US011594378B2

(12) United States Patent
Onodera et al.

(10) Patent No.: US 11,594,378 B2
(45) Date of Patent: *Feb. 28, 2023

(54) ELECTRONIC COMPONENT AND ELECTRONIC COMPONENT DEVICE

(71) Applicant: TDK CORPORATION, Tokyo (JP)

(72) Inventors: Shinya Onodera, Tokyo (JP); Koki Ito, Tokyo (JP); Hideki Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,524

(22) Filed: Nov. 10, 2021

(65) Prior Publication Data

US 2022/0084753 A1 Mar. 17, 2022

Related U.S. Application Data

(63) Continuation of application No. 16/097,175, filed as application No. PCT/JP2017/033943 on Sep. 20, 2017, now Pat. No. 11,264,172.

(30) Foreign Application Priority Data

Sep. 23, 2016 (JP) ............................ JP2016-185862
Mar. 16, 2017 (JP) ............................ JP2017-051594
(Continued)

(51) Int. Cl.
*H01G 4/30* (2006.01)
*H01G 2/06* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01); *H01G 4/1218* (2013.01)

(58) Field of Classification Search
None
See application file for complete search history.

(56) References Cited

U.S. PATENT DOCUMENTS 6,381,117 B1 4/2002 Nakagawa et al.
9,159,495 B2 10/2015 Shim et al.
(Continued)

FOREIGN PATENT DOCUMENTS

CN 101034622 A 9/2007
CN 101454852 A 6/2009
(Continued)

OTHER PUBLICATIONS

Dec. 12, 2017 International Search Report issued in International Patent Application No. PCT/JP2017/033943.
(Continued)

*Primary Examiner* — Dion R. Ferguson
(74) *Attorney, Agent, or Firm* — Oliff PLC

(57) ABSTRACT

An element body includes a principal surface arranged to constitute a mounting surface and a first side surface adjacent to the principal surface. An external electrode includes a first electrode portion disposed on the principal surface and a second electrode portion disposed on the first side surface. The first electrode portion includes a sintered metal layer, a conductive resin layer formed on the sintered metal layer, and a plating layer formed on the conductive resin layer. The second electrode portion includes a first region and a second region. The first region includes a sintered metal layer and a plating layer formed on the sintered metal layer. The second region includes a sintered metal layer, a conductive resin layer formed on the sintered metal layer, and a plating layer formed on the conductive resin layer. The second region is located closer to the principal surface than the first region.

23 Claims, 80 Drawing Sheets

(30) Foreign Application Priority Data

| | | |
|---|---|---|
| Mar. 29, 2017 | (JP) | JP2017-064822 |
| Sep. 7, 2017 | (JP) | JP2017-172120 |
| Sep. 7, 2017 | (JP) | JP2017-172127 |

(51) Int. Cl.

| | |
|---|---|
| ***H01G 4/008*** | (2006.01) |
| ***H01G 4/012*** | (2006.01) |
| ***H01G 4/12*** | (2006.01) |

(56) References Cited

U.S. PATENT DOCUMENTS

| | | | | |
|---|---|---|---|---|
| 9,336,946 | B2 | 5/2016 | Lee et al. | |
| 9,343,235 | B2 | 5/2016 | Lee et al. | |
| 10,249,438 | B1 | 4/2019 | Byun et al. | |
| 10,453,612 | B2 | 10/2019 | Terashita et al. | |
| 10,510,486 | B2 | 12/2019 | Yamada | |
| 10,600,570 | B2 | 3/2020 | Onodera et al. | |
| 10,707,020 | B2 | 7/2020 | Onodera et al. | |
| 10,763,042 | B2 | 9/2020 | Onodera et al. | |
| 10,818,431 | B2 | 10/2020 | Onodera et al. | |
| 10,840,021 | B2 | 11/2020 | Yamada | |
| 11,264,172 | B2 * | 3/2022 | Onodera | H01G 4/008 |
| 2005/0185360 | A1 | 8/2005 | Purple et al. | |
| 2007/0211410 | A1 | 9/2007 | Togashi | |
| 2009/0040688 | A1 | 2/2009 | Kayatani | |
| 2012/0073129 | A1 | 3/2012 | Abe et al. | |
| 2014/0345927 | A1 | 11/2014 | Itagaki | |
| 2015/0022945 | A1 | 1/2015 | Park et al. | |
| 2015/0041194 | A1 | 2/2015 | Shim et al. | |
| 2015/0162132 | A1 | 6/2015 | Kwag et al. | |
| 2015/0255213 | A1 | 9/2015 | Lee et al. | |
| 2015/0287533 | A1 | 10/2015 | Lee et al. | |
| 2015/0287670 | A1 | 10/2015 | Fukase et al. | |
| 2015/0364256 | A1 | 12/2015 | Zenzai et al. | |
| 2016/0005539 | A1 | 1/2016 | Lee et al. | |
| 2016/0126012 | A1 | 5/2016 | Kim et al. | |
| 2016/0240315 | A1 | 8/2016 | Onoue et al. | |
| 2016/0240316 | A1 | 8/2016 | Onoue et al. | |
| 2016/0381802 | A1 | 12/2016 | Taniguchi et al. | |
| 2017/0098505 | A1 | 4/2017 | Ando et al. | |
| 2017/0256359 | A1 | 9/2017 | Masunari | |
| 2018/0068792 | A1 | 3/2018 | Egashira et al. | |
| 2018/0114644 | A1 | 4/2018 | Sugita | |
| 2018/0151296 | A1 | 5/2018 | Yamada | |
| 2018/0174753 | A1 | 6/2018 | Terashita et al. | |
| 2018/0268998 | A1 | 9/2018 | Onodera et al. | |
| 2019/0080845 | A1 | 3/2019 | Onodera et al. | |
| 2019/0096576 | A1 | 3/2019 | Onodera et al. | |
| 2019/0131070 | A1 | 5/2019 | Onodera et al. | |
| 2019/0131072 | A1 | 5/2019 | Onodera et al. | |
| 2019/0131073 | A1 | 5/2019 | Onodera et al. | |
| 2019/0131076 | A1 | 5/2019 | Fukumura | |
| 2019/0164696 | A1 | 5/2019 | Onodera et al. | |
| 2019/0237250 | A1 | 8/2019 | Onodera et al. | |
| 2019/0237261 | A1 | 8/2019 | Onodera et al. | |
| 2019/0378654 | A1 | 12/2019 | Yamada | |
| 2020/0312550 | A1 | 10/2020 | Nagai et al. | |
| 2020/0312551 | A1 | 10/2020 | Nagai et al. | |
| 2022/0084753 | A1 | 3/2022 | Onodera et al. | |

FOREIGN PATENT DOCUMENTS

| | | | | |
|---|---|---|---|---|
| CN | 104183386 | A | | 12/2014 |
| CN | 105280374 | A | | 1/2016 |
| CN | 105895369 | A | | 8/2016 |
| CN | 105895372 | A | | 8/2016 |
| JP | S58-175817 | A | | 10/1983 |
| JP | H08-107038 | A | | 4/1996 |
| JP | H8-203770 | A | | 8/1996 |
| JP | 2002-198229 | A | | 7/2002 |
| JP | 2004-259991 | A | | 9/2004 |
| JP | 2004-296936 | A | | 10/2004 |
| JP | 2007-243039 | A | | 9/2007 |
| JP | 2008-181956 | A | | 8/2008 |
| JP | 2010226017 | A | * | 10/2010 |
| JP | 4947076 | B2 | | 6/2012 |
| JP | 2016-004659 | A | | 1/2016 |
| JP | 2016-018985 | A | | 2/2016 |
| JP | 2017-028229 | A | | 2/2017 |
| JP | 2018-32670 | A | | 3/2018 |
| JP | 2018-041761 | A | | 3/2018 |
| JP | 2018-088451 | A | | 6/2018 |
| KR | 10-2007-0092644 | A | | 9/2007 |
| KR | 10-2015-0115184 | A | | 10/2015 |
| KR | 10-2015-0144290 | A | | 12/2015 |
| KR | 10-2016-0005492 | A | | 1/2016 |
| KR | 10-2016-0053682 | A | | 5/2016 |
| WO | 2014/038066 | A1 | | 3/2014 |
| WO | 2016/208633 | A1 | | 12/2016 |

OTHER PUBLICATIONS

Mar. 26, 2019 International Preliminary Report on Patentability issued in International Patent Application No. PCT/JP2017/033943.

Aug. 27, 2021 Final Office Action issued in U.S. Appl. No. 16/097,175.

Nov. 8, 2021 Notice of Allowance Issued in U.S. Appl. No. 16/097,175.

Nov. 16, 2022 Office Action issued in U.S. Appl. No. 17/881,204.

* cited by examiner

ELECTRONIC COMPONENT AND ELECTRONIC COMPONENT DEVICE

This is a Continuation of U.S. application Ser. No. 16/097,175 filed Oct. 26, 2018, which is a National Stage Application of International Application No. PCT/JP2017/033943 filed Sep. 20, 2017, which claims the benefit Japanese Application No. 2016-185862 filed Sep. 23, 2016, Japanese Application No. 2017-051594 filed Mar. 16, 2017, Japanese Application No. 2017-064822 filed Mar. 29, 2017, Japanese Application No. 2017-172120 filed Sep. 7, 2017, and Japanese Application No. 2017-172127 filed Sep. 7, 2017. The disclosure of the prior applications is hereby incorporated by reference herein in its entirety.

TECHNICAL FIELD

The present invention relates to an electronic component and an electronic component device.

BACKGROUND ART

Known electronic components include an element body and an external electrode disposed on the element body (see, for example, Patent Literature 1). The element body includes a principal surface and a first side surface adjacent to the principal surface. The external electrode includes a first electrode portion and a second electrode portion. The first electrode portion is disposed on the principal surface. The second electrode portion is disposed on the first side surface and is coupled to the first electrode portion. The principal surface is arranged to constitute a mounting surface opposing an electronic device (e.g., a circuit board or an electronic component) on which the electronic component is solder-mounted.

CITATION LIST

Patent Literature

Patent Literature 1: Japanese Unexamined Patent Publication No. S58-175817

SUMMARY OF INVENTION

Technical Problem

An object of the present invention is to provide an electronic component and an electronic component device that suppress occurrence of a crack in an element body.

Solution to Problem

As a result of researches and studies, the present inventors have discovered the following facts. In a case in which the electronic component is solder-mounted on an electronic device (e.g., a circuit board or an electronic component), external force applied onto the electronic component from the electronic device may act as stress on the element body. The external force is applied onto the element body from a solder fillet formed at the solder-mounting, through the external electrode. The stress tends to concentrate on an end edge of the external electrode. For example, the stress tends to concentrate on an end edge of the first electrode portion located on the principal surface arranged to constitute the mounting surface. Therefore, a crack may occur in the element body with the end edge of the first electrode portion serving as an origination.

An electronic component according to a first aspect of the present invention includes an element body of a rectangular parallelepiped shape and an external electrode. The element body includes a principal surface arranged to constitute a mounting surface and a first side surface adjacent to the principal surface. The external electrode includes a first electrode portion and a second electrode portion. The first electrode portion is disposed on the principal surface. The second electrode portion is disposed on the first side surface and is coupled to the first electrode portion. The first electrode portion includes a sintered metal layer, a conductive resin layer formed on the sintered metal layer, and a plating layer formed on the conductive resin layer. The second electrode portion includes a first region and a second region. The first region includes a sintered metal layer and a plating layer formed on the sintered metal layer. The second region includes a sintered metal layer, a conductive resin layer formed on the sintered metal layer, and a plating layer formed on the conductive resin layer. The second region is located closer to the principal surface than the first region.

In the first aspect, the first electrode portion includes the conductive resin layer, and the second region included in the second electrode portion includes the conductive resin layer. Therefore, stress tends not to concentrate on an end edge of the external electrode, even in a case in which external force is applied onto the electronic component through a solder fillet. The end edge of the external electrode tends not to serve as an origination of a crack. Consequently, occurrence of the crack in the element body is suppressed.

In the first aspect, a ratio of a length of the second region in a direction orthogonal to the principal surface, to a length of the element body in the direction orthogonal to the principal surface may be equal to or more than 0.2. In this case, the stress further tends not to concentrate on the end edge of the external electrode. Therefore, the occurrence of a crack in the element body is further suppressed.

In the first aspect, the element body may further include a second side surface adjacent to the principal surface and the first side surface. The external electrode may further include a third electrode portion. In this case, the third electrode portion is disposed in the second side surface and is coupled to the first electrode portion. The third electrode portion may include a third region and a fourth region. In this case, the third region includes a sintered metal layer and a plating layer formed on the sintered metal layer. The fourth region includes a sintered metal layer, a conductive resin layer formed on the sintered metal layer, and a plating layer formed on the conductive resin layer. The fourth region is located closer to the principal surface than the third region. In this configuration, the fourth region included in the third electrode portion includes the conductive resin layer. Therefore, the stress tends not to concentrate on the end edge of the external electrode, even in a case in which the external electrode includes the third electrode portion. Consequently, the occurrence of a crack in the element body is reliably suppressed.

In the first aspect, a ratio of a length of the fourth region in the direction orthogonal to the principal surface, to a length of the element body in the direction orthogonal to the principal surface may be equal to or more than 0.2. In this case, the stress further tends not to concentrate on the end edge of the external electrode. Therefore, the occurrence of a crack in the element body is further suppressed.

An electronic component device according to a second aspect of the present invention includes the electronic component according to the first aspect and an electronic device. The electronic device includes a pad electrode. The pad electrode is coupled to the external electrode via a solder fillet. The solder fillet is formed on the first region and second region included in the second electrode portion.

In the second aspect, the first electrode portion includes the conductive resin layer, and the second region included in the second electrode portion includes the conductive resin layer. Therefore, stress tends not to concentrate on an end edge of the external electrode, even in a case in which external force is applied onto the electronic component through a solder fillet. The end edge of the external electrode tends not to serve as an origination of a crack. Consequently, occurrence of a crack in the element body is suppressed.

In the second aspect, the solder fillet is also formed on the first region in addition to the second region included in the second electrode portion. In the second aspect, a region on which the solder fillet is formed is large, as compared with in an electronic component device where the solder fillet is only formed on the second region. Consequently, mounting strength of the electronic component is secured.

As a result of researches and studies, the present inventors have further discovered the following facts. Stress acting on the element body tends to concentrate on an end edge of a sintered metal layer. Therefore, a crack may occur in the element body with the end edge of the sintered metal layer serving as an origination. For example, the stress tends to concentrate on an end edge of an end region near a principal surface of the sintered metal layer when viewed from a direction orthogonal to a side surface.

An electronic component according to a third aspect of the present invention includes an element body of a rectangular parallelepiped shape and an external electrode. The element body includes a principal surface arranged to constitute a mounting surface and a side surface adjacent to the principal surface. The external electrode includes an electrode portion disposed on the side surface. The electrode portion includes a first region and a second region. The first region includes a sintered metal layer formed on the side surface and a plating layer formed on the sintered metal layer. The second region includes a sintered metal layer formed on the side surface, a conductive resin layer formed over the sintered metal layer and the side surface, and a plating layer formed on the conductive resin layer. The second region is located closer to the principal surface than the first region.

In the third aspect, the second region located closer to the principal surface than the first region includes the conductive resin layer formed over the sintered metal layer and the side surface. The conductive resin layer covers an end edge of the sintered metal layer included in the second region. Therefore, stress tends not to concentrate on the end edge of the sintered metal layer included in the second region, even in a case in which external force is applied onto the electronic component through a solder fillet. The end edge of the sintered metal layer tends not to serve as an origination of a crack. Consequently, occurrence of the crack in the element body is reliably suppressed.

In an electronic component described in Japanese Unexamined Patent Publication No. 2004-296936, the conductive resin layer does not cover the end edge of the sintered metal layer included in the second region. In this case, the stress tends to concentrate on the end edge of the sintered metal layer included in the second region. The end edge of the sintered metal layer may serve as an origination of the crack.

In the third aspect, the second region may include a first portion and a second portion. In this case, in the first portion, the conductive resin layer is formed on the sintered metal layer. In the second portion, the conductive resin layer is formed on the side surface. A width of the second portion may continuously decrease with an increase in distance from the principal surface.

Internal stress is generated in a plating layer at a forming process of the plating layer. In a case in which a shape of the plating layer in plan view has a corner, the internal stress tends to concentrate on the corner. Therefore, the plating layer or a conductive resin layer located under the plating layer may peel off at the corner of the plating layer.

Bonding strength between the conductive resin layer and the element body is smaller than bonding strength between the conductive resin layer and the sintered metal layer. Therefore, in the second portion, in which the conductive resin layer is formed on the side surface, of the second region, the conductive resin layer tends to peel off from the side surface, as compared with in the first portion.

In a case in which the width of the second portion continuously decreases with the increase in distance from the principal surface, the shape of the second portion in plan view has no corner. Therefore, a portion on which the internal stress concentrates tends not to be generated in the plating layer. Consequently, occurrence of peel-off of the plating layer and the conductive resin layer in the second portion is suppressed.

In the third aspect, an end edge of the second portion may be curved when viewed from in a direction orthogonal to the side surface. Also in this case, the shape of the second portion in plan view has no corner. Therefore, a portion on which the internal stress concentrates tends not to be generated in the plating layer included in the second portion. Consequently, occurrence of peel-off of the plating layer and the conductive resin layer in the second portion is suppressed.

In the third aspect, an end edge of the second region may have an approximately arc shape when viewed from in a direction orthogonal to the side surface. Also in this case, the shape of the second portion in plan view has no corner. Therefore, a portion on which the internal stress concentrates tends not to be generated in the plating layer included in the second portion. Consequently, occurrence of peel-off of the plating layer and the conductive resin layer in the second portion is suppressed.

As a result of researches and studies, the present inventors have further discovered the following facts. Stress acting on the element body tends to concentrate on an end edge of a sintered metal layer when viewed from a direction orthogonal to a principal surface and an end edge of an end region near a principal surface of the sintered metal layer when viewed from a direction orthogonal to a side surface, for example.

An electronic component according to a fourth aspect of the present invention includes an element body of a rectangular parallelepiped shape. The element body includes a principal surface arranged to constitute a mounting surface, a pair of end surfaces opposing each other and adjacent to the principal surface, and a side surface adjacent to the pair of end surfaces and the principal surface. The electronic component includes external electrodes disposed at each end portion of the element body in a direction in which the pair of end surfaces opposes each other. The external electrode includes a sintered metal layer and a conductive resin layer formed over the sintered metal layer and the element body. An entirety of the sintered metal layer is covered with the conductive resin layer when viewed from a direction orthogonal to the principal surface. An edge region near the principal surface of the sintered metal layer is covered with the conductive resin layer and an end edge of the conductive resin layer crosses an end edge of the sintered metal layer, when viewed from a direction orthogonal to the side surface.

In the fourth aspect, when viewed from the direction orthogonal to the principal surface, the entire sintered metal layer is covered with the conductive resin layer. Therefore, stress tends not to concentrate on an end edge of the sintered metal layer. The edge region near the principal surface of the sintered metal layer is covered with the conductive resin layer when viewed from a direction orthogonal to the side surface. Therefore, stress tends not to concentrate on an end edge of the edge region. Consequently, occurrence of the crack in the element body is suppressed.

In the fourth aspect, when viewed from a direction orthogonal to the side surface, the end edge of the conductive resin layer crosses the end edge of the sintered metal layer. The entire sintered metal layer is not covered with the conductive resin layer. The sintered metal layer includes a region exposed from the conductive resin layer. Therefore, in the fourth aspect, an increase in an amount of conductive resin paste used for forming the conductive resin layer is suppressed.

In the fourth aspect, the external electrode may include a first electrode portion. In this case, the first electrode portion is disposed on the side surface and on a ridge portion located between the end surface and the side surface. The first portion may include a first region and a second region. In this case, in the first region, the sintered metal layer is exposed from the conductive resin layer. In the second region, the sintered metal layer is covered with the conductive resin layer. The second region is located closer to the principal surface than the first region. A width of the second portion in the direction in which the pair of side surface opposes each other may decrease with an increase in distance from the principal surface. In this configuration, the increase in the amount of conductive resin paste used for forming the conductive resin layer is further suppressed.

In the fourth aspect, an end edge of the second portion may have an approximately arc shape when viewed from the direction orthogonal to the side surface. In the fourth aspect, an end edge of the second portion may be approximately linear when viewed from the direction orthogonal to the side surface. In the fourth aspect, an end edge of the second portion may have two side edges crossing each other when viewed from the direction orthogonal to the side surface.

An electronic component according to a fifth aspect of the present invention includes an element body of a rectangular parallelepiped shape. The element body includes a first principal surface arranged to constitute a mounting surface, a pair of end surfaces opposing each other and adjacent to the first principal surface, and a pair of side surface opposing each other and adjacent to the pair of end surfaces and the first principal surface. The electronic component includes external electrodes disposed at each end portion of the element body in a direction in which the pair of end surfaces opposes each other. The external electrode includes a conductive resin layer is formed to continuously cover a part of the first principal surface, a part of the end surface, and a part of each of the pair of side surfaces.

External force applied onto the electronic component from the electronic device tends to act on a region defined by the part of the first principal surface, the part of the end surface, and the part of each of the pair of side surfaces, for example. A crack may occur in the element body due to the external force.

In the fifth aspect, the conductive resin layer is formed to continuously cover the part of the first principal surface, the part of the end surface, and the part of each of the pair of side surfaces.

Therefore, the external force applied onto the electronic component from the electronic device tends not to act on the element body. Consequently, the fifth aspect suppresses occurrence of a crack in the element body.

A region between the element body and the conductive resin layer may act as a path through which moisture infiltrates. In a case in which moisture infiltrates from the region between the element body and the conductive resin layer, durability of the electronic component decreases. The fifth aspect includes few paths through which moisture infiltrates, as compared with an electronic component in which the conductive resin layer is formed to continuously cover an entire end surface, a part of each of a pair of principal surface, and a part of each of a pair of side surfaces. Therefore, the fifth aspect improves moisture resistance reliability.

The fifth aspect may include an internal conductor exposed to the corresponding end surface. The external electrode may include a sintered metal layer formed on the end surface to be connected to the internal conductor. In this case, the sintered metal layer is favorably in contact with the internal conductor. Therefore, the external electrode and the internal conductor are reliably electrically connected to each other.

In the fifth aspect, the sintered metal layer may include a first region and a second region. In this case, the first region is covered with the conductive resin layer. The second region is exposed from the conductive resin layer. The conductive resin layer includes a conductive material (e.g., metal powder) and a resin (e.g., a thermosetting resin). Electric resistance of the conductive resin layer is larger than electric resistance of the sintered metal layer. In a case in which the sintered metal layer includes the second region, the second region is electrically connected to the electronic device without passing through the conductive resin layer. Therefore, this configuration suppresses an increase in equivalent series resistance (ESR), even in a case in which the external electrode includes the conductive resin layer.

In the fifth aspect, the sintered metal layer may also be formed on a first ridge portion located between the end surface and the side surface and a second ridge portion located between the end surface and the first principal surface. Bonding strength between the conductive resin layer and the element body is smaller than bonding strength between the conductive resin layer and the sintered metal layer. In this configuration, the sintered metal layer is formed on the first ridge portion and the second ridge portion. Therefore, even in a case in which the conductive resin layer peels off from the element body, the peel-off of the conductive resin layer tends not to develop to a position corresponding to the end surface beyond a position corresponding to the first and second ridge portions.

In the fifth aspect, the conductive resin layer may be formed to cover a part of a portion of the sintered metal layer formed on the first ridge portion and an entirety of a portion of the sintered metal layer formed on the second ridge portion. In this configuration, the peel-off of the conductive resin layer further tends not to develop to the position corresponding to the end surface.

The Stress acting on the element body due to the external force applied onto the electronic component from the electronic device tends to concentrate on an end edge of the sintered metal layer. Therefore, a crack may occur in the element body with the end edge of the sintered metal layer serving as an origination. In a case in which the conductive resin layer is formed to cover the part of the portion of the sintered metal layer formed on the first ridge portion and an entirety of the portion of the sintered metal layer formed on the second ridge portion, the stress tends not to concentrate on the end edge of the sintered metal layer. Therefore, the occurrence of the crack in the element body is reliably suppressed.

In the fifth aspect, an area of the conductive resin layer located on the side surface and the first ridge portion may be larger than an area of the sintered metal layer located on the first ridge portion. An area of the conductive resin layer located on the end surface and the second ridge portion may be smaller than an area of the sintered metal layer located on the end surface and the second ridge portion. In this case, the increase in ESR is further suppressed.

In the fifth aspect, a part of the portion of the sintered metal layer formed on the first ridge portion may be exposed from the conductive resin layer. In this case, the area of the conductive resin layer located on the side surface and the first ridge portion may be larger than an area of the part of the portion of the sintered metal layer formed on the first ridge portion. This configuration further suppresses the increase in ESR.

In the fifth aspect, the area of the conductive resin layer located on the end surface and the second ridge portion may be smaller than an area of a region exposed from the conductive resin layer in the sintered metal layer located on the end surface and the second ridge portion. In this case, the increase in ESR is further suppressed.

In the fifth aspect, the external electrode may include a plating layer formed to cover the conductive resin layer and the second region included in the sintered metal layer. In this case, the external electrode includes the plating layer, and thus the electronic component can be solder-mounting on the electronic device. The second region included in the sintered metal layer is electrically connected to the electronic device via the plating layer, and thus the increase in ESR is further suppressed.

In the fifth aspect, when viewed from a direction orthogonal to the end surface, a height of the conductive resin layer may be a half of a height of the element body, or less. This configuration includes few paths through which moisture infiltrates, as compared with an electronic component in which a height of the conductive resin layer is higher than a half of a height of the element body when viewed from a direction orthogonal to the end surface. Therefore, the moisture resistance reliability is further improved. This configuration suppresses the increase in ESR, as compared with the electronic component in which the height of the conductive resin layer is higher than the half of the height of the element body when viewed from the direction orthogonal to the end surface.

In the fifth aspect, the element body may include a second principal surface opposing the first principal surface arranged to constitute the mounting surface. The second principal surface may be exposed from the conductive resin layer. In this case, the increase in ESR is suppressed.

In the fifth aspect, the conductive resin layer may be in contact with a ridge portion located between the first principal surface and the side surface. In this configuration, a crack tends not to occur in the ridge portion located between the first principal surface and the side surface.

An electronic component according to a sixth aspect of the present invention includes an element body of a rectangular parallelepiped shape. The element body includes a first principal surface arranged to constitute a mounting surface, a second principal surface opposing the first principal surface in a first direction, a pair of side surfaces opposing each other in a second direction, and a pair of end surfaces opposing each other in a third direction. The electronic component includes a plurality of internal electrodes. The plurality of internal electrodes is disposed in the element body and opposes each other in the second direction. The plurality of internal electrodes includes one end exposed to the corresponding end surface. The electronic component includes external electrodes disposed at both end portions of the element body in the third direction. The external electrode is coupled to the corresponding internal electrode. The external electrode includes a conductive resin layer formed to cover a portion near the first principal surface in the end surface.

External force applied onto the electronic component from the electronic device tends to act on the element body through a region near the first principal surface in the end surface, for example. A crack may occur in the element body due to the external force.

In the sixth aspect, the conductive resin layer is formed to cover the portion near the first principal surface in the end surface. Therefore, the external force applied onto the electronic component from the electronic device tends not to act on the element body. Consequently, the sixth aspect suppresses occurrence of a crack in the element body.

In the sixth aspect, the conductive resin layer is formed to cover the portion near the first principal surface in the end surface. The end surface includes a region not covered with the conductive resin layer when viewed from the third direction. Therefore, the sixth aspect includes few paths through which moisture infiltrates, as compared with an electronic component in which a conductive resin layer is formed to cover an entire end surface. Consequently, the sixth aspect improves moisture resistance reliability.

In the sixth aspect, the first principal surface is arranged to constitute a mounting surface and the plurality of internal electrodes opposes each other in the second direction. Therefore, in the sixth aspect, a current path formed for each of the internal electrodes is short. Consequently, the sixth aspect reduces equivalent series inductance (ESL).

In the sixth aspect, the one end of the internal electrode may include a first region and a second region, when viewed from the third direction. In this case, the first region overlaps with the conductive resin layer. The second region does not overlap with the conductive resin layer. This configuration includes few paths through which moisture infiltrates, and thus the moisture resistance reliability is reliably improved.

In the sixth aspect, a length of the first region at the one end of the internal electrode in the first direction may be smaller than a length of the second region at the one end of the internal electrode in the first direction. This configuration includes even fewer paths through which moisture infiltrates, and thus the moisture resistance reliability is further improved.

In the sixth aspect, the external electrode may include a sintered metal layer formed on the end surface to be connected to the second region of the one end of the internal electrode. In this case, the external electrode and the internal electrode are favorably in contact with each other. Therefore, the external electrode and the internal electrode are reliably electrically connected to each other. As described above, electric resistance of the conductive resin layer is larger than electric resistance of the sintered metal layer. In a case in which the external electrode includes the sintered metal layer connected to the internal electrode, the sintered metal layer is electrically connected to the electronic device without passing through the conductive resin layer. Therefore, this configuration suppresses an increase in ESR, even in a case in which the external electrode includes the conductive resin layer.

In the sixth aspect, the plurality of internal electrodes may include a plurality of first internal electrodes and a plurality of second internal electrodes. In this case, the plurality of first internal electrodes is exposed at one of the pair of the end surface. The plurality of second internal electrodes is exposed at another of the pair of the end surface. The one ends of all the first internal electrodes and the one ends of all the second internal electrodes may be connected to the respective sintered metal layers. In this case, the increase in ESR is further suppressed.

In the sixth aspect, the external electrode may include a plating layer formed to cover the conductive resin layer and the sintered metal layer. In this case, the external electrode includes the plating layer. The electronic component according to this configuration can be solder-mounting on the electronic device. The sintered metal layer is electrically connected to the electronic device via the plating layer. Therefore, this configuration further suppresses the increase in ESR.

In the sixth aspect, an end edge of the conductive resin layer and the one end of the internal electrode cross each other when viewed from the third direction. This configuration includes few paths through which moisture infiltrates, and thus the moisture resistance reliability is reliably improved.

In the sixth aspect, the conductive resin layer may be formed to also cover a portion near the end surface in the first principal surface. External force applied onto the electronic component from the electronic device may act on the element body through a region near the end surface in the first principal surface. Therefore, this configuration reliably suppresses occurrence of a crack in the element body.

In the sixth aspect, the conductive resin layer may be formed to also cover a portion near the end surface in the side surface. External force applied onto the electronic component from the electronic device may act on the element body through a region near the end surface in the side surface. Therefore, this configuration reliably suppresses occurrence of a crack in the element body.

In the sixth aspect, a portion of the conductive resin layer located on the side surface may oppose the internal electrode having a polarity different from that of the portion, in the second direction. In this case, capacitance component is formed between the portion of the conductive resin layer located on the side surface and the internal electrode opposing the portion. Therefore, in this configuration, electrostatic capacitance increases.

In the sixth aspect, the conductive resin layer may be not formed on the second principal surface. In a case in which the electronic component is mounted on an electronic device in such a manner that the first principal surface is arranged to constitute the mounting surface, the second principal surface needs to be picked up by a suction nozzle of a component mounting device (mounter). In this configuration, a shape of the external electrode on the first principal surface is different from a shape of the external electrode on the second principal surface. Therefore, the first principal surface and the second principal surface are easily distinguished from each other. Consequently, the electronic component according this configuration is reliably mounted on the electronic device.

In the sixth aspect, a distance between the side surface and the internal electrode nearest to the side surface in the second direction may be larger than a distance between the first principal surface and the internal electrode in the first direction, and larger than a distance between the first principal surface and the internal electrode in the first direction. In this case, even in a case in which a crack occurs from the side surface of the element body, the crack tends not to reach to the internal electrode.

Advantageous Effects of Invention

The present invention provides an electronic component and an electronic component device that suppress occurrence of a crack in an element body.

DESCRIPTION OF EMBODIMENTS

Figure 1:
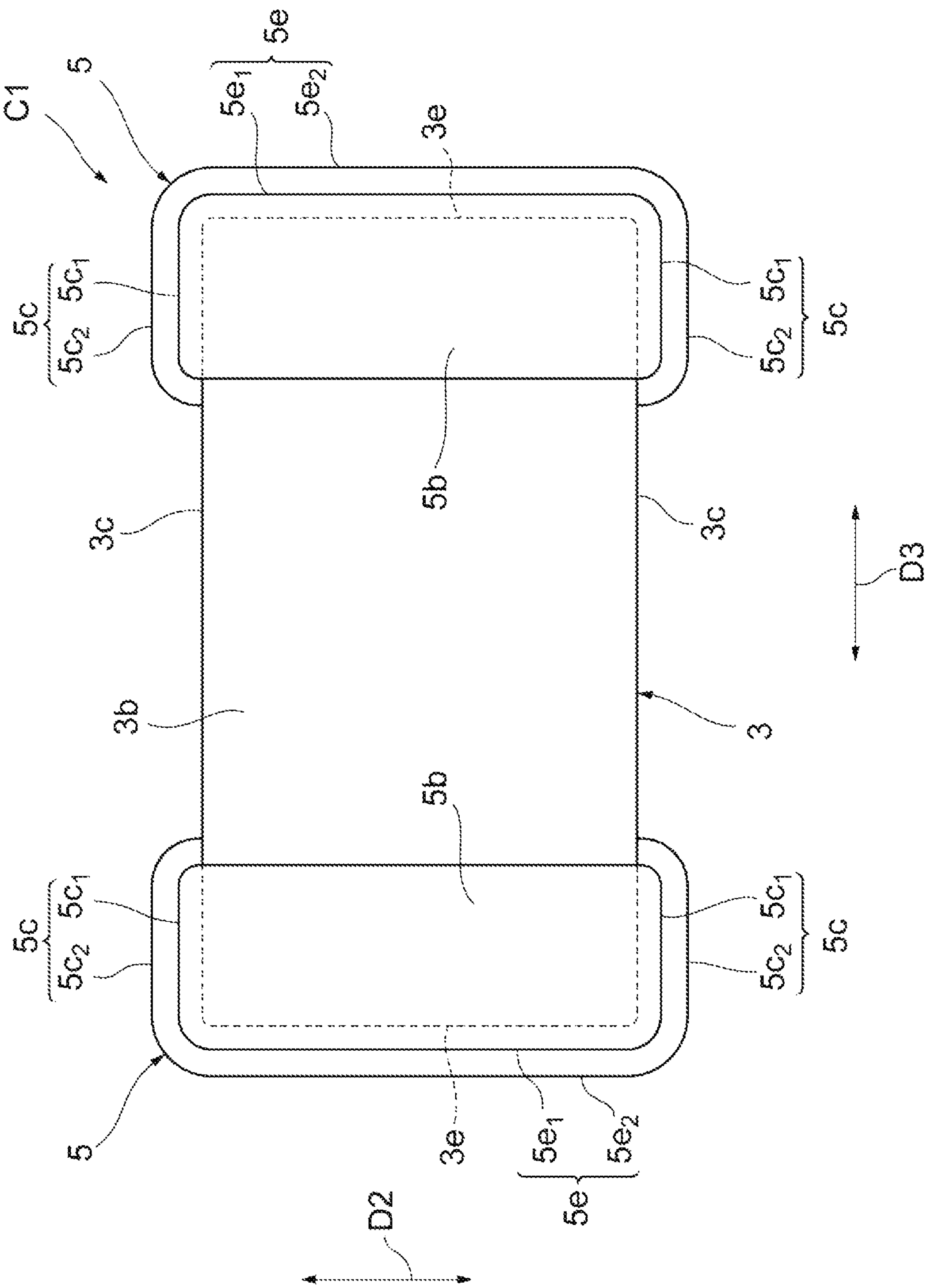
FIG. 1 is a plan view of a multilayer capacitor according to a first embodiment.

Embodiments of the present invention will be hereinafter described in detail with reference to the accompanying drawings. In the description, the same reference numerals are used for the same elements or elements having the same functions, and redundant descriptions thereabout are omitted.

First Embodiment

Figure 2:
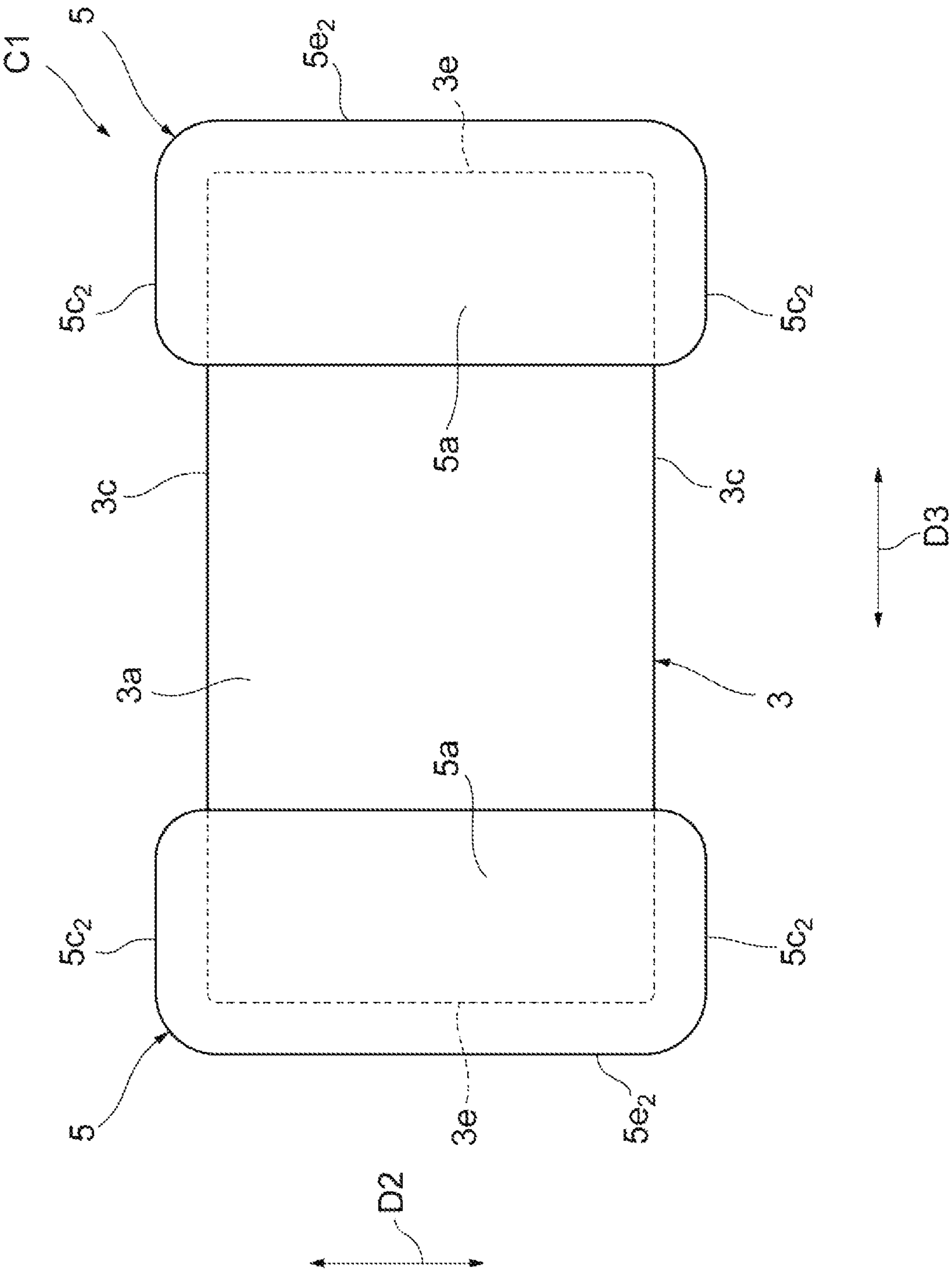
FIG. 2 is a plan view of the multilayer capacitor according to the first embodiment.
Figure 3:
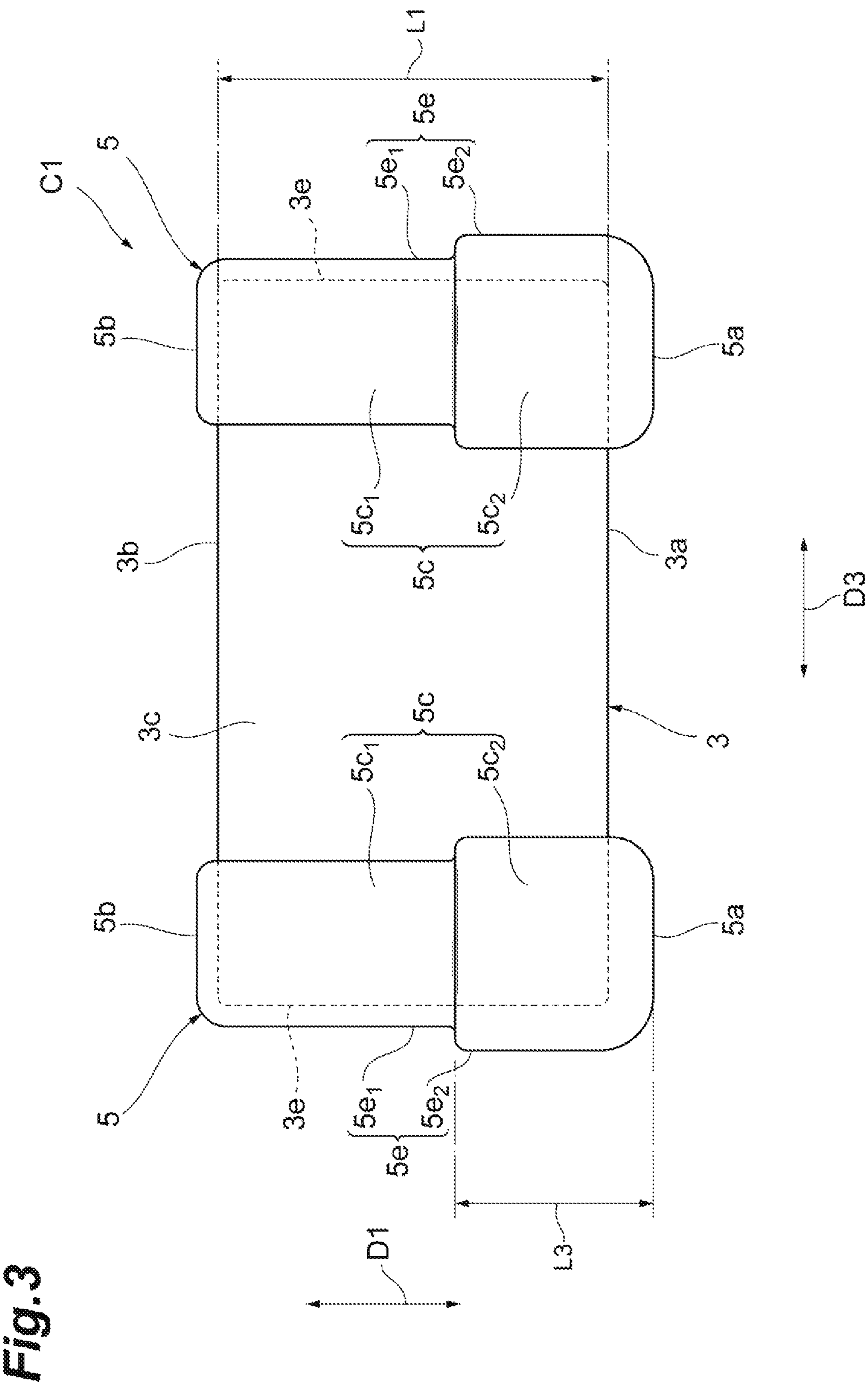
FIG. 3 is a side view of the multilayer capacitor according to the first embodiment.
Figure 4:
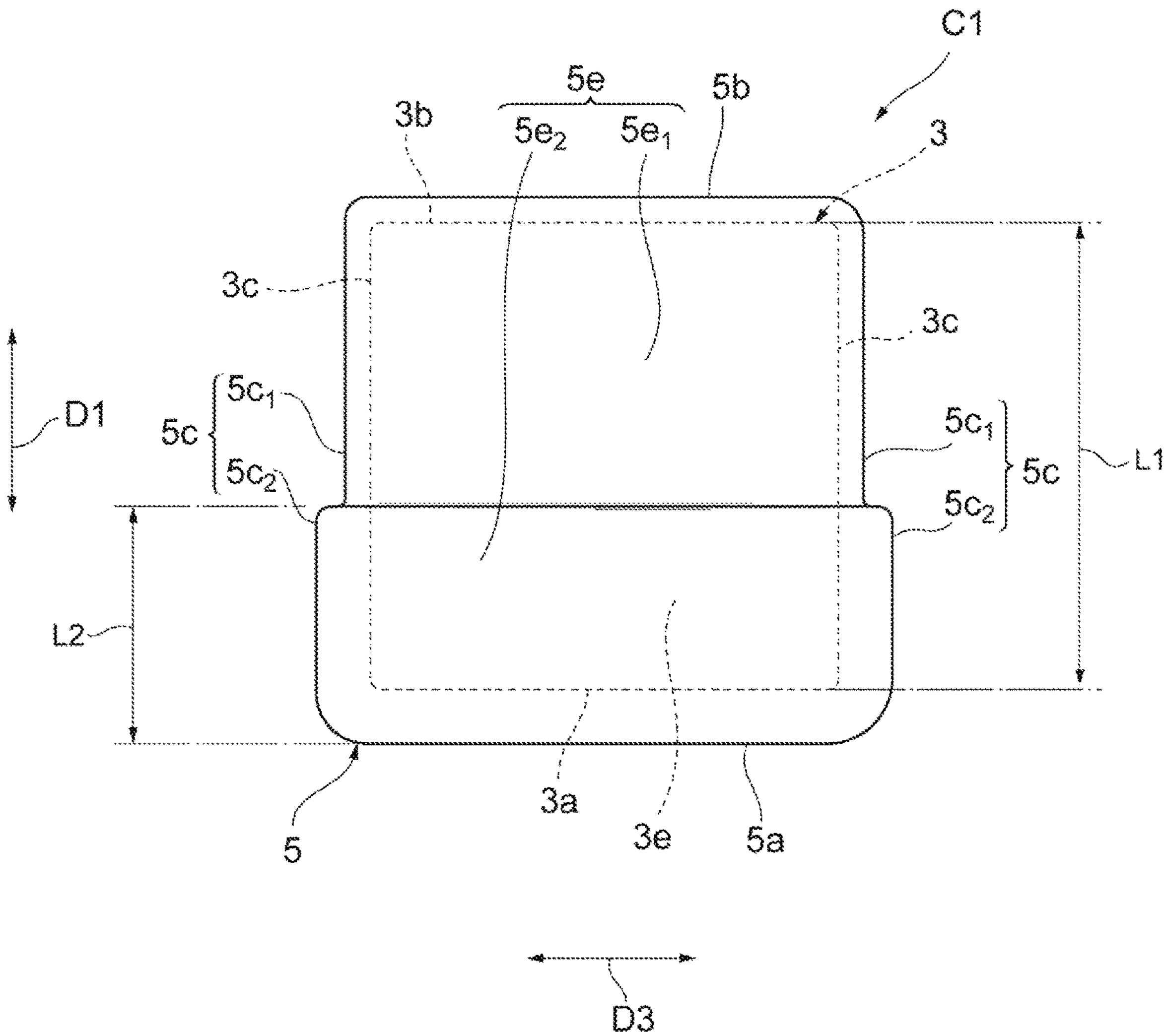
FIG. 4 is a side view of the multilayer capacitor according to the first embodiment.
Figure 5:
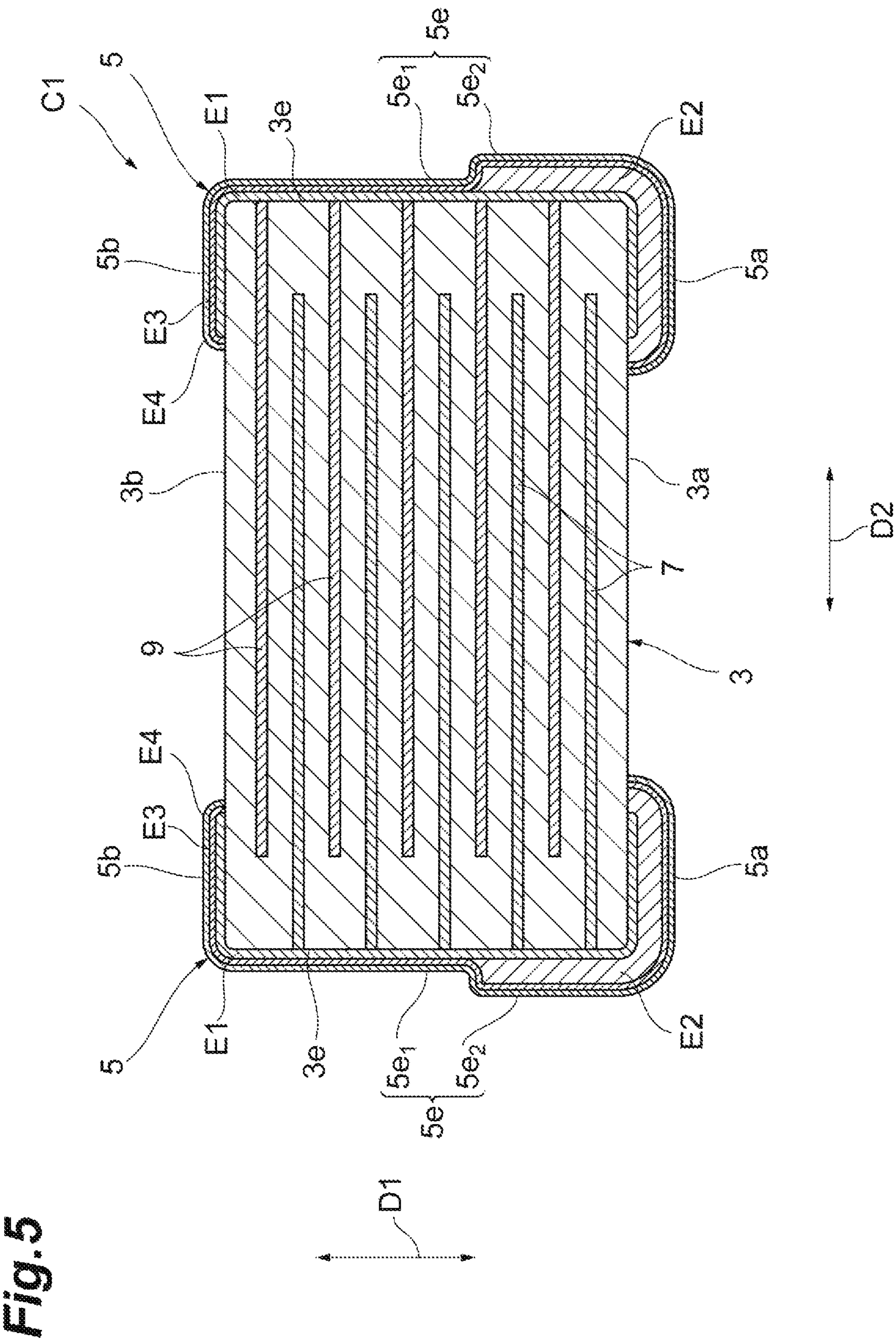
FIG. 5 is a view illustrating a cross-sectional configuration of the multilayer capacitor according to the first embodiment.
Figure 6:
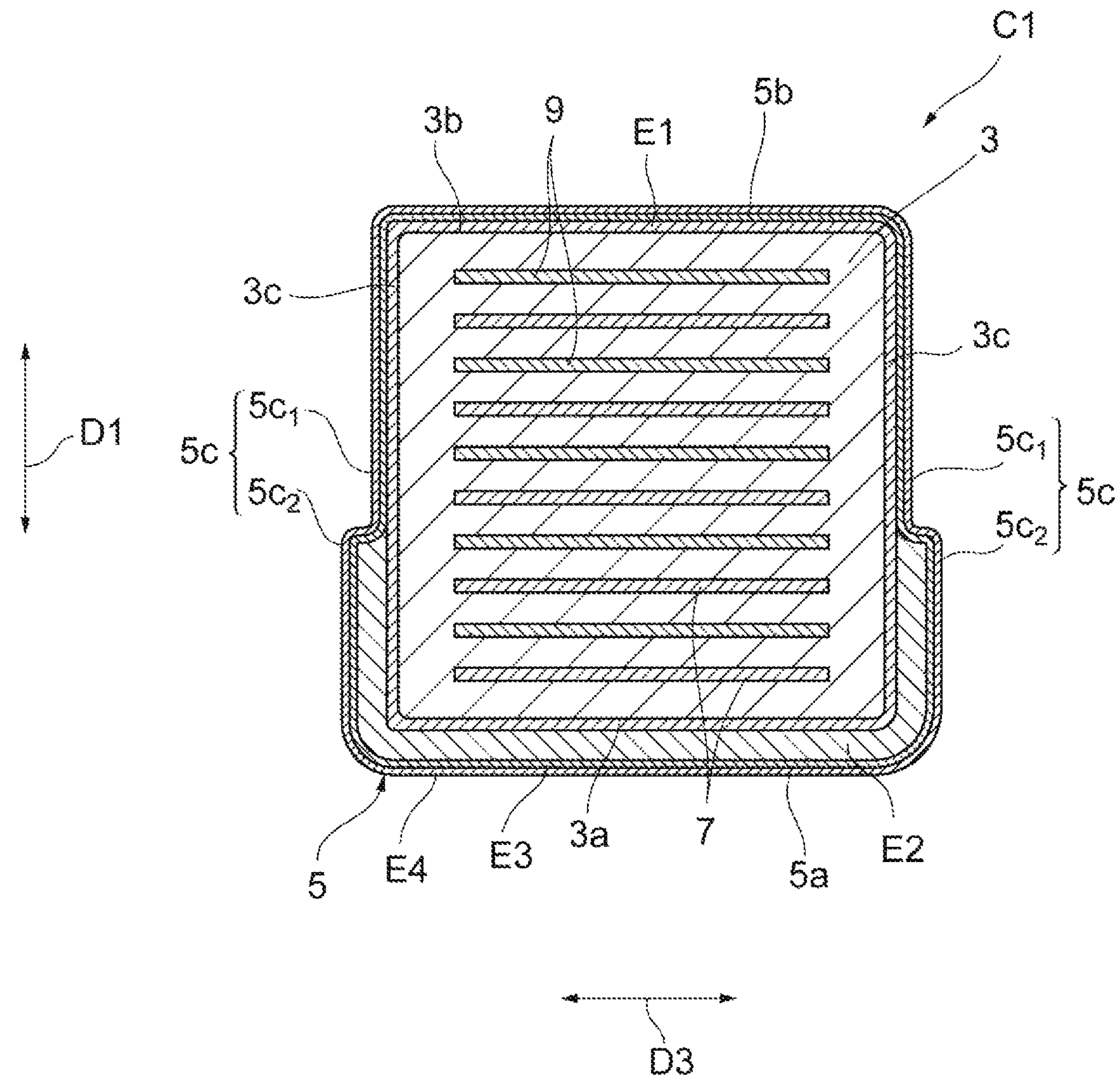
FIG. 6 is a view illustrating a cross-sectional configuration of the multilayer capacitor according to the first embodiment.

A configuration of a multilayer capacitor C1 according to a first embodiment will be described with reference to FIGS. 1 to 6. FIGS. 1 and 2 are plan views of a multilayer capacitor according to the first embodiment. FIGS. 3 and 4 are side views of the multilayer capacitor according to the first embodiment. FIGS. 5 and 6 are views illustrating a cross-sectional configuration of the multilayer capacitor according to the first embodiment. In the first embodiment, an electronic component is, for example, the multilayer capacitor C1.

As illustrated in FIGS. 1 to 4, the multilayer capacitor C1 includes an element body 3 of a rectangular parallelepiped shape and a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3*a* and 3*b* opposing each other, a pair of side surfaces 3*c* opposing each other, and a pair of side surfaces 3*e* opposing each other. The pair of principal surfaces 3*a* and 3*b* and the pair of side surfaces 3*c* have a rectangular shape. The direction in which the pair of principal surfaces 3*a* and 3*b* opposes each other is a first direction D1. The direction in which the pair of side surfaces 3*c* opposes each other is a second direction D2. The direction in which the pair of side surfaces 3*e* opposes each other is a third direction D3.

The first direction D1 is a direction orthogonal to the respective principal surfaces 3*a* and 3*b* and is orthogonal to the second direction D2. The third direction D3 is a direction parallel to the respective principal surfaces 3*a* and 3*b* and the respective side surfaces 3*c*, and is orthogonal to the first direction D1 and the second direction D2. In the first embodiment, a length of the element body 3 in the third direction D3 is larger than a length of the element body 3 in the first direction D1, and larger than a length of the element body 3 in the second direction D2. The third direction D3 is a longitudinal direction of the element body 3.

The pair of side surfaces 3*c* extends in the first direction D1 to couple the pair of principal surfaces 3*a* and 3*b*. The pair of side surfaces 3*c* also extends in the third direction D3. The pair of side surfaces 3*e* extends in the first direction D1 to couple the pair of principal surfaces 3*a* and 3*b*. The pair of side surfaces 3*e* also extends in the second direction D2. Each of the principal surfaces 3*a* and 3*b* is adjacent to the pair of side surfaces 3*c* and the pair of side surfaces 3*e*.

The element body 3 is configured by laminating a plurality of dielectric layers in the first direction D1. The element body 3 includes the plurality of laminated dielectric layers. In the element body 3, a lamination direction of the plurality of dielectric layers coincides with the first direction D1. Each dielectric layer includes, for example, a sintered body of a ceramic green sheet containing a dielectric material. As the dielectric material, for example, a dielectric ceramic of $BaTiO_3$ base, $Ba(Ti,Zr)O_3$ base, or $(Ba,Ca)TiO_3$ base is used. In an actual element body 3, each of the dielectric layers is integrated to such an extent that a boundary between the dielectric layers cannot be visually recognized. In the element body 3, the lamination direction of the plurality of dielectric layers may coincide with the second direction D2.

As illustrated in FIGS. 5 and 6, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is usually used as an internal electrode of a multilayer electronic component. As the conductive material, a base metal (e.g., Ni or Cu) is used. Each of the internal electrodes 7 and 9 includes a sintered body of a conductive paste containing the above conductive material. In the first embodiment, each of the internal electrodes 7 and 9 is made of Ni.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. Polarities of the internal electrodes 7 and the internal electrodes 9 are different from each other. In a case in which the lamination direction of the plurality of dielectric layers is the second direction D2, the internal electrodes 7 and the internal electrodes 9 are disposed in different positions (layers) in the second direction D2. Each of the internal electrodes 7 and 9 includes one end exposed to a corresponding side surface 3*e*.

The external electrodes 5 are disposed at both end portions of the element body 3 in the third direction D3. Each of the external electrodes 5 is disposed on a corresponding side surface 3*e* side of the element body 3. The external electrode 5 includes electrode portions 5*a*, 5*b*, 5*c*, and 5*e*. The electrode portion 5*a* is disposed on the principal surface 3*a*. The electrode portion 5*b* is disposed on the principal surface 3*b*. The electrode portion 5*c* is disposed on each side surface 3*c*. The electrode portion 5*e* is disposed on the corresponding side surface 3*e*. The external electrode 5 is formed on the five surfaces, that is, the principal surfaces 3*a* and 3*b*, the pair of side surfaces 3*c*, and the pair of side surfaces 3*e*. The electrode portions 5*a*, 5*b*, 5*c*, and 5*e* adjacent to each other are connected to each other at a ridge of the element body 3, and are electrically connected to each other.

The electrode portion 5*e* covers all the one ends exposed at the side surface 3*e* of the respective internal electrodes 7 and 9. The internal electrodes 7 and 9 are directly connected to a corresponding electrode portion 5*e*. The internal electrodes 7 and 9 are electrically connected to the respective external electrodes 5.

As illustrated in FIGS. 5 and 6, the external electrode 5 includes a first electrode layer E1, a second electrode layer E2, a third electrode layer E3, and a fourth electrode layer E4. The fourth electrode layer E4 is the outermost layer of the external electrode 5.

The electrode portion 5*a* includes the first electrode layer E1, the second electrode layer E2, the third electrode layer E3, and the fourth electrode layer E4. The electrode portion 5*a* has a four-layer structure. In the electrode portion 5*a*, an entirety of the first electrode layer E1 is covered with the second electrode layer E2. The electrode portion 5*b* includes the first electrode layer E1, the third electrode layer E3, and the fourth electrode layer E4. The electrode portion 5*b* does not include the second electrode layer E2. The electrode portion 5*b* has a three-layer structure.

The electrode portion 5*c* includes a region $5c_1$ and a region $5c_2$. The region $5c_2$ is located closer to the principal surface 3*a* than the region $5c_1$. In the present embodiment, the electrode portion 5*c* includes only two regions $5c_1$ and $5c_2$. The region $5c_1$ includes the first electrode layer E1, the third electrode layer E3, and the fourth electrode layer E4. The region $5c_1$ does not include the second electrode layer E2. The region $5c_1$ has a three-layer structure. The region $5c_2$ includes the first electrode layer E1, the second electrode layer E2, the third electrode layer E3, and the fourth electrode layer E4. The region $5c_2$ has a four-layer structure.

The electrode portion 5*e* includes a region $5e_1$ and a region $5e_2$. The region $5e_2$ is located closer to the principal surface 3*a* than the region $5e_1$. In the present embodiment, the electrode portion 5*e* includes only two regions $5e_1$ and $5e_2$. The region $5e_1$ includes the first electrode layer E1, the third electrode layer E3, and the fourth electrode layer E4. The region $5e_1$ does not include the second electrode layer E2. The region $5e_1$ has a three-layer structure. The region $5e_2$ includes the first electrode layer E1, the second electrode layer E2, the third electrode layer E3, and the fourth electrode layer E4.

The region $5e_2$ has a four-layer structure.

The first electrode layer E1 is formed by sintering a conductive paste applied onto the surface of the element body 3. The first electrode layer E1 is a layer that is formed by sintering a metal component (metal powder) contained in the conductive paste. The first electrode layer E1 is a sintered metal layer. The first electrode layer E1 is a sintered metal layer formed on the element body 3. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent.

The second electrode layer E2 is formed by curing a conductive resin paste applied onto the first electrode layer E1. The second electrode layer E2 is formed to cover a partial region of the first electrode layer E1. The partial region of the first electrode layer E1 is a region, in the first electrode layer E1, corresponding to the electrode portion 5*a*, the region $5c_2$, and the region $5e_2$. The first electrode layer E1 serves as an underlying metal layer for forming the second electrode layer E2. The second electrode layer E2 is a conductive resin layer formed on the first electrode layer E1. The conductive resin paste contains a thermosetting resin, a metal powder, and an organic solvent. As the metal powder, for example, Ag powder or Cu powder is used. As the thermosetting resin, for example, a phenolic resin, an acrylic resin, a silicone resin, an epoxy resin, or a polyimide resin is used.

The third electrode layer E3 is formed on the second electrode layer E2 and on a portion of the first electrode layer E1 exposed from the second electrode layer E2 by plating method. In the present embodiment, the third electrode layer E3 is a Ni plating layer formed by Ni plating. The third electrode layer E3 may be an Sn plating layer, a Cu plating layer, or an Au plating layer. The third electrode layer E3 contains Ni, Sn, Cu, or Au.

The fourth electrode layer E4 is formed on the third electrode layer E3 by plating method. In the present embodiment, the fourth electrode layer E4 is an Sn plating layer formed by Sn plating. The fourth electrode layer E4 may be a Cu plating layer or an Au plating layer. The fourth electrode layer E4 contains Sn, Cu, or Au. The third electrode layer E3 and fourth electrode layer E4 form a plating layer disposed on the second electrode layer E2. In the present embodiment, the plating layer disposed on the second electrode layer E2 has a two-layer structure.

The first electrode layer E1 included in each of the electrode portions 5*a*, 5*b*, 5*c*, and 5*e* is integrally formed. The second electrode layer E2 included in each of the electrode portions 5*a*, 5*c*, and 5*e* is integrally formed. The third electrode layer E3 included in each of the electrode portions 5*a*, 5*b*, 5*c*, and 5*e* is integrally formed. The fourth electrode layer E4 included in each of the electrode portions 5*a*, 5*b*, 5*c*, and 5*e* is also integrally formed.

A ratio (L2/L1) of a length L2 of the region $5c_2$ in the first direction D1 to a length L1 of the element body 3 in the first direction D1 is equal to or more than 0.2. A ratio (L3/L1) of a length L3 of the region $5e_2$ in the first direction D1 to the length L1 of the element body 3 is equal to or more than 0.2.

The multilayer capacitor C1 is solder-mounted on an electronic device (e.g., a circuit board or an electronic component). In the multilayer capacitor C1, the principal surface 3*a* is arranged to constitute a mounting surface opposing the electronic device.

As described above, in the first embodiment, the electrode portion 5*a* includes the second electrode layer E2 (conductive resin layer), and the region $5e_2$ included in the electrode portion 5*e* includes the second electrode layer E2 (conductive resin layer). Therefore, stress tends not to concentrate on an end edge of the external electrode 5, even in a case in which external force is applied onto the multilayer capacitor C1 through a solder fillet. The end edge of the external electrode 5 tends not to serve as an origination of a crack. Consequently, in the multilayer capacitor C1, occurrence of a crack in the element body 3 is suppressed.

In the first embodiment, the region $5c_2$ included in the electrode portion 5*c* includes the second electrode layer E2 (conductive resin layer). Therefore, the stress tends not to concentrate on the end edge of the external electrode 5, even in a case in which the external electrode 5 includes the electrode portion 5*c*. Consequently, in the multilayer capacitor C1, occurrence of the crack in the element body 3 is reliably suppressed.

The ratio (L3/L1) of the length L3 of the region $5e_2$ to the length L1 of the element body 3 is equal to or more than 0.2. Therefore, the stress further tends not to concentrate on the end edge of the external electrode 5. Consequently, in the multilayer capacitor C1, the occurrence of a crack in the element body 3 is further suppressed.

The ratio (L2/L1) of the length L2 of the region $5c_2$ to the length L1 of the element body 3 is equal to or more than 0.2. Therefore, the stress further tends not to concentrate on the end edge of the external electrode 5. Consequently, in the multilayer capacitor C1, the occurrence of a crack in the element body 3 is further suppressed.

Figure 7:
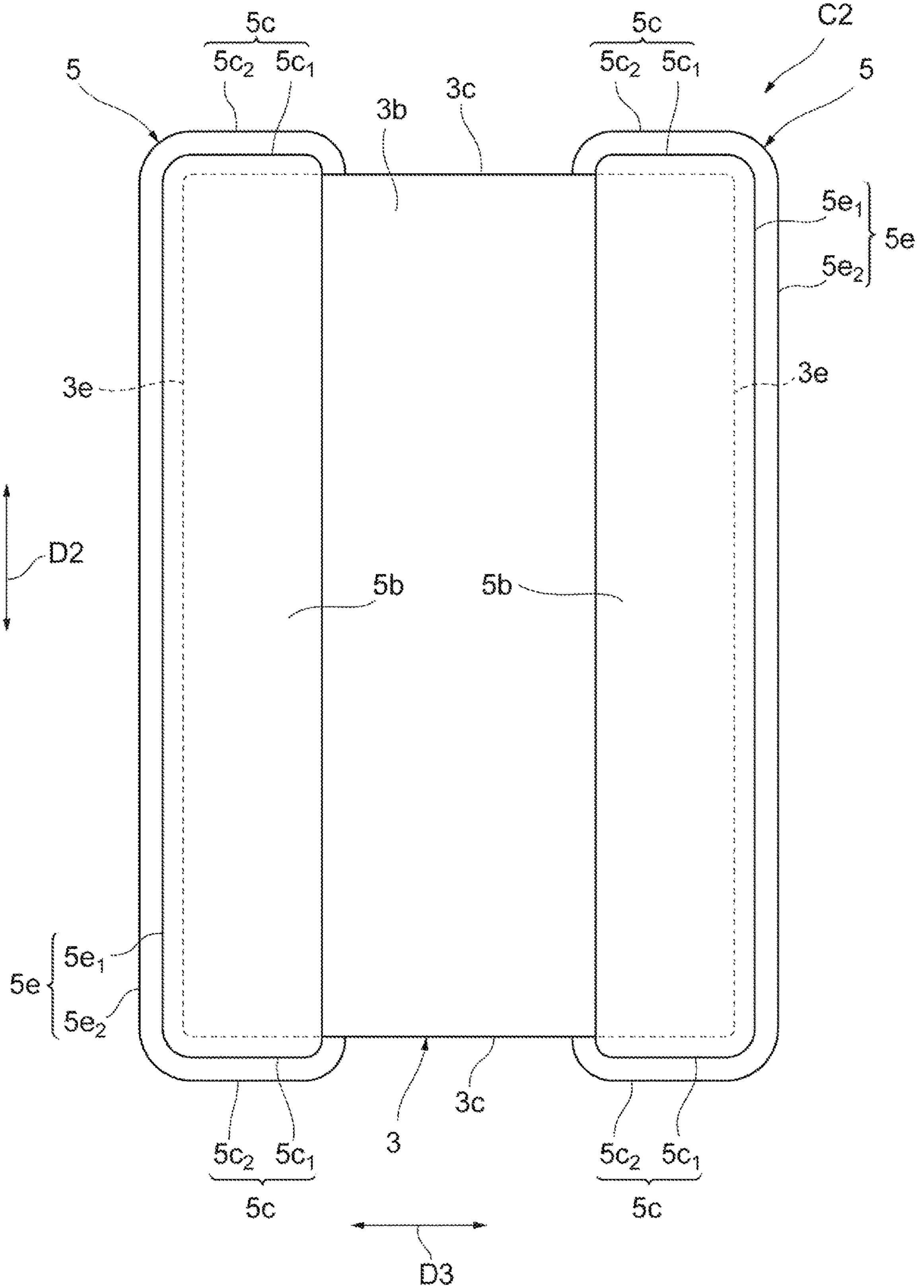
FIG. 7 is a plan view of a multilayer capacitor according to a modification of the first embodiment.
Figure 8:
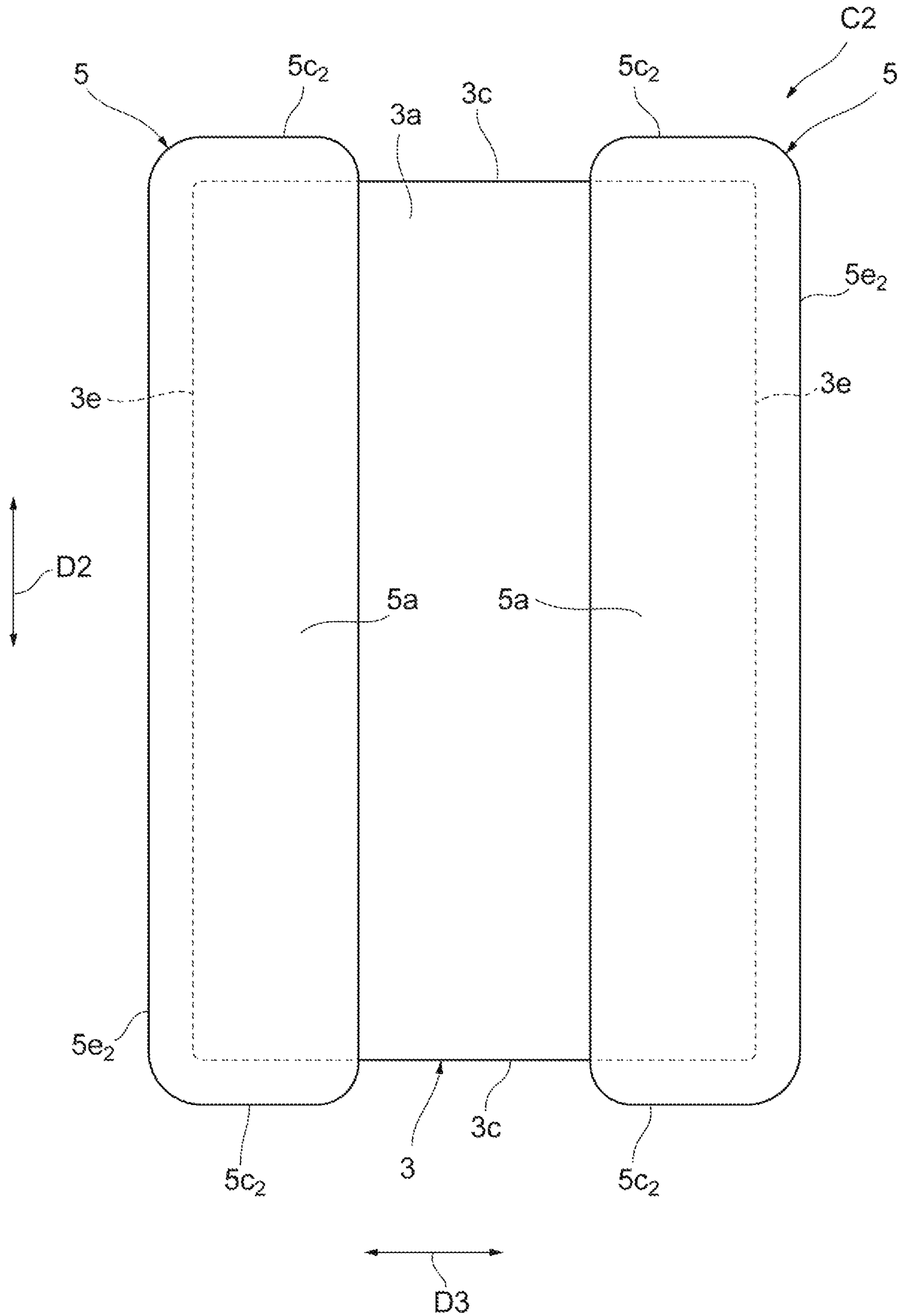
FIG. 8 is a plan view of the multilayer capacitor according to the modification of the first embodiment.
Figure 9:
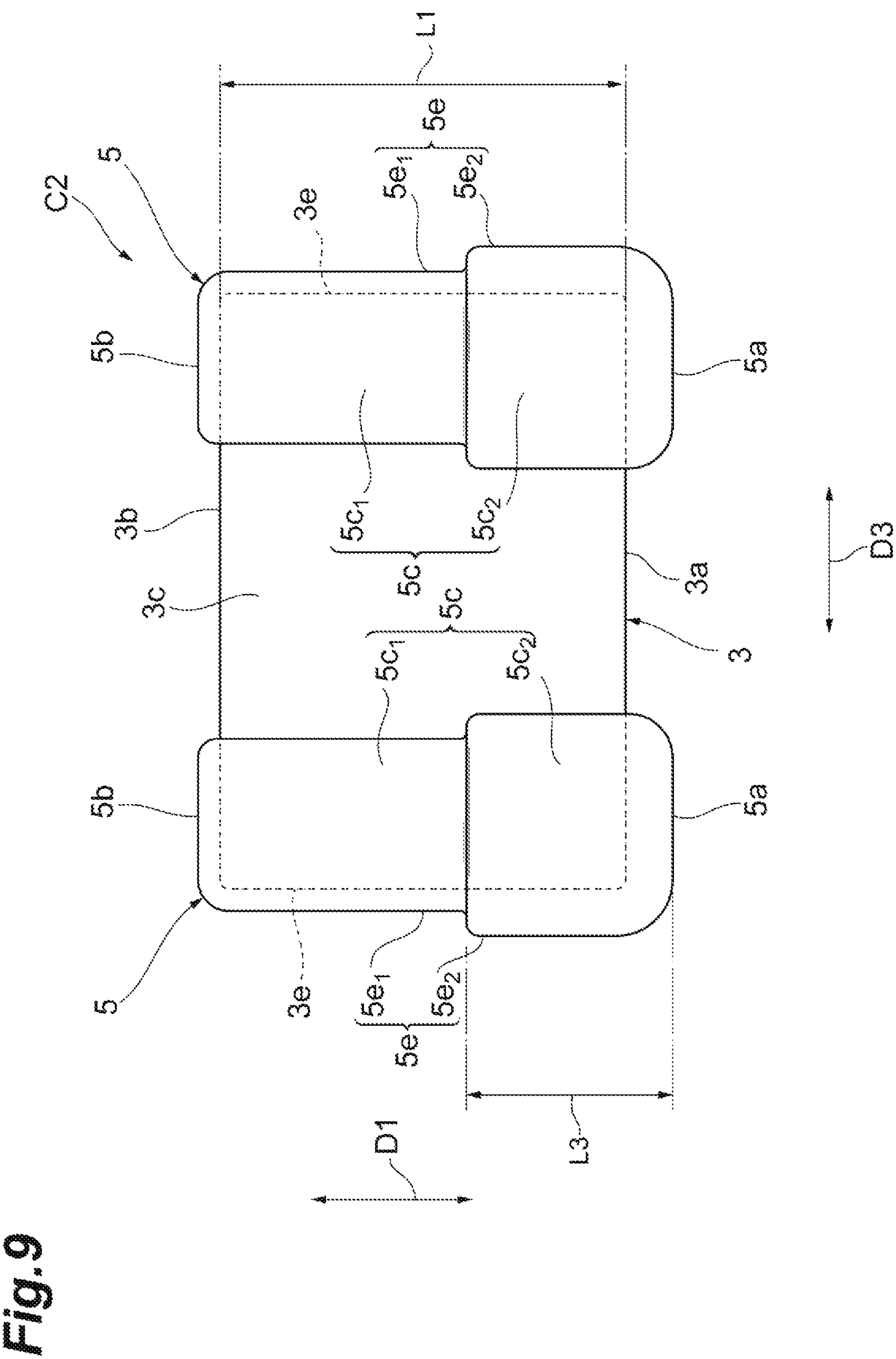
FIG. 9 is a side view of the multilayer capacitor according to the modification.
Figure 10:
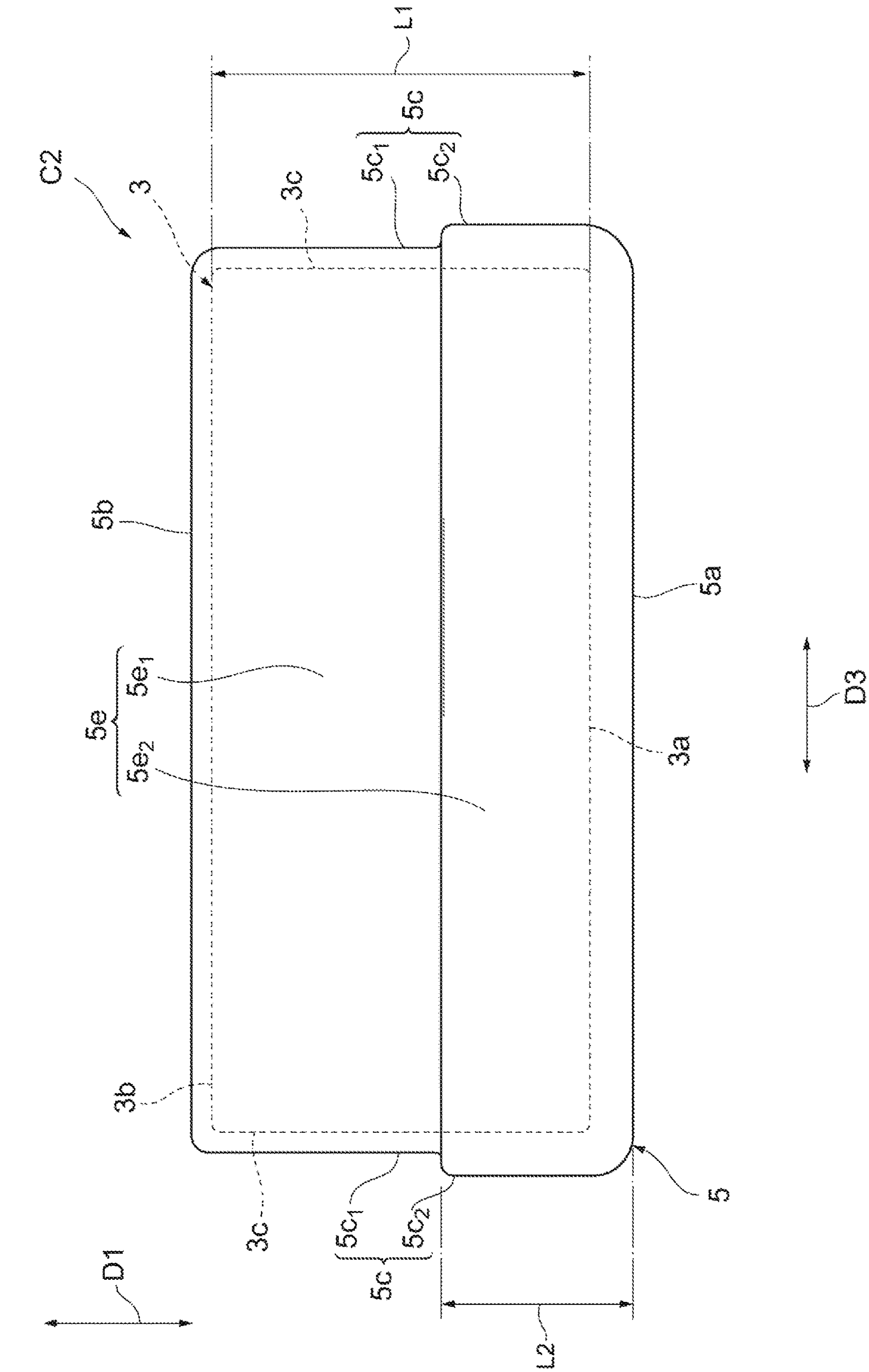
FIG. 10 is a side view of the multilayer capacitor according to the modification.

Next, a configuration of a multilayer capacitor C2 according to another modification of the first embodiment will be described with reference to FIGS. 7 to 10. FIGS. 7 and 8 are plan views of a multilayer capacitor according to the present modification. FIGS. 9 and 10 are side views of the multilayer capacitor according to the present modification.

As with the multilayer capacitor C1, the multilayer capacitor C2 includes the element body 3, the pair of external electrodes 5, the plurality of internal electrodes 7 (not illustrated), and the plurality of internal electrodes 9 (not illustrated). In the multilayer capacitor C2, a shape of the element body 3 is different from that of the multilayer capacitor C1.

In the present modification, the length of the element body 3 in the second direction D2 is larger than the length of the element body 3 in the first direction D1, and larger than the length of the element body 3 in the third direction D3. The second direction D2 is a longitudinal direction of the element body 3. Also in the present modification, occurrence of a crack in the element body 3 is suppressed.

Second Embodiment

Figure 11:
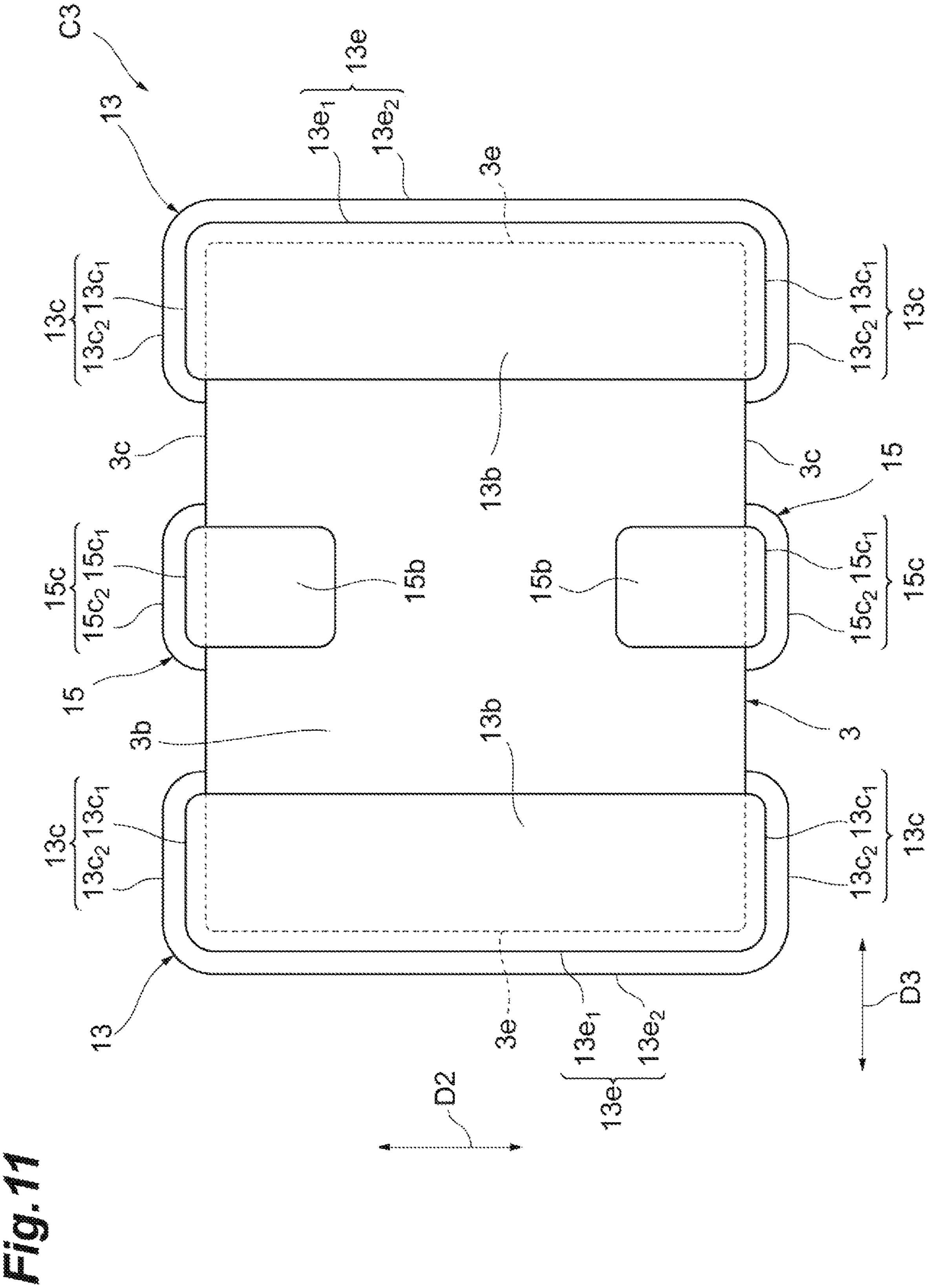
FIG. 11 is a plan view of a multilayer feedthrough capacitor according to a second embodiment.
Figure 12:
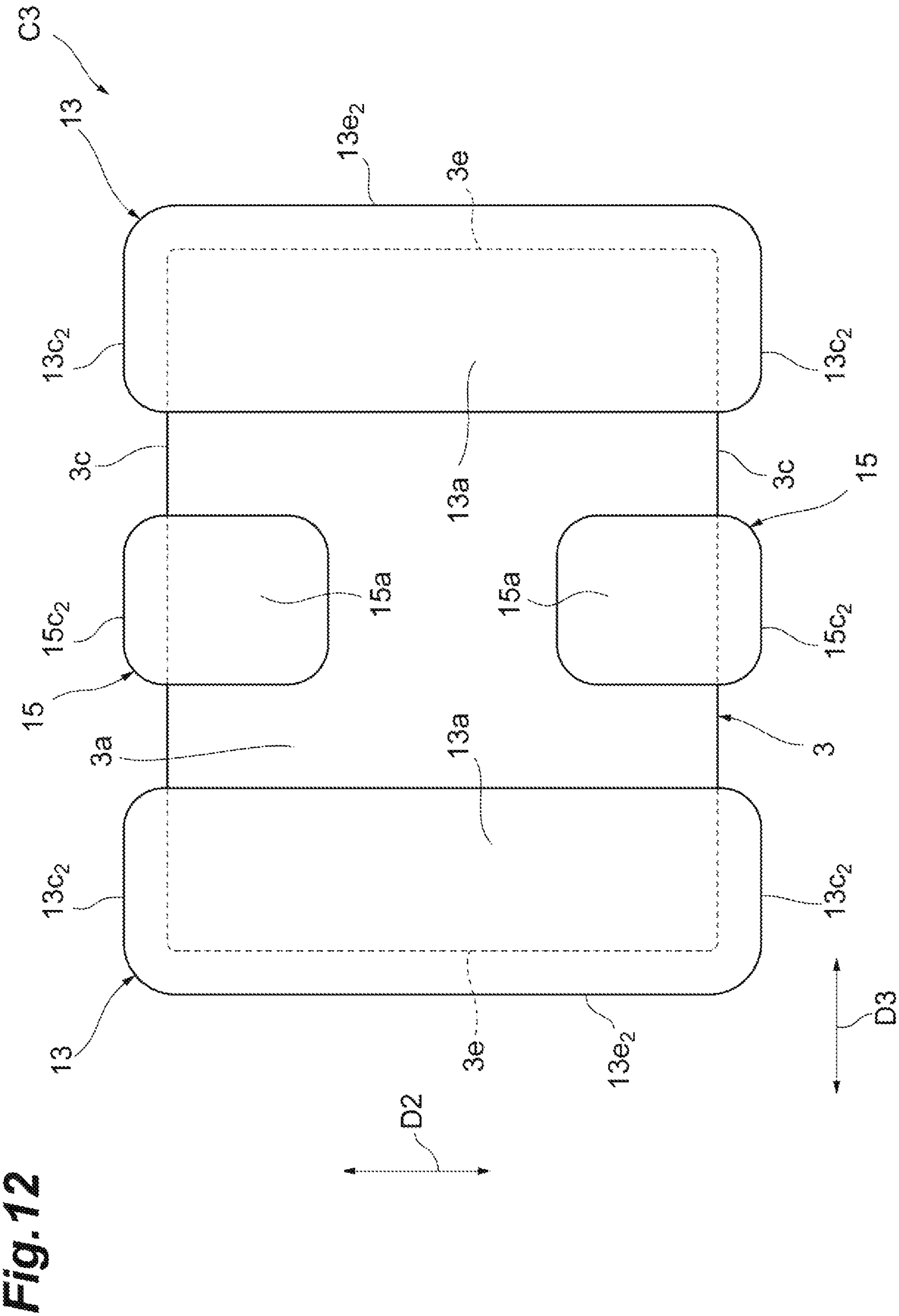
FIG. 12 is a plan view of the multilayer feedthrough capacitor according to the second embodiment.
Figure 13:
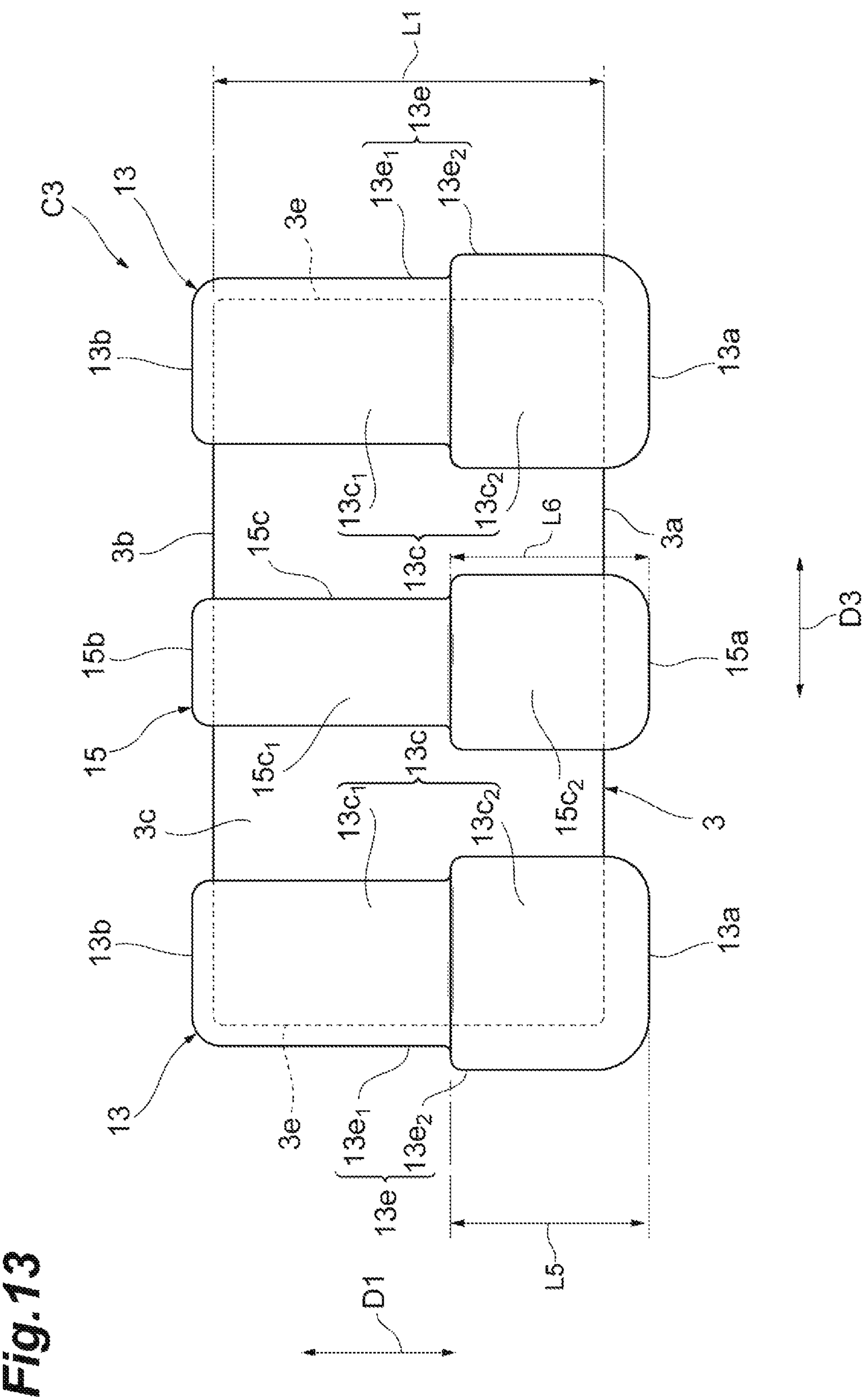
FIG. 13 is a side view of the multilayer feedthrough capacitor according to the second embodiment.
Figure 14:
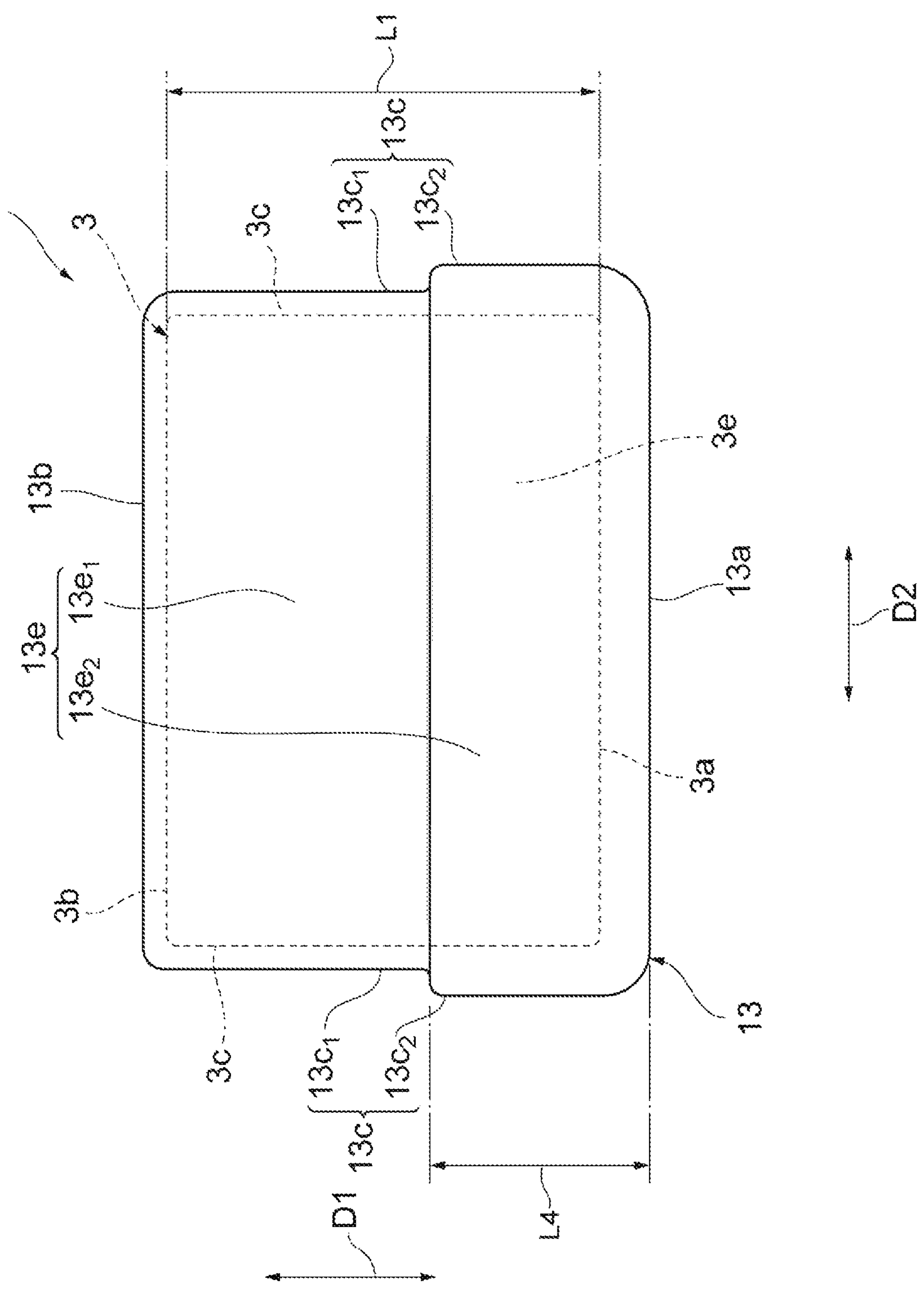
FIG. 14 is a side view of the multilayer feedthrough capacitor according to the second embodiment.
Figure 15:
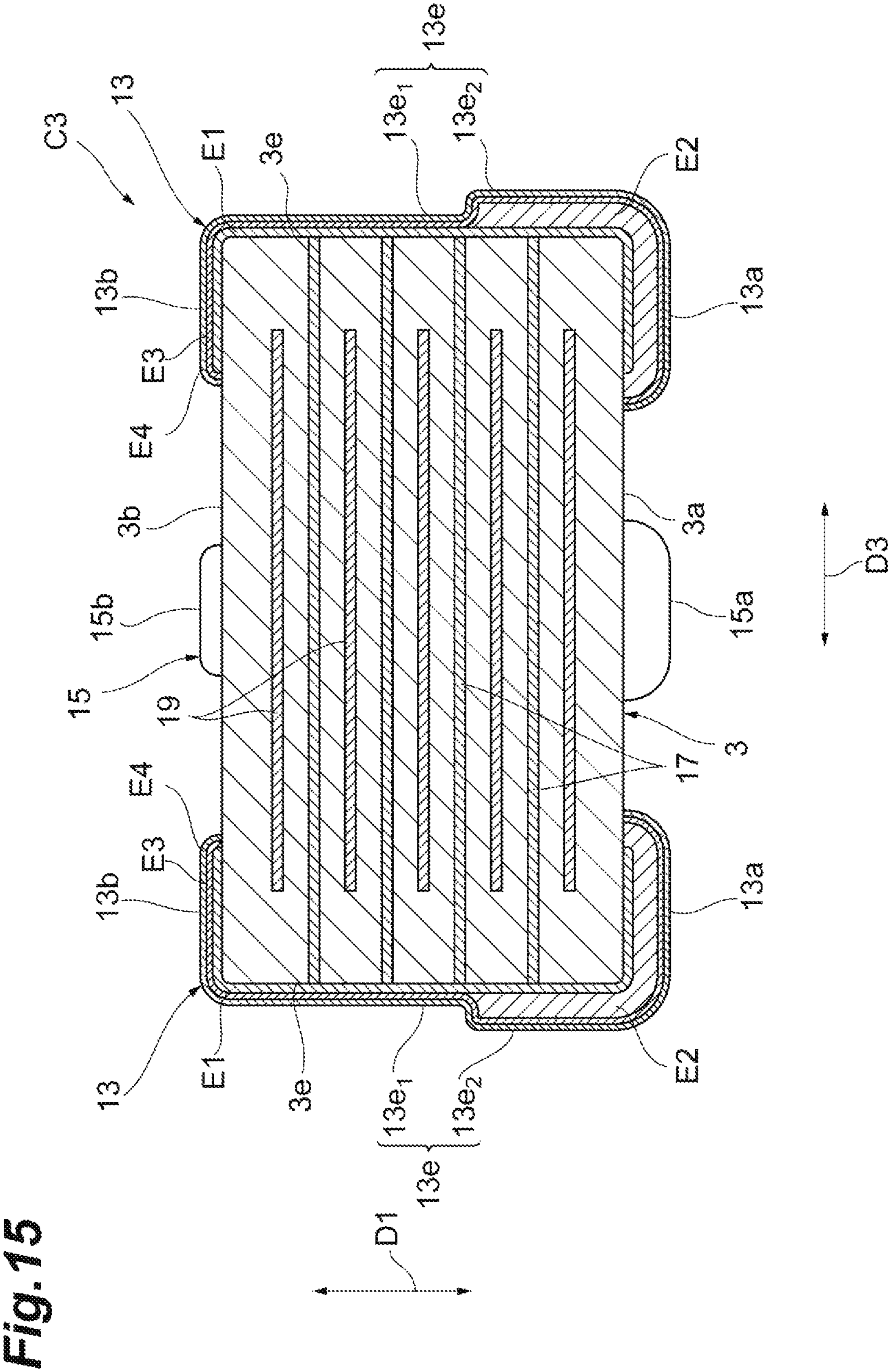
FIG. 15 is a view illustrating a cross-sectional configuration of the multilayer feedthrough capacitor according to the second embodiment.
Figure 16:
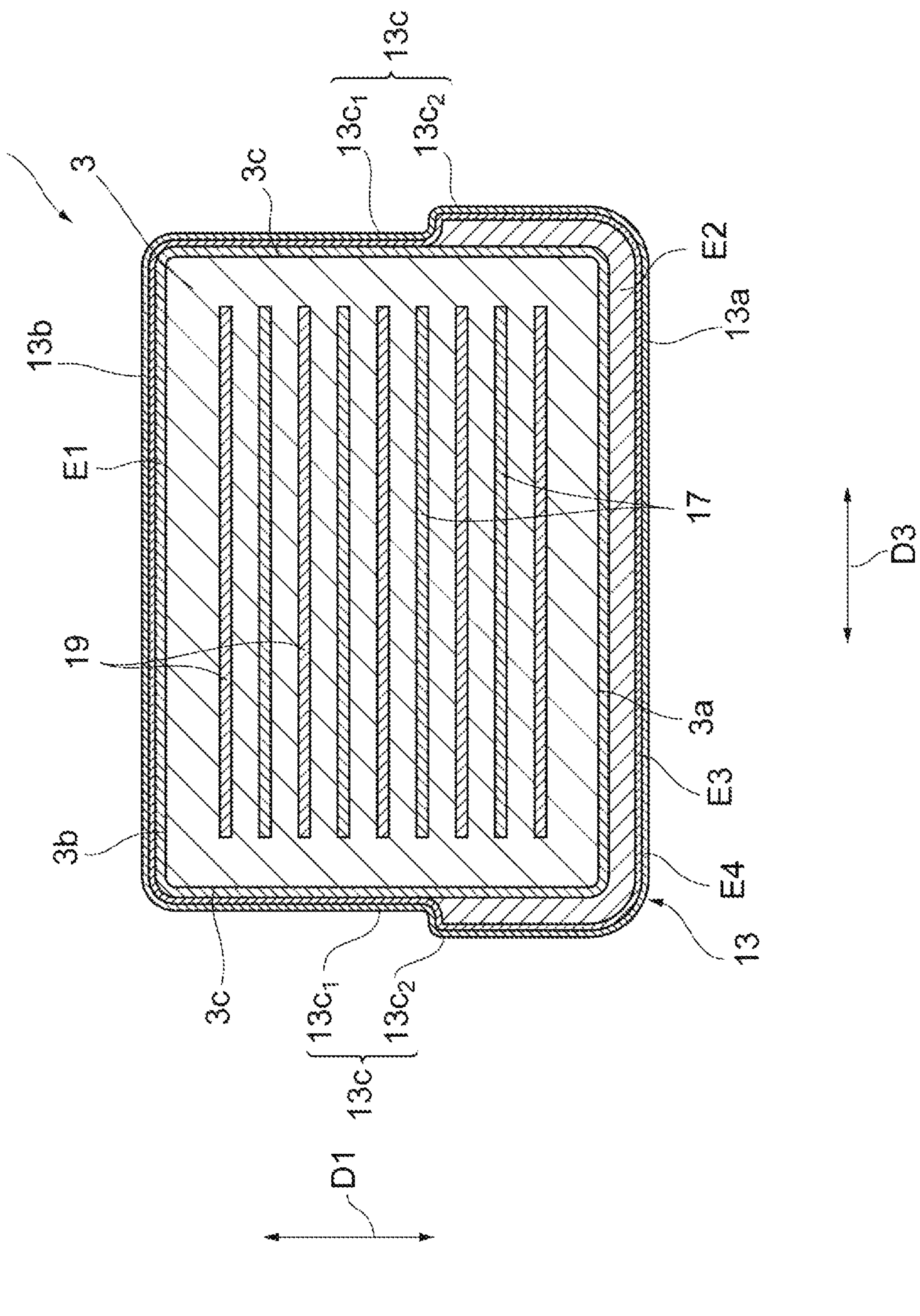
FIG. 16 is a view illustrating a cross-sectional configuration of the multilayer feedthrough capacitor according to the second embodiment.
Figure 17:
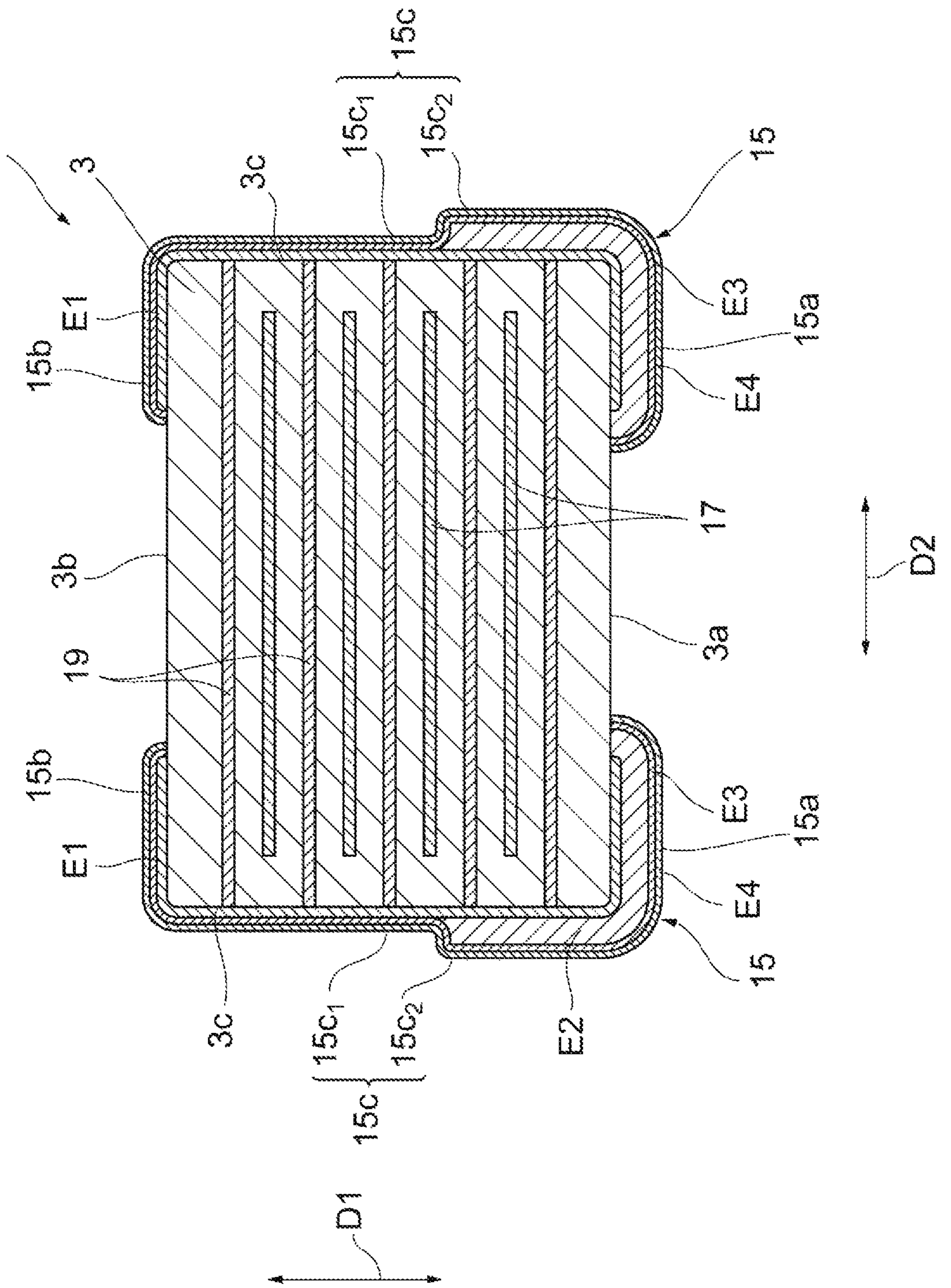
FIG. 17 is a view illustrating a cross-sectional configuration of the multilayer feedthrough capacitor according to the second embodiment.

A configuration of a multilayer feedthrough capacitor C3 according to a second embodiment will be described with reference to FIGS. 11 to 17. FIGS. 11 and 12 are plan views of a multilayer feedthrough capacitor according to the second embodiment. FIGS. 13 and 14 are side views of the multilayer feedthrough capacitor according to the second embodiment. FIGS. 15 to 17 are views illustrating a cross-sectional configuration of the multilayer feedthrough capacitor according to the second embodiment. In the second embodiment, an electronic component is, for example, the multilayer feedthrough capacitor C3.

As illustrated in FIGS. 11 to 14, the multilayer feedthrough capacitor C3 includes the element body 3, a pair of external electrodes 13, and a pair of external electrodes 15. The pair of external electrodes 13 and the pair of external electrodes 15 are disposed on the outer surface of the element body 3. The pair of external electrodes 5 and the pair of external electrodes 15 are separated from each other. The pair of external electrodes 13 functions as, for example, signal terminal electrodes, and the pair of external electrodes 15 functions as, for example, ground terminal electrodes.

As illustrated in FIGS. 15 to 17, the multilayer feedthrough capacitor C3 includes a plurality of internal electrodes 17 and a plurality of internal electrodes 19. As with the internal electrodes 7 and 9, the internal electrodes 17 and 19 are made of a conductive material that is usually used as an internal electrode of a multilayer electronic component. Also in the second embodiment, the internal electrodes 7 and 9 are made of Ni.

The internal electrodes 17 and the internal electrodes 19 are disposed in different positions (layers) in the first direction D1. The internal electrodes 17 and the internal electrodes 19 are alternately disposed in the element body 3 to oppose each other in the first direction D1 with an interval therebetween. Polarities of the internal electrodes 17 and the internal electrodes 19 are different from each other. In a case in which the lamination direction of the plurality of dielectric layers is the second direction D2, the internal electrodes 17 and the internal electrodes 19 are disposed in different positions (layers) in the second direction D2. Each of the internal electrodes 17 and 9 includes one end exposed to a corresponding side surface 3*e*. Both ends of the internal electrode 17 are exposed to the pair of side surfaces 3*e*. Both ends of the internal electrode 19 are exposed to the pair of side surfaces 3*c*.

The external electrode 13 is disposed at end portion of the element body 3 in a third direction D3. The external electrode 13 includes a plurality of electrode portions 13*a*, 13*b*, 13*c*, and 13*e*. The electrode portion 13*a* is disposed on the principal surface 3*a*. The electrode portion 13*b* is disposed on the principal surface 3*b*. The electrode portion 13*c* is disposed on each side surface 3*c*. The electrode portion 13*e* is disposed on the corresponding side surface 3*e*. The external electrode 13 is formed on the five surfaces, that is, the principal surfaces 3*a* and 3*b*, the pair of side surfaces 3*c*, and the side surface 3*e*. The electrode portions 13*a*, 13*b*, 13*c*, and 13*e* adjacent to each other are connected to each other at a ridge of the element body 3, and are electrically connected to each other.

The electrode portion 13*e* covers all the one ends exposed at the side surface 3*e*, of the internal electrodes 17. The internal electrodes 17 are directly connected to each electrode portion 13*e*. The internal electrodes 17 are electrically connected to the pair of external electrodes 13.

As illustrated in FIGS. 15 and 16, the external electrode 13 includes the first electrode layer E1, the second electrode layer E2, the third electrode layer E3, and the fourth electrode layer E4. The fourth electrode layer E4 is the outermost layer of the external electrode 13.

The electrode portion 13*a* includes the first electrode layer E1, the second electrode layer E2, the third electrode layer E3, and the fourth electrode layer E4. The electrode portion 13*a* has a four-layer structure. In the electrode portion 13*a*, an entirety of the first electrode layer E1 is covered with the second electrode layer E2. The electrode portion 13*b* includes the first electrode layer E1, the third electrode layer E3, and the fourth electrode layer E4. The electrode portion 13*b* does not include the second electrode layer E2. The electrode portion 13*b* has a three-layer structure.

The electrode portion 13*c* includes a region $\mathbf{13}c_1$ and a region $\mathbf{13}c_2$. The region $\mathbf{13}c_2$ is located closer to the principal surface 3*a* than the region $\mathbf{13}c_1$. In the present embodiment, the electrode portion 13*c* includes only two regions $\mathbf{13}c_1$ and $\mathbf{13}c_2$. The region $\mathbf{13}c_1$ includes the first electrode layer E1, the third electrode layer E3, and the fourth electrode layer E4. The region $\mathbf{13}c_1$ does not include the second electrode layer E2. The region $\mathbf{13}c_1$ has a three-layer structure. The region $\mathbf{13}c_2$ includes the first electrode layer E1, the second electrode layer E2, the third electrode layer E3, and the fourth electrode layer E4. The region $\mathbf{13}c_2$ has a four-layer structure.

The electrode portion 13*e* includes a region $\mathbf{13}e_1$ and a region $\mathbf{13}e_2$. The region $\mathbf{13}e_2$ is located closer to the principal surface 3*a* than the region $\mathbf{13}e_1$. In the present embodiment, the electrode portion 13*e* includes only two regions $\mathbf{13}e_1$ and $\mathbf{13}e_2$. The region $\mathbf{13}e_1$ includes the first electrode layer E1, the third electrode layer E3, and the fourth electrode layer E4. The region $\mathbf{13}e_1$ does not include the second electrode layer E2. The region $\mathbf{13}e_1$ has a three-layer structure. The region $\mathbf{13}e_2$ includes the first electrode layer E1, the second electrode layer E2, the third electrode layer E3, and the fourth electrode layer E4. The region $\mathbf{13}e_2$ has a four-layer structure.

A ratio (L4/L1) of a length L4 of the region $\mathbf{13}c_2$ in the first direction D1 to the length L1 of the element body 3 is equal to or more than 0.2. A ratio (L5/L1) of a length L5 of the region $\mathbf{13}e_2$ in the first direction D1 to the length L1 of the element body 3 is equal to or more than 0.2.

The first electrode layer E1 included in each of the electrode portions 13*a*, 13*b*, 13*c*, and 13*e* is integrally formed. The second electrode layer E2 included in each of the electrode portions 13*a*, 13*c*, and 13*e* is integrally formed. The third electrode layer E3 included in each of the electrode portions 13*a*, 13*b*, 13*c*, and 13*e* is integrally formed. The fourth electrode layer E4 included in each of the electrode portions 13*a*, 13*b*, 13*c*, and 13*e* is also integrally formed.

The external electrode 15 is disposed on a central portion of the element body 3 in the third direction D3. The external electrode 15 includes electrode portions 15*a*, 15*b*, and 15*c*. The electrode portion 15*a* is disposed on the principal surface 3*a*. The electrode portion 15*b* is disposed on the principal surface 3*b*. The electrode portions 15*c* is disposed on the side surface 3*c*. The external electrode 6 is formed on the three surfaces, that is, the pair of principal surfaces 3*a* and 3*b*, and the side surface 3*c*. The electrode portions 15*a*, 15*b*, and 15*c* adjacent to each other are connected to each other at a ridge of the element body 3, and are electrically connected to each other.

The electrode portion 15*c* covers all the one ends exposed at the side surface 3*c*, of the internal electrodes 19. The internal electrodes 19 are directly connected to each electrode portion 15*c*. The internal electrodes 19 are electrically connected to the pair of external electrodes 15.

As illustrated in FIG. 17, the external electrode 15 also includes the first electrode layer E1, the second electrode layer E2, the third electrode layer E3, and the fourth electrode layer E4. The fourth electrode layer E4 is the outermost layer of the external electrode 15.

The electrode portion 15*a* includes the first electrode layer E1, the second electrode layer E2, the third electrode layer E3, and the fourth electrode layer E4. The electrode portion 15*a* has a four-layer structure. In the electrode portion 15*a*, an entirety of the first electrode layer E1 is covered with the second electrode layer E2. The electrode portion 15*b* includes the first electrode layer E1, the third electrode layer E3, and the fourth electrode layer E4. The electrode portion 15*b* does not include the second electrode layer E2. The electrode portion 15*b* has a three-layer structure.

The electrode portion 15*c* includes a region $15c_1$ and a region $15c_2$. The region $15c_2$ is located closer to the principal surface 3*a* than the region $15c_1$. In the present embodiment, the electrode portion 15*c* includes only two regions $15c_1$ and $15c_2$. The region $15c_1$ includes the first electrode layer E1, the third electrode layer E3, and the fourth electrode layer E4. The region $15c_1$ does not include the second electrode layer E2. The region $15c_1$ has a three-layer structure. The region $15c_2$ includes the first electrode layer E1, the second electrode layer E2, the third electrode layer E3, and the fourth electrode layer E4. The region $15c_2$ has a four-layer structure.

A ratio (L6/L1) of a length L6 of the region $15c_2$ in the first direction D1 to the length L1 of the element body 3 is equal to or more than 0.2. The first electrode layer E1 included in each of the electrode portions 15*a*, 15*b*, and 15*c* is integrally formed. The second electrode layer E2 included in each of the electrode portions 15*a* and 15*c* is integrally formed. The third electrode layer E3 included in each of the electrode portions 15*a*, 15*b*, and 15*c* is integrally formed. The fourth electrode layer E4 included in each of the electrode portions 15*a*, 15*b*, and 15*c* is also integrally formed.

The multilayer feedthrough capacitor C3 is also solder-mounted on the electronic device. In the multilayer feedthrough capacitor C3, the principal surface 3*a* is arranged to constitute a mounting surface opposing the electronic device.

As described above, in the second embodiment, the electrode portions 13*a* and 15*a* include the second electrode layer E2 (conductive resin layer), and the regions $13c_2$ and $15c_2$ included in the electrode portions 13*c* and 15*c* include the second electrode layer E2 (conductive resin layer). Therefore, stress tends not to concentrate on end edges of the external electrodes 13 and 15, even in a case in which external force is applied onto the multilayer feedthrough capacitor C3 through a solder fillet. The end edges of the external electrodes 13 and 15 tend not to serve as an origination of a crack. Consequently, in the multilayer feedthrough capacitor C3, occurrence of a crack in the element body 3 is suppressed.

The ratio (L5/L1) of the length L5 of the region $13e_2$ to the length L1 of the element body 3 is equal to or more than 0.2. Therefore, the stress further tends not to concentrate on the end edge of the external electrode 13. Consequently, in the multilayer feedthrough capacitor C3, the occurrence of a crack in the element body 3 is further suppressed.

The ratio (L4/L1) of the length L4 of the region $13c_2$ to the length L1 of the element body 3 is equal to or more than 0.2. Therefore, the stress further tends not to concentrate on the end edge of the external electrode 13. Consequently, in the multilayer feedthrough capacitor C3, the occurrence of a crack in the element body 3 is further suppressed.

In the second embodiment, the ratio (L6/L1) of the length L6 of the region $15c_2$ to the length L1 of the element body 3 is equal to or more than 0.2. Therefore, the stress further tends not to concentrate on the end edge of the external electrode 15. Consequently, in the multilayer feedthrough capacitor C3, the occurrence of a crack in the element body 3 is further suppressed.

Third Embodiment

Figure 18:
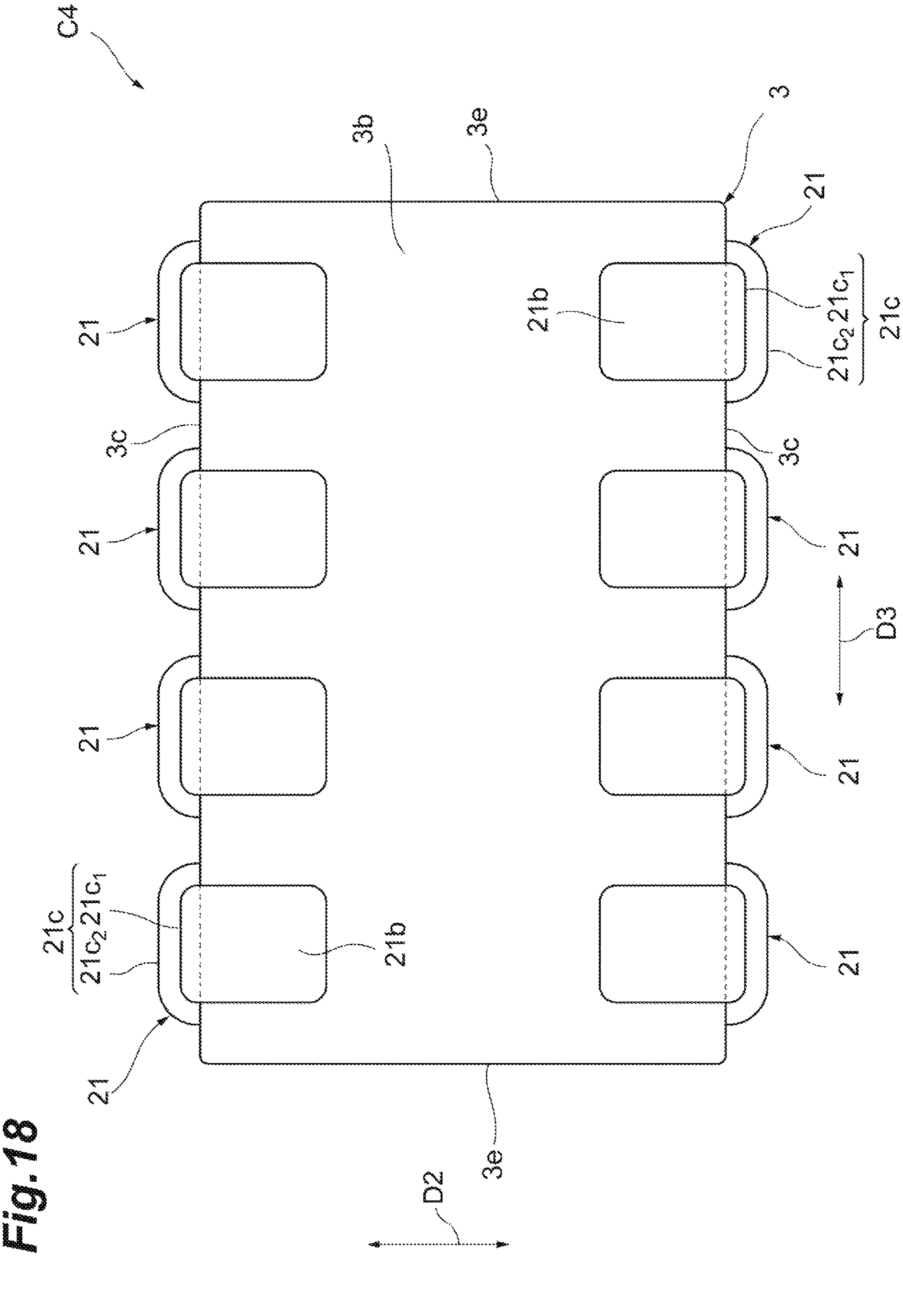
FIG. 18 is a plan view of a multilayer capacitor according to a third embodiment.
Figure 19:
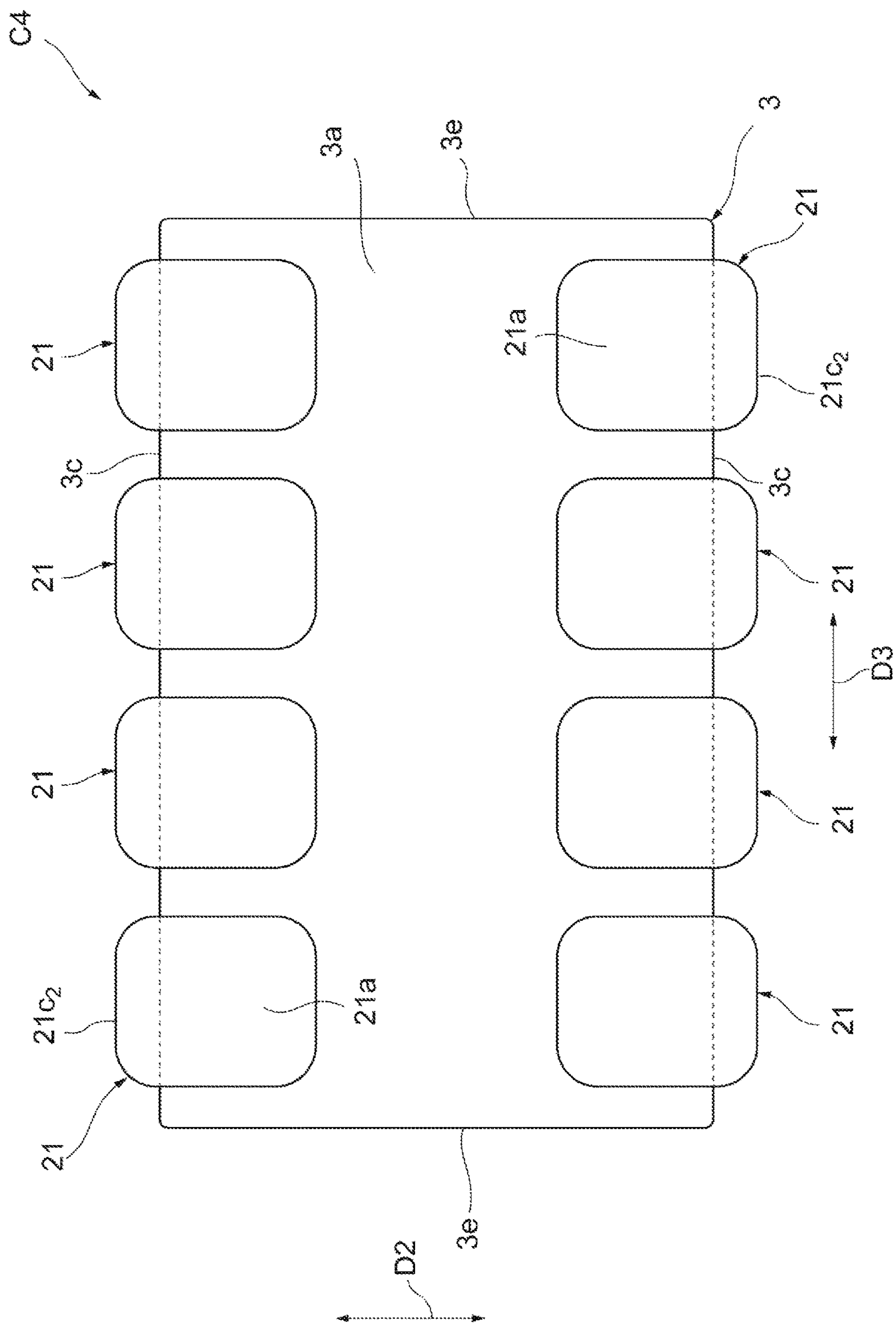
FIG. 19 is a plan view of the multilayer capacitor according to the third embodiment.
Figure 20:
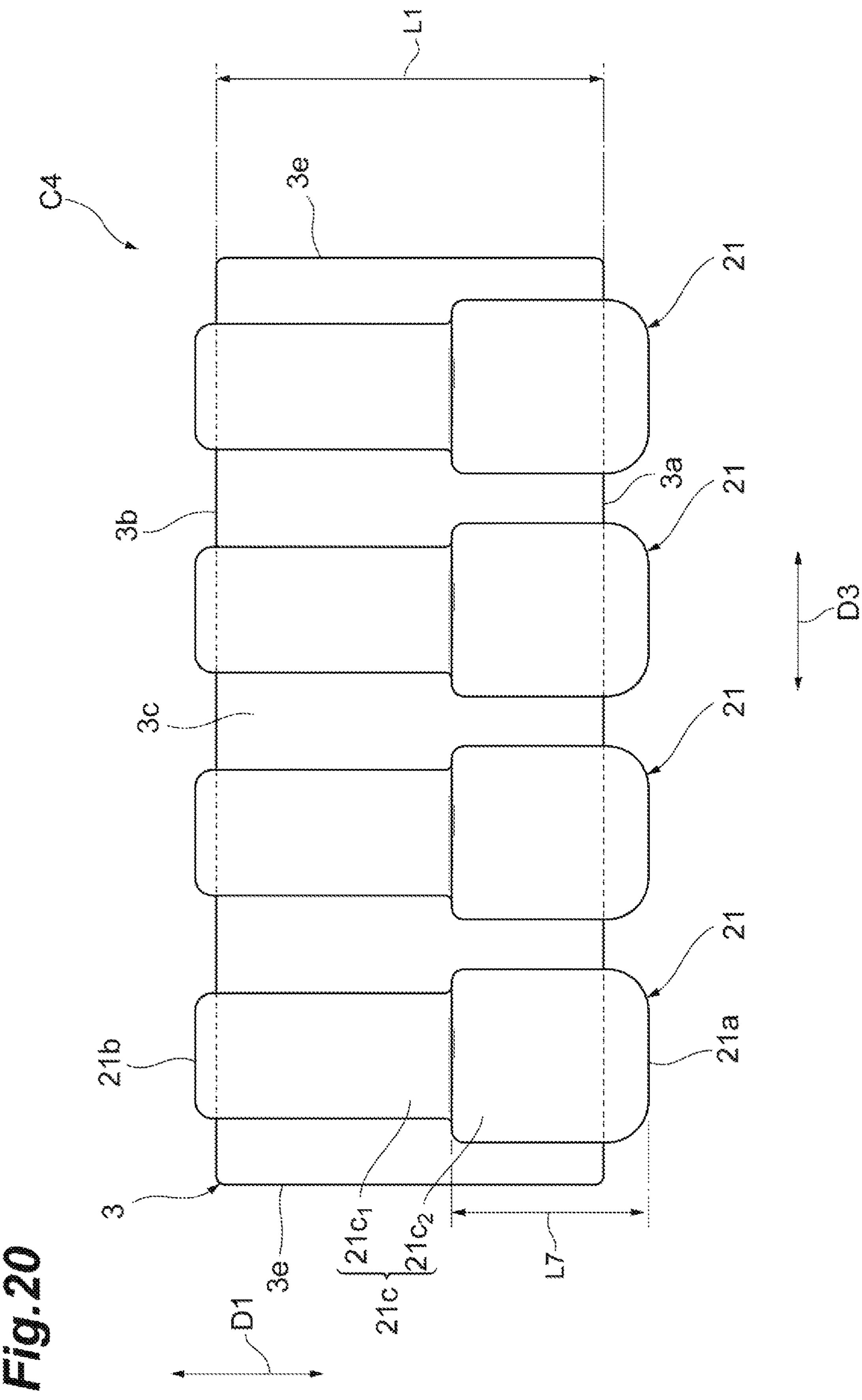
FIG. 20 is a side view of the multilayer capacitor according to the third embodiment.
Figure 21:
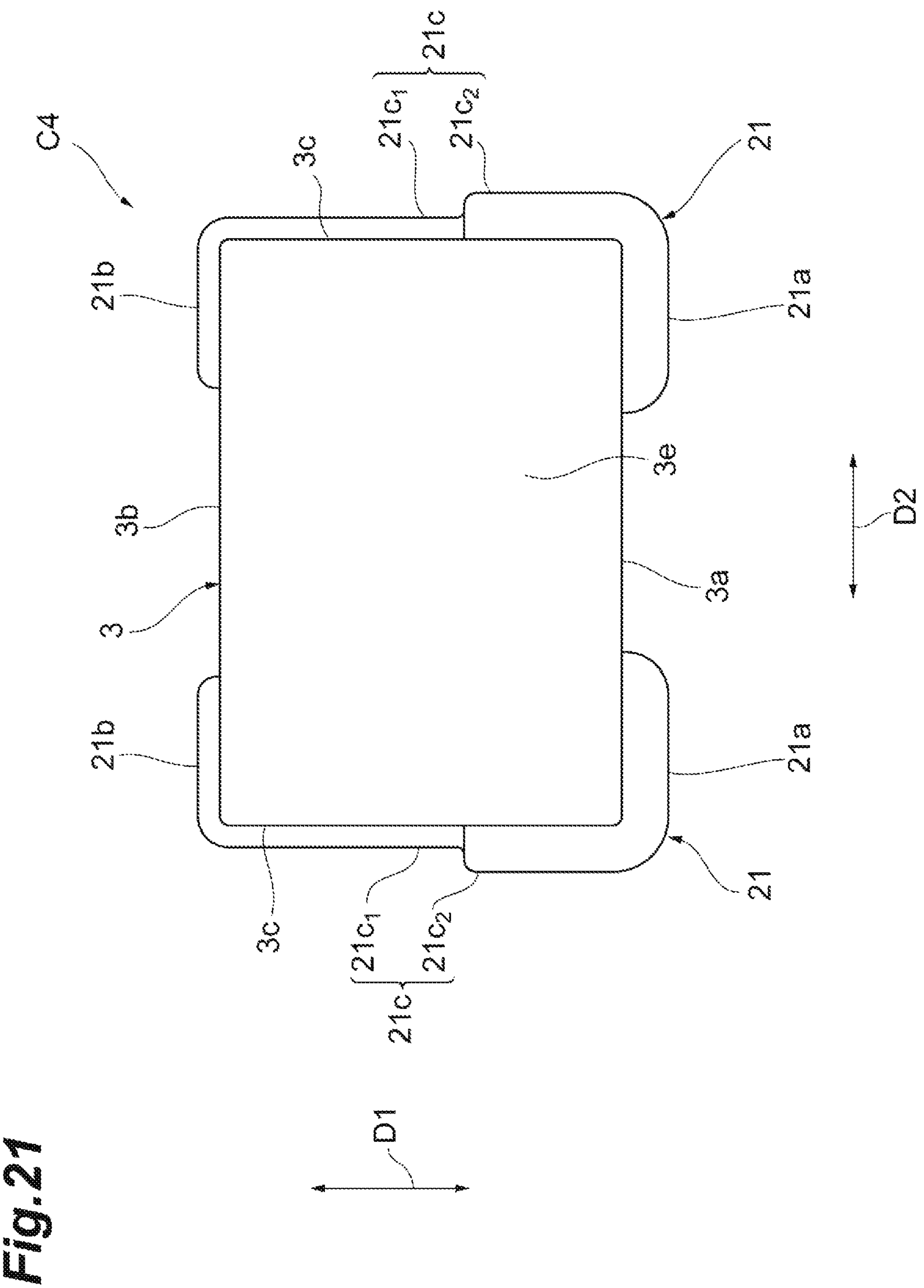
FIG. 21 is a side view of the multilayer capacitor according to the third embodiment.
Figure 22:
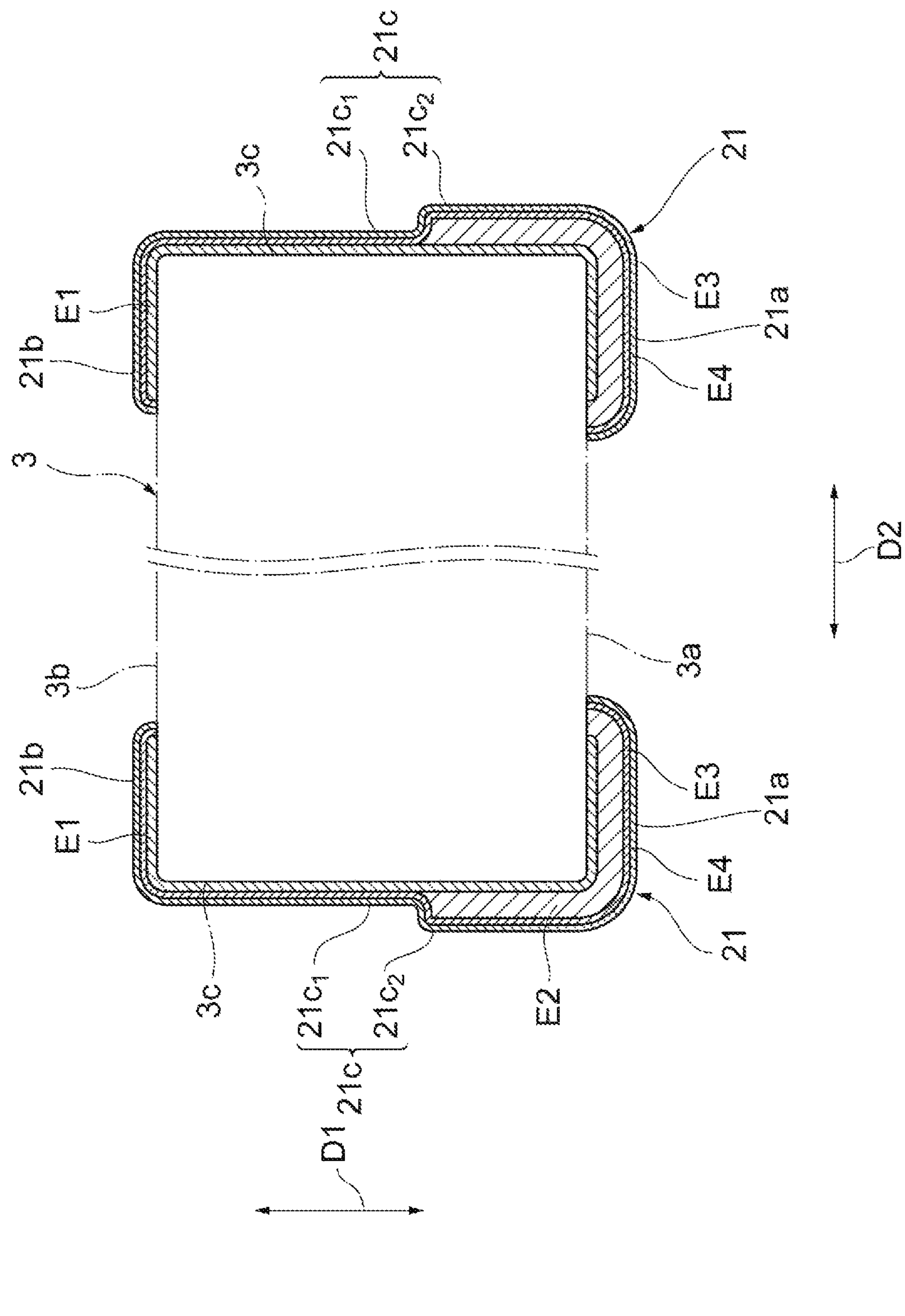
FIG. 22 is a view illustrating a cross-sectional configuration of external electrodes included in the multilayer capacitor according to the third embodiment.

A configuration of a multilayer capacitor C4 according to a third embodiment will be described with reference to FIGS. 18 to 22. FIGS. 18 and 19 are plan views of a multilayer capacitor according to the third embodiment. FIGS. 20 and 21 are side views of the multilayer capacitor according to the third embodiment. FIG. 22 is a view illustrating a cross-sectional configuration of external electrodes. In the third embodiment, an electronic component is, for example, the multilayer capacitor C4.

As illustrated in FIGS. 18 to 21, the multilayer capacitor C4 includes the element body 3, a plurality of external electrodes 21, and a plurality of internal electrodes (not illustrated). The plurality of external electrodes 21 is disposed on the outer surface of the element body 3. The plurality of external electrodes 21 is separated from each other. In the present embodiment, the multilayer capacitor C4 includes eight external electrodes 21. The number of the external electrodes 21 is not limited to eight.

Each of the external electrodes 21 includes electrode portions 21*a*, 21*b*, and 21*c*. The electrode portion 21*a* is disposed on the principal surface 3*a*. The electrode portion 21*b* is disposed on the principal surface 3*b*. The electrode portion 21*c* is disposed on the side surface 3*c*. The external electrode 21 is formed on the three surfaces, that is, the principal surfaces 3*a* and 3*b* and the side surfaces 3*c*. The electrode portions 21*a*, 21*b*, and 21*c* adjacent to each other are connected to each other at a ridge of the element body 3, and are electrically connected to each other.

The electrode portion 21$c$ covers all one ends exposed at the side surface 3$c$, of the respective internal electrodes. The electrode portion 21$c$ is directly connected to the respective internal electrodes. The external electrode 21 is electrically connected to the respective internal electrodes.

As illustrated in FIG. 22, the external electrode 21 includes the first electrode layer E1, the second electrode layer E2, the third electrode layer E3, and the fourth electrode layer E4. The fourth electrode layer E4 is the outermost layer of the external electrode 21.

The electrode portion 21$a$ includes the first electrode layer E1, the second electrode layer E2, the third electrode layer E3, and the fourth electrode layer E4. The electrode portion 21$a$ has a four-layer structure. In the electrode portion 21$a$, an entirety of the first electrode layer E1 is covered with the second electrode layer E2. The electrode portion 21$b$ includes the first electrode layer E1, the third electrode layer E3, and the fourth electrode layer E4. The electrode portion 21$b$ does not include the second electrode layer E2. The electrode portion 21$b$ has a three-layer structure.

The electrode portion 21$c$ includes a region 21$c_1$ and a region 21$c_2$. The region 21$c_2$ is located closer to the principal surface 3$a$ than the region 21$c_1$. In the present embodiment, the electrode portion 21$c$ includes only two regions 21$c_1$ and 21$c_2$. The region 21$c_1$ includes the first electrode layer E1, the third electrode layer E3, and the fourth electrode layer E4. The region 21$c_1$ does not include the second electrode layer E2. The region 21$c_1$ has a three-layer structure. The region 21$c_2$ includes the first electrode layer E1, the second electrode layer E2, the third electrode layer E3, and the fourth electrode layer E4. The region 21$c_2$ has a four-layer structure.

A ratio (L7/L1) of a length L7 of the region 21$c_2$ in the first direction D1 to the length L1 of the element body 3 is equal to or more than 0.2. The first electrode layer E1 included in each of the electrode portions 21$a$, 21$b$, and 21$c$ is integrally formed. The second electrode layer E2 included in each of the electrode portions 21$a$ and 21$c$ is integrally formed. The third electrode layer E3 included in each of the electrode portions 21$a$, 21$b$, and 21$c$ is integrally formed. The fourth electrode layer E4 included in each of the electrode portions 21$a$, 21$b$, and 21$c$ is also integrally formed.

The multilayer capacitor C4 is also solder-mounted on the electronic device. In the multilayer capacitor C4, the principal surface 3$a$ is arranged to constitute a mounting surface opposing the electronic device.

As described above, in the third embodiment, the electrode portion 21$a$ includes the second electrode layer E2 (conductive resin layer), and the region 21$c_2$ included in the electrode portion 21$c$ includes the second electrode layer E2 (conductive resin layer). Therefore, stress tends not to concentrate on an end edge of the external electrode 21, even in a case in which external force is applied onto the multilayer capacitor C4 through a solder fillet. The end edge of the external electrode 21 tends not to serve as an origination of a crack. Consequently, in the multilayer capacitor C4, occurrence of a crack in the element body 3 is suppressed.

The ratio (L7/L1) of the length L7 of the region 21$c_2$ to the length L1 of the element body 3 is equal to or more than 0.2. Therefore, the stress further tends not to concentrate on the end edge of the external electrode 21. Consequently, in the multilayer capacitor C4, the occurrence of a crack in the element body 3 is further suppressed.

Fourth Embodiment

Figure 23:
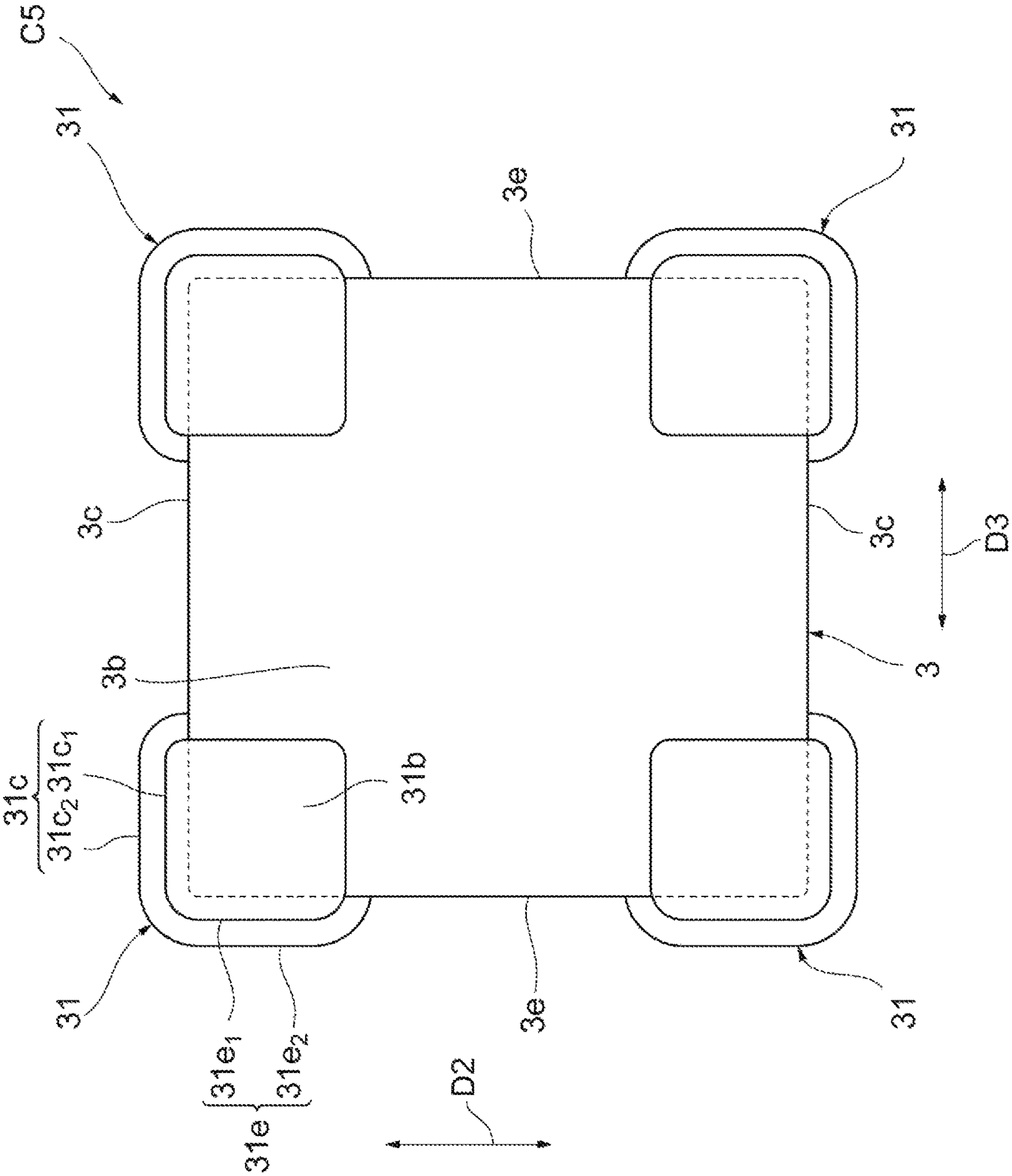
FIG. 23 is a plan view of a multilayer capacitor according to a fourth embodiment.
Figure 24:
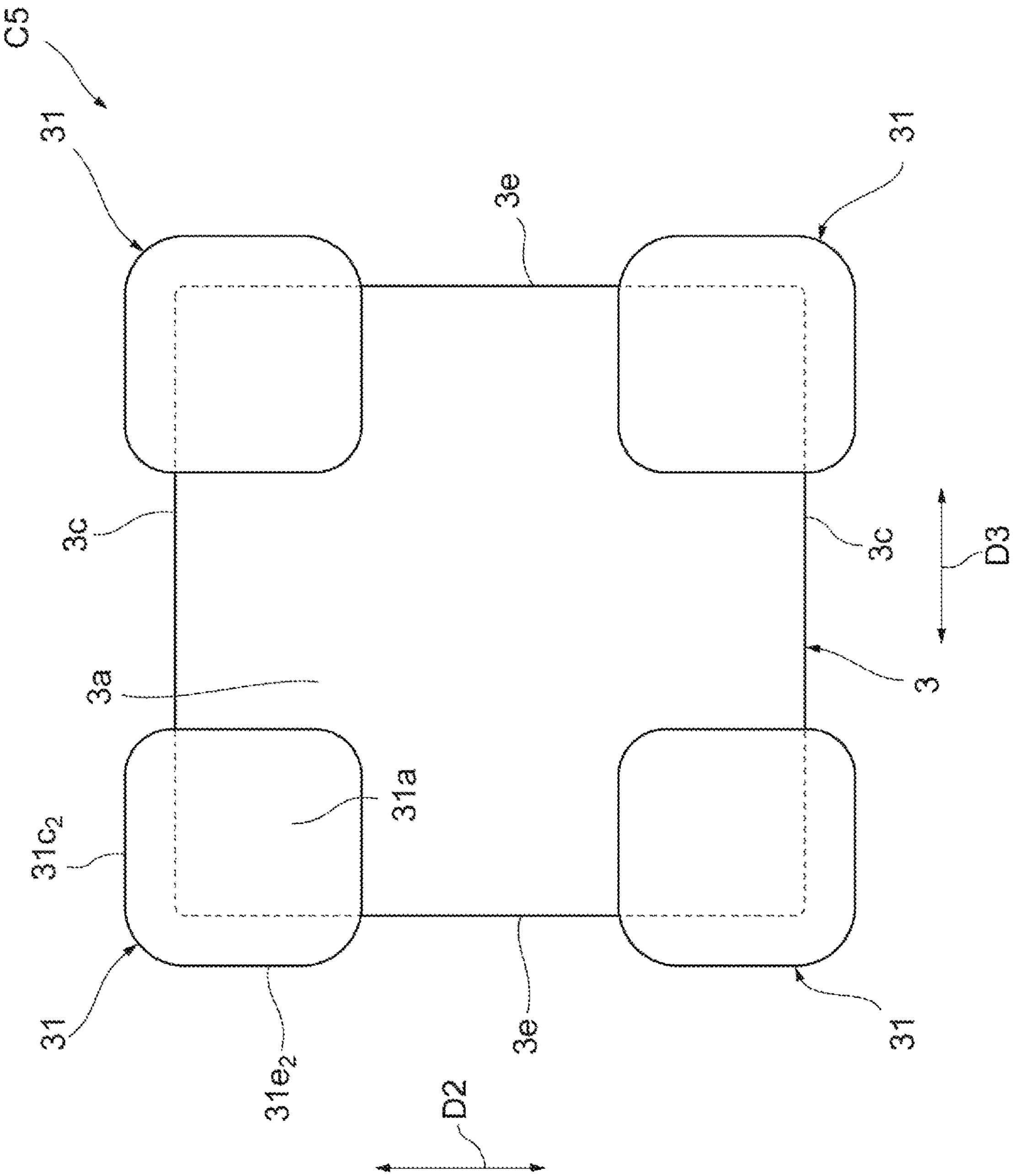
FIG. 24 is a plan view of the multilayer capacitor according to the fourth embodiment.
Figure 25:
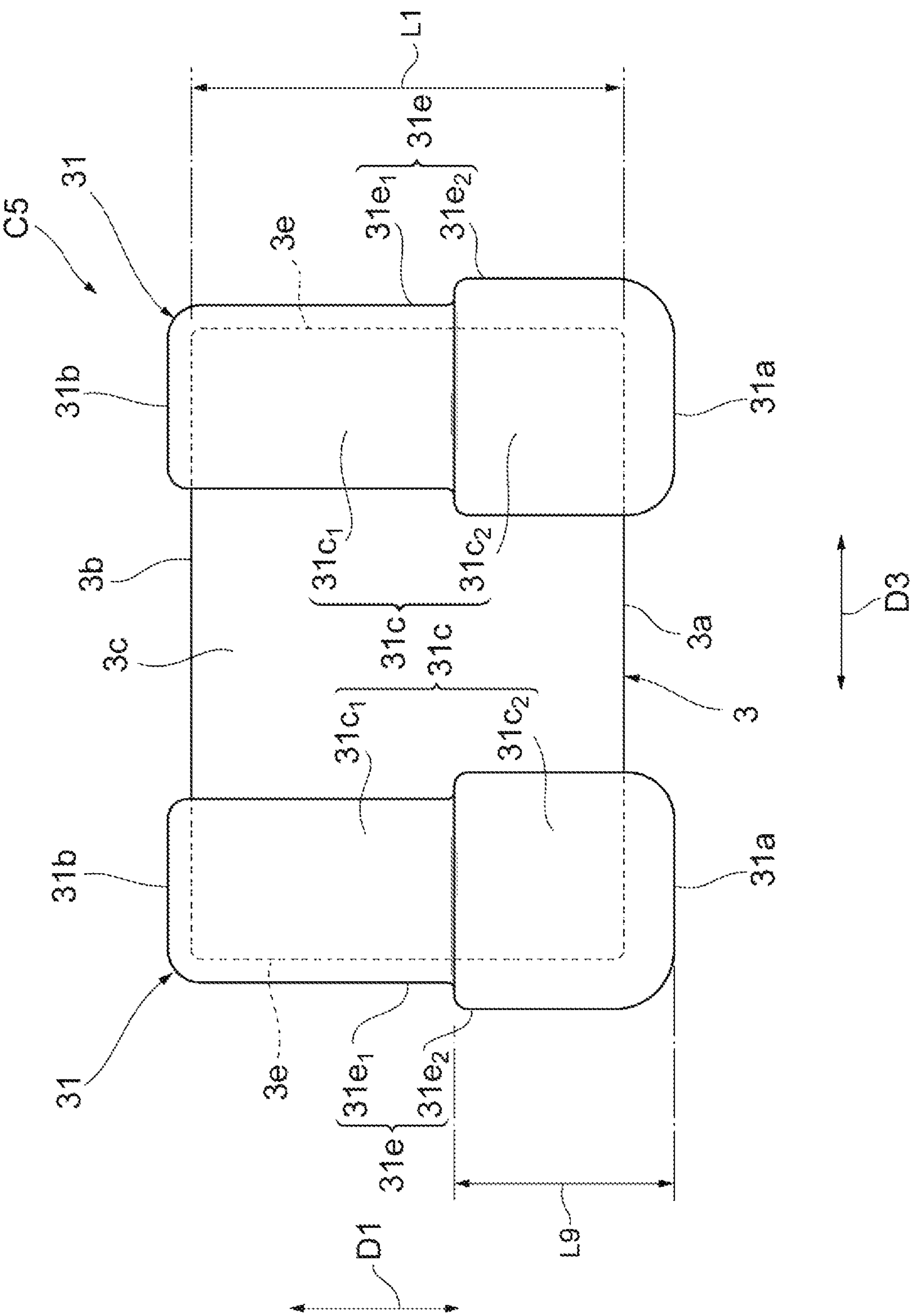
FIG. 25 is a side view of the multilayer capacitor according to the fourth embodiment.
Figure 26:
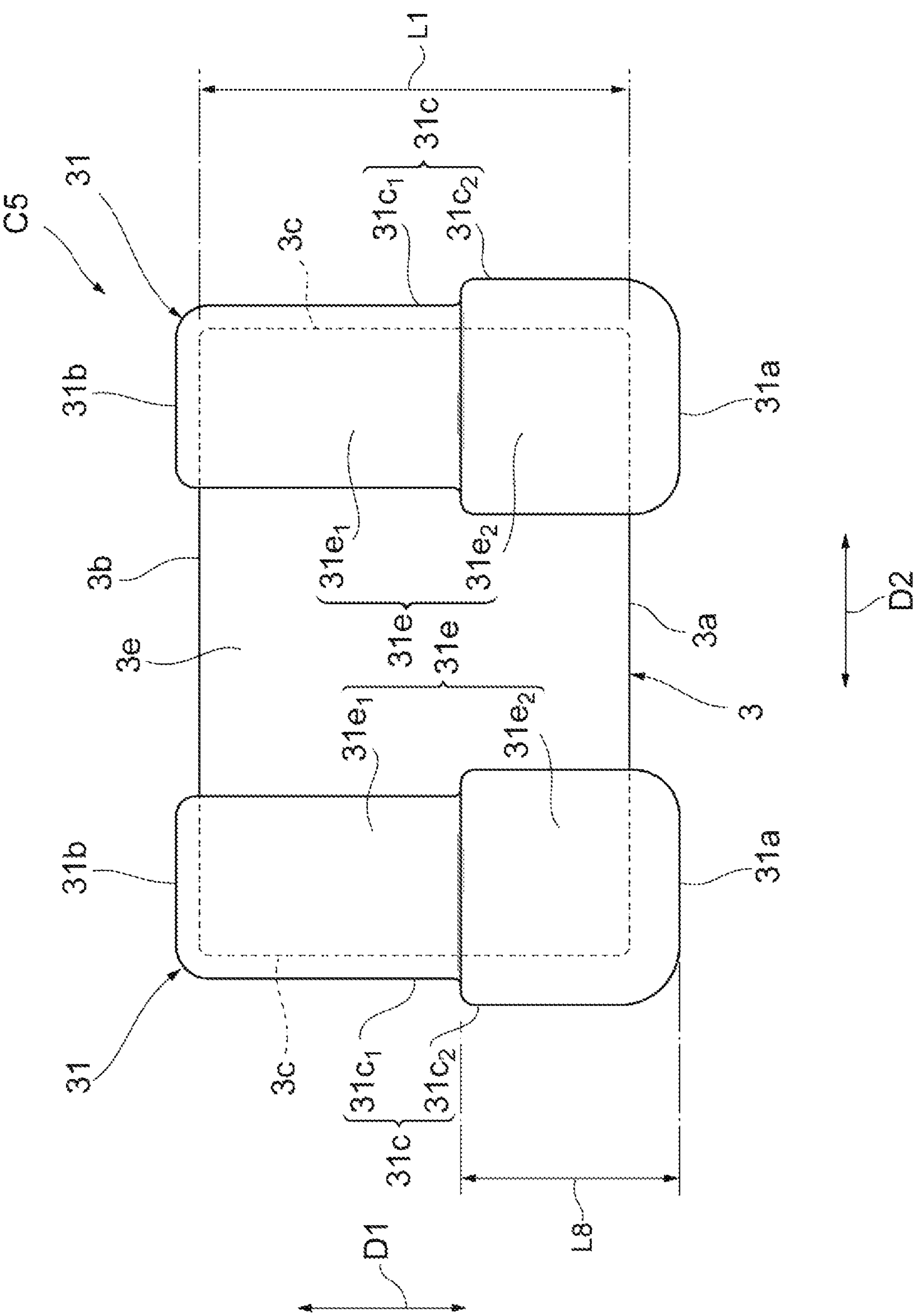
FIG. 26 is a side view of the multilayer capacitor according to the fourth embodiment.
Figure 27A:
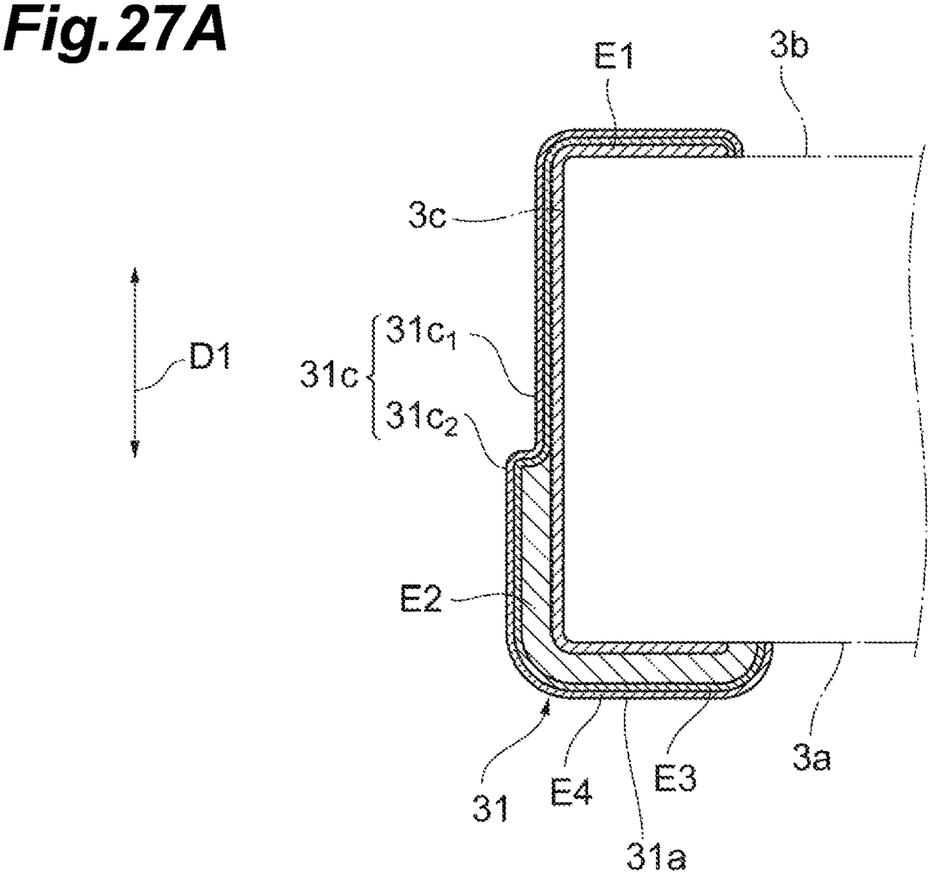
FIGS. 27A and 27B are views illustrating a cross-sectional configuration of external electrodes included in the multilayer capacitor according to the fourth embodiment.
Figure 27B:
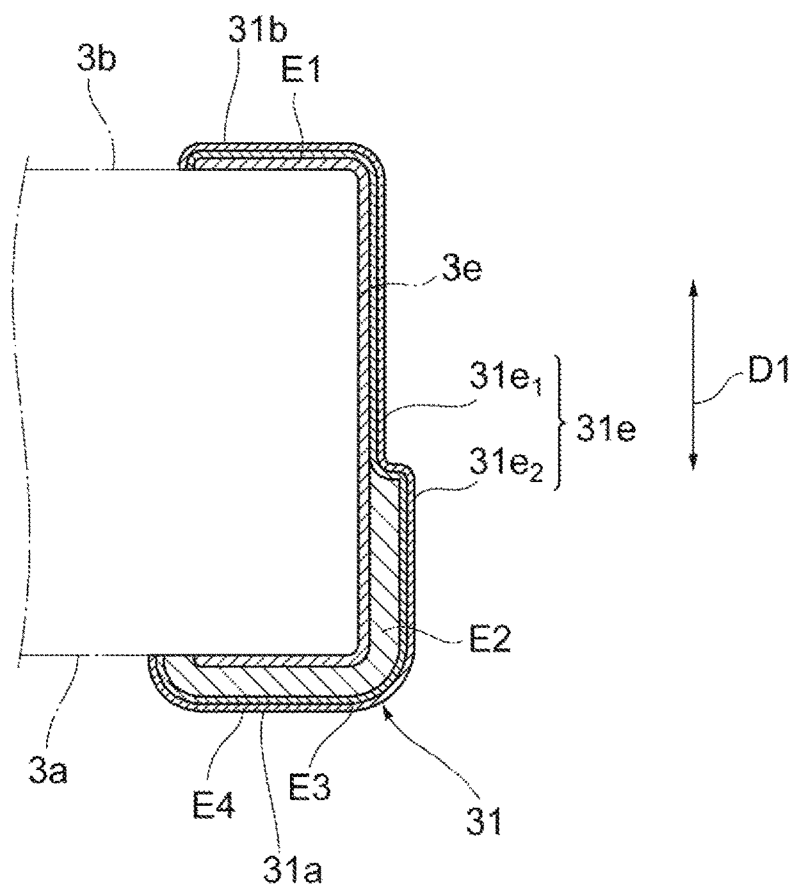

A configuration of a multilayer capacitor C5 according to a fourth embodiment will be described with reference to FIGS. 23 to 27B. FIGS. 23 and 24 are plan views of a multilayer capacitor according to the fourth embodiment. FIGS. 25 and 26 are side views of the multilayer capacitor according to the fourth embodiment FIGS. 27A and 27B are views illustrating a cross-sectional configuration of external electrodes. In the fourth embodiment, an electronic component is, for example, the multilayer capacitor C5.

As illustrated in FIGS. 23 to 26, the multilayer capacitor C5 includes the element body 3, a plurality of external electrodes 31, and a plurality of internal electrodes (not illustrated). The plurality of external electrodes 31 is disposed on the outer surface of the element body 3. The plurality of external electrodes 31 is separated from each other. In the present embodiment, the multilayer capacitor C5 includes four external electrodes 31.

The length of the element body 3 in the first direction D1 is smaller than the length of the element body 3 in the second direction D2, and smaller than the length of the element body 3 in the third direction D3. The length of the element body 3 in the second direction D2 and the length of the element body 3 in the third direction D3 are equivalent.

Each external electrode 31 is disposed at each corner portion of the element body 3. Each of the external electrodes 31 includes electrode portions 31$a$, 31$b$, 31$c$, and 31$e$. The electrode portion 31$a$ is disposed on the principal surface 3$a$. The electrode portion 31$b$ is disposed on the principal surface 3$b$. The electrode portion 31$c$ is disposed on the side surface 3$c$. The electrode portion 31$e$ is disposed on the side surface 3$e$. The external electrode 31 is formed on the four surfaces, that is, the principal surfaces 3$a$ and 3$b$, the side surface 3$c$, and the side surface 3$e$. The electrode portions 31$a$, 31$b$, 31$c$, and 13$e$ adjacent to each other are connected to each other at a ridge of the element body 3, and are electrically connected to each other.

The electrode portions 31$c$ and 31$e$ covers all the one ends exposed at the side surfaces 3$c$ and 3$e$, of the respective internal electrodes. The electrode portions 31$c$ and 31$e$ are directly connected to the respective internal electrodes. The external electrode 31 is electrically connected to the respective internal electrodes.

As illustrated in FIGS. 27A and 27B, the external electrode 31 includes a first electrode layer E1, a second electrode layer E2, a third electrode layer E3, and a fourth electrode layer E4. The fourth electrode layer E4 is the outermost layer of the external electrode 31.

The electrode portion 31$a$ includes the first electrode layer E1, the second electrode layer E2, the third electrode layer E3, and the fourth electrode layer E4. The electrode portion 31$a$ has a four-layer structure. In the electrode portion 31$a$, an entirety of the first electrode layer E1 is covered with the second electrode layer E2. The electrode portion 31$b$ includes the first electrode layer E1, the third electrode layer E3, and the fourth electrode layer E4. The electrode portion 31$b$ does not include the second electrode layer E2. The electrode portion 31$b$ has a three-layer structure.

The electrode portion 31$c$ includes a region 31$c_1$ and a region 31$c_2$. The region 31$c_2$ is located closer to the principal surface 3$a$ than the region 31$c_1$. In the present embodiment, the electrode portion 31$c$ includes only two regions 31$c_1$ and 31$c_2$. The region 31$c_1$ includes the first electrode layer E1, the third electrode layer E3, and the fourth electrode layer E4. The region 31$c_1$ does not include the second electrode layer E2. The region 31$c_1$ has a three-layer structure. The region 31$c_2$ includes the first electrode layer E1, the second electrode layer E2, the third electrode layer E3, and the fourth electrode layer E4. The region 31$c_2$ has a four-layer structure.

The electrode portion 31$e$ includes a region 31$e_1$ and a region 31$e_2$. The region 31$e_2$ is located closer to the principal surface 3$a$ than the region 31$e_1$. In the present embodiment, the electrode portion 31$e$ includes only two regions 31$e_1$ and 31$e_2$. The region 31$e_1$ includes the first electrode layer E1, the third electrode layer E3, and the fourth electrode layer E4. The region 31$e_1$ does not include the second electrode layer E2. The region 31$e_1$ has a three-layer structure. The region 31$e_2$ includes the first electrode layer E1, the second electrode layer E2, the third electrode layer E3, and the fourth electrode layer E4. The region 31$e_2$ has a four-layer structure.

A ratio (L8/L1) of a length L8 of the region 31$c_2$ in the first direction D1 to the length L1 of the element body 3 is equal to or more than 0.2. A ratio (L9/L1) of a length L9 of the region 31$e_2$ in the first direction D1 to the length L1 of the element body 3 is equal to or more than 0.2.

The first electrode layer E1 included in each of the electrode portions 31$a$, 31$b$, 31$c$, and 31$e$ is integrally formed. The second electrode layer E2 included in each of the electrode portions 31$a$, 31$c$, and 31$e$ is integrally formed. The third electrode layer E3 included in each of the electrode portions 31$a$, 31$b$, 31$c$, and 31$e$ is integrally formed. The fourth electrode layer E4 included in each of the electrode portions 31$a$, 31$b$, 31$c$, and 31$e$ is also integrally formed.

The multilayer capacitor C5 is also solder-mounted on the electronic device. In the multilayer capacitor C5, the principal surface 3$a$ is arranged to constitute a mounting surface opposing the electronic device.

As described above, in the fourth embodiment, the electrode portion 31$a$ includes the second electrode layer E2 (conductive resin layer), and the regions 31$c_2$ and 31$e_2$ included in the electrode portions 31$c$ and 31$e$ include the second electrode layer E2 (conductive resin layer). Therefore, stress tends not to concentrate on an end edge of the external electrode 31, even in a case in which external force is applied onto the multilayer capacitor C5 through a solder fillet. The end edge of the external electrode 31 tends not to serve as an origination of a crack. Consequently, in the multilayer capacitor C5, occurrence of a crack in the element body 3 is suppressed.

The ratio (L8/L1) of the length L8 of the region 31$c_2$ to the length L1 of the element body 3 is equal to or more than 0.2. The ratio (L9/L1) of the length L9 of the region 31$e_2$ to the length L1 of the element body 3 is equal to or more than 0.2. Therefore, the stress further tends not to concentrate on the end edge of the external electrode 31. Consequently, in the multilayer capacitor C5, the occurrence of a crack in the element body 3 is further suppressed.

Fifth Embodiment

Figure 28:
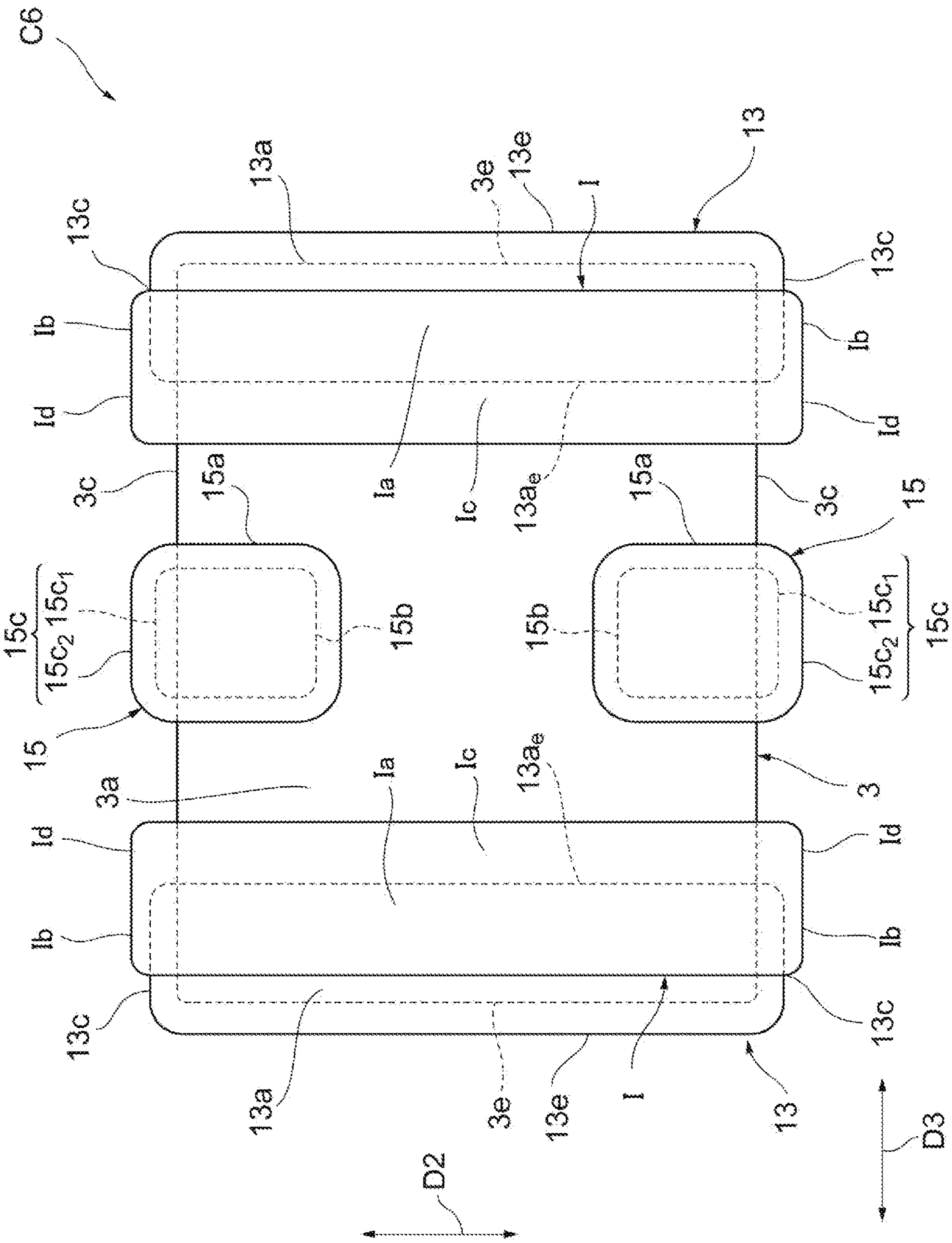
FIG. 28 is a plan view of a multilayer feedthrough capacitor according to a fifth embodiment.
Figure 29:
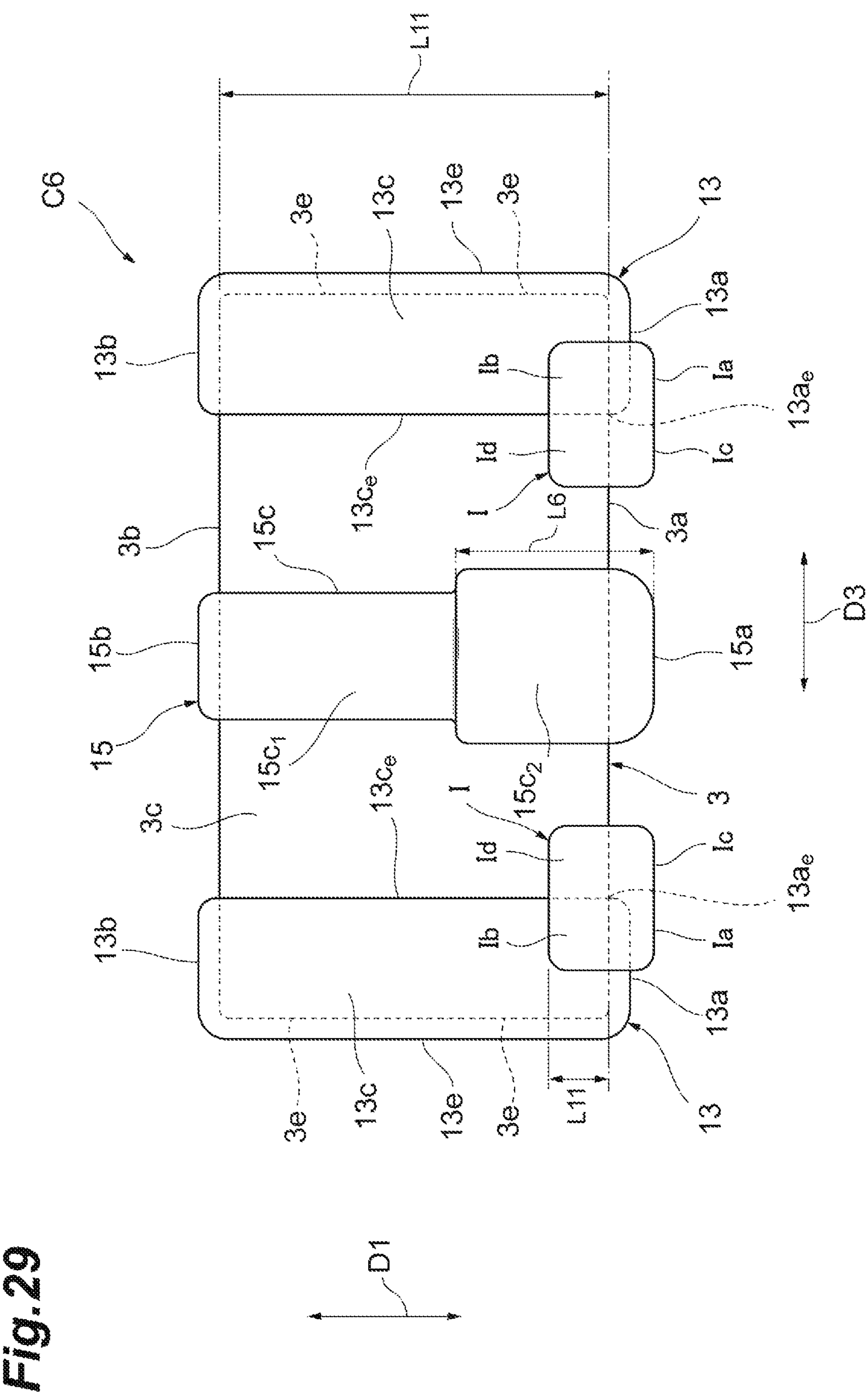
FIG. 29 is a side view of the multilayer feedthrough capacitor according to the fifth embodiment.
Figure 30:
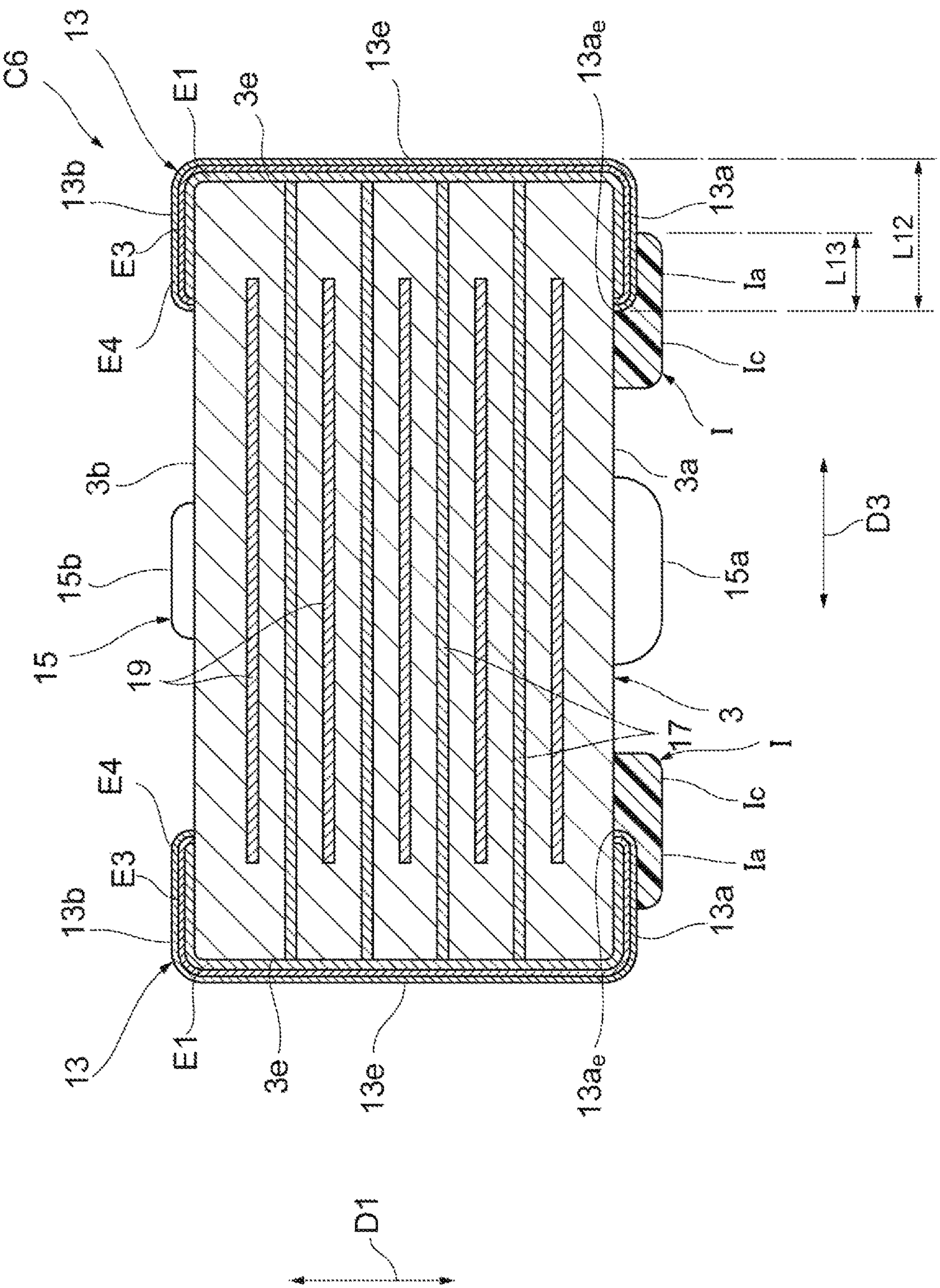
FIG. 30 is a view illustrating a cross-sectional configuration of the multilayer feedthrough capacitor according to the fifth embodiment.
Figure 31:
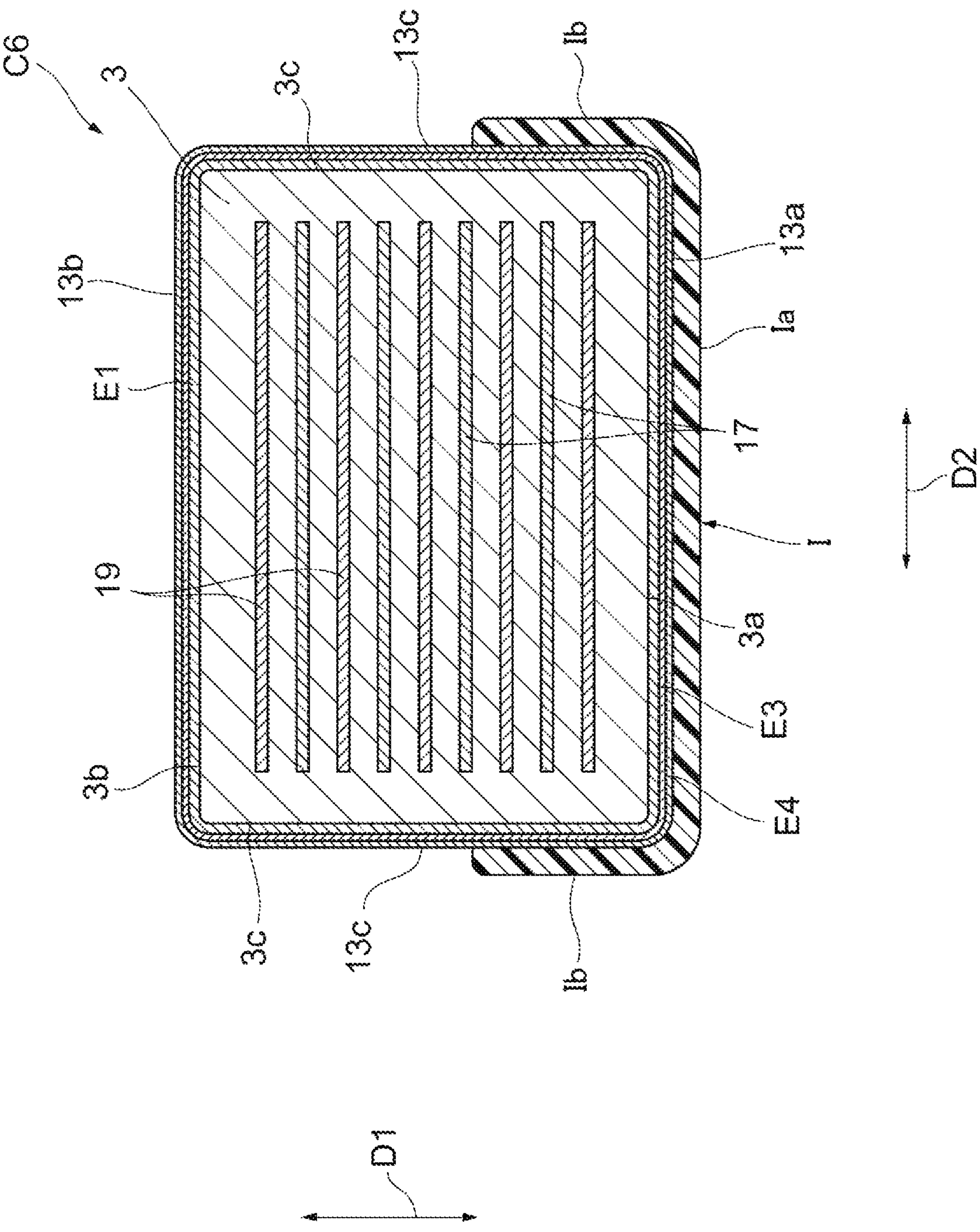
FIG. 31 is a view illustrating a cross-sectional configuration of the multilayer feedthrough capacitor according to the fifth embodiment.
Figure 32:
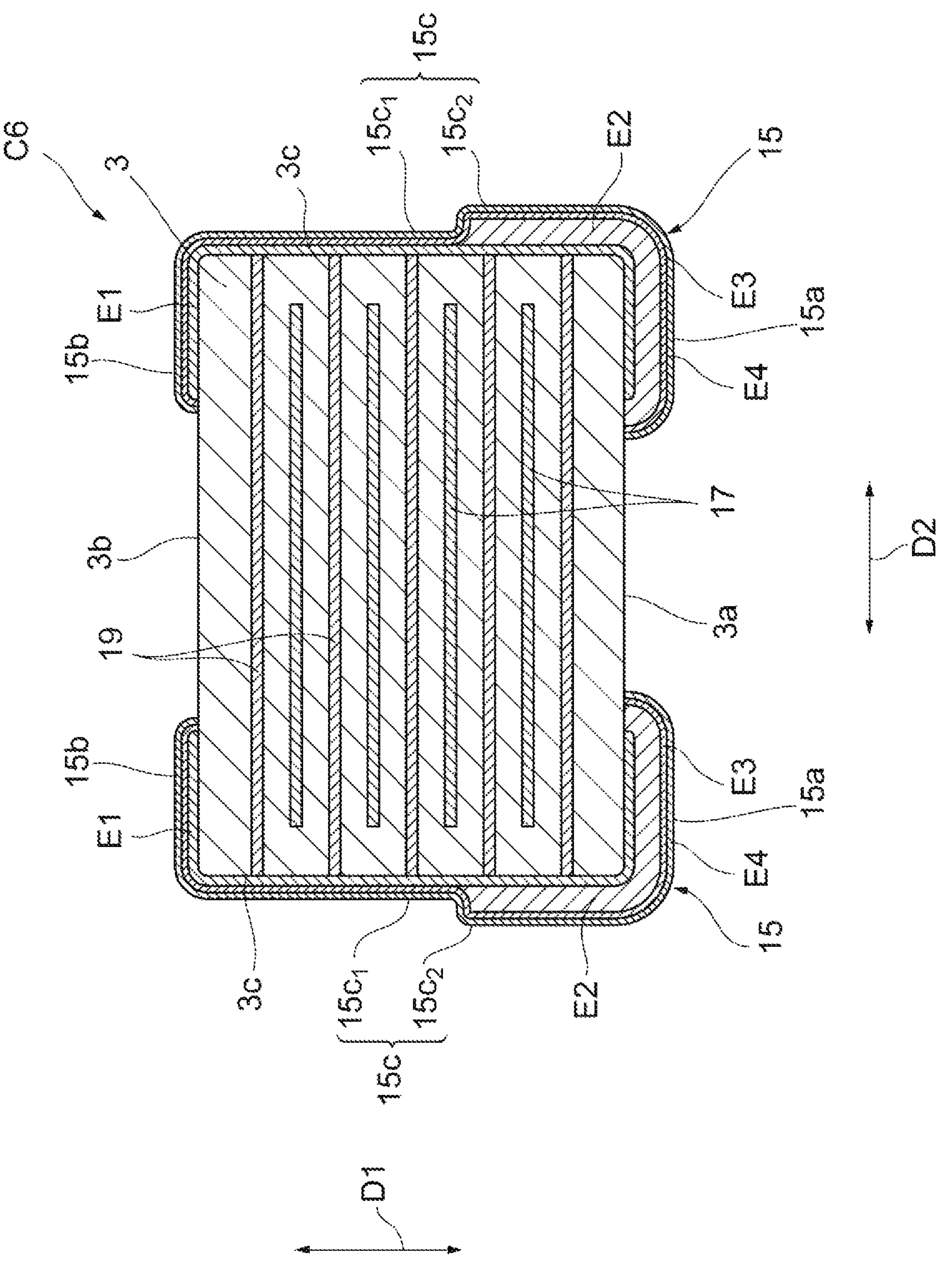
FIG. 32 is a view illustrating a cross-sectional configuration of the multilayer feedthrough capacitor according to the fifth embodiment.

A configuration of a multilayer feedthrough capacitor C6 according to a fifth embodiment will be described with reference to FIGS. 28 to 32. FIG. 28 is a plan view of a multilayer feedthrough capacitor according to the fifth embodiment. FIG. 29 is a side view of the multilayer feedthrough capacitor according to the fifth embodiment. FIGS. 30 to 32 are views illustrating a cross-sectional configuration of the multilayer feedthrough capacitor according to the fifth embodiment. In the fifth embodiment, an electronic component is, for example, the multilayer feedthrough capacitor C6.

As illustrated in FIGS. 28 to 32, the multilayer feedthrough capacitor C6 includes the element body 3, the pair of external electrodes 13, the pair of external electrodes 15, the plurality of internal electrodes 17, and the plurality of internal electrodes 19. The multilayer feedthrough capacitor C6 is also solder-mounted on the electronic device. In the multilayer feedthrough capacitor C6, the principal surface 3$a$ is arranged to constitute a mounting surface opposing the electronic device.

As illustrated in FIGS. 30 and 31, the external electrode 13 includes the first electrode layer E1, the third electrode layer E3, and the fourth electrode layer E4. In the multilayer feedthrough capacitor C6, the external electrode 13 does not include the second electrode layer E2. Each of the electrode portions 13$a$, 13$c$, and 13$e$ includes the first electrode layer E1, the third electrode layer E3, and the fourth electrode layer E4. Each of the electrode portions 13$a$, 13$c$, and 13$e$ has a three-layer structure. The fourth electrode layer E4 is the outermost layer of the external electrode 13.

As illustrated in FIG. 32, as is the case in the multilayer feedthrough capacitor C3, the external electrode 15 includes the first electrode layer E1, the second electrode layer E2, the third electrode layer E3, and the fourth electrode layer E4.

The multilayer feedthrough capacitor C6 includes a pair of insulating films I. The insulating film I is made of a material having electrical insulation properties (e.g., an insulating resin or glass). In the fifth embodiment, the insulating film I is made of an insulating resin (e.g., an epoxy resin).

The insulating film I covers a part of the external electrode 13 and a part of the element body 3, along an end edge 13$a_e$ of the electrode portion 13$a$ and an end edge 13$c_e$ of the electrode portion 13$c$. The electrode portion 13$b$, the electrode portion 13$e$, and the principal surface 3$b$ are not covered with the insulating film I.

Along the end edge 13$a_e$ and only a part of the end edge 13$c_e$ (a portion near the principal surface 3$a$ in the first direction D1), the insulating film I continuously covers the end edge 13$a_e$ and only the part of the end edge 13$c_e$, and continuously covers the principal surface 3$a$ and the side surface 3$c$. The insulating film I includes film portions Ia, Ib, Ic, and Id. The film portion Ia is located on the electrode portion 13$a$. The film portion Ib is located on the electrode portion 13$c$. The film portion Ic is located on the principal surface 3$a$. The film portion Id is located on the side surface 3$c$. The film portions Ia, Ib, Ic, and Id each are integrally formed.

A surface of the electrode portion 13$a$ includes a region covered with the insulating film I (film portion Ia) along the end edge 13$a_e$, and a region exposed from the insulating film I. The region exposed from the insulating film I is located closer to the end surface 3$e$ than the region covered with the film portion Ia. A surface of the electrode portion 13$c$ includes a region covered with the insulating film I (film portion Ib) along the end edge 13$c_e$, and a region exposed from the insulating film I.

The principal surface 3$a$ includes a region covered with the insulating film I (film portion Ic) along the end edge 13$a_e$, and a region exposed from the insulating film I. The side surface 3$c$ includes a region covered with the insulating film I (film portion Id) along the end edge 13$c_e$, and a region exposed from the insulating film I.

In the fifth embodiment, a ratio (L11/L1) of each length L11 of the film portion Ib and the film portion Id in the first direction D1 to the length L1 of the element body 3 is 0.1 or more to 0.4 or less. A ratio (L13/L12) of a length L13 of the film portion Ia in the third direction D3 to a length L12 of the electrode portion 13$a$ in the third direction D3 is equal to or more than 0.3.

As described above, in the fifth embodiment, the insulating film I continuously covers the end edge $13a_e$ and only the part of the end edge $13c_e$. Therefore, a solder fillet does not reach the end edge $13a_e$ and the part of the end edge $13c_e$ (an end edge of a portion located near the principal surface 3*a*, in the electrode portion 13*c*). Consequently, even in a case in which external force is applied onto the multilayer feedthrough capacitor C6 through the solder fillet, stress tends not to concentrate on the end edges $13a_e$ and $13c_e$. The end edges $13a_e$ and $13c_e$ tend not to serve as an origination of a crack.

In the multilayer feedthrough capacitor C6, the electrode portion 15*a* include the second electrode layer E2, and the region $15c_2$ included in the electrode portion 15*c* includes the second electrode layer E2. Therefore, stress tends not to concentrate on end edges of the external electrode 15, even in a case in which external force is applied onto the multilayer feedthrough capacitor C6 through the solder fillet. The end edge of the external electrode 15 tends not to serve as an origination of a crack.

Consequently, in the multilayer feedthrough capacitor C6, occurrence of a crack in the element body 3 is suppressed.

In the fifth embodiment, the insulating film I continuously covers the principal surface 3*a* and the side surface 3*c* along the end edge 13*a*, and only the part of the end edge $13c_e$. Therefore, the end edge 13*a*, and the part of the end edge 13*c*, are reliably covered with the insulating film I. Consequently, in the multilayer feedthrough capacitor C6, the end edges $13a_e$ and $13c_e$ further tend not to serve as the origination of the crack.

In the fifth embodiment, the entire electrode portion 13*b* is exposed from the insulating film I. Therefore, the solder fillet SF is formed on the electrode portion 13*b*. Consequently, mounting strength of the multilayer feedthrough capacitor C6 is ensured.

In the fifth embodiment, the ratio (L11/L1) of the length L11 to the length L1 of the element body 3 is 0.1 or more to 0.4 or less. In this case, the effect of suppressing occurrence of cracks is ensured, and a size of the insulating film I is reduced. Therefore, a cost of the multilayer feedthrough capacitor C6 is reduced. In a case in which the ratio (L11/L1) is less than 0.1, the stress acting on the end edges 13*a*, and $13c_e$ is large. The end edges $13a_e$ and $13c_e$ tend to serve as the origination of the crack.

In the fifth embodiment, the ratio (L13/L12) of the length L13 of the film portion Ia to the length L12 of the electrode portion 13*a* is equal to or more than 0.3. In this case, the stress further tends not to concentrate on the end edge $13a_e$. Therefore, occurrence of the crack in the element body 3 is further suppressed. In a case in which the ratio (L13/L12) is less than 0.3, the stress acting on the end edge $13a_e$ is large. The end edge $13a_e$ tends to serve as the origination of the crack.

Figure 33:
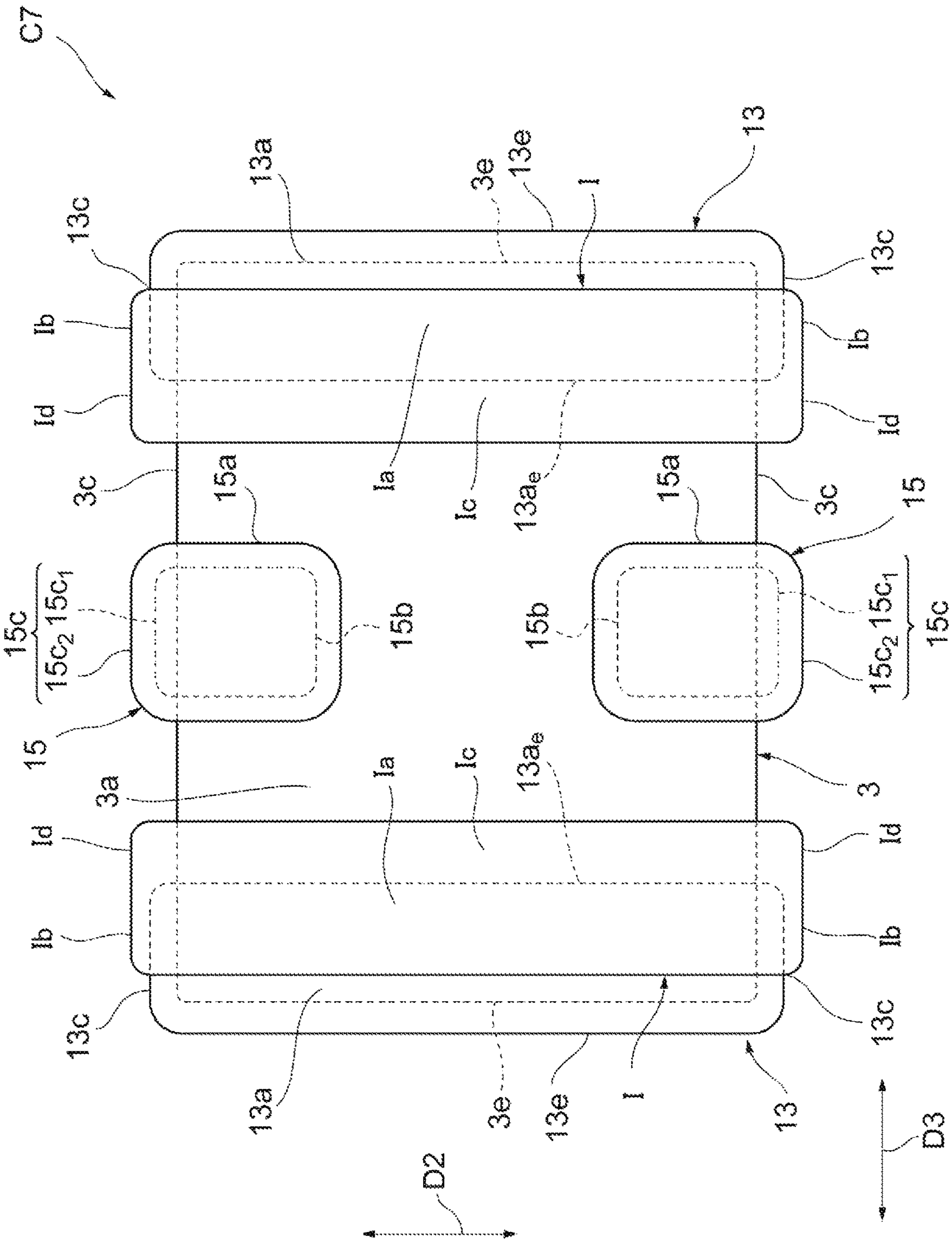
FIG. 33 is a plan view of a multilayer feedthrough capacitor according to a modification of the fifth embodiment.

Next, a configuration of a multilayer feedthrough capacitor C7 according to a modification of the fifth embodiment will be described with reference to FIGS. 33 to 35. FIGS. 33 and 35 are plan views of a multilayer feedthrough capacitor according to the present modification. FIG. 35 is a side view of the multilayer feedthrough capacitor according to the present modification.

As with the multilayer feedthrough capacitor C6, the multilayer feedthrough capacitor C7 includes the element body 3, the pair of external electrodes 13, the pair of external electrodes 15, the plurality of internal electrodes 17 (not illustrated), and the plurality of internal electrodes 19 (not illustrated). In the multilayer feedthrough capacitor C7, a shape of the insulating film I is different from that of the multilayer feedthrough capacitor C6.

Figure 34:
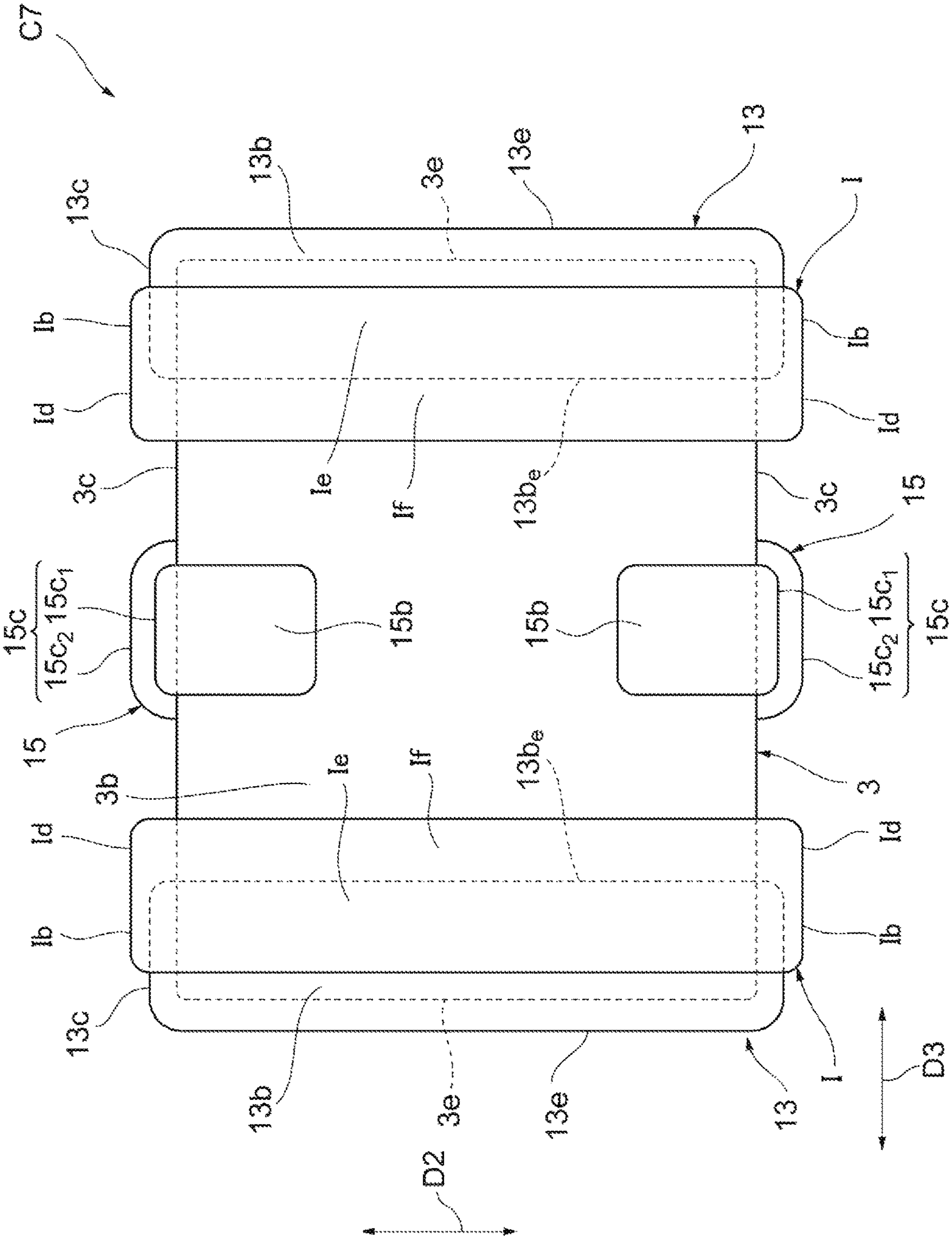
FIG. 34 is a plan view of the multilayer feedthrough capacitor according to the modification.
Figure 35:
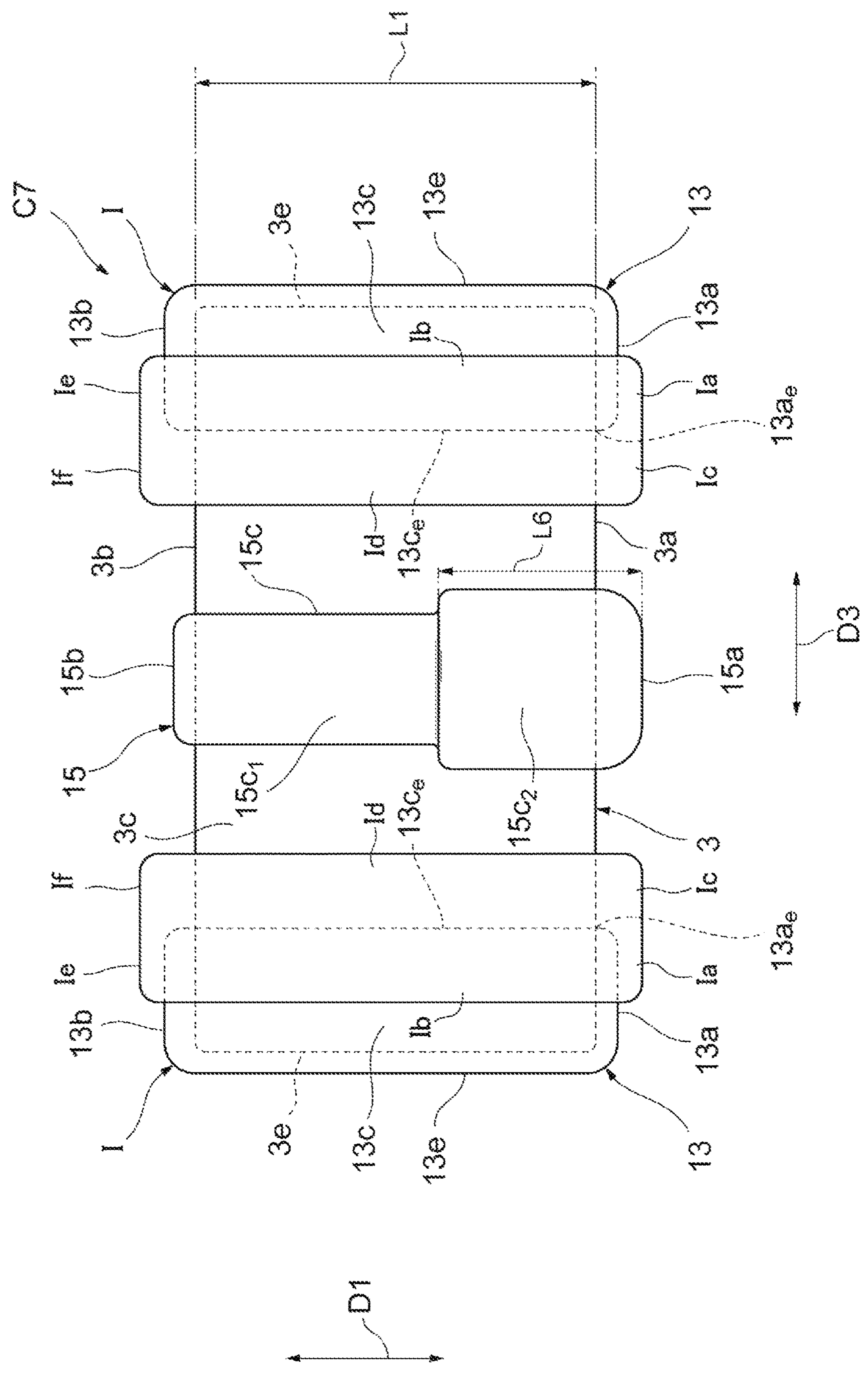
FIG. 35 is a side view of the multilayer feedthrough capacitor according to the modification.

As illustrated in FIGS. 33 to 35, the multilayer feedthrough capacitor C7 includes the pair of insulating films I. The insulating film I covers a part of the external electrode 13 and a part of the element body 3, along the end edge $13a_e$ of the electrode portion 13*a*, an end edge $13b_e$ of the electrode portion 13*b*, and the end edge $13c_e$ of the electrode portion 13*c*. The electrode portion 13*e* is not covered with the insulating film I.

Along all of the end edge $13a_e$, the end edge $13b_e$, and the end edge $13c_e$, the insulating film I continuously covers the end edge $13a_e$, the end edge $13b_e$, and the end edge $13c_e$, and continuously covers the principal surface 3*a*, the principal surface 3*b*, and the side surface 3*c*. The insulating film I includes film portions Ia, Ib, Ic, Id, Ie, and If. The film portion Ia is located on the electrode portion 13*a*. The film portion Ib is located on the electrode portion 13*c*. The film portion Ic is located on the principal surface 3*a*. The film portion Id is located on the side surface 3*c*. The film portion Ie is located on the electrode portion 13*b*. The film portion If is located on the principal surface 3*b*. The film portions Ia, Ib, Ic, Id, Ie, and If each are integrally formed.

The surface of the electrode portion 13*a* includes a region covered with the insulating film I (film portion Ia) along the end edge $13a_e$, and a region exposed from the insulating film I. The region exposed from the insulating film I, on the surface of the electrode portion 13*a*, is located closer to the side surface 3*e* than the region covered with the film portion Ia. The surface of the electrode portion 13*c* includes a region covered with the insulating film I (film portion Ib) along the end edge $13c_e$, and a region exposed from the insulating film I. The region exposed from the insulating film I, on the surface of the electrode portion 13*c*, is located closer to the side surface 3*e* than the region covered with the film portion Ib. A surface of the electrode portion 13*b* includes a region covered with the insulating film I (film portion Ie) along the end edge $13b_e$, and a region exposed from the insulating film I. The region exposed from the insulating film I, on the surface of the electrode portion 13*b*, is located closer to the side surface 3*e* than the region covered with the film portion Ie.

The principal surface 3*a* includes a region covered with the insulating film I (film portion Ic) along the end edge $13a_e$, and a region exposed from the insulating film I. The side surface 3*c* includes a region covered with the insulating film I (film portion Id) along the end edge $13c_e$, and a region exposed from the insulating film I. The principal surface 3*b* includes a region covered with the insulating film I (film portion If) along the end edge $13b_e$, and a region exposed from the insulating film I.

In the present modification, the insulating film I continuously covers all of the end edge $13a_e$, the end edge $13b_e$, and the end edge $13c_e$. Therefore, occurrence of a crack in the element body 3 is reliably suppressed.

The insulating film I continuously covers the principal surface 3*a*, the principal surface 3*b*, and the side surface 3*c* along all of the end edge $13a_e$, the end edge $13b_e$, and the end edge $13c_e$. Therefore, all of the end edge $13a_e$, the end edge $13b_e$, and the end edge $13c_e$ are reliably covered with the insulating film I. Consequently, the end edges $13a_e$ and $13c_e$ further tend not to serve as the origination of the crack.

Sixth Embodiment

Figure 36:
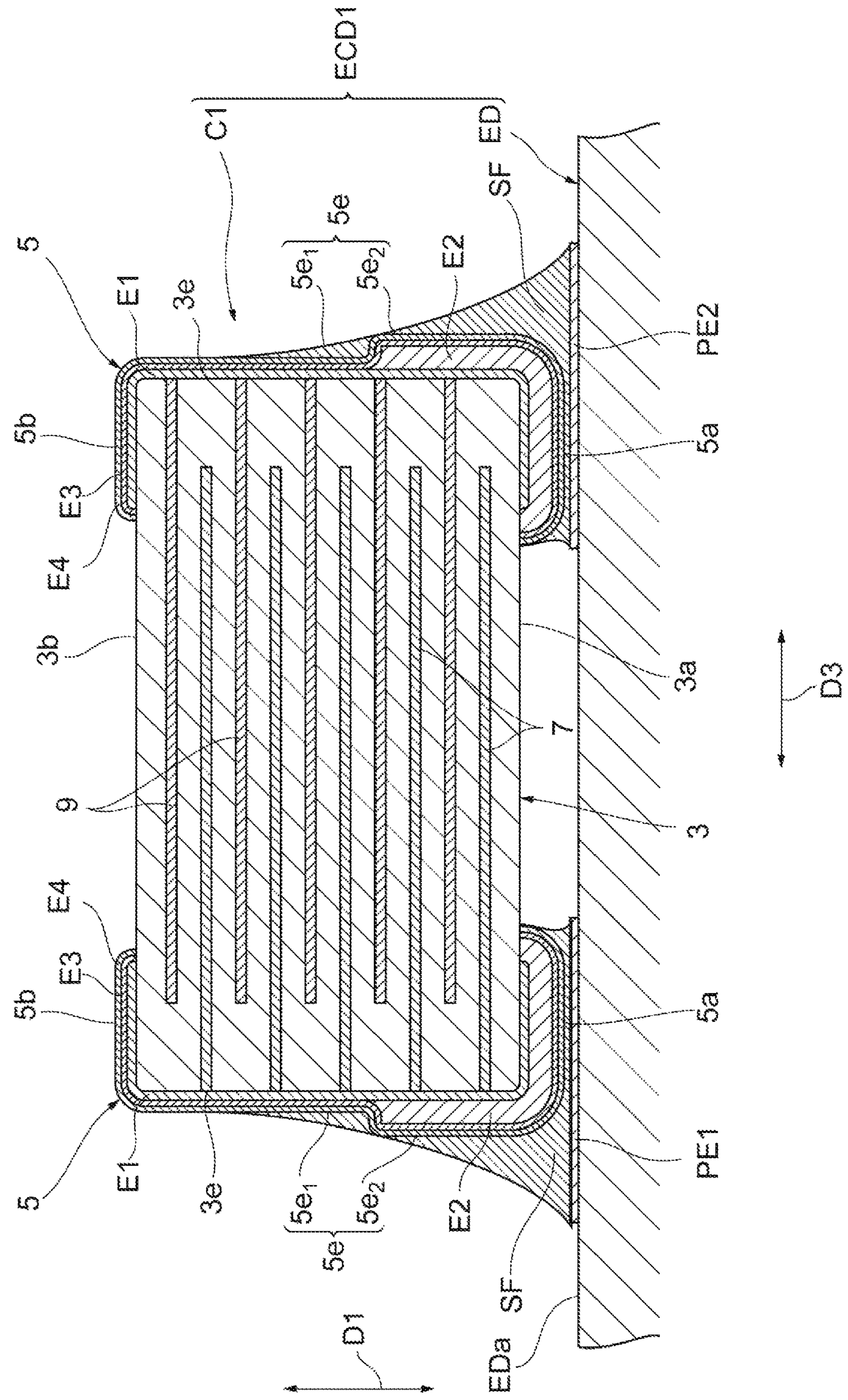
FIG. 36 is a view illustrating a cross-sectional configuration of an electronic component device according to a sixth embodiment.

A configuration of an electronic component device ECD1 according to a sixth embodiment will be described with reference to FIG. 36. FIG. 36 is a view illustrating a cross-sectional configuration of the electronic component device according to the sixth embodiment.

As illustrated in FIG. 36, the electronic component device ECD1 includes the multilayer capacitor C1 and an electronic device ED. The electronic device ED includes, for example, a circuit board or an electronic component.

The multilayer capacitor C1 is solder-mounted on the electronic device ED. The electronic device ED includes a principal surface EDa and two pad electrodes PE1 and PE2. Each of the pad electrodes PE1 and PE2 is disposed on the principal surface EDa. The two pad electrodes PE1 and PE2 are separated from each other. The multilayer capacitor C1 is disposed on the electronic device ED in such a manner that the principal surface EDa and the principal surface 3*a* that is the mounting surface oppose each other.

In a case in which the multilayer capacitor C1 is solder-mounted, molten solder wets to the external electrodes 5 (fourth electrode layers E4). Solder fillets SF are formed on the external electrodes 5 by solidification of the wet solder. The external electrodes 5 and the pad electrodes PE1 and PE2 that correspond to each other are coupled via the solder fillets SF.

The solder fillet SF is formed on the region $5e_1$ and region $5e_2$ of the electrode portion 5*e*. In addition to the region $5e_2$, the region $5e_1$ that does not include the second electrode layer E2 is also coupled to the corresponding pad electrode PE1 or PE2 via the solder fillet SF. Although illustration is omitted, the solder fillet SF is also formed on the region $5c_1$ and region $5c_2$ of the electrode portion 5*c*.

In the electronic component device ECD1, a region on which the solder fillet SF is formed is large, as compared with in an electronic component device where the solder fillet SF is formed only on the regions $5e_2$ of the electrode portion 5*e*. Therefore, mounting strength of the multilayer capacitor C1 is ensured.

The region $5e_2$ protrudes in the second direction D2 and the third direction D3 more than the region $5e_1$. Therefore, a step is formed at a boundary between the region $5e_2$ and the region $5e_1$. In a vicinity of the boundary between the region $5e_2$ and the region $5e_1$, a surface area of the region $5e_1$ is smaller than a surface area of the region $5e_2$. Therefore, a path of the molten solder wetting is small. Consequently, the molten solder tends to wet from the region $5e_2$ to the region $5e_1$, and the solder tends to accumulate on the step formed by the region $5e_2$ and the region $5e_1$. A solder pool is formed on the step formed by the region $5e_2$ and the region $5e_1$.

In the electronic component device ECD1 illustrated in FIG. 36, the solder pool is formed on the step formed by the region $5e_2$ and the region $5e_1$. In the electronic component device ECD1, a volume of the solder fillet formed on the region $5e_2$ and the pad electrode PE1 or PE2 is small, as compared with in an electronic component device in which no step is formed at the boundary between the region $5e_2$ and the region $5e_1$. Therefore, force acting on the multilayer capacitor C1 from the solder fillet SF is small. Stress concentrating on the end edge of the first electrode layer E1 located on the main surface 3*a* arranged to constitute the mounting surface is also small. Consequently, the end edge of the first electrode layer E1 tends not to serve as an origination of a crack. Occurrence of a crack in the element body 3 is suppressed.

In the electronic component device ECD1, the amount of solder wetting on the region $5e_1$ is large, as compared with in the electronic component device in which no step is formed at the boundary between the region $5e_2$ and the region $5e_1$. Therefore, in the electronic component device ECD1, a region formed with the solder fillet SF is large. Consequently, the mounting strength of the multilayer capacitor C1 is improved.

The step formed by the region $5e_2$ and the region $5e_1$ includes the second electrode layer E2 (conductive resin layer). Therefore, the solder pool formed on the step that is formed by the region $5e_2$ and the region $5e_1$ tends not to serve as the origination of a crack. Consequently, a crack tends not to occur in the external electrode 5.

As illustrated in FIGS. 4 and 4, the region $5c_2$ protrudes in the second direction D2 and the third direction D3 more than the region $5c_1$. Therefore, a step is formed at a boundary between the region $5c_2$ and the region $5c_1$. In a vicinity of the boundary between the region $5c_2$ and the region $5c_1$, a surface area of the region $5c_1$ is smaller than a surface area of the region $5c_2$. Therefore, a path of the molten solder wetting is small. Consequently, the molten solder tends to wet from the region $5c_2$ to the region $5c_1$, and the solder tends to accumulate on the step formed by the region $5c_2$ and the region $5c_1$. Although illustration is omitted, a solder pool is formed on the step formed by the region $5c_2$ and the region $5c_1$.

In the electronic component device ECD1, the solder pool is formed on the step formed by the region $5c_2$ and the region $5c_1$. In the electronic component device ECD1, a volume of the solder fillet formed on the region $5c_2$ and the pad electrode PE1 or PE2 is small, as compared with in an electronic component device in which no step is formed at the boundary between the region $5c_2$ and the region $5c_1$. Therefore, force acting on the multilayer capacitor C1 from the solder fillet SF is small. Stress concentrating on the end edge of the first electrode layer E1 located on the main surface 3*a* arranged to constitute the mounting surface is also small. Consequently, the end edge of the first electrode layer E1 tends not to serve as an origination of a crack. Occurrence of a crack in the element body 3 is suppressed.

In the electronic component device ECD1, the amount of solder wetting on the region $5c_1$ is large, as compared with in the electronic component device in which no step is formed at the boundary between the region $5c_2$ and the region $5c_1$, and thus a region formed with the solder fillet SF is large. Consequently, the mounting strength of the multilayer capacitor C1 is further improved.

The step formed by the region $5c_2$ and the region $5c_1$ includes the second electrode layer E2 (conductive resin layer). Therefore, the solder pool formed on the step that is formed by the region $5c_2$ and the region $5c_1$ tends not to serve as the origination of a crack. Consequently, the crack further tends not to occur in the external electrode 5.

The ratio (L3/L1) of the length L3 of the region $5e_2$ to the length L1 of the element body 3 may be equal to or less than 0.8. In a case in which the ratio (L3/L1) is equal to or less than 0.8, the solder pool is reliably formed on the step formed by the region $5e_2$ and the region $5e_1$, as compared with in a case in which the ratio (L3/L1) is more than 0.8.

The ratio (L2/L1) of the length L2 of the region $5c_2$ to the length L1 of the element body 3 may be equal to or less than 0.8. In a case in which the ratio (L2/L1) is equal to or less than 0.8, the solder pool is reliably formed on the step formed by the region $5c_2$ and the region $5c_1$, as compared with in a case in which the ratio (L2/L1) is more than 0.8.

The electronic component device ECD1 may include the multilayer capacitor C2, the multilayer capacitor C4, or the multilayer capacitor C5 in place of the multilayer capacitor C1. The electronic component device ECD1 may include the multilayer feedthrough capacitor C3, the multilayer feedthrough capacitor C6, or the multilayer feedthrough capacitor C7 in place of the multilayer capacitor C1.

In a case in which the electronic component device ECD1 includes the multilayer feedthrough capacitor C3, the solder fillet SF is formed on the region $\mathbf{13}e_1$ and region $\mathbf{13}e_2$ of the electrode portion 13*e*. Furthermore, the solder fillet SF is also formed on the region $\mathbf{15}c_1$ and region $\mathbf{15}c_2$ of the electrode portion 15*c*.

In a case in which the electronic component device ECD1 includes the multilayer capacitor C4, the solder fillet SF is formed on the region $\mathbf{21}c_1$ and region $\mathbf{21}c_2$ of the electrode portion 21*c*. In a case in which the electronic component device ECD1 includes the multilayer capacitor C5, the solder fillet SF is formed on the regions $\mathbf{31}c_1$ and $\mathbf{31}e_1$ and regions $\mathbf{31}c_2$ and $\mathbf{31}e_2$ of the electrode portions 31*c* and 31*e*.

In a case in which the electronic component device ECD1 includes the multilayer feedthrough capacitor C6 or the multilayer feedthrough capacitor C7, the solder fillet SF is formed on the region $\mathbf{15}c_1$ and region $\mathbf{15}c_2$ of the electrode portion 15*c*. Furthermore, the solder fillet SF is also formed on the electrode portion 13*e*.

Figure 37:
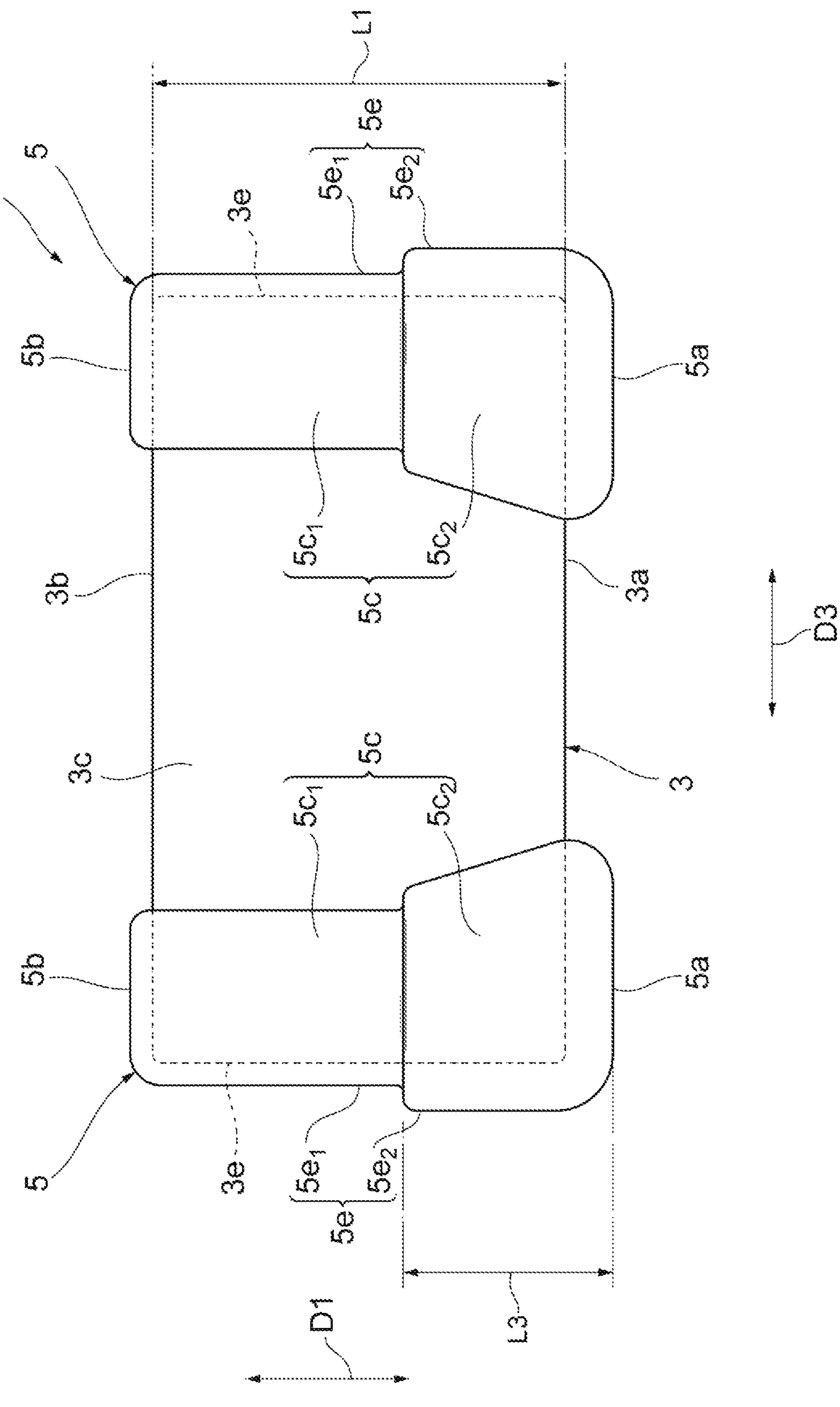
FIG. 37 is a side view of a multilayer capacitor according to a modification of the first embodiment.
Figure 38:
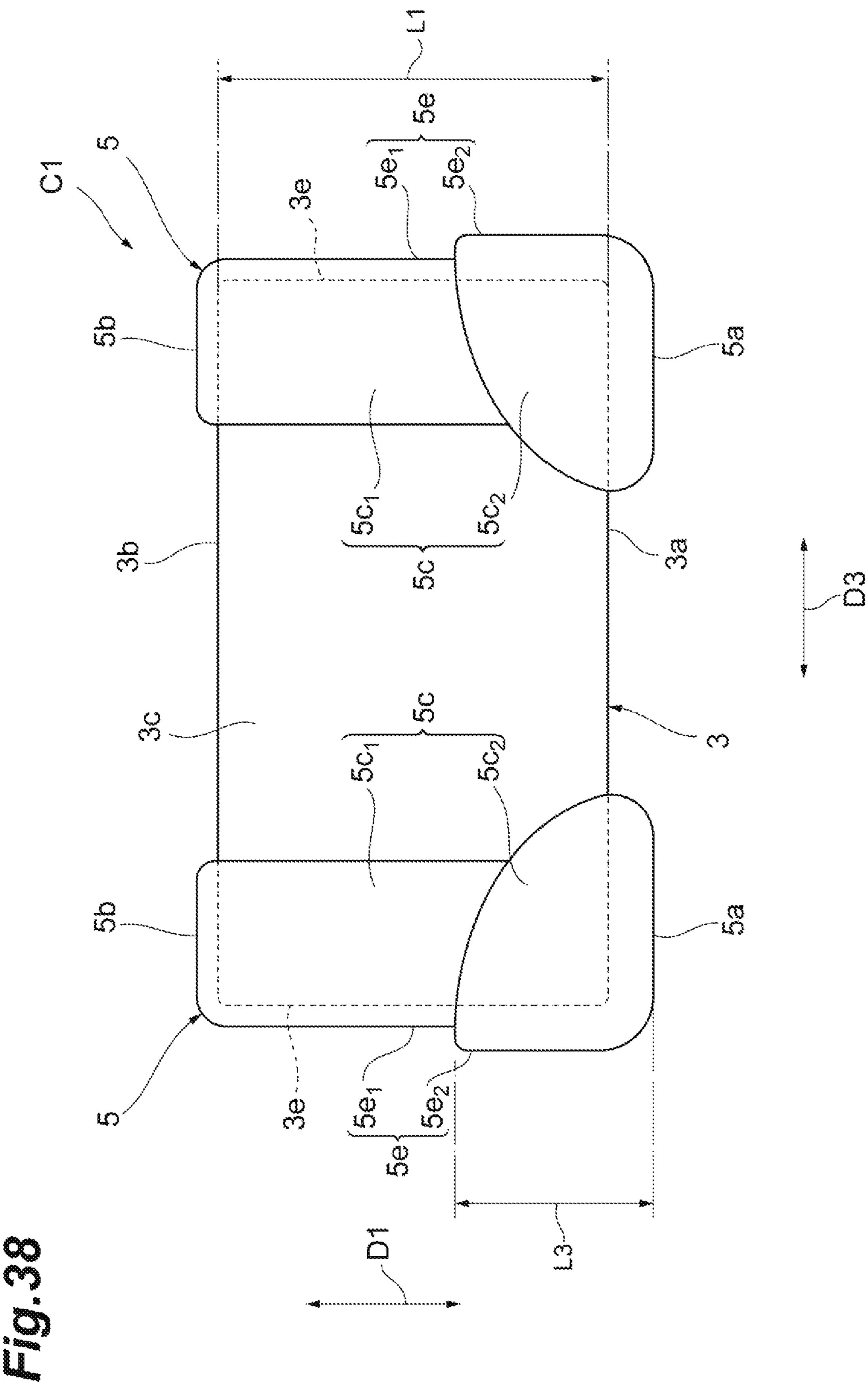
FIG. 38 is a side view of a multilayer capacitor according to a modification of the first embodiment.
Figure 39:
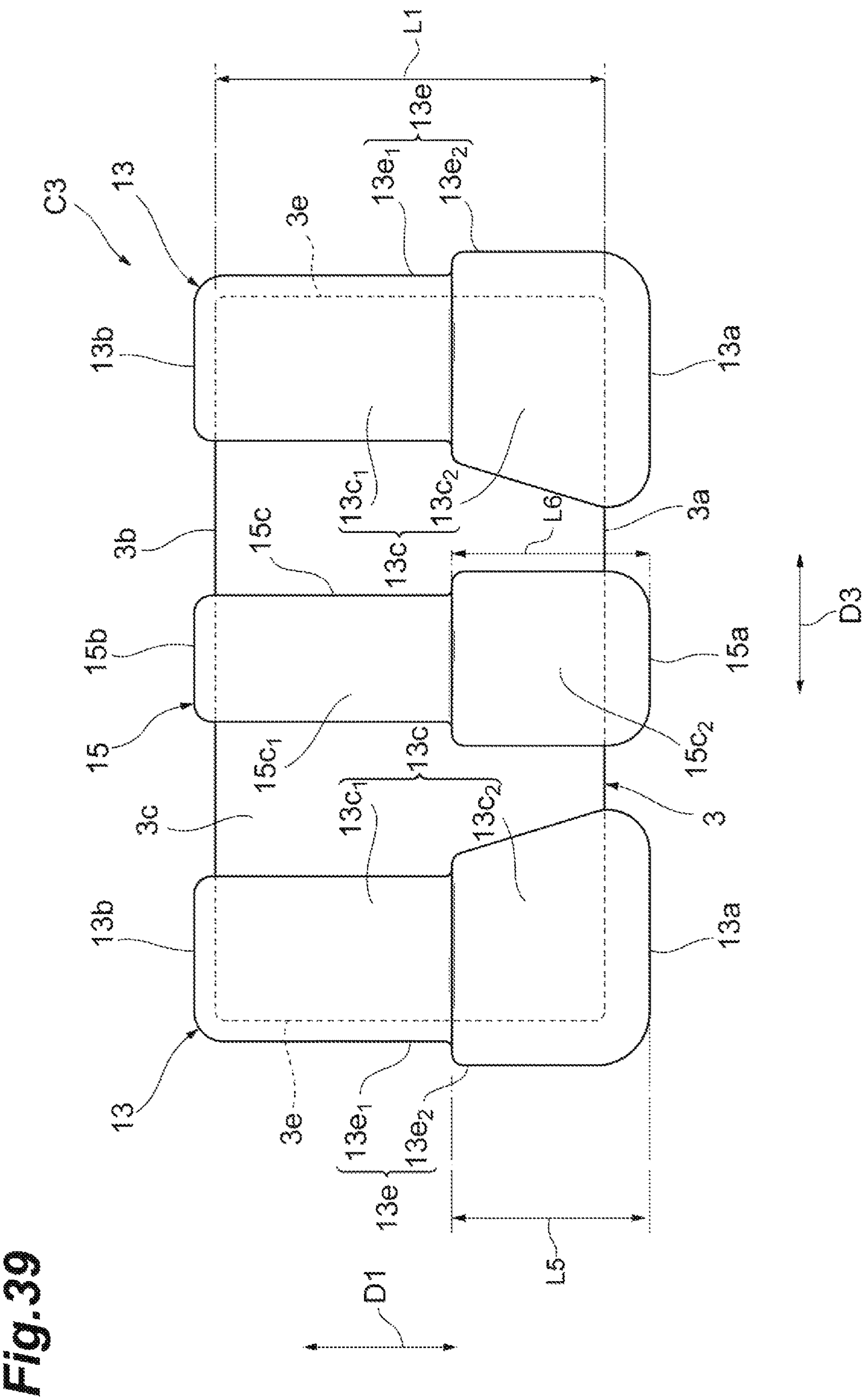
FIG. 39 is a side view of a multilayer feedthrough capacitor according to a modification of the second embodiment.
Figure 40:
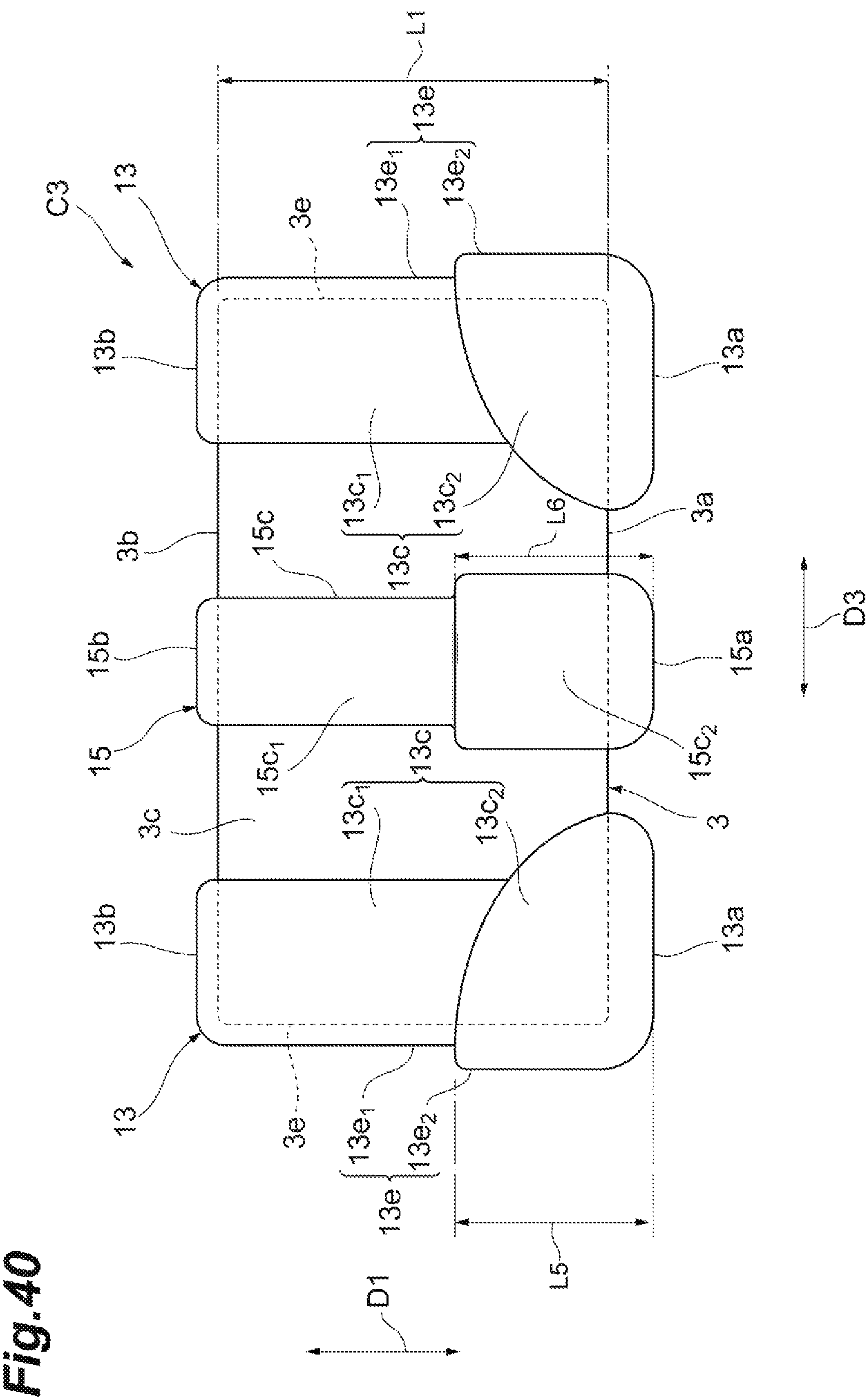
FIG. 40 is a side view of a multilayer feedthrough capacitor according to a modification of the second embodiment.
Figure 41:
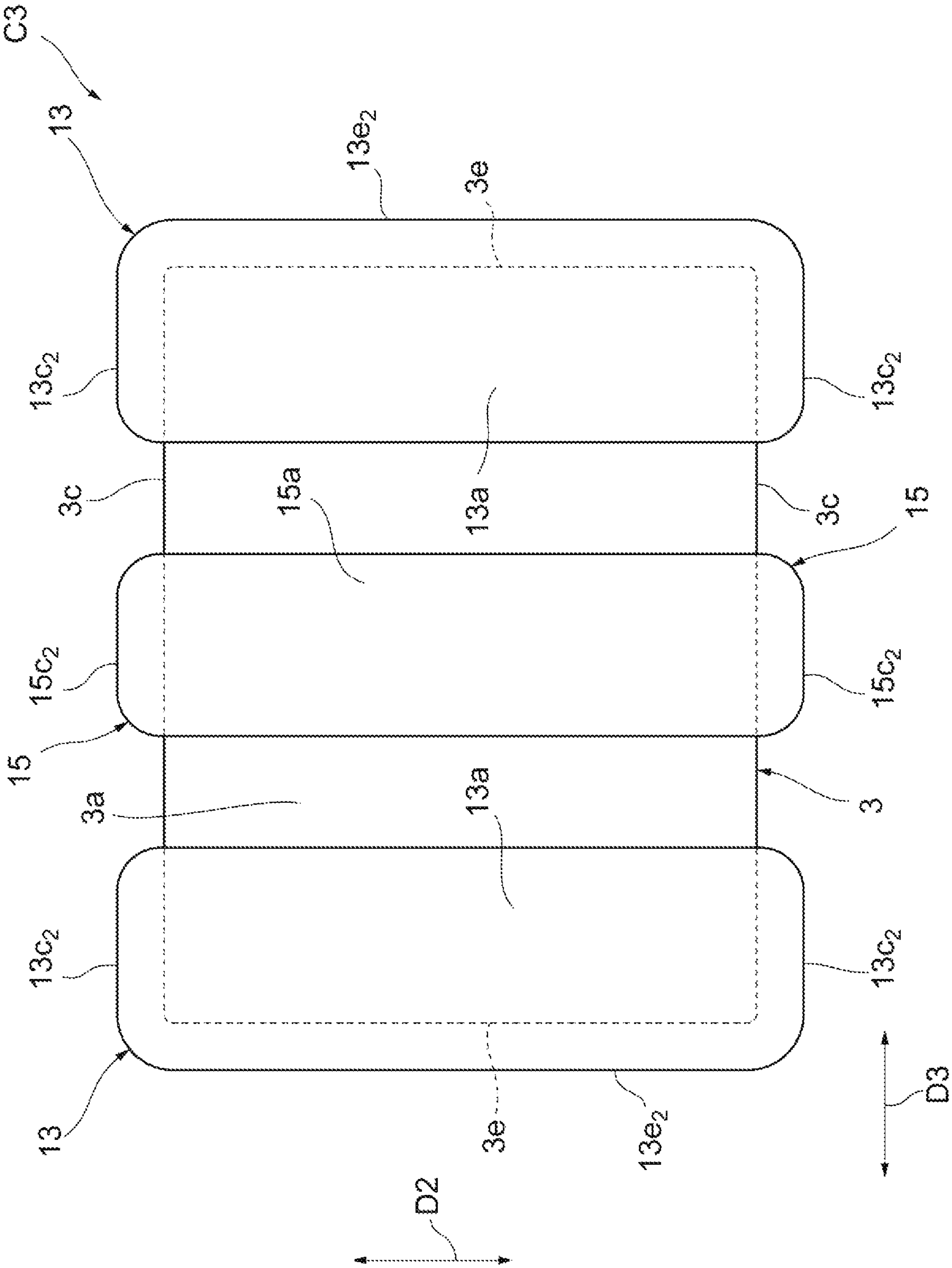
FIG. 41 is a plan view of a multilayer feedthrough capacitor according to a modification of the second embodiment.

As illustrated in FIGS. 37 and 38, in the multilayer capacitor C1, a width of the region $\mathbf{5}c_2$ in a third direction D3 may increase with an increase in distance from the region $\mathbf{5}c_1$. In this case, molten solder tends to wet from the region $\mathbf{5}c_2$ to the region $\mathbf{5}c_1$. Therefore, the occurrence of a crack in the element body 3 is further suppressed and the mounting strength is improved. As illustrated in FIGS. 39 and 40, in the multilayer feedthrough capacitor C3, a width of the region $\mathbf{13}c_2$ in a third direction D3 may increase with an increase in distance from the region $\mathbf{13}c_1$. In this case, molten solder tends to wet from the region $\mathbf{13}c_2$ to the region $\mathbf{13}c_1$. Therefore, the occurrence of the crack in the element body 3 is further suppressed and the mounting strength is improved.

The multilayer feedthrough capacitor C3 may include one external electrode 15. In this case, the electrode portion 15*a* extends in the second direction D2 on the principal surface 3*a*. In this modification, an entirety of the first electrode layer E1 is covered with the second electrode layer E2 in the electrode portion 5*a*.

Seventh Embodiment

Figure 42:
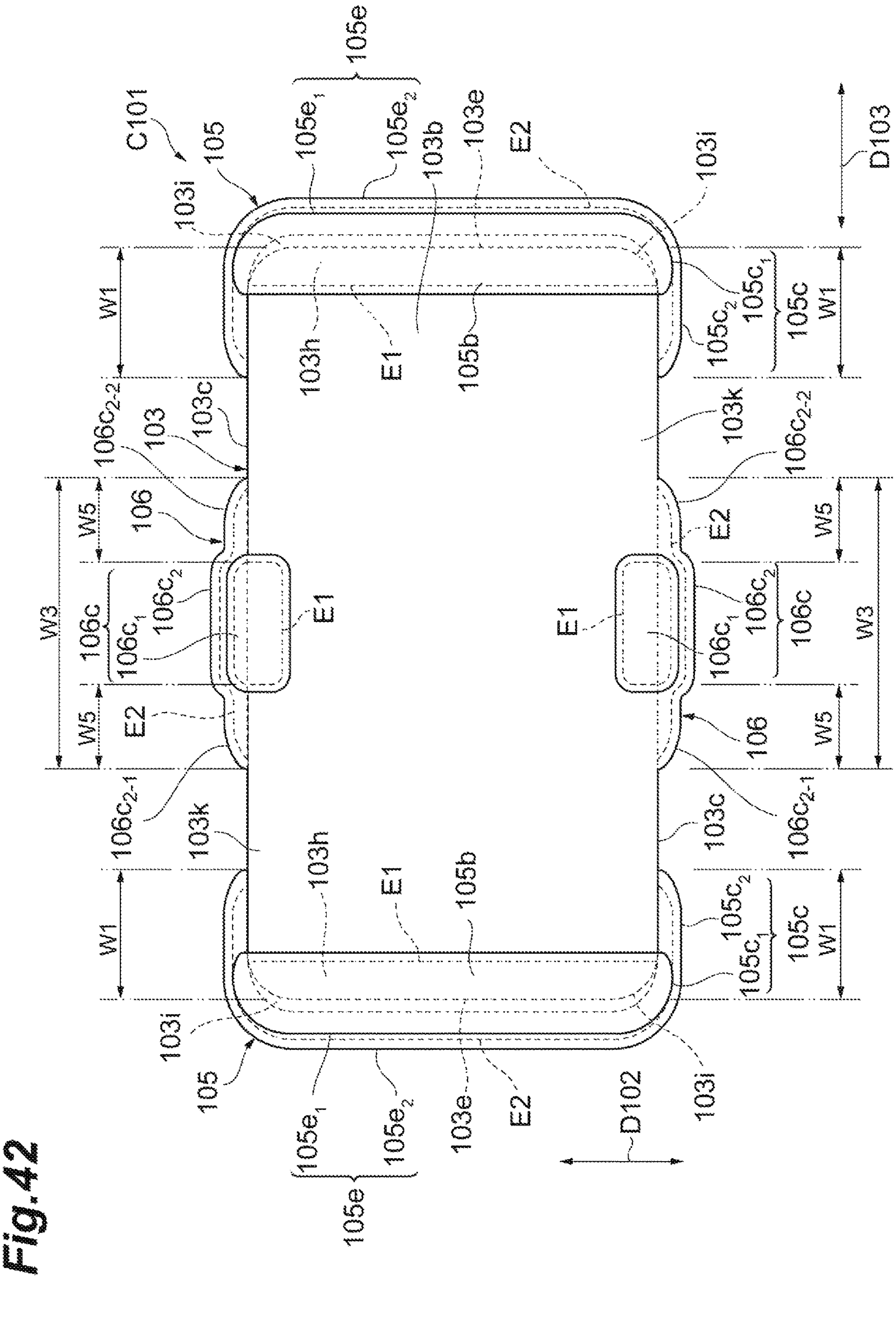
FIG. 42 is a plan view of a multilayer feedthrough capacitor according to a seventh embodiment.
Figure 43:
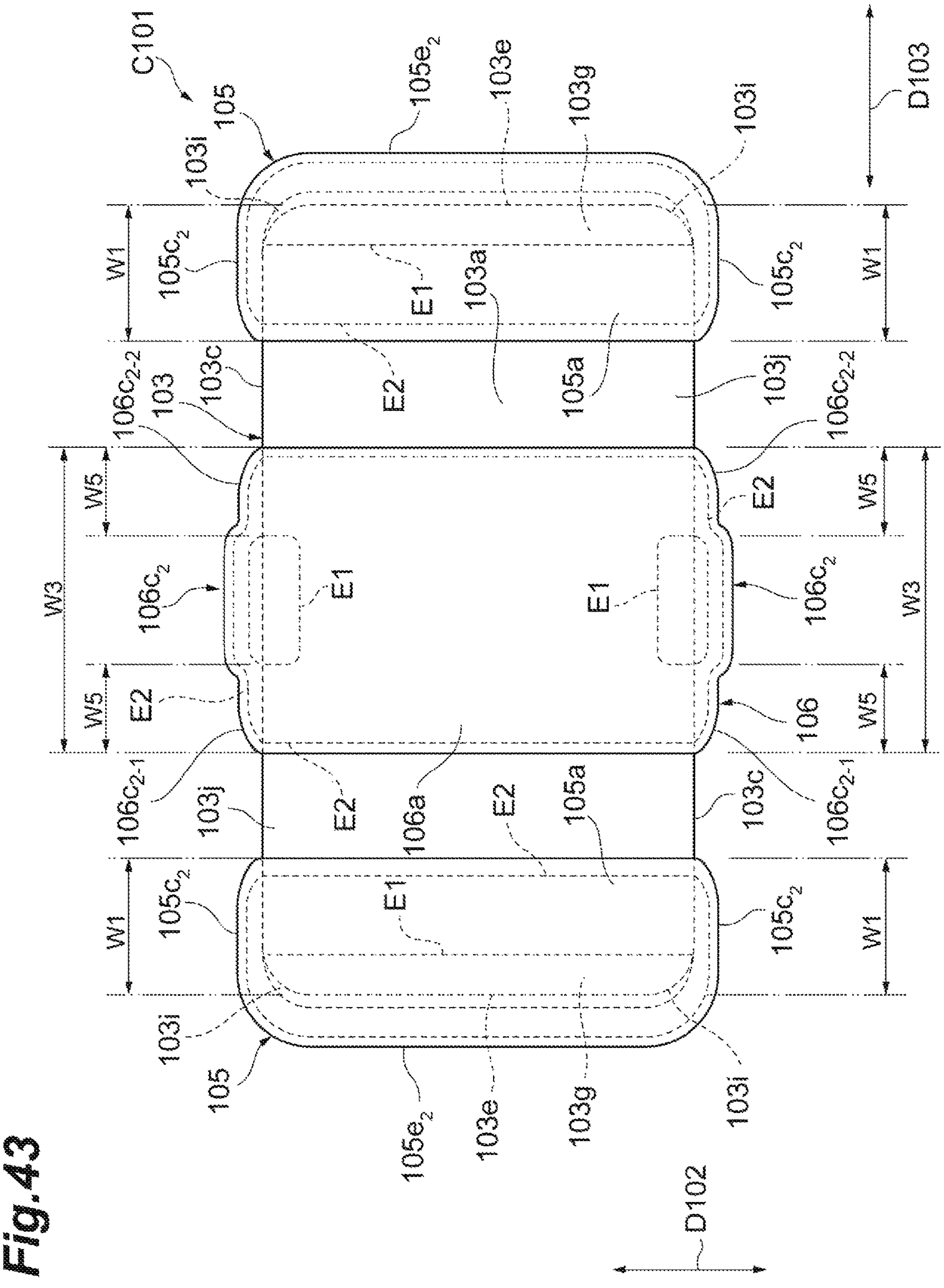
FIG. 43 is a plan view of the multilayer feedthrough capacitor according to the seventh embodiment.
Figure 44:
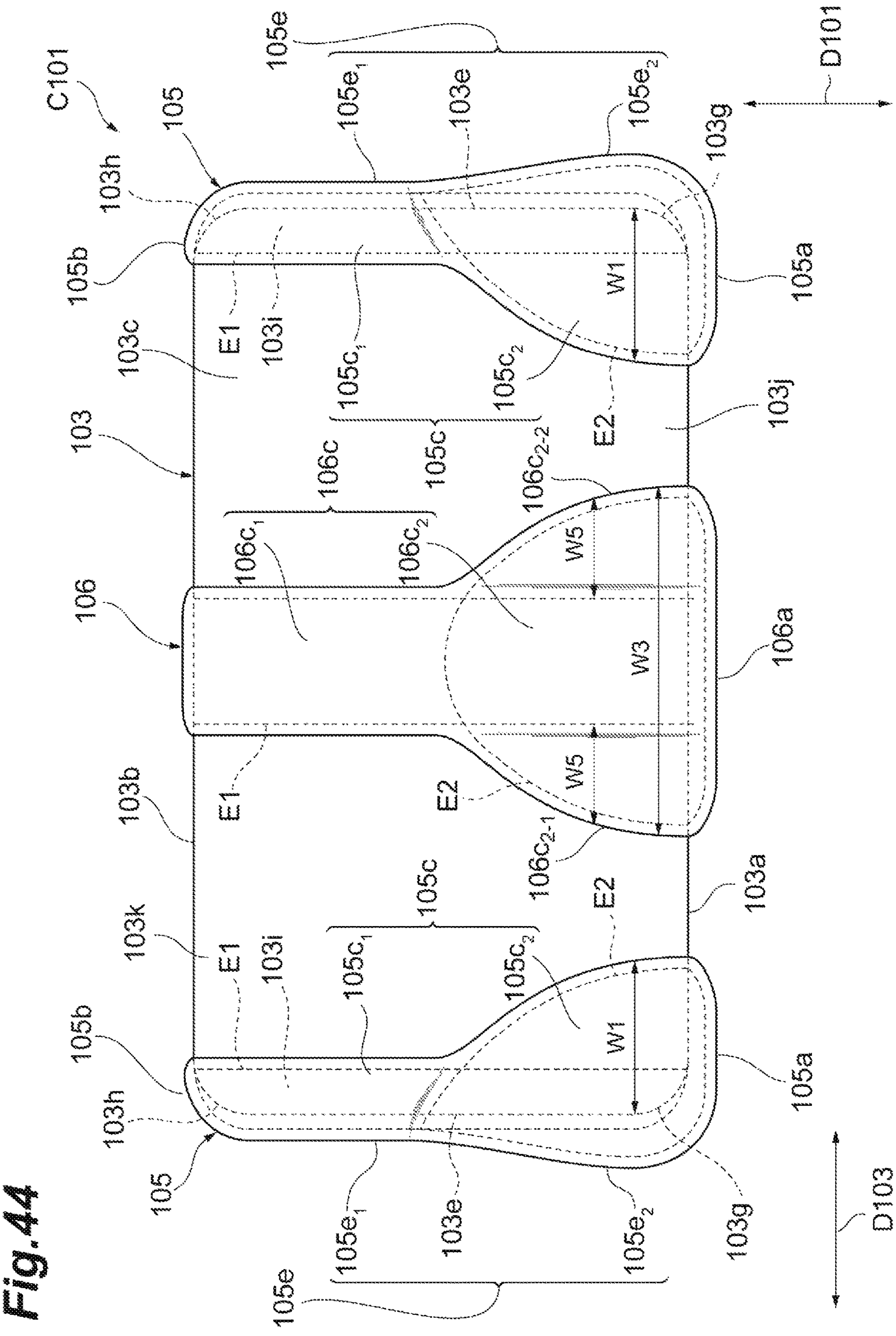
FIG. 44 is a side view of the multilayer feedthrough capacitor according to the seventh embodiment.
Figure 45:
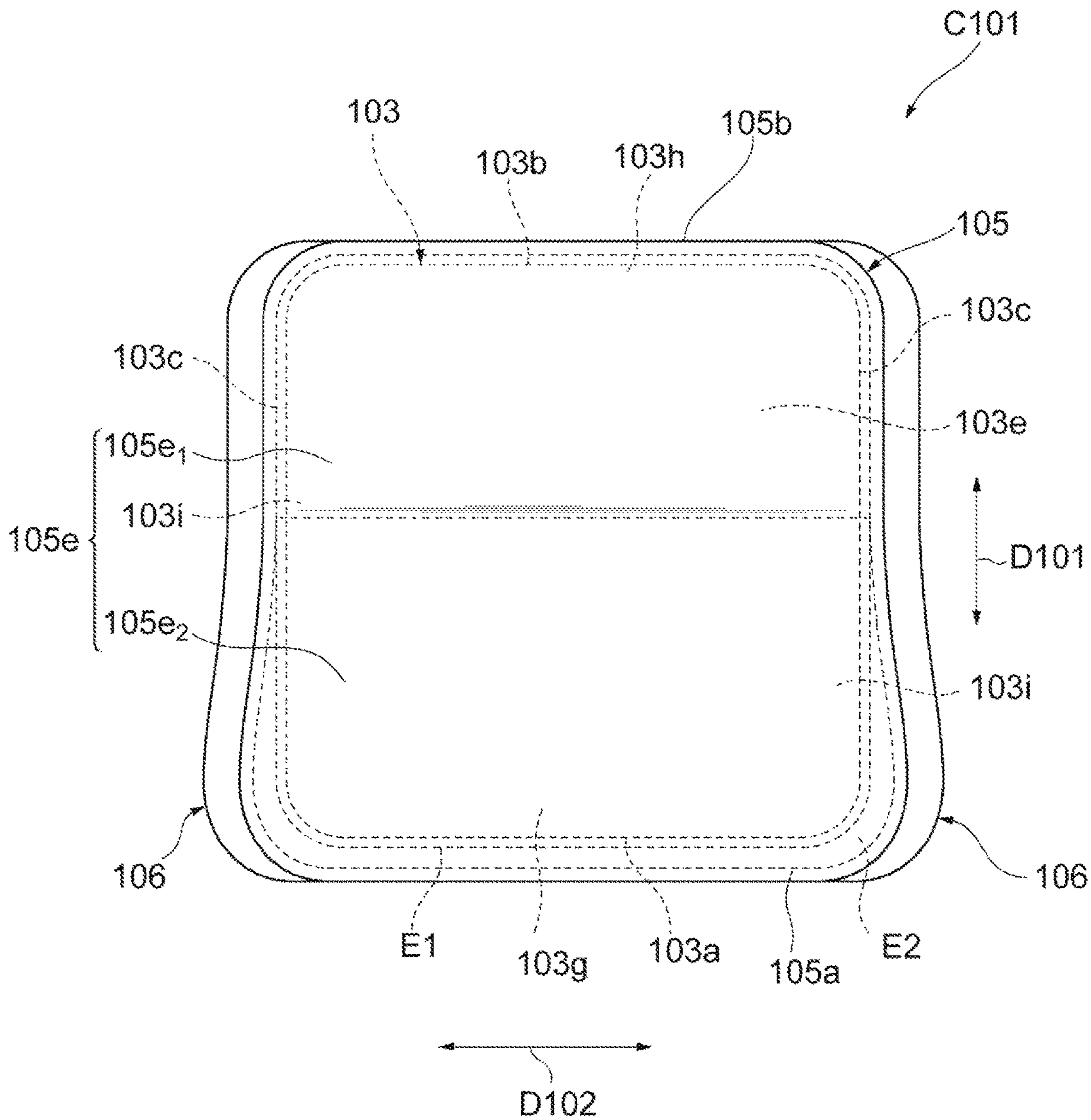
FIG. 45 is a side view of the multilayer feedthrough capacitor according to the seventh embodiment.
Figure 46:
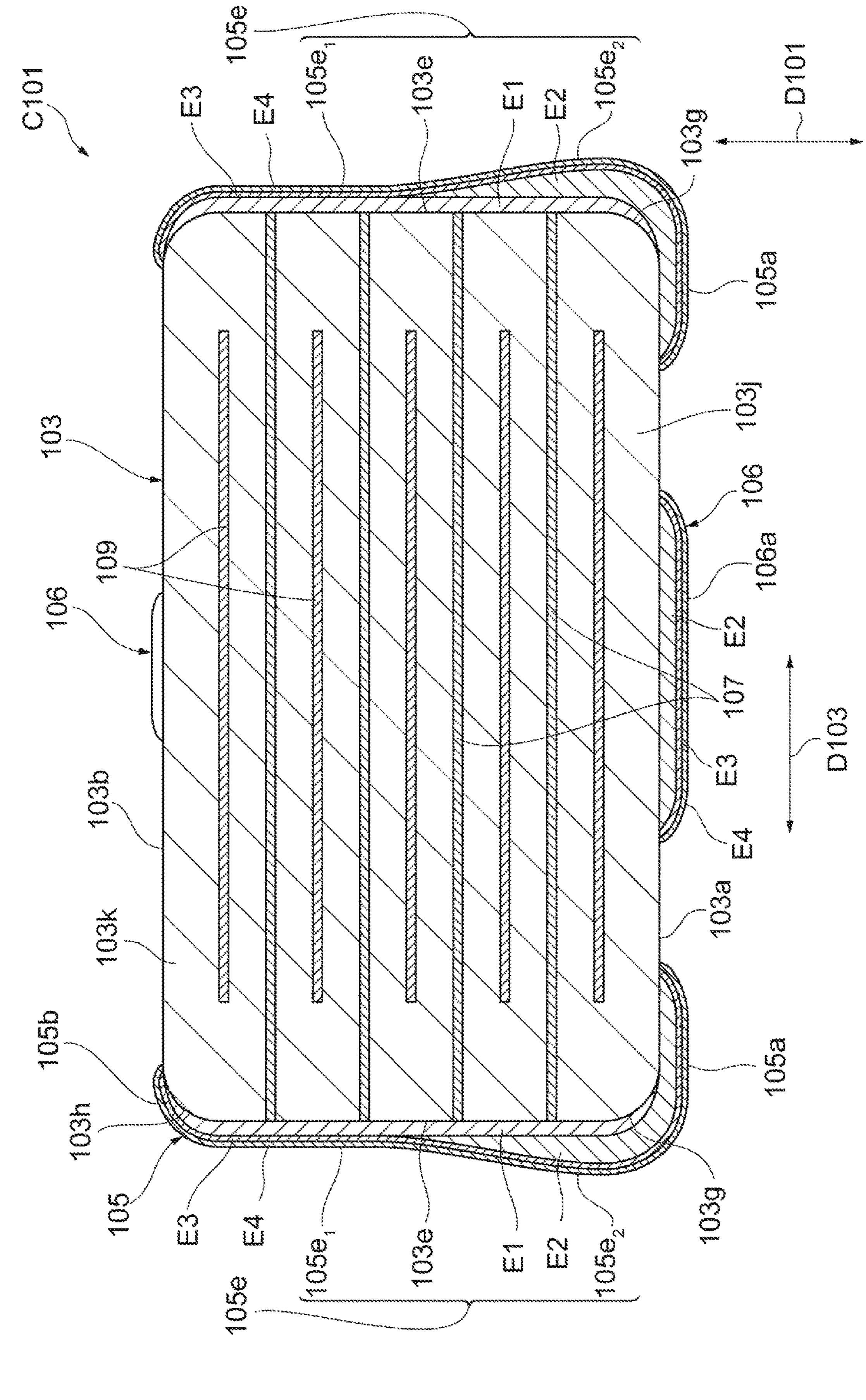
FIG. 46 is a view illustrating a cross-sectional configuration of the multilayer feedthrough capacitor according to the seventh embodiment.
Figure 47:
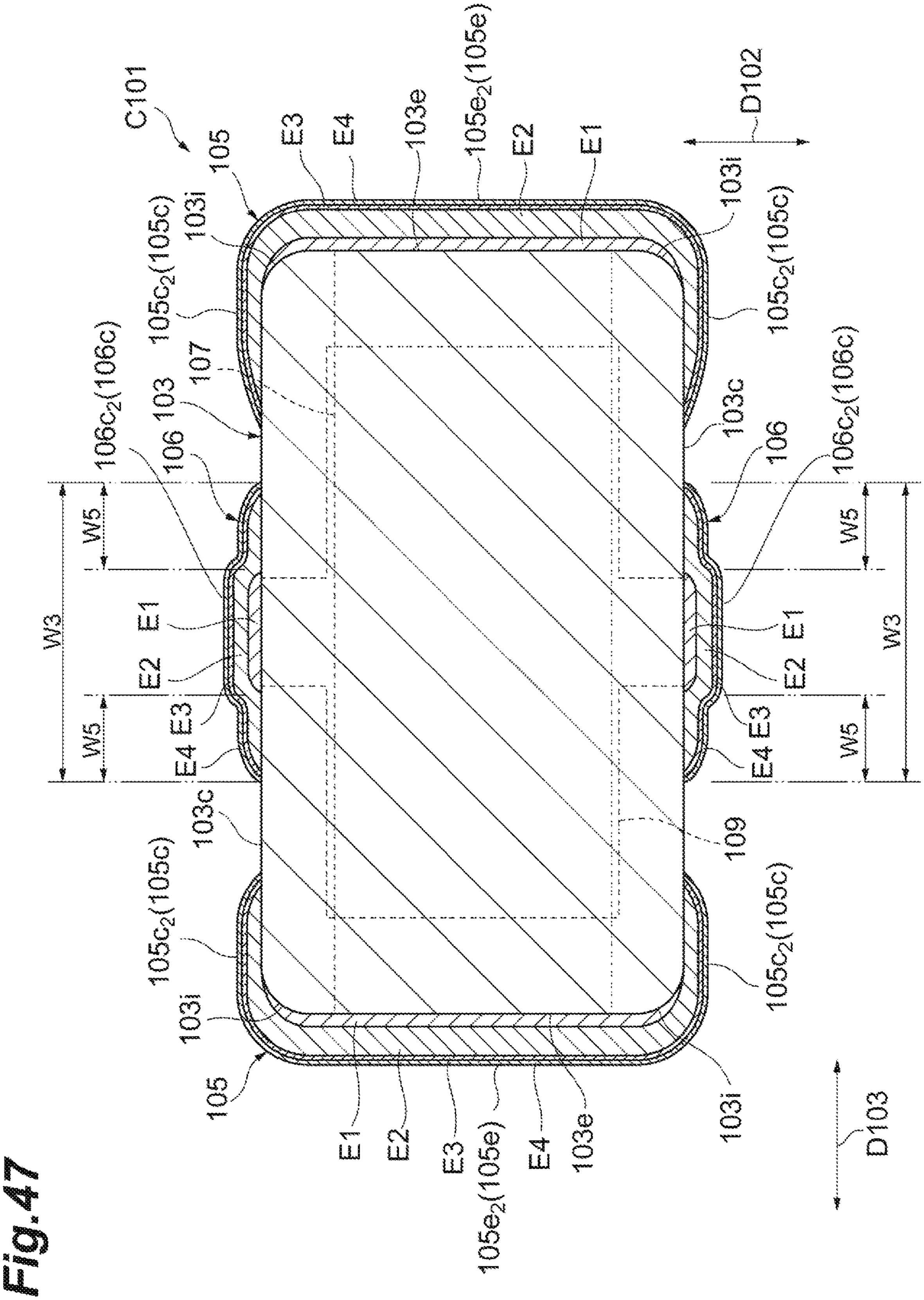
FIG. 47 is a view illustrating a cross-sectional configuration of the multilayer feedthrough capacitor according to the seventh embodiment.
Figure 48:
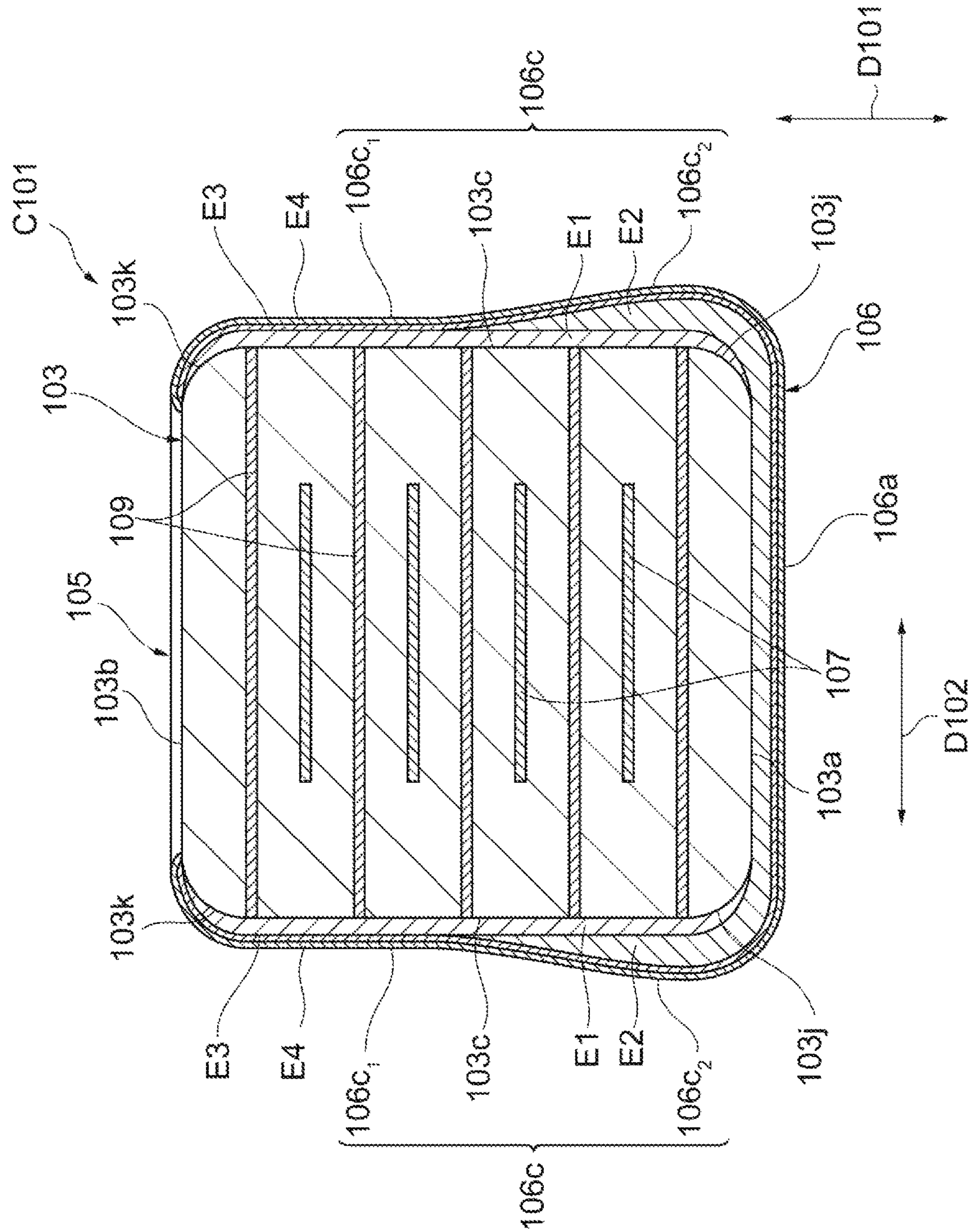
FIG. 48 is a view illustrating a cross-sectional configuration of the multilayer feedthrough capacitor according to the seventh embodiment.

A configuration of a multilayer feedthrough capacitor C101 according to a seventh embodiment will be described with reference to FIGS. 42 to 48. FIGS. 42 and 43 are plan views of a multilayer feedthrough capacitor according to the seventh embodiment. FIG. 44 is a side view of the multilayer feedthrough capacitor according to the seventh embodiment. FIG. 45 is a end view of the multilayer feedthrough capacitor according to the seventh embodiment. FIGS. 46, 47, and 48 are views illustrating a cross-sectional configuration of the multilayer feedthrough capacitor according to the seventh embodiment. In the seventh embodiment, an electronic component is, for example, the multilayer feedthrough capacitor C101.

As illustrated in FIG. 42, the multilayer feedthrough capacitor C101 includes the element body 103, a pair of external electrodes 105, and one external electrode 106. The pair of external electrodes 105 and the one external electrode 106 are disposed on an outer surface of the element body 103. The pair of external electrodes 105 and the external electrode 106 are separated from each other. The pair of external electrodes 105 functions as, for example, signal terminal electrodes. The external electrode 106 functions as, for example, a ground terminal electrode.

The element body 103 has a rectangular parallelepiped shape. The element body 103 includes a pair of principal surfaces 103*a* and 103*b* opposing each other, a pair of side surfaces 103*c* opposing each other, and a pair of end surfaces 103*e* opposing each other. The pair of principal surfaces 103*a* and 103*b* and the pair of side surfaces 103*c* have a rectangular shape. The direction in which the pair of principal surfaces 103*a* and 103*b* opposes each other is a first direction D101. The direction in which the pair of side surfaces 103*c* opposes each other is a second direction D102. The direction in which the pair of end surfaces 103*e* opposes each other is a third direction D103. The rectangular parallelepiped shape includes a rectangular parallelepiped shape in which corners and ridges are chamfered, and a rectangular parallelepiped shape in which the corners and ridges are rounded.

The first direction D101 is a direction orthogonal to the respective principal surfaces 103*a* and 103*b* and is orthogonal to the second direction D102. The third direction D103 is a direction parallel to the respective principal surfaces 103*a* and 103*b* and the respective side surfaces 103*c*, and is orthogonal to the first direction D101 and the second direction D102. The second direction D102 is orthogonal to the respective side surfaces 103*c*. The third direction D103 is orthogonal to the respective end surfaces 103*e*. In the seventh embodiment, a length of the element body 103 in the third direction D103 is larger than a length of the element body 103 in the first direction D101, and larger than a length of the element body 103 in the second direction D102. The third direction D103 is a longitudinal direction of the element body 103.

The pair of side surfaces 103*c* extends in the first direction D101 to couple the pair of principal surfaces 103*a* and 103*b*. The pair of side surfaces 103*c* also extends in the third direction D103. The pair of end surfaces 103*e* extends in the first direction D101 to couple the pair of principal surfaces 103*a* and 103*b*. The pair of end surfaces 103*e* also extends in the second direction D102.

The element body 103 includes a pair of ridge portions 103*g*, a pair of ridge portions 103*h*, four ridge portions 103*i*, a pair of ridge portions 103*j*, and a pair of ridge portions 103*k*. The ridge portion 103*g* is located between the end surface 103*e* and the principal surface 103*a*. The ridge portion 103*h* is located between the end surface 103*e* and the principal surface 103*b*. The ridge portion 103*i* is located between the end surface 103*e* and the side surface 103*c*. The ridge portion 103*j* is located between the principal surface 103*a* and the side surface 103*c*. The ridge portion 103*k* is located between the principal surface 103*b* and the side surface 103*c*. In the present embodiment, each of the ridge portions 103*g*, 103*h*, 103*i*, 103*j*, and 103*k* is rounded to curve. The element body 103 is subject to what is called a round chamfering process.

The end surface 103*e* and the principal surface 103*a* are indirectly adjacent to each other with the ridge portion 103*g* therebetween. The end surface 103*e* and the principal surface 103*b* are indirectly adjacent to each other with the ridge portion 103*h* therebetween. The end surface 103*e* and the side surface 103*c* are indirectly adjacent to each other with the ridge portion 103*i* therebetween. The principal surface 103*a* and the side surface 103*c* are indirectly adjacent to each other with the ridge portion 103*j* therebetween. The principal surface 103*b* and the side surface 103*c* are indirectly adjacent to each other with the ridge portion 103*k* therebetween.

The element body 103 is configured by laminating a plurality of dielectric layers in the first direction D101. The element body 103 includes the plurality of laminated dielectric layers. In the element body 103, a lamination direction of the plurality of dielectric layers coincides with the first direction D101. The first direction D101 is the direction in which the pair of principal surfaces 103*a* and 103*b* opposes each other. Each dielectric layer includes, for example, a sintered body of a ceramic green sheet containing a dielectric material. As the dielectric material, for example, a dielectric ceramic of $BaTiO_3$ base, $Ba(Ti,Zr)O_3$ base, or $(Ba,Ca)TiO_3$ base is used. In an actual element body 103, each of the dielectric layers is integrated to such an extent that a boundary between the dielectric layers cannot be visually recognized. In the element body 103, the lamination direction of the plurality of dielectric layers may coincide with the second direction D102.

The multilayer feedthrough capacitor C101 is solder-mounted on an electronic device (e.g., a circuit board or an electronic component). In the multilayer feedthrough capacitor C101, the principal surface 103*a* is arranged to constitute a mounting surface opposing the electronic device.

As illustrated in FIGS. 46, 47, and 48, the multilayer feedthrough capacitor C101 includes a plurality of internal electrodes 107 and a plurality of internal electrodes 109. Each of the internal electrodes 107 and 109 is an internal conductor disposed in the element body 103. Each of the internal electrodes 107 and 109 is made of a conductive material that is usually used as an internal electrode of a multilayer electronic component. As the conductive material, a base metal (e.g., Ni or Cu) is used. The internal electrodes 107 and 109 include a sintered body of a conductive paste containing the above conductive material. In the seventh embodiment, the internal electrodes 107 and 109 are made of Ni.

The internal electrodes 107 and the internal electrodes 109 are disposed in different positions (layers) in the first direction D101. The internal electrodes 107 and the internal electrodes 109 are alternately disposed in the element body 103 to oppose each other in the first direction D101 with an interval therebetween. Polarities of the internal electrodes 107 and the internal electrodes 109 are different from each other. In a case in which the lamination direction of the plurality of dielectric layers is the second direction D102, the internal electrodes 107 and the internal electrodes 109 are disposed in different positions (layers) in the second direction D102. The internal electrode 107 includes a pair of one ends exposed to a corresponding end surface 103*e*. The internal electrode 109 includes a pair of end exposed to a corresponding side surface 103*c*.

The external electrodes 105 are disposed at both end portions of the element body 103 in the third direction D103. Each of the external electrodes 105 is disposed on a corresponding end surface 103*e* side of the element body 103. The external electrode 105 includes electrode portions 105*a*, 105*b*, 105*c*, and 105*e*. The electrode portion 105*a* is disposed on the principal surface 103*a* and on the ridge portion 103*g*. The electrode portion 105*b* is disposed on the ridge portion 103*h*. The electrode portion 105*c* is disposed on each ridge portion 103*i*. The electrode portion 105*e* is disposed on the corresponding end surface 103*e*. The external electrode 105 also includes electrode portions disposed on the ridge portions 103*j*.

The external electrode 105 is formed on the four surfaces, that is, the principal surface 103*a*, the pair of side surfaces 103*c*, and the one end surface 103*e*, as well as on the ridge portions 103*g*, 103*h*, 103*i*, and 103*j*. The electrode portions 105*a*, 105*b*, 105*c*, and 105*e* adjacent each other are coupled and are electrically connected to each other. In the present embodiment, the external electrode 105 is not intentionally formed on the principal surface 103*b*.

The electrode portion 105*e* disposed on the end surface 103*e* covers all the one ends of the internal electrodes 107 exposed at the end surface 103*e*. The internal electrodes 107 are directly connected to the electrode portions 105*e*. The internal electrode 107 is electrically connected to the pair of external electrodes 105.

As illustrated in FIGS. 46, 47, and 48, the external electrode 105 includes the first electrode layer E1, the second electrode layer E2, the third electrode layer E3, and the fourth electrode layer E4. The fourth electrode layer E4 is the outermost layer of the external electrode 105. Each of the electrode portions 105*a*, 105*c*, and 105*e* includes the first electrode layer E1, the second electrode layer E2, the third electrode layer E3, and the fourth electrode layer E4. The electrode portion 105*b* includes the first electrode layer E1, the third electrode layer E3, and the fourth electrode layer E4.

The first electrode layer E1 included in the electrode portion 105*a* is disposed on the ridge portion 103*g*, and is not disposed on the principal surface 103*a*. The principal surface 103*a* is not covered with the first electrode layer E1, thereby being exposed from the first electrode layer E1. The second electrode layer E2 included in the electrode portion 105*a* is disposed on the first electrode layer E1 and on the principal surface 103*a*. An entirety of the first electrode layer E1 is covered with the second electrode layer E2. The second electrode layer E2 included in the electrode portion 105*a* is in contact with the principal surface 103*a*. The electrode portion 105*a* has a four-layer structure on the ridge portion 103*g*, and has three-layer structure on the principal surface 103*a*.

The first electrode layer E1 included in the electrode portion 105*b* is disposed on the ridge portion 103*h*, and is not disposed on the principal surface 103*b*. The principal surface 103*b* is not covered with the first electrode layer E1, thereby being exposed from the first electrode layer E1. The electrode portion 105*b* does not include the second electrode layer E2. The electrode portion 105*b* has a three-layer structure.

The first electrode layer E1 included in the electrode portion 105*c* is disposed on the ridge portion 103*i*, and is not disposed on the side surface 103*c*. The side surface 103*c* is not covered with the first electrode layer E1, thereby being exposed from the first electrode layer E1. The second electrode layer E2 included in the electrode portion 105*c* is disposed on the first electrode layer E1 and on the side surface 103*c*. A part of the first electrode layer E1 is covered with the second electrode layer E2. The second electrode layer E2 included in the electrode portion 105*c* is in contact with the side surface 103*c*.

The electrode portion 105*c* includes a region $\mathbf{105}c_1$ and a region $\mathbf{105}c_2$. The region $\mathbf{105}c_2$ is located closer to the principal surface 103*a* than the region $\mathbf{105}c_1$. In the present embodiment, the electrode portion 105*c* includes only two regions $\mathbf{105}c_1$ and $\mathbf{105}c_2$. The region $\mathbf{105}c_1$ includes the first electrode layer E1, the third electrode layer E3, and the fourth electrode layer E4. The region $\mathbf{105}c_1$ does not include the second electrode layer E2. The region $\mathbf{105}c_1$ has a three-layer structure. The region $\mathbf{105}c_2$ includes the first electrode layer E1, the second electrode layer E2, the third electrode layer E3, and the fourth electrode layer E4. The region $\mathbf{105}c_2$ has s four-layer structure on the ridge portion 103*i*, and has a three-layer structure on the side surface 103*c*. The region $\mathbf{105}c_1$ is the region where the first electrode layer E1 is exposed from the second electrode layer E2. The region $105c_2$ is the region where the first electrode layer E1 is covered with the second electrode layer E2.

The first electrode layer E1 included in the electrode portion 105*e* is disposed on the end surface 103*e*. The entire end surface 103*e* is covered with the first electrode layer E1. The second electrode layer E2 included in the electrode portion 105*e* is disposed on the first electrode layer E1. A part of the first electrode layer E1 is covered with the second electrode layer E2.

The electrode portion 105*e* includes a region $105e_1$ and a region $105e_2$. The region $105e_2$ is located closer to the principal surface 103*a* than the region $105e_1$. In the present embodiment, the electrode portion 105*e* includes only two regions $105e_1$ and $105e_2$. The region $105e_1$ includes the first electrode layer E1, the third electrode layer E3, and the fourth electrode layer E4. The region $105e_1$ does not include the second electrode layer E2. The region $105e_1$ has a three-layer structure. The region $105e_2$ includes the first electrode layer E1, the second electrode layer E2, the third electrode layer E3, and the fourth electrode layer E4. The region $105e_2$ has a four-layer structure. The region $105e_1$ is the region where the first electrode layer E1 is exposed from the second electrode layer E2. The region $105e_2$ is the region where the first electrode layer E1 is covered with the second electrode layer E2.

The external electrode 106 is disposed on a central portion of the element body 103 in the third direction D103. The external electrode 106 is located between the pair of external electrodes 105 in the third direction D103. The external electrode 106 includes an electrode portion 106*a* and a pair of electrode portions 106*c*. The electrode portion 106*a* is disposed on the principal surface 103*a*. Each of the electrode portions 106*c* is disposed on the side surface 103*c* and on the ridge portions 103*j* and 103*k*. The external electrode 106 is formed on the three surfaces, that is, the principal surface 103*a* and the pair of side surfaces 103*c*, as well as on the ridge portions 103*j* and 103*k*. The electrode portions 106*a* and 106*c* adjacent each other are coupled and are electrically connected to each other. In the present embodiment, the external electrode 106 is not intentionally formed on the principal surface 103*b*.

The electrode portion 106*a* extends in the second direction D102 on the principal surface 103*a*. Each of the electrode portions 106*c* covers all the one ends exposed at the side surface 103*c*, of the internal electrodes 109. The internal electrodes 109 are directly connected to each electrode portion 106*c*. The internal electrodes 109 are electrically connected to the external electrode 106.

As illustrated in FIGS. 46, 47, and 48, the external electrode 106 also includes the first electrode layer E1, the second electrode layer E2, the third electrode layer E3, and the fourth electrode layer E4. The fourth electrode layer E4 is the outermost layer of the external electrode 106. The electrode portion 106*a* includes the second electrode layer E2, the third electrode layer E3, and the fourth electrode layer E4. Each of the electrode portions 106*c* includes the first electrode layer E1, the second electrode layer E2, the third electrode layer E3, and the fourth electrode layer E4.

The second electrode layer E2 included in the electrode portion 106*a* is disposed on the principal surface 103*a*. The electrode portion 106*a* does not include the first electrode layer E1. The second electrode layer E2 included in the electrode portion 106*a* is in contact with the principal surface 103*a*. The electrode portion 106*a* has a three-layer structure.

The first electrode layer E1 included in the electrode portion 106*c* is disposed on the side surface 103*c* and on the ridge portions 103*j* and 103*k*. The second electrode layer E2 included in the electrode portion 106*c* is disposed on the first electrode layer E1, on the side surface 103*c*, and on the ridge portion 103*j*. A part of the first electrode layer E1 is covered with the second electrode layer E2. The second electrode layer E2 included in the electrode portion 106*c* is in contact with the side surface 103*c* and the ridge portion 103*j*.

The electrode portion 106*c* includes a region $106c_1$ and a region $106c_2$. The region $106c_2$ is located closer to the principal surface 103*a* than the region $106c_1$. In the present embodiment, the electrode portion 106*c* includes only two regions $106c_1$ and $106c_2$. The region $106c_1$ includes the first electrode layer E1, the third electrode layer E3, and the fourth electrode layer E4. The region $106c_1$ does not include the second electrode layer E2. The region $106c_1$ has a three-layer structure. The region $106c_2$ includes the first electrode layer E1, the second electrode layer E2, the third electrode layer E3, and the fourth electrode layer E4. The region $106c_1$ is the region where the first electrode layer E1 is exposed from the second electrode layer E2. The region $106c_2$ is the region where the first electrode layer E1 is covered with the second electrode layer E2.

The region $106c_2$ includes a first portion $106c_{2-1}$ and a pair of second portions $106c_{2-2}$. In the first portion $106c_{2-1}$, the second electrode layer E2 is formed on the first electrode layer E1. In each of the second portions $106c_{2-2}$, the second electrode layer E2 is formed on the side surface 103*c*. The first portion $106c_{2-1}$ has a four-layer structure. Each of the second portions $106c_{2-2}$ includes the second electrode layer E2, the third electrode layer E3, and the fourth electrode layer E4. Each of the second portion $106c_{2-2}$ has a three-layer structure. The first portion $106c_{2-1}$ and the pair of second portions $106c_{2-2}$ are integrally formed. The first portion $106c_{2-1}$ is located between the pair of second portions $106c_{2-2}$ in the third direction D103. The second portions $106c_{2-2}$ are located at both sides of the first portion $106c_{2-1}$ when viewed from the second direction D102.

The first electrode layer E1 is formed by sintering a conductive paste. The first electrode layer E1 is a layer that is formed by sintering a metal component (metal powder) contained in the conductive paste. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent.

The second electrode layer E2 is formed by curing a conductive resin paste. The second electrode layer E2 is a conductive resin layer. The conductive resin paste contains, for example, a resin (e.g., a thermosetting resin), a conductive material (e.g., metal powder), and an organic solvent. As the metal powder, for example, Ag powder or Cu powder is used. As the thermosetting resin, for example, a phenolic resin, an acrylic resin, a silicone resin, an epoxy resin, or a polyimide resin is used.

The third electrode layer E3 is formed by plating method. In the present embodiment, the third electrode layer E3 is a Ni plating layer formed by Ni plating. The third electrode layer E3 may be an Sn plating layer, a Cu plating layer, or an Au plating layer. The third electrode layer E3 contains Ni, Sn, Cu, or Au.

The fourth electrode layer E4 is formed by plating method. In the present embodiment, the fourth electrode layer E4 is an Sn plating layer formed by Sn plating. The fourth electrode layer E4 may be a Cu plating layer or an Au plating layer. The fourth electrode layer E4 contains Sn, Cu, or Au.

Next, a configuration of the external electrode 105 will be described.

The first electrode layer E1 is formed to cover the end surface 103*e* and the ridge portions 103*g*, 103*h*, and 103*i*. The first electrode layer E1 is not intentionally formed on the pair of principal surfaces 103*a* and 103*b* and the pair of side surfaces 103*c*. The first electrode layer E1 may be unintentionally formed on the principal surfaces 103*a* and 103*b* and the side surface 103*c* due to a production error, for example.

The second electrode layer E2 is formed on the first electrode layer E1, on the principal surface 103*a*, and on the pair of side surfaces 103*c*. The second electrode layer E2 is formed over the first electrode layer E1 and the element body 103. In the present embodiment, the second electrode layer E2 is formed to cover a partial region of the first electrode layer E1. The partial region of the first electrode layer E1 is a region, in the first electrode layer E1, corresponding to the electrode portion 105*a*, the region 105$c_2$, and the region 105$e_2$. The second electrode layer E2 is formed to cover the ridge portion 103*j*. The first electrode layer E1 serves as an underlying metal layer for forming the second electrode layer E2. The second electrode layer E2 is the conductive resin layer formed on the first electrode layer E1.

The third electrode layer E3 is formed on the second electrode layer E2 and on the first electrode layer E1 (portion of the first electrode layer E1 exposed from the second electrode layer E2). The fourth electrode layer E4 is formed on the third electrode layer E3. The third electrode layer E3 and fourth electrode layer E4 constitute a plating layer formed on the second electrode layer E2. In the present embodiment, the plating layer formed on the second electrode layer E2 has a two-layer structure.

The first electrode layer E1 included in each of the electrode portions 105*a*, 105*b*, 105*c*, and 105*e* is integrally formed. The second electrode layer E2 included in each of the electrode portions 105*a*, 105*c*, and 105*e* is integrally formed. The third electrode layer E3 included in each of the electrode portions 105*a*, 105*b*, 105*c*, and 105*e* is integrally formed. The fourth electrode layer E4 included in each of the electrode portions 105*a*, 105*b*, 105*c*, and 105*e* is also integrally formed.

When viewed from the first direction D101, an entirety of the first electrode layer E1 (first electrode layer E1 included in the electrode portion 105*a*) is covered with the second electrode layer E2. When viewed from the first direction D101, the first electrode layer E1 (first electrode layer E1 included in the electrode portion 105*a*) is not exposed from the second electrode layer E2.

When viewed in the second direction D102, an end region near the principal surface 103*a* of the first electrode layer E1 (first electrode layer E1 included in the region 105$c_2$) is covered with the second electrode layer E2. When viewed from the second direction D102, an end edge of the second electrode layer E2 crosses an end edge of the first electrode layer E1. When viewed from the second direction D102, an end region near the principal surface 103*b* of the first electrode layer E1 (first electrode layer E1 included in the region 105$c_1$) is exposed from the second electrode layer E2. The region 105$c_2$ includes the second electrode layer E2 formed over the first electrode layer E1 and the side surface 103*c*.

When viewed from the third direction D103, an end region near the principal surface 103*a* of the first electrode layer E1 (first electrode layer E1 included in the region 105$e_2$) is covered with the second electrode layer E2. When viewed from the third direction D103, an end edge of the second electrode layer E2 is located on the first electrode layer E1. When viewed from the third direction D103, an end region near the principal surface 103*b* of the first electrode layer E1 (first electrode layer E1 included in the region 105$e_1$) is exposed from the second electrode layer E2.

As illustrated in FIG. 44, a width W1 of the region 105$c_2$ in the third direction D103 continuously decreases with an increase in distance from the principal surface 103*a* (electrode portion 105*a*). A width of the region 105$c_2$ in a first direction D101 continuously decreases with an increase in distance from the end surface 103*e* (electrode portion 5*e*). In the present embodiment, an end edge of the region 105$c_2$ has an approximately arc shape when viewed from the second direction D102. The region 105$c_2$ has an approximately fan shape when viewed from the second direction D102.

Next, a configuration of the external electrode 106 will be described.

The first electrode layer E1 is formed to cover the side surface 103*c* and the ridge portions 103*j* and 103*k*. The first electrode layer E1 is not intentionally formed on the pair of principal surfaces 103*a* and 103*b*. The first electrode layer E1 may be unintentionally formed on the principal surfaces 103*a* and 103*b* due to a production error, for example.

The second electrode layer E2 is formed over the first electrode layer E1 and the element body 103. In the present embodiment, the second electrode layer E2 is formed to cover a partial region of the first electrode layer E1. The partial region of the first electrode layer E1 is a region corresponding to the region 106$c_2$ in the first electrode layer E1. The second electrode layer E2 is also formed to cover a partial region of the principal surface 103*a*, a partial region of the side surface 103*c*, and a partial region of the ridge portion 103*j*.

The third electrode layer E3 is formed on the second electrode layer E2 and on the first electrode layer E1 (portion of the first electrode layer E1 exposed from the second electrode layer E2) by plating method. The fourth electrode layer E4 is formed on the third electrode layer E3 by plating method.

The second electrode layer E2 included in each of the electrode portions 106*a* and 106*c* is integrally formed. The third electrode layer E3 included in each of the electrode portions 106*a* and 106*c* is integrally formed. The fourth electrode layer E4 included in each of the electrode portions 106*a* and 106*c* is integrally formed.

When viewed from the first direction D101, an entirety of the first electrode layer E1 (first electrode layer E1 included in the electrode portion 106*c*) is covered with the second electrode layer E2. When viewed from the first direction D101, the first electrode layer E1 (first electrode layer E1 included in the electrode portion 106*c*) is not exposed from the second electrode layer E2.

When viewed in the second direction D102, an end region near the principal surface 103*a* of the first electrode layer E1 (first electrode layer E1 included in the region 106$c_2$) is covered with the second electrode layer E2. When viewed from the second direction D102, an end edge of the second electrode layer E2 crosses an end edge of the first electrode layer E1. When viewed from the second direction D102, an end region near the principal surface 103*b* of the first electrode layer E1 (first electrode layer E1 included in the region 106$c_1$) is exposed from the second electrode layer E2.

The region $106c_2$ includes the second electrode layer E2 formed over the first electrode layer E1 and the side surface 103c.

As illustrated in FIG. 44, a width W3 of the region $106c_2$ in the third direction D103 continuously decreases with an increase in distance from the principal surface 103a (electrode portion 106a). In the present embodiment, an end edge of the region $106c_2$ has an approximately arc shape when viewed from the second direction D102. The region $106c_2$ has an approximately semicircular shape when viewed from the second direction D102.

As illustrated in FIG. 44, widths W5 of the regions $106c_{2-2}$ in the third direction D103 also continuously decrease with an increase in distance from the principal surface 103a (electrode portion 106a). An end edge of each region $106c_{2-2}$ is curved when viewed from the second direction D102. In the present embodiment, the end edge of each region $106c_{2-2}$ has an approximately arc shape when viewed from the second direction D102. Each region $106c_{2-2}$ has an approximately fan shape when viewed from the second direction D102. The width W5 of one region $106c_{2-2}$ and the width W5 of another region $106c_{2-2}$ may be equal to each other or different from each other.

As described above, in the seventh embodiment, the region $106c_2$ located closer to the principal surface 103a than the region $106c_1$ includes the second electrode layer E2. The second electrode layer E2 included in the region $106c_2$ is formed over the first electrode layer E1 and the side surface 103c. Therefore, the second electrode layer E2 covers the end edge of the first electrode layer E1 included in the region $106c_2$. Stress tends not to concentrate on the end edge of the first electrode layer E1 included in the region $106c_2$, even in a case in which external force is applied onto the multilayer feedthrough capacitor C101 through a solder fillet. The end edge of the first electrode layer E1 tends not to serve as an origination of a crack. Consequently, in the multilayer feedthrough capacitor C101, occurrence of a crack in the element body 103 is reliably suppressed.

In the multilayer feedthrough capacitor C101, the region $105c_2$ located closer to the principal surface 103a than the region $105c_1$ includes the second electrode layer E2. The second electrode layer E2 included in the region $105c_2$ is formed over the first electrode layer E1 and the side surface 103c. Therefore, the second electrode layer E2 covers the end edge of the first electrode layer E1 included in the region $105c_2$. Stress tends not to concentrate on the end edge of the first electrode layer E1 included in the region $105c_2$. The end edge of the first electrode layer E1 tends not to serve as an origination of a crack. Consequently, in the multilayer feedthrough capacitor C101, occurrence of a crack in the element body 103 is further reliably suppressed.

In the multilayer feedthrough capacitor C101, the second electrode layers E2 cover the entire first electrode layers E1 (first electrode layers E1 included in the electrode portions 105a and 106a) when viewed from the first direction D101. Therefore, the stress tends not to concentrate on the end edges of the first electrode layers E1 included in the electrode portions 105a and 106a. Consequently, in the multilayer feedthrough capacitor C101, occurrence of a crack in the element body 103 is further reliably suppressed.

In the multilayer feedthrough capacitor C101, the region $106c_1$ includes the first portion $106c_{2-1}$ and the second portions $106c_{2-2}$. The widths W5 of the regions $106c_{2-2}$ in a third direction D103 continuously decrease with the increase in distance from the principal surface 103a (electrode portion 106a).

Internal stress is generated in the third electrode layer E3 and the fourth electrode layer E4 at a forming process of the respective electrode layers E3 and E4. In a case in which shapes of the third electrode layer E3 and the fourth electrode layer E4 in plan view have a corner, the internal stress tends to concentrate on the corner, and then the electrode layers E3 and E4 or the second electrode layer E2 located under the electrode layers E3 and E4 may peel off at the corner.

Bonding strength between the second electrode layer E2 and the element body 103 (side surface 103c) is smaller than bonding strength between the second electrode layer E2 and the first electrode layer E1. Therefore, in the second portion $106c_{2-2}$ in which the second electrode layer E2 is formed on the side surface 103c, the second electrode layer E2 tends to peel off from the side surface 103c, as compared with in the first portion $106c_{2-1}$.

In a case in which the width W5 of the second portion $106c_{2-2}$ continuously decreases with the increase in distance from the principal surface 103a, a shape of the second portion $106c_{2-2}$ in plan view has no corner. Therefore, a portion on which the internal stress concentrates tends not to be generated in the third electrode layer E3 and the fourth electrode layer E4. Consequently, occurrence of peel-off of the third electrode layer E3 and fourth electrode layer E4 and the second electrode layer E2 in the second portion $106c_{2-2}$ is suppressed.

In the multilayer feedthrough capacitor C101, the width W1 of the region $105c_2$ continuously decreases with the increase in distance from the principal surface 103a. Therefore, a shape of the region $105c_2$ in plan view also has no corner. Consequently, occurrence of peel-off of the third electrode layer E3 and fourth electrode layer E4 and the second electrode layer E2 in the region $105c_2$ is suppressed.

In the multilayer feedthrough capacitor C101, the end edge of the second portion $106c_{2-2}$ is curved when viewed from in the second direction D102. Also in this case, the shape of the second portion $106c_{2-2}$ in plan view has no corner. Therefore, a portion on which the internal stress concentrates tends not to be generated in the third electrode layer E3 and the fourth electrode layer E4 included in the second portion $106c_{2-2}$. Consequently, occurrence of peel-off of the third electrode layer E3 and fourth electrode layer E4 and the second electrode layer E2 in the second portion $106c_{2-2}$ is suppressed.

In the multilayer feedthrough capacitor C101, the end edge of the region $106c_2$ has an approximately arc shape when viewed from in the second direction D102. Also in this case, the shape of the second portion $106c_{2-2}$ in plan view has no corner. Therefore, a portion on which the internal stress concentrates tends not to be generated in the third electrode layer E3 and the fourth electrode layer E4 included in the second portion $106c_{2-2}$. Consequently, occurrence of peel-off of the third electrode layer E3 and fourth electrode layer E4 and the second electrode layer E2 in the second portion $106c_{2-2}$ is suppressed.

Figure 49:
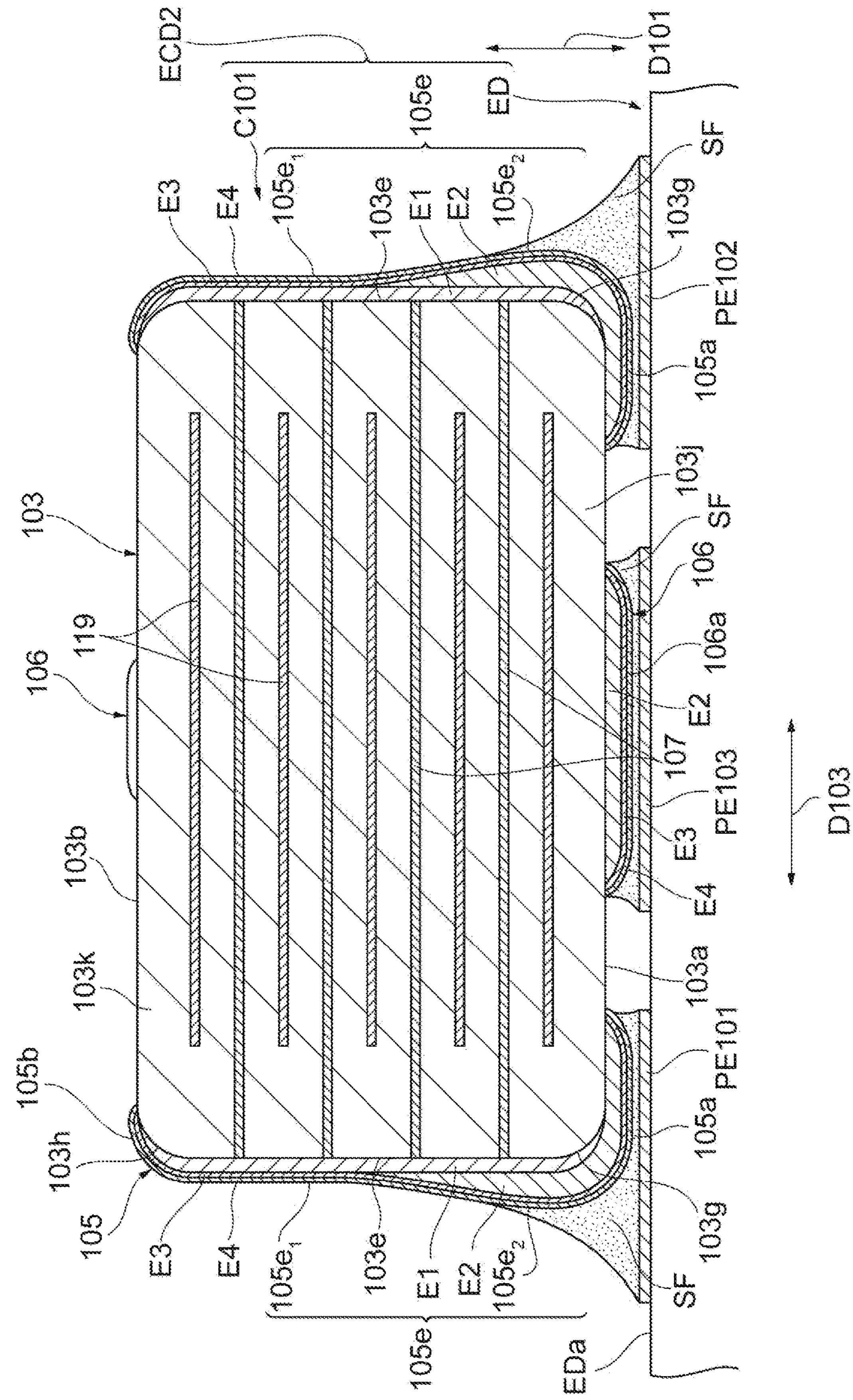
FIG. 49 is a view illustrating a mounted structure of the multilayer feedthrough capacitor according to the seventh embodiment.
Figure 50:
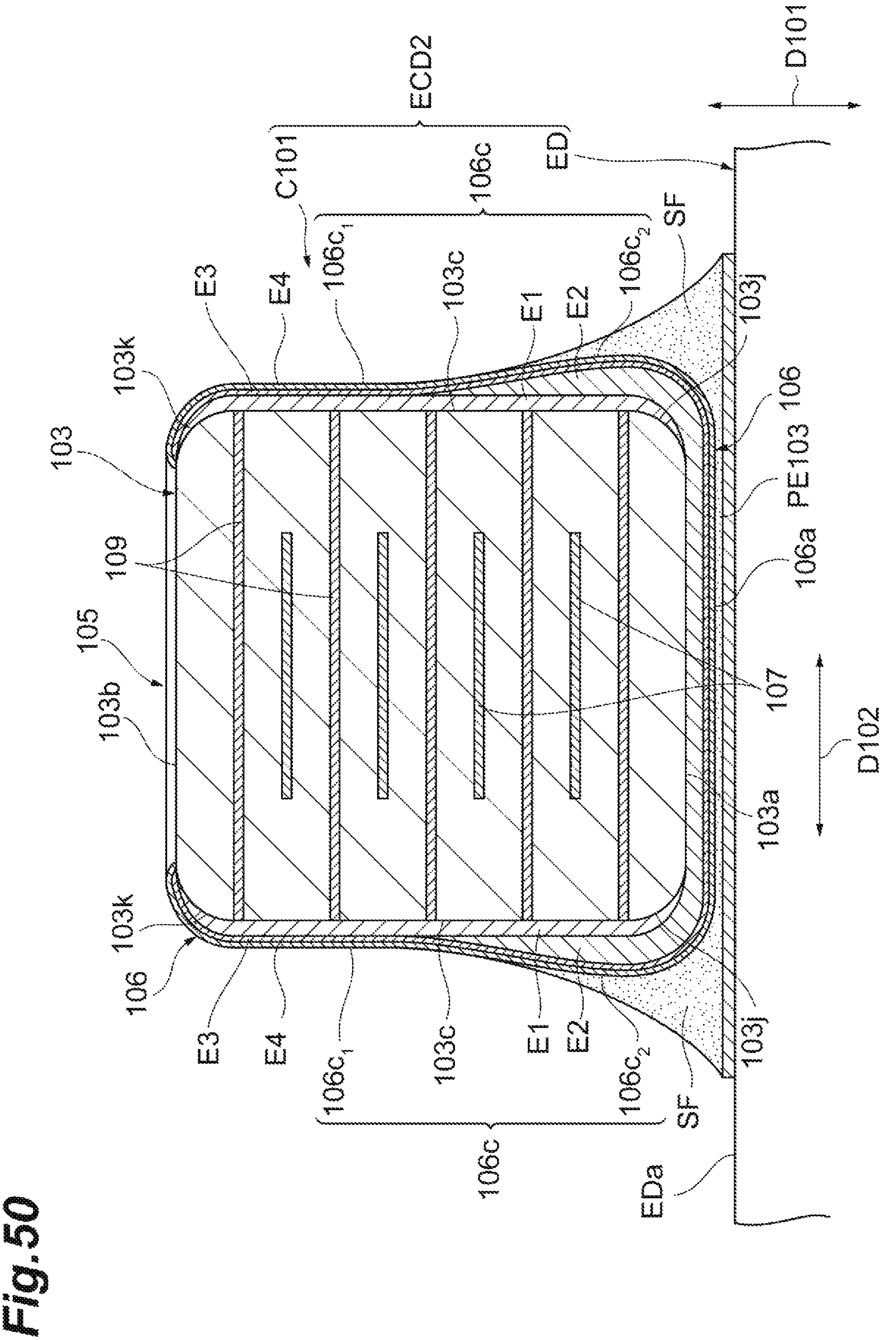
FIG. 50 is a view illustrating the mounted structure of the multilayer feedthrough capacitor according to the seventh embodiment.

Next, a mounted structure of the multilayer feedthrough capacitor C101 will be described with reference to FIGS. 49 and 50. FIGS. 49 and 50 are views illustrating a mounted structure of the multilayer feedthrough capacitor according to the seventh embodiment.

As illustrated in FIGS. 49 and 50, an electronic component device ECD2 includes the multilayer feedthrough capacitor C101 and an electronic device ED. The electronic device ED includes, for example, a circuit board or an electronic component.

The multilayer feedthrough capacitor C101 is solder-mounted on the electronic device ED. The electronic device ED includes a principal surface EDa and a plurality of pad electrodes PE101, PE102, and PE103. Each of the pad electrodes PE101, PE102, and PE103 is disposed on the principal surface EDa. The plurality of pad electrodes PE101, PE102, and PE103 are separated from each other. The multilayer feedthrough capacitor C101 is disposed on the electronic device ED in such a manner that the principal surface 103*a* that is the mounting surface and the principal surface EDa oppose each other.

In a case in which the multilayer feedthrough capacitor C101 is solder-mounted, molten solder wets to the external electrodes 105 and 106 (fourth electrode layers E4). Solder fillets SF are formed on the external electrodes 105 and 106 by solidification of the wet solder. The external electrodes 105 and 106 and the pad electrodes PE101, PE102, and PE103 that correspond to each other are coupled via the solder fillets SF.

The solder fillets SF are formed on the regions $\mathbf{105}e_1$ and $\mathbf{106}c_1$ and regions $\mathbf{105}e_2$ and $\mathbf{106}c_2$ of the electrode portions 105*e* and 106*c*. In addition to the regions $\mathbf{105}e_2$ and $\mathbf{106}c_2$, the regions $\mathbf{105}e_1$ and $\mathbf{106}c_1$ that do not include the second electrode layer E2 are also coupled to the pad electrodes PE101, PE102, and PE103 via the solder fillets SF. Although illustration is omitted, the solder fillet SF is also formed on the region $\mathbf{105}c_1$ and region $\mathbf{105}c_2$ of the electrode portion 105*c*.

In the electronic component device ECD2, occurrence of a crack in the element body 103 is reliably suppressed as described above.

Figure 51:
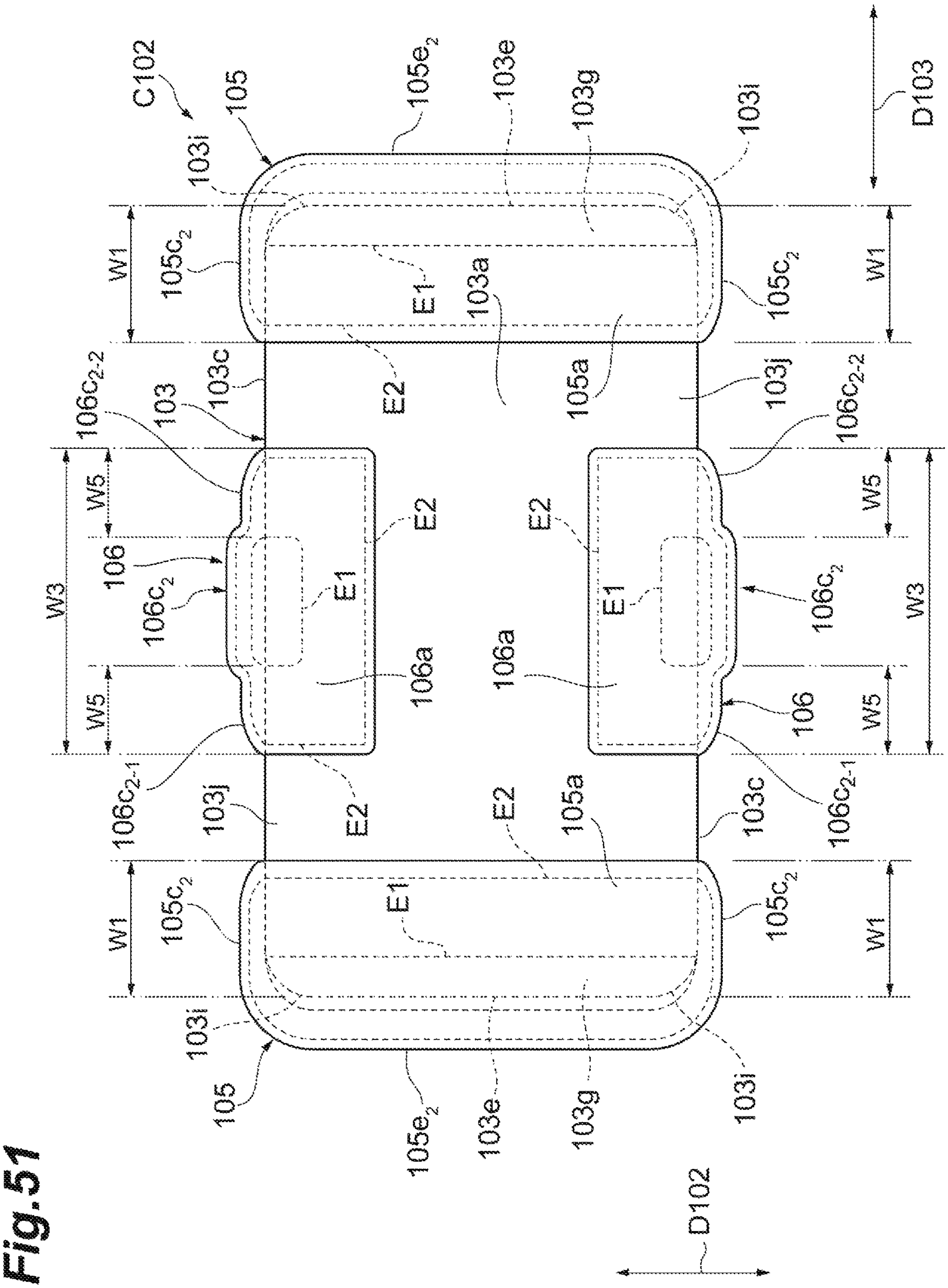
FIG. 51 is a plan view of a multilayer feedthrough capacitor according to a modification of the seventh embodiment.
Figure 52:
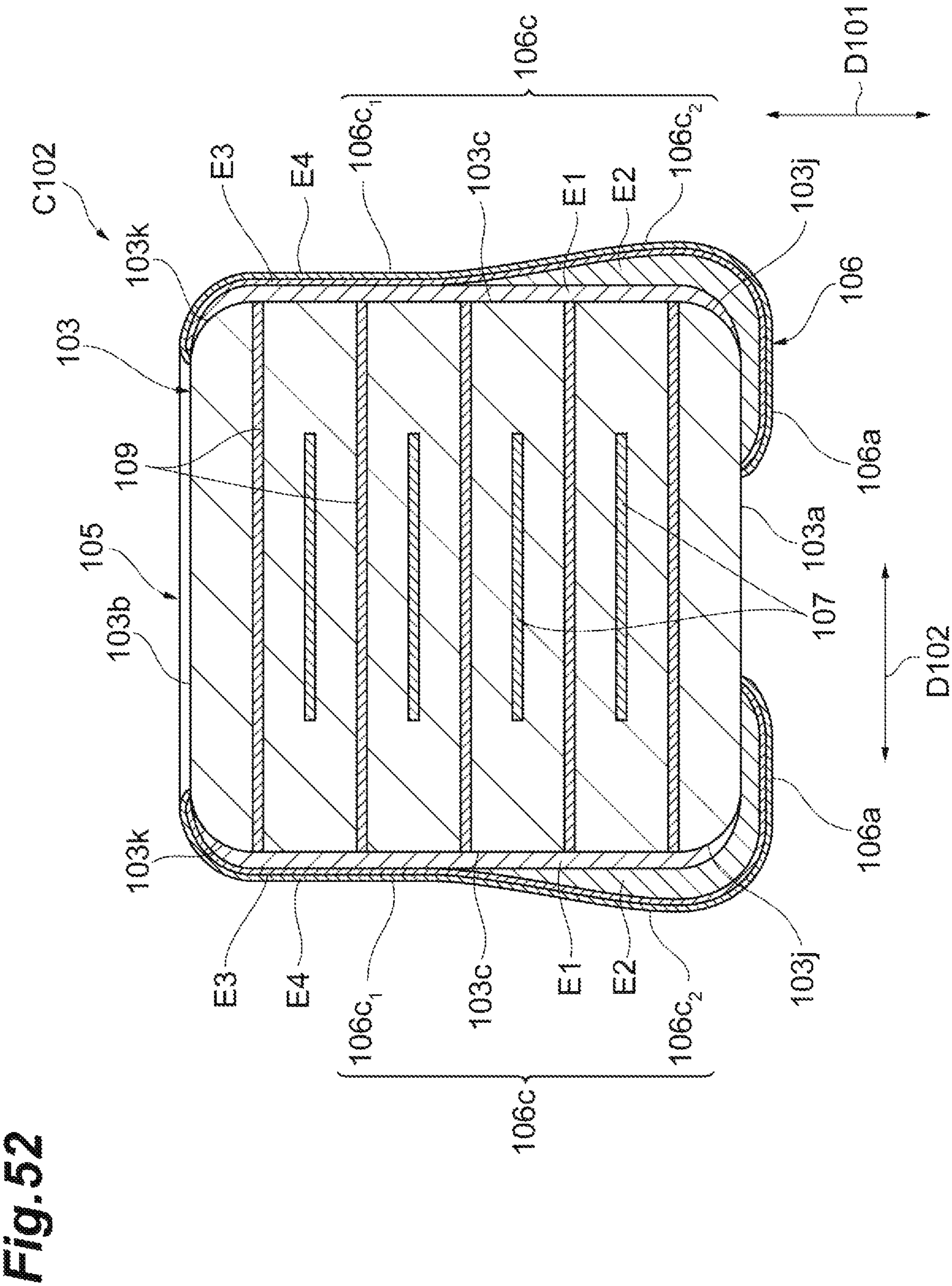
FIG. 52 is a view illustrating a cross-sectional configuration of the multilayer feedthrough capacitor according to the modification of the seventh embodiment.

Next, a configuration of a multilayer feedthrough capacitor C102 according to a modification of the seventh embodiment will be described with reference to FIGS. 51 and 52. FIG. 51 is a plan view of a multilayer feedthrough capacitor according to the present modification. FIG. 52 is a view illustrating a cross-sectional configuration of the multilayer feedthrough capacitor according to the present modification.

As with the multilayer feedthrough capacitor C101, the multilayer feedthrough capacitor C102 includes the element body 103, the pair of external electrodes 105, the plurality of internal electrodes 107 (not illustrated), and a plurality of internal electrodes 109 (not illustrated). The multilayer feedthrough capacitor C102 includes a pair of external electrodes 106. In the multilayer feedthrough capacitor C102, the number of the external electrodes 106 is different from that of the multilayer feedthrough capacitor C101.

As illustrated in FIG. 52, each of the external electrodes 106 includes the first electrode layer E1, the second electrode layer E2, the third electrode layer E3, and the fourth electrode layer E4. The fourth electrode layer E4 is the outermost layer of the external electrode 106. The electrode portions 106*a* include the second electrode layer E2, the third electrode layer E3, and the fourth electrode layer E4. Each of the electrode portions 106*c* includes the first electrode layer E1, the second electrode layer E2, the third electrode layer E3, and the fourth electrode layer E4.

The electrode portions 106*a* included in one external electrode 106 and the electrode portions 106*a* included in another external electrode 106 is separated from each other in the second direction D102. Also in the present modification, the second electrode layers E2 cover an entirety of the first electrode layers E1 (first electrode layers E1 included in the electrode portion 106*a*) when viewed from the first direction D101. The first electrode layers E1 (first electrode layers E1 included in the electrode portion 106*a*) are not exposed from the second electrode layers E2 when viewed from the first direction D101.

Eighth Embodiment

Figure 53:
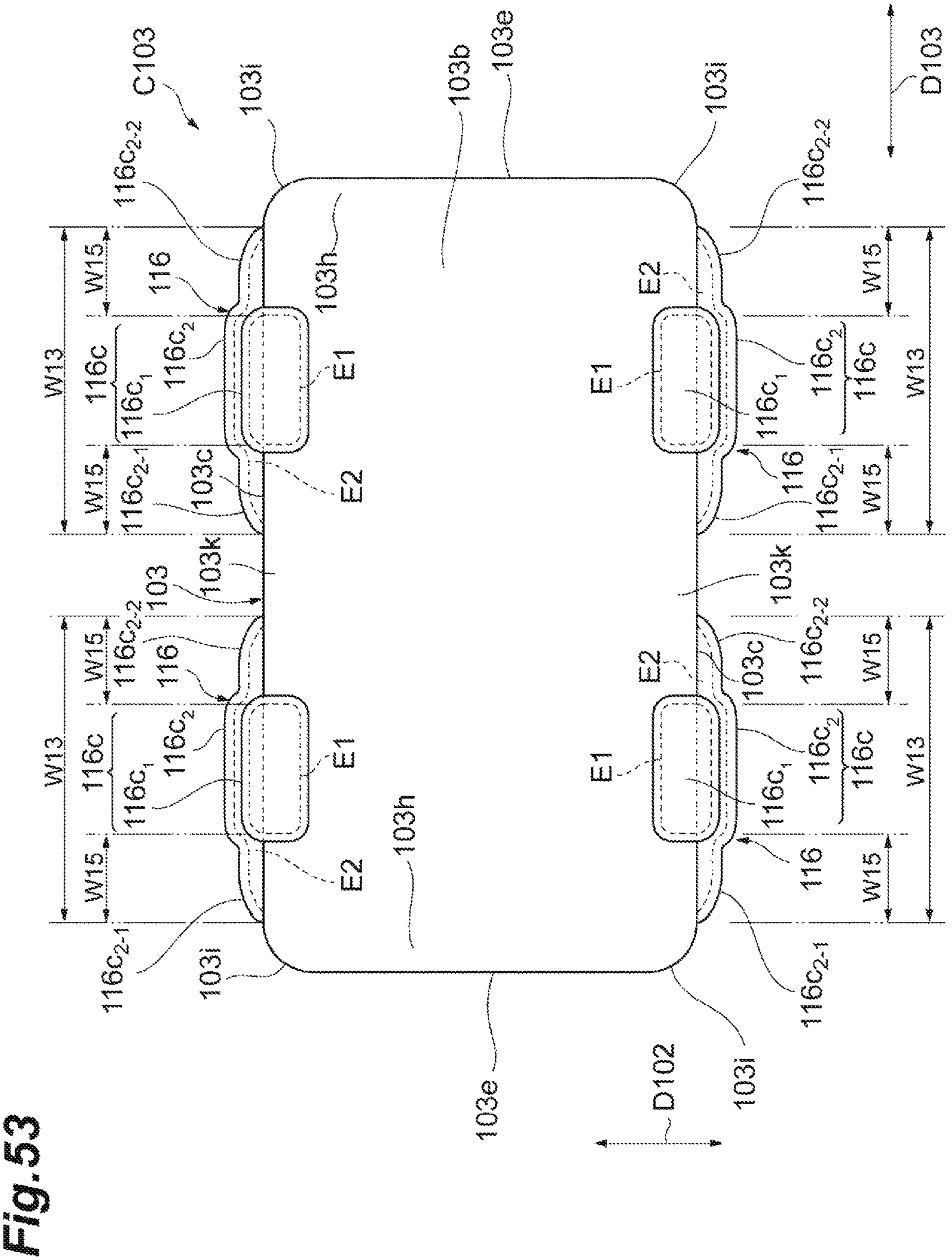
FIG. 53 is a plan view of a multilayer capacitor according to an eighth embodiment.
Figure 54:
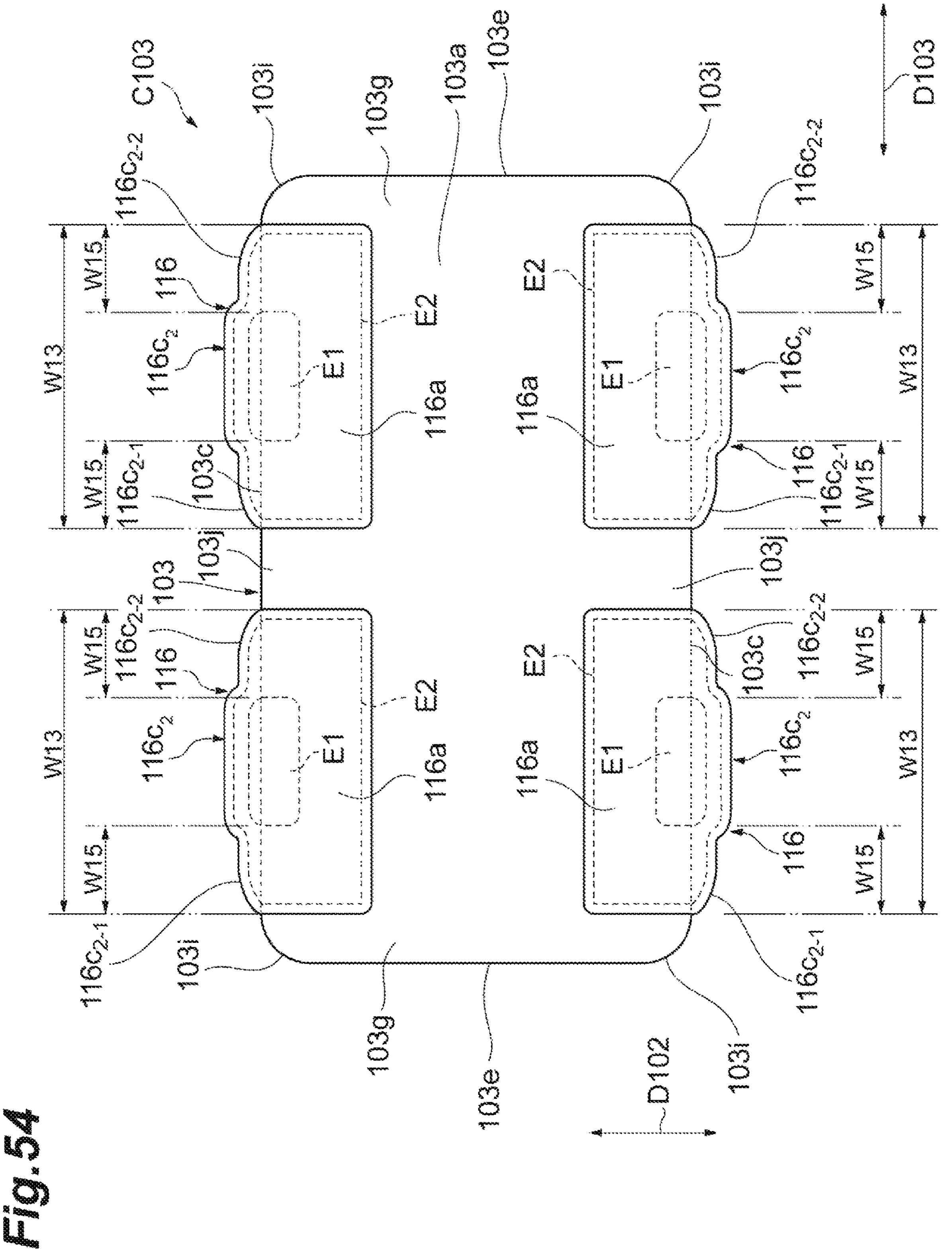
FIG. 54 is a plan view of the multilayer capacitor according to the eighth embodiment.
Figure 55:
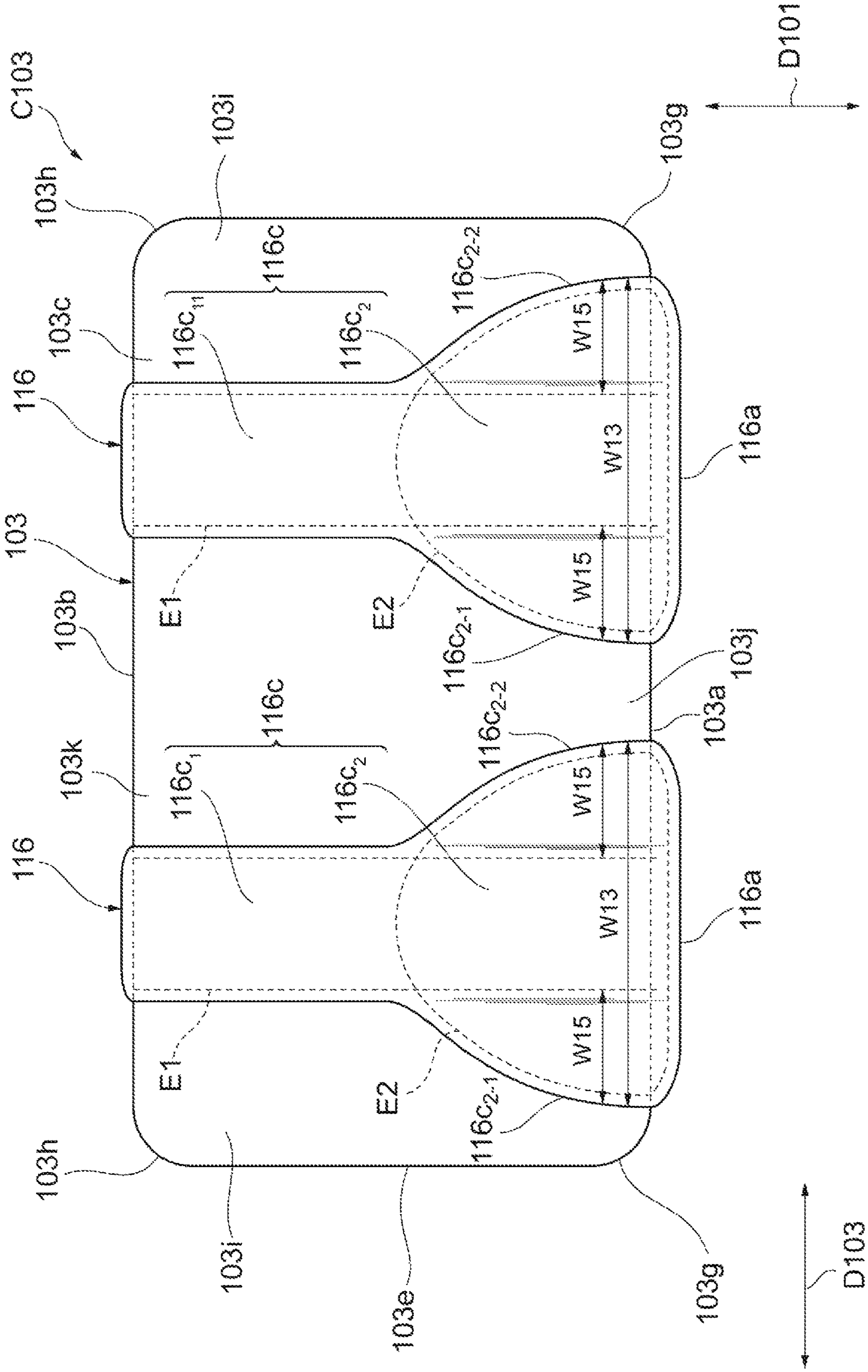
FIG. 55 is a side view of the multilayer capacitor according to the eighth embodiment.
Figure 56:
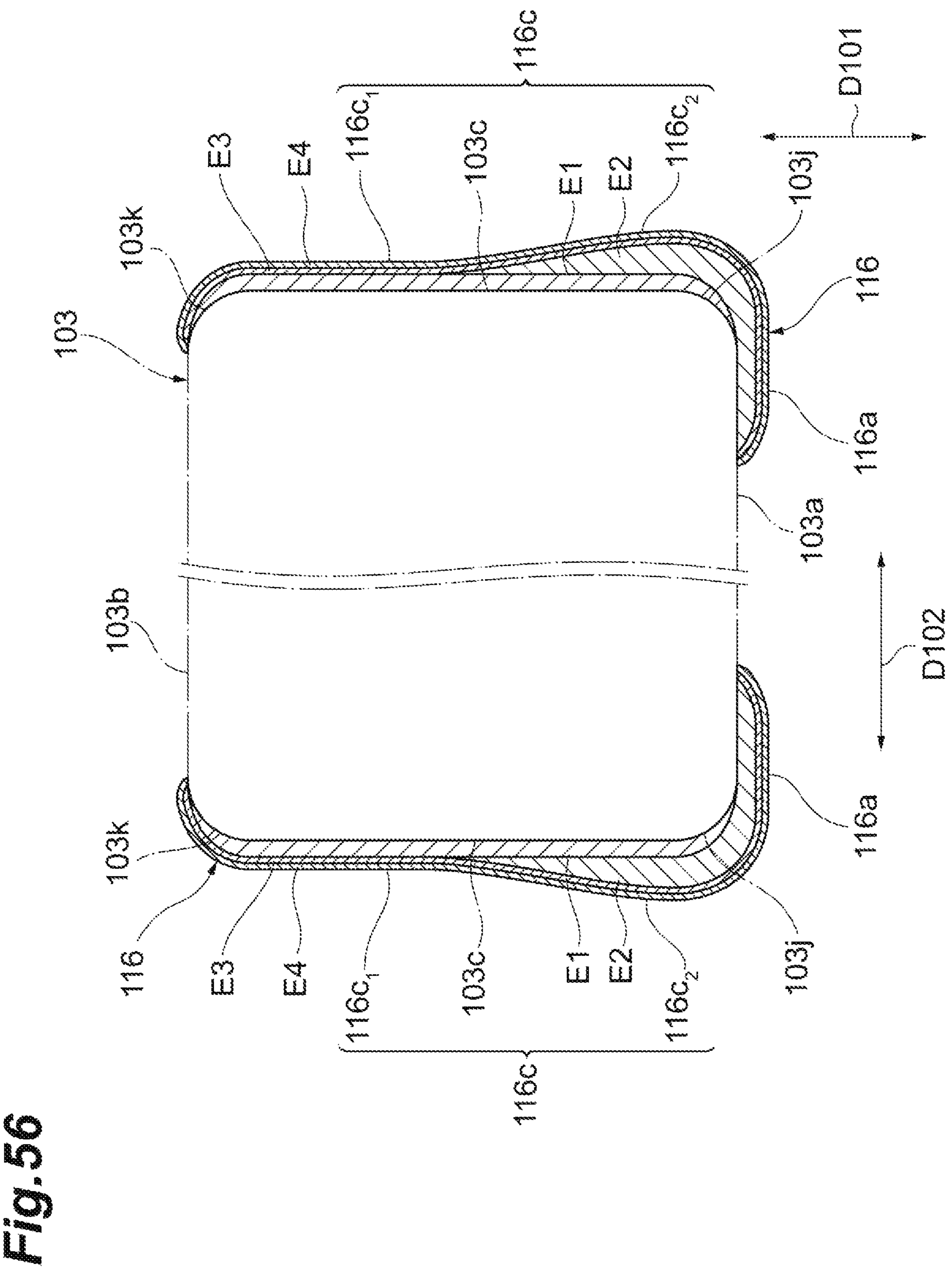
FIG. 56 is a view illustrating a cross-sectional configuration of external electrodes included in the multilayer capacitor according to the eighth embodiment.

A configuration of a multilayer capacitor C103 according to an eighth embodiment will be described with reference to FIGS. 53 to 56. FIGS. 53 and 54 are plan views of a multilayer capacitor according to the eighth embodiment. FIG. 55 is a side view of the multilayer capacitor according to the eighth embodiment. FIG. 56 is a view illustrating a cross-sectional configuration of external electrodes. In the eighth embodiment, an electronic component is, for example, the multilayer capacitor C103.

As illustrated in FIGS. 53 to 56, the multilayer capacitor C103 includes the element body 103, a plurality of external electrodes 116, and a plurality of internal electrodes (not illustrated). The plurality of external electrodes 116 is disposed on the outer surface of the element body 103. The plurality of external electrodes 5 is separated from each other. In the present embodiment, the multilayer capacitor C103 includes four external electrodes 116. The number of the external electrodes 116 is not limited to four.

As with the external electrode 106, the external electrode 116 includes an electrode portion 116*a* and a pair of electrode portions 116*c*. The electrode portion 116*a* is disposed on the principal surface 103*a*. Each of the electrode portions 116*c* is disposed on the side surface 103*c* and on the ridge portions 103*j* and 103*k*. The external electrode 116 is formed on the two surfaces, that is, the principal surface 103*a* and the side surface 103*c*, as well as on the ridge portions 103*j* and 103*k*. The electrode portions 116*a* and 116*c* adjacent each other are coupled and are electrically connected to each other. In the present embodiment, the external electrode 116 is not intentionally formed on the principal surface 103*b*.

The electrode portion 116*c* covers all one ends exposed at the side surface 103*c* of the respective internal electrodes. The electrode portion 116*c* is directly connected to the respective internal electrodes. The external electrode 116 is electrically connected to the respective internal electrodes.

As illustrated in FIG. 56, the external electrode 116 also includes the first electrode layer E1, the second electrode layer E2, the third electrode layer E3, and the fourth electrode layer E4. The fourth electrode layer E4 is the outermost layer of the external electrode 116.

Next, a configuration of the external electrode 116 will be described.

The first electrode layer E1 is formed to cover the side surface 103*c* and the ridge portions 103*j* and 103*k*. The first electrode layer E1 is not intentionally formed on the pair of principal surfaces 103*a* and 103*b*. The first electrode layer E1 may be unintentionally formed on the principal surfaces 103*a* and 103*b* due to a production error, for example.

The second electrode layer E2 is formed over the first electrode layer E1 and the element body 103. In the present embodiment, the second electrode layer E2 is formed to cover a partial region of the first electrode layer E1. The partial region of the first electrode layer E1 is a region corresponding to a region $\mathbf{116}c_2$ in the first electrode layer E1. The second electrode layer E2 is also formed to cover a partial region of the principal surface 103*a*, a partial region of the side surface 103*c*, and a partial region of the ridge portion 103*j*.

The third electrode layer E3 is formed on the second electrode layer E2 and on the first electrode layer E1 (portion of the first electrode layer E1 exposed from the second electrode layer E2) by plating method. The fourth electrode layer E4 is formed on the third electrode layer E3 by plating method.

The second electrode layer E2 included in each of the electrode portions 116*a* and 116*c* is integrally formed. The third electrode layer E3 included in each of the electrode portions 116*a* and 116*c* is integrally formed. The fourth electrode layer E4 included in each of the electrode portions 116*a* and 116*c* is integrally formed.

When viewed from the first direction D101, an entirety of the first electrode layer E1 (first electrode layer E1 included in the electrode portion 116*c*) is covered with the second electrode layer E2. When viewed from the first direction D101, the first electrode layer E1 (first electrode layer E1 included in the electrode portion 116*c*) is not exposed from the second electrode layer E2.

When viewed in the second direction D102, an end region near the principal surface 103*a* of the first electrode layer E1 (first electrode layer E1 included in the region $\mathbf{116}c_2$) is covered with the second electrode layer E2. When viewed from the second direction D102, an end edge of the second electrode layer E2 crosses an end edge of the first electrode layer E1. When viewed from the second direction D102, an end region near the principal surface 103*b* of the first electrode layer E1 (first electrode layer E1 included in the region $\mathbf{116}c_1$) is exposed from the second electrode layer E2. The region $\mathbf{116}c_2$ includes the second electrode layer E2 formed over the first electrode layer E1 and the side surface 103*c*.

The region $\mathbf{116}c_2$ includes a first portion $\mathbf{116}c_{2\text{-}1}$ and a pair of second portions $\mathbf{116}c_{2\text{-}2}$. In the first portion $\mathbf{116}c_{2\text{-}1}$, the second electrode layer E2 is formed on the first electrode layer E1. In the pair of the second portions $\mathbf{116}c_{2\text{-}2}$, the second electrode layer E2 is formed on the side surface 103*c*. The first portion $\mathbf{116}c_{2\text{-}1}$ has a four-layer structure. Each of the second portions $\mathbf{116}c_{2\text{-}2}$ includes the second electrode layer E2, the third electrode layer E3, and the fourth electrode layer E4. Each of the second portion $\mathbf{116}c_{2\text{-}2}$ has a three-layer structure. The first portion $\mathbf{116}c_{2\text{-}1}$ and the pair of second portions $\mathbf{116}c_{2\text{-}2}$ are integrally formed. The first portion $\mathbf{116}c_{2\text{-}1}$ is located between the pair of second portions $\mathbf{116}c_{2\text{-}2}$ in the third direction D103. The second portions $\mathbf{116}c_{2\text{-}2}$ are located at both sides of the first portion $\mathbf{116}c_{2\text{-}1}$ when viewed from the second direction D102.

As illustrated in FIG. 55, a width W13 of the region $\mathbf{116}c_2$ in the third direction D103 continuously decreases with an increase in distance from the principal surface 103*a* (electrode portion 116*a*). In the present embodiment, an end edge of the region $\mathbf{116}c_2$ has an approximately arc shape when viewed from the second direction D102. The region $\mathbf{116}c_2$ has an approximately semicircular shape when viewed from the second direction D102.

As illustrated in FIG. 55, widths W15 of the regions $\mathbf{116}c_{2\text{-}2}$ in the third direction D103 also continuously decrease with an increase in distance from the principal surface 103*a* (electrode portion 116*a*). An end edge of each region $\mathbf{116}c_{2\text{-}2}$ is curved when viewed from the second direction D102. In the present embodiment, the end edge of each region $\mathbf{116}c_{2\text{-}2}$ has an approximately arc shape when viewed from the second direction D102. Each region $\mathbf{116}c_{2\text{-}2}$ has an approximately fan shape when viewed from the second direction D102. The width W15 of one region $\mathbf{116}c_{2\text{-}2}$ and the width W15 of another region $\mathbf{116}c_{2\text{-}2}$ may be equal to each other or different from each other.

The multilayer capacitor C103 is also solder-mounted on the electronic device. In the multilayer capacitor C103, the principal surface 103*a* is arranged to constitute a mounting surface opposing the electronic device.

As described above, in the eighth embodiment, the region $\mathbf{116}c_2$ located closer to the principal surface 103*a* than the region $\mathbf{116}c_1$ includes the second electrode layer E2. The second electrode layer E2 is formed over the first electrode layer E1 and the side surface 103*c*. Therefore, the second electrode layer E2 covers the end edge of the first electrode layer E1 included in the region $\mathbf{116}c_2$. Stress tends not to concentrate on the end edge of the first electrode layer E1 included in the region $\mathbf{116}c_2$, even in a case in which external force is applied onto the multilayer capacitor C103 through a solder fillet. The end edge of the first electrode layer E1 tends not to serve as an origination of a crack. Consequently, in the multilayer capacitor C103, occurrence of a crack in the element body 103 is reliably suppressed.

In the multilayer capacitor C103, the second electrode layers E2 cover the entirety of the first electrode layers E1 (first electrode layers E1 included in the electrode portions 115*a* and 116*a*) when viewed from the first direction D101. Therefore, the stress tends not to concentrate on the end edges of the first electrode layers E1 included in the electrode portions 115*a* and 116*a*. Consequently, in the multilayer capacitor C103, occurrence of a crack in the element body 103 is further reliably suppressed.

In the multilayer capacitor C103, the region $\mathbf{116}c_2$ includes the first portion $\mathbf{116}c_{2\text{-}1}$ and the second portion $\mathbf{116}c_{2\text{-}2}$. The width W15 of the second portion $\mathbf{116}c_{2\text{-}2}$ continuously decreases with the increase in distance from the principal surface 103*a* (electrode portion 116*a*). Therefore, a shape of the second portion $\mathbf{116}c_{2\text{-}2}$ in plan view has no corner. A portion on which the internal stress concentrates tends not to be generated in the third electrode layer E3 and the fourth electrode layer E4. Consequently, occurrence of peel-off of the third electrode layer E3 and fourth electrode layer E4 and the second electrode layer E2 in the second portion $\mathbf{116}c_{2\text{-}2}$ is suppressed.

In the multilayer capacitor C103, the end edge of the second portion $\mathbf{116}c_{2\text{-}2}$ is curved when viewed from in the second direction D102. Also in this case, the shape of the second portion $\mathbf{116}c_{2\text{-}2}$ in plan view has no corner. Therefore, a portion on which the internal stress concentrates tends not to be generated in the third electrode layer E3 and the fourth electrode layer E4 included in the second portion $\mathbf{116}c_{2\text{-}2}$. Consequently, occurrence of peel-off of the third electrode layer E3 and fourth electrode layer E4 and the second electrode layer E2 in the second portion $\mathbf{116}c_{2\text{-}2}$ is suppressed.

In the multilayer capacitor C103, the end edge of the region $\mathbf{116}c_2$ has an approximately arc shape when viewed from in the second direction D102. Also in this case, the shape of the second portion $\mathbf{106}c_{2\text{-}2}$ in plan view has no corner. Therefore, a portion on which the internal stress concentrates tends not to be generated in the third electrode layer E3 and the fourth electrode layer E4 included in the second portion $\mathbf{116}c_{2\text{-}2}$. Consequently, occurrence of peel-off of the third electrode layer E3 and fourth electrode layer E4 and the second electrode layer E2 in the second portion $\mathbf{116}c_{2\text{-}2}$ is suppressed.

The electronic component device ECD2 may include the multilayer capacitor C103 in place of the multilayer feed-through capacitor C101. In this case, occurrence of a crack in the element body 103 is reliably suppressed.

Ninth Embodiment

Figure 57:
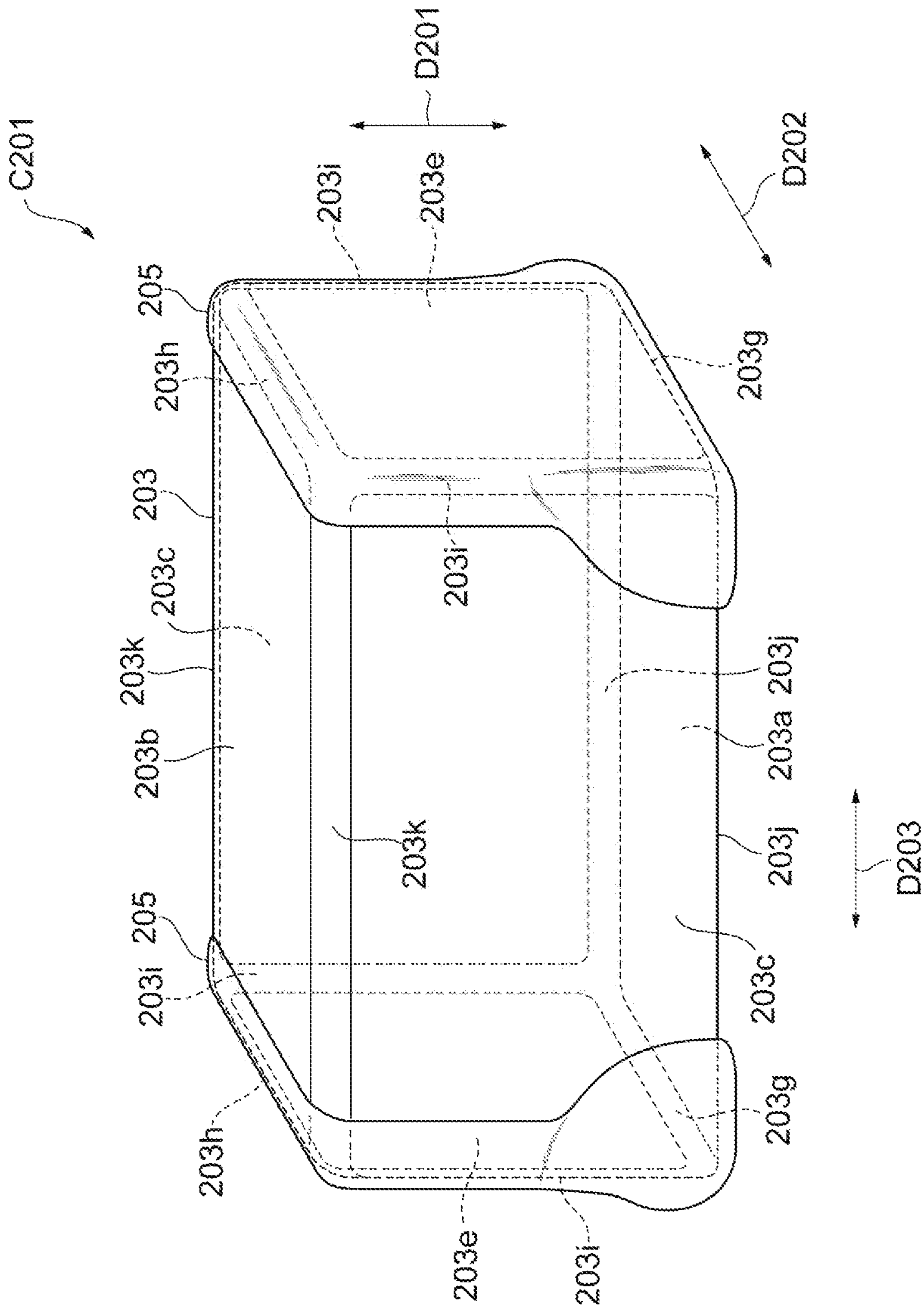
FIG. 57 is a perspective view of a multilayer capacitor according to a ninth embodiment.
Figure 58:
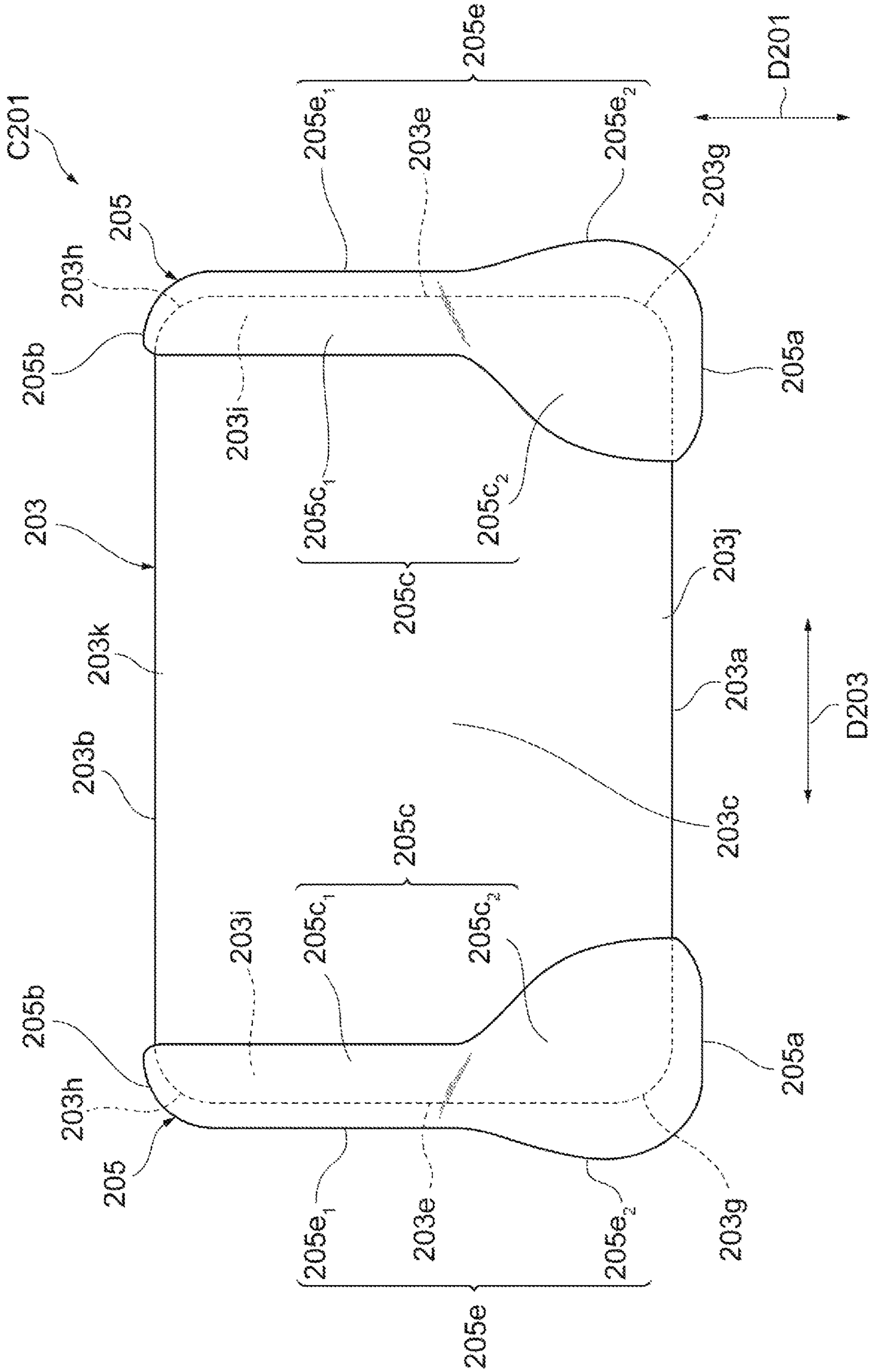
FIG. 58 is a side view of the multilayer capacitor according to the ninth embodiment.
Figure 59:
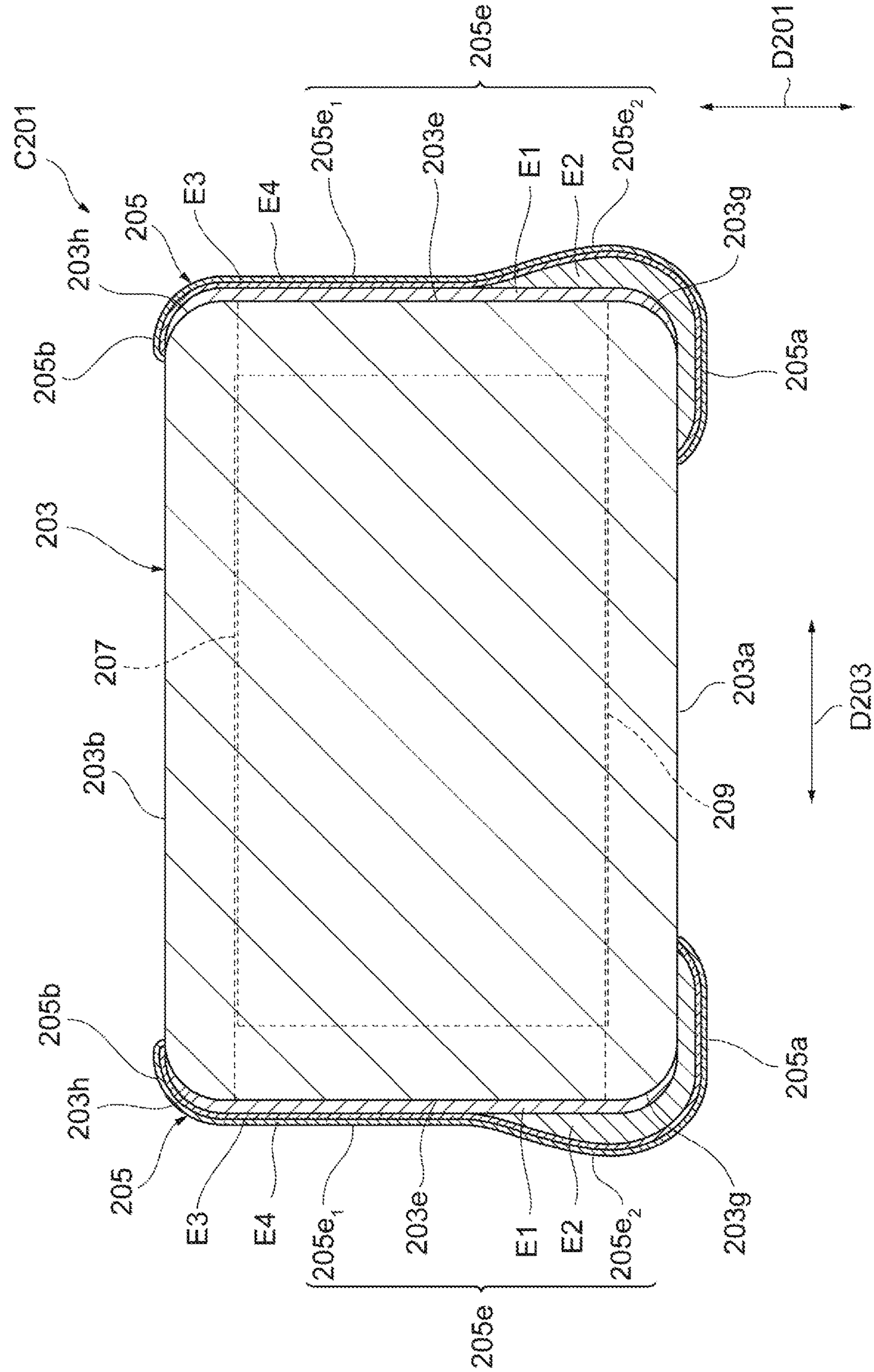
FIG. 59 is a view illustrating a cross-sectional configuration of the multilayer capacitor according to the ninth embodiment.
Figure 60:
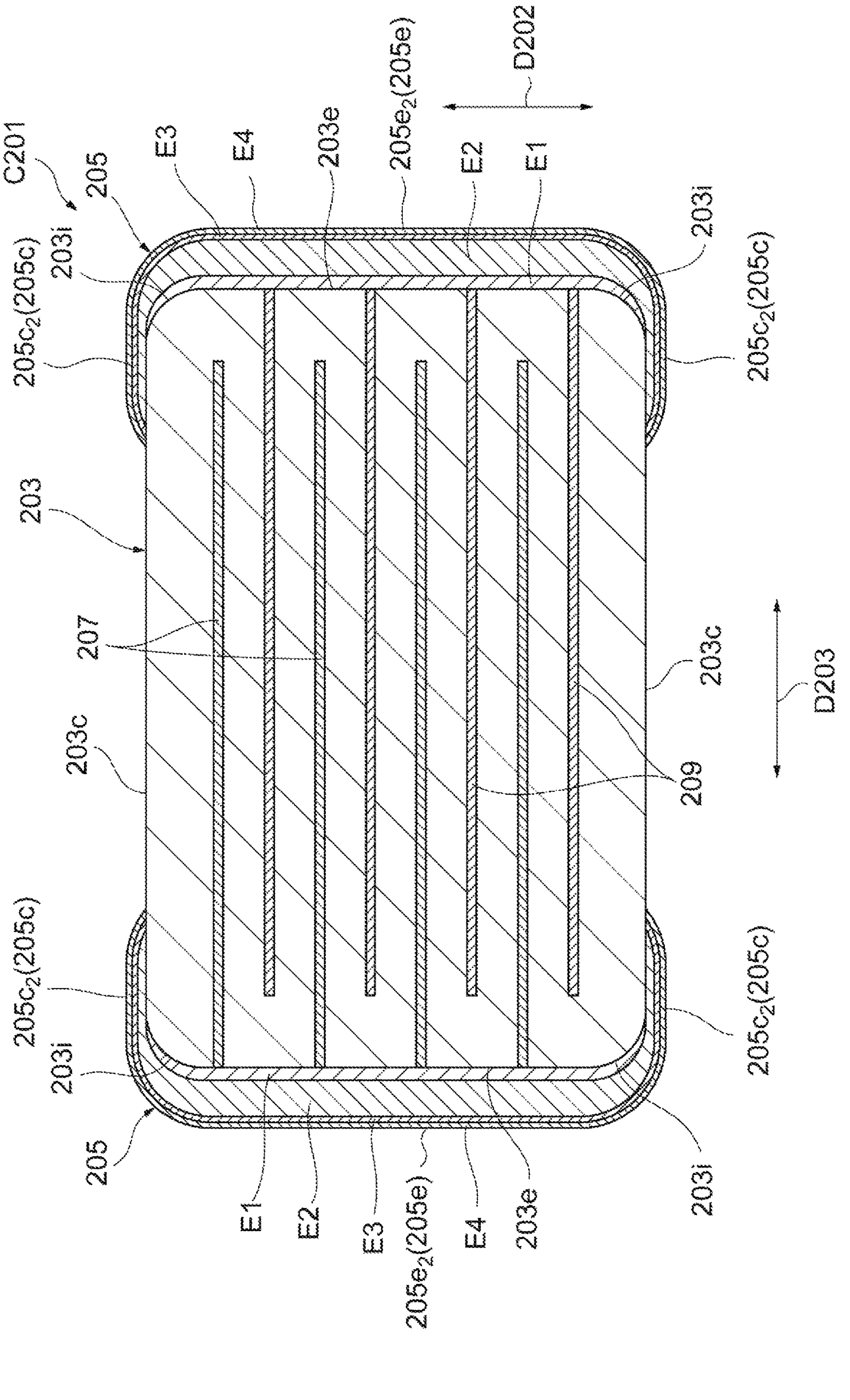
FIG. 60 is a view illustrating a cross-sectional configuration of the multilayer capacitor according to the ninth embodiment.
Figure 61:
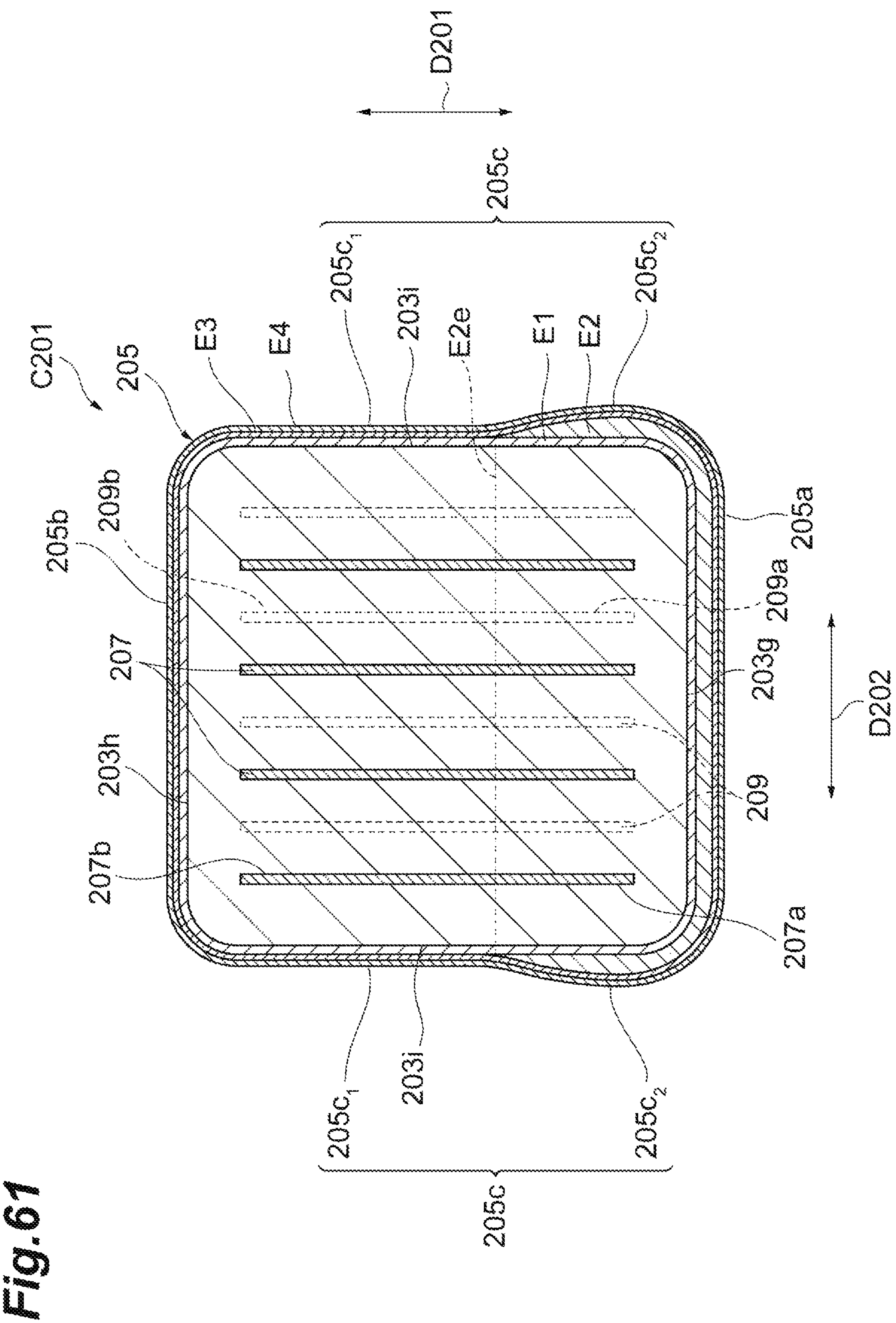
FIG. 61 is a view illustrating a cross-sectional configuration of the multilayer capacitor according to the ninth embodiment.
Figure 62:
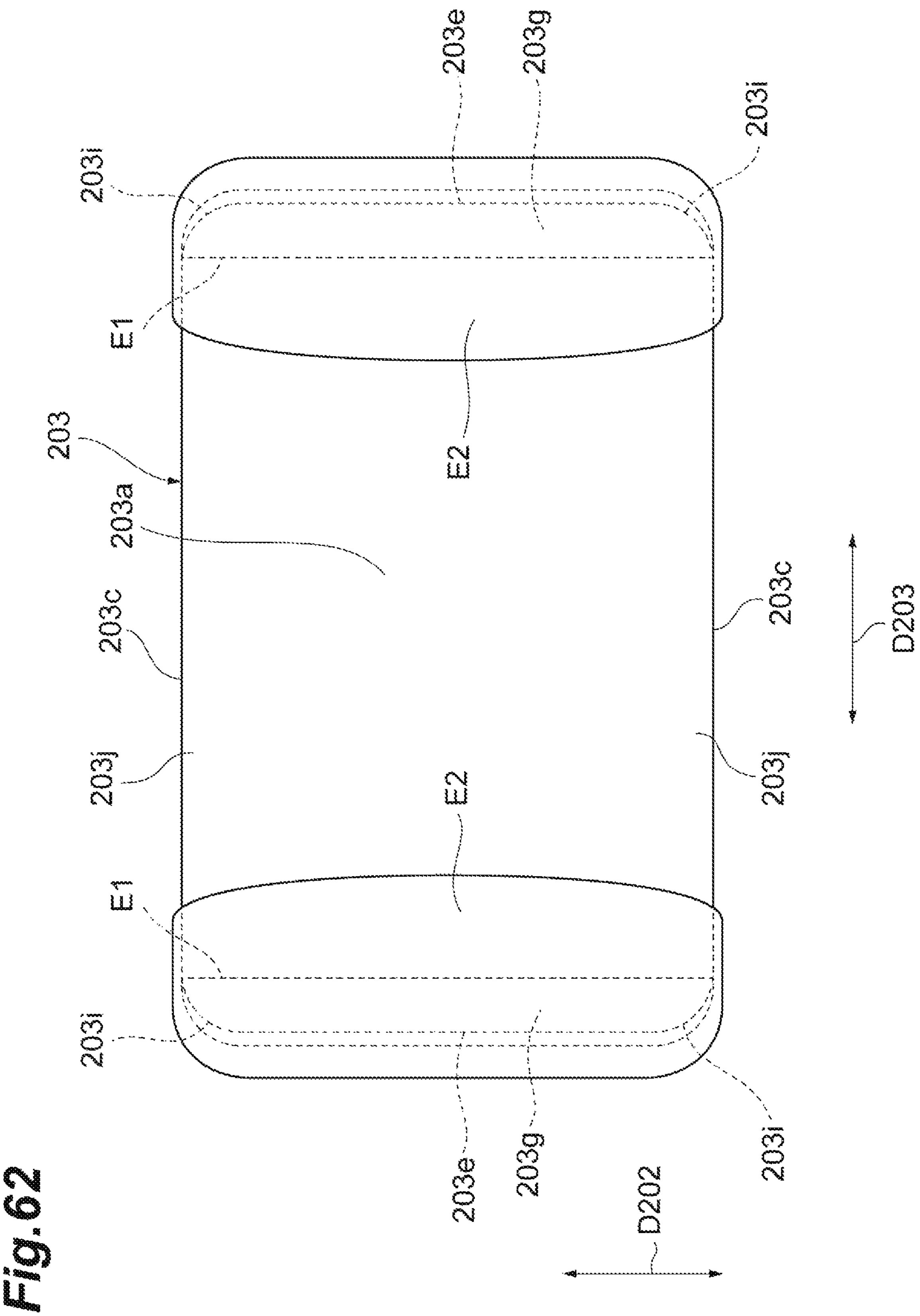
FIG. 62 is a plan view illustrating an element body, a first electrode layer, and a second electrode layer.
Figure 63:
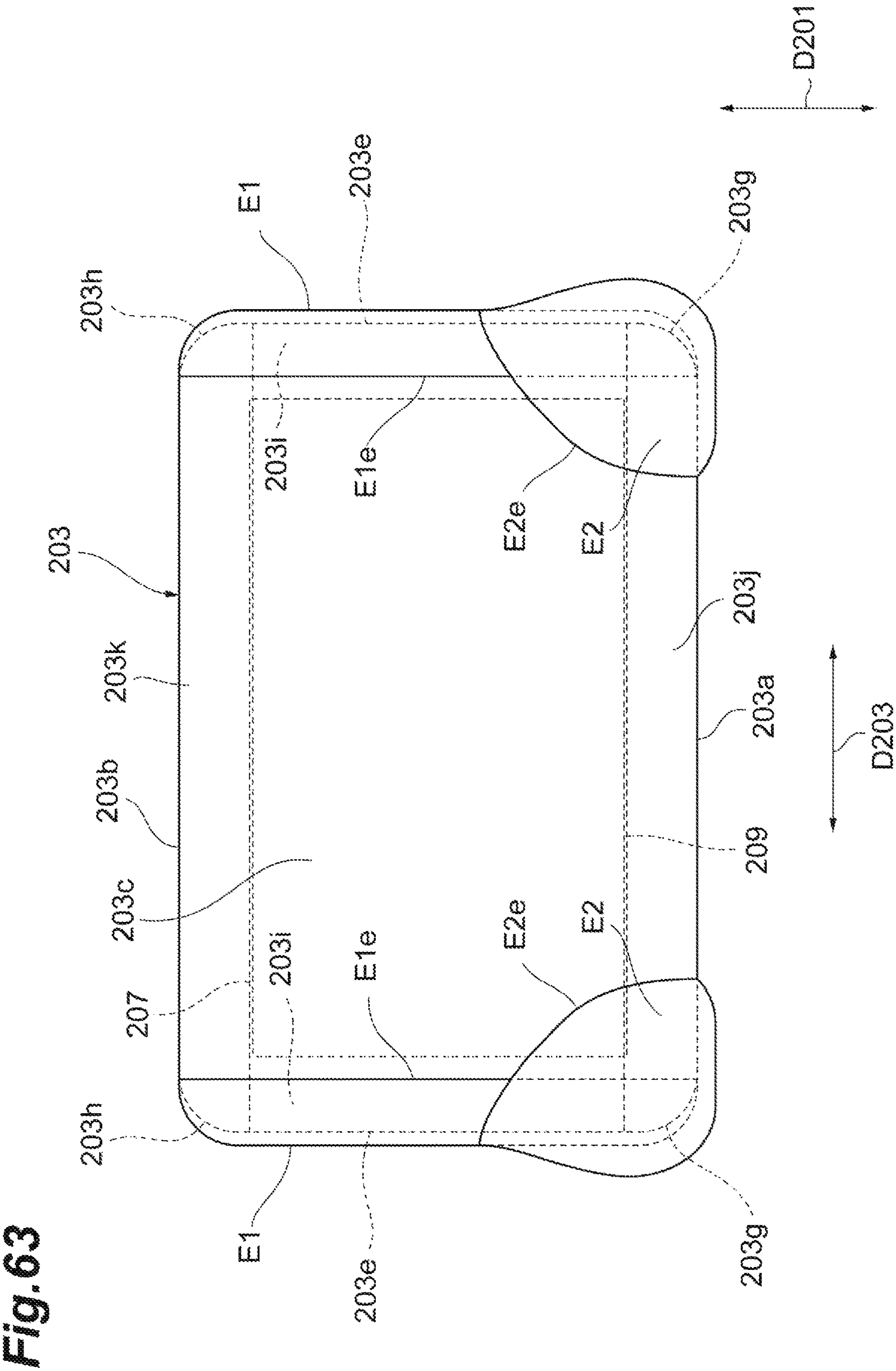
FIG. 63 is a side view illustrating the element body, the first electrode layer, and the second electrode layer.
Figure 64:
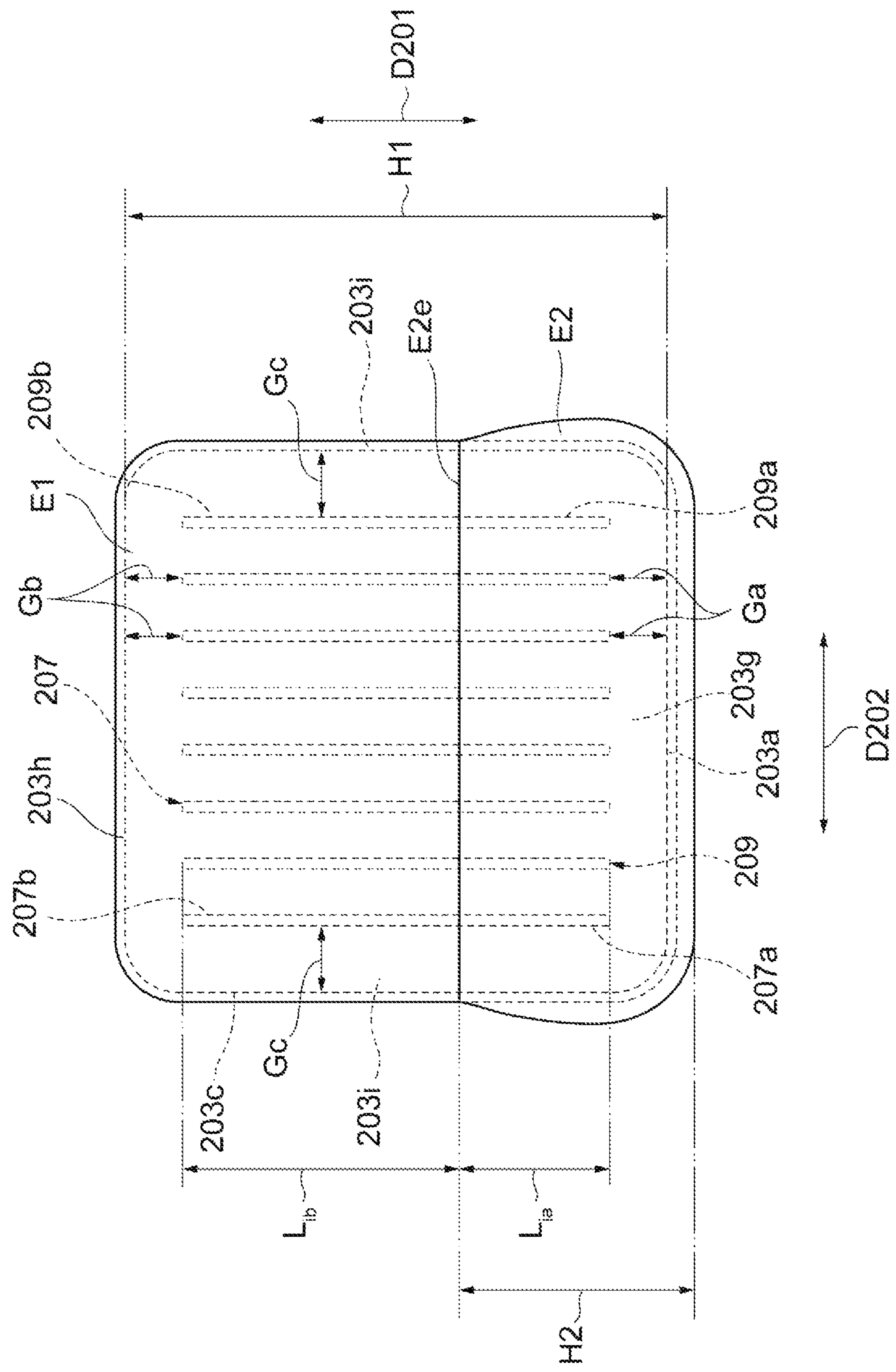
FIG. 64 is an end view illustrating the element body, the first electrode layer, and the second electrode layer.

A configuration of a multilayer capacitor C201 according to a ninth embodiment will be described with reference to FIGS. 57 to 64. FIG. 57 is a perspective view of the multilayer capacitor according to the ninth embodiment. FIG. 58 is a side view of the multilayer capacitor according to the ninth embodiment. FIGS. 59, 60, and 61 are views illustrating a cross-sectional configuration of the multilayer capacitor according to the ninth embodiment. FIG. 62 is a plan view illustrating an element body, a first electrode layer, and a second electrode layer. FIG. 63 is a side view illustrating the element body, the first electrode layer, and the second electrode layer. FIG. 64 is an end view illustrating the element body, the first electrode layer, and the second electrode layer. In the ninth embodiment, an electronic component is, for example, the multilayer capacitor C201.

As illustrated in FIG. 57, the multilayer capacitor C201 includes an element body 203 of a rectangular parallelepiped shape and a pair of external electrodes 205. The pair of external electrodes 205 is disposed on an outer surface of the element body 203. The pair of external electrodes 205 is separated from each other. The rectangular parallelepiped shape includes a rectangular parallelepiped shape in which corners and ridges are chamfered, and a rectangular parallelepiped shape in which the corners and ridges are rounded.

The element body 203 includes a pair of principal surfaces 203*a* and 203*b* opposing each other, a pair of side surfaces 203*c* opposing each other, and a pair of end surfaces 203*e* opposing each other. The pair of principal surfaces 203*a* and 203*b* and the pair of side surfaces 203*c* have a rectangular shape. The direction in which the pair of principal surfaces 203*a* and 203*b* opposes each other is a first direction D201. The direction in which the pair of side surfaces 203*c* opposes each other is a second direction D202. The direction in which the pair of end surfaces 203*e* opposes each other is a third direction D203. The multilayer capacitor C201 is solder-mounted on an electronic device (e.g., a circuit board or an electronic component). In the multilayer capacitor C201, the principal surface 203*a* is arranged to constitute a mounting surface opposing the electronic device.

The first direction D201 is a direction orthogonal to the respective principal surfaces 203*a* and 203*b* and is orthogonal to the second direction D202. The third direction D203 is a direction parallel to the respective principal surfaces 203*a* and 203*b* and the respective side surfaces 203*c*, and is orthogonal to the first direction D201 and the second direction D202. The second direction D202 is a direction orthogonal to the respective side surfaces 203*c*. The third direction D203 is a direction orthogonal to the respective end surfaces 203*e*. In the ninth embodiment, a length of the element body 203 in the third direction D203 is larger than a length of the element body 203 in the first direction D201, and larger than a length of the element body 203 in the second direction D202. The third direction D203 is a longitudinal direction of the element body 203.

The pair of side surfaces 203*c* extends in the first direction D201 to couple the pair of principal surfaces 203*a* and 203*b*. The pair of side surfaces 203*c* also extends in the third direction D203. The pair of end surfaces 203*e* extends in the first direction D201 to couple the pair of principal surfaces 203*a* and 203*b*. The pair of end surfaces 203*e* also extends in the second direction D202.

The element body 203 includes a pair of ridge portions 203*g*, a pair of ridge portions 203*h*, four ridge portions 203*i*, a pair of ridge portions 203*j*, and a pair of ridge portions 203*k*. The ridge portion 203*g* is located between the end surface 203*e* and the principal surface 203*a*. The ridge portion 203*h* is located between the end surface 203*e* and the principal surface 203*b*. The ridge portion 203*i* is located between the end surface 203*e* and the side surface 203*c*. The ridge portion 203*j* is located between the principal surface 203*a* and the side surface 203*c*. The ridge portion 203*k* is located between the principal surface 203*b* and the side surface 203*c*. In the present embodiment, each of the ridge portions 203*g*, 203*h*, 203*i*, 203*j*, and 203*k* is rounded to curve. The element body 203 is subject to what is called a round chamfering process.

The end surface 203*e* and the principal surface 203*a* are indirectly adjacent to each other with the ridge portion 203*g* therebetween. The end surface 203*e* and the principal surface 203*b* are indirectly adjacent to each other with the ridge portion 203*h* therebetween. The end surface 203*e* and the side surface 203*c* are indirectly adjacent to each other with the ridge portion 203*i* therebetween. The principal surface 203*a* and the side surface 203*c* are indirectly adjacent to each other with the ridge portion 203*j* therebetween. The principal surface 203*b* and the side surface 203*c* are indirectly adjacent to each other with the ridge portion 203*k* therebetween.

The element body 203 is configured by laminating a plurality of dielectric layers in the second direction D202. The element body 203 includes the plurality of laminated dielectric layers. In the element body 203, a lamination direction of the plurality of dielectric layers coincides with the second direction D202. Each dielectric layer includes, for example, a sintered body of a ceramic green sheet containing a dielectric material. As the dielectric material, for example, a dielectric ceramic of $BaTiO_3$ base, $Ba(Ti,Zr)O_3$ base, or $(Ba,Ca)TiO_3$ base is used. In an actual element body 203, each of the dielectric layers is integrated to such an extent that a boundary between the dielectric layers cannot be visually recognized. In the element body 203, the lamination direction of the plurality of dielectric layers may coincide with the first direction D201.

As illustrated in FIGS. 59, 60, and 61, the multilayer capacitor C201 includes a plurality of internal electrodes 207 and a plurality of internal electrodes 209. Each of the internal electrodes 207 and 209 is an internal conductor disposed in the element body 203. Each of the internal electrodes 207 and 209 is made of a conductive material that is usually used as an internal electrode of a multilayer electronic component. As the conductive material, a base metal (e.g., Ni or Cu) is used. Each of the internal electrodes 207 and 209 includes a sintered body of a conductive paste containing the above conductive material. In the ninth embodiment, each of the internal electrodes 207 and 209 is made of Ni.

The internal electrodes 207 and the internal electrodes 209 are disposed in different positions (layers) in the second direction D202. The internal electrodes 207 and the internal electrodes 209 are alternately disposed in the element body 203 to oppose each other in the second direction D202 with an interval therebetween. Polarities of the internal electrodes 207 and the internal electrodes 209 are different from each other. In a case in which the lamination direction of the plurality of dielectric layers is the first direction D201, the internal electrodes 207 and the internal electrodes 209 are disposed in different positions (layers) in the first direction D201. Each of the internal electrodes 207 and 209 includes one end exposed to a corresponding side surface 203*e*.

The plurality of internal electrodes 207 and the plurality of internal electrodes 209 are alternately disposed in the second direction D202. Each of the internal electrodes 207 and 209 is located in a plane approximately orthogonal to each of the principal surfaces 203*a* and 203*b*. The internal electrodes 207 and the internal electrodes 209 oppose each other in the second direction D202. The direction (second direction D202) in which the internal electrodes 207 and the internal electrodes 209 oppose each other is orthogonal to the direction (first direction D201) orthogonal to each of the principal surfaces 203*a* and 203*b*. As illustrated in FIG. 64, a distance Gc is larger than a distance Ga, and larger than a distance Gb. The distance Gc is the distance between the side surface 203*c* and the internal electrode 207 or 209 nearest to the side surface 203*c* in the second direction D202. The distance Ga is the distance between the principal surface 203*a* and the internal electrodes 207 and 209 in the first direction D201. The distance Gab is the distance between the principal surface 203*b* and the internal electrodes 207 and 209 in the first direction D201.

As also illustrated in FIG. 58, the external electrodes 205 are disposed at both end portions of the element body 203 in the third direction D203. Each of the external electrodes 205 is disposed on a corresponding end surface 203*e* side of the element body 203. As illustrated in FIGS. 59, 60, and 61, the external electrode 205 includes a plurality of electrode portions 205*a*, 205*b*, 205*c*, and 205*e*. The electrode portion 205*a* is disposed on the principal surface 203*a* and on the ridge portion 203*g*. The electrode portion 205*b* is disposed on the ridge portion 203*h*. The electrode portion 205*c* is disposed on each ridge portion 203*i*. The electrode portion 205*e* is disposed on the corresponding end surface 203*e*. The external electrode 205 also includes electrode portions disposed on the ridge portions 203*j*. The electrode portion 205*c* is also disposed on the side surface 203*c*.

The external electrode 205 is formed on the four surfaces, that is, the principal surface 203*a*, the end surface 203*e*, and the pair of side surfaces 203*c*, as well as on the ridge portions 203*g*, 203*h*, 203*i*, and 203*j*. The electrode portions 205*a*, 205*b*, 205*c*, and 205*e* adjacent each other are coupled and are electrically connected to each other. In the present embodiment, the external electrode 205 is not intentionally formed on the principal surface 203*b*. The electrode portion 205*e* disposed on the end surface 203*e* covers all one ends exposed at the end surface 203*e* of the corresponding internal electrodes 207 or 209. The electrode portion 205*e* is directly connected to the respective internal electrodes 207 and 209. The external electrode 205 is electrically connected to the respective internal electrodes 207 and 209.

As illustrated in FIGS. 59, 60, and 61, the external electrode 205 includes a first electrode layer E1, a second electrode layer E2, a third electrode layer E3, and a fourth electrode layer E4. The fourth electrode layer E4 is the outermost layer of the external electrode 205. Each of the electrode portions 205*a*, 205*c*, and 205*e* includes the first electrode layer E1, the second electrode layer E2, the third electrode layer E3, and the fourth electrode layer E4. The electrode portion 205*b* includes the first electrode layer E1, the third electrode layer E3, and the fourth electrode layer E4.

The first electrode layer E1 included in the electrode portion 205*a* is disposed on the ridge portion 203*g*, and is not disposed on the principal surface 203*a*. The first electrode layer E1 included in the electrode portion 205*a* is in contact with the entire ridge portion 203*g*. The principal surface 203*a* is not covered with the first electrode layer E1, thereby being exposed from the first electrode layer E1. The second electrode layer E2 included in the electrode portion 205*a* is disposed on the first electrode layer E1 and on the principal surface 203*a*. An entirety of the first electrode layer E1 is covered with the second electrode layer E2. In the electrode portion 205*a*, the second electrode layer E2 is in contact with a part of the principal surface 203*a* (partial region near the end surface 203*e* in the principal surface 203*a*) and an entirety of the first electrode layer E1. The electrode portion 205*a* has a four-layer structure on the ridge portion 203*g*, and has a three-layer structure on the principal surface 203*a*.

The second electrode layer E2 included in the electrode portion 205*a* is formed to cover the entire ridge portion 203*g* and the part of the principal surface 203*a* (partial region near the end surface 203*e* in the principal surface 203*a*). The second electrode layer E2 included in the electrode portion 205*a* is formed to indirectly cover the entire ridge portion 203*g* with the first electrode layer E1 therebetween. The second electrode layer E2 included in the electrode portion 205*a* is formed to directly cover the part of the principal surface 203*a*. The second electrode layer E2 included in the electrode portion 205*a* is formed to directly cover an entire portion of the first electrode layer E1 formed on the ridge portion 203*g*.

The first electrode layer E1 included in the electrode portion 205*b* is disposed on the ridge portion 203*h*, and is not disposed on the principal surface 203*b*. The first electrode layer E1 included in the electrode portion 205*b* is in contact with the entire ridge portion 203*h*. The principal surface 203*b* is not covered with the first electrode layer E1, thereby being exposed from the first electrode layer E1. The electrode portion 205*b* does not include the second electrode layer E2. The principal surface 203*b* is not covered with the second electrode layer E2, thereby being exposed from the second electrode layer E2. The second electrode layer E2 is not formed on the principal surface 203*b*. The electrode portion 5*b* has a three-layer structure.

The first electrode layer E1 included in the electrode portion 205*c* is disposed on the ridge portion 203*i*, and is not disposed on the side surface 203*c*. The first electrode layer E1 included in the electrode portion 205*c* is in contact with the entire ridge portion 203*i*. The side surface 203*c* is not covered with the first electrode layer E1, thereby being exposed from the first electrode layer E1. The second electrode layer E2 included in the electrode portion 205*c* is disposed on the first electrode layer E1 and on the side surface 203*c*. A part of the first electrode layer E1 is covered with the second electrode layer E2. In the electrode portion 205*c*, the second electrode layer E2 is in contact with a part of the side surface 203*c* and a part of the first electrode layer E1. The second electrode layer E2 included in the electrode portion 205*c* includes a portion located on the side surface 203*c*.

The second electrode layer E2 included in the electrode portion 205*c* is formed to cover a part of the ridge portion 203*i* (partial region near the principal surface 203*a* in the ridge portion 203*i*) and a part of the side surface 203*c* (corner region near the principal surface 203*a* and end surface 203*e* in the side surface 203*c*). The second electrode layer E2 included in the electrode portion 205*c* indirectly is formed to indirectly cover the part of the ridge portion 203*i* with the first electrode layer E1 therebetween. The second electrode layer E2 included in the electrode portion 205*c* is formed to directly cover the part of the side surface 3*c*. The second electrode layer E2 included in the electrode portion 205*c* is formed to directly cover the part of the first electrode layer E1 formed in the ridge portion 203*i*.

The electrode portion 205*c* includes a region $\mathbf{205}c_1$ and a region $\mathbf{205}c_2$. The region $\mathbf{205}c_2$ is located closer to the principal surface 203*a* than the region $\mathbf{205}c_1$. In the present embodiment, the electrode portion 205*c* includes only two regions $\mathbf{205}c_1$ and $\mathbf{205}c_2$. The region $\mathbf{205}c_1$ includes the first electrode layer E1, the third electrode layer E3, and the fourth electrode layer E4. The region 205$c_1$ does not include the second electrode layer E2. The region 205$c_1$ has a three-layer structure. The region 205$c_2$ includes the first electrode layer E1, the second electrode layer E2, the third electrode layer E3, and the fourth electrode layer E4. The region 205$c_2$ has a four-layer structure on the ridge portion 203*i*, and has a three-layer structure on the side surface 203*c*. The region 205$c_1$ is the region where the first electrode layer E1 is exposed from the second electrode layer E2. The region 205$c_2$ is the region where the first electrode layer E1 is covered with the second electrode layer E2.

The first electrode layer E1 included in the electrode portion 205*e* is disposed on the end surface 203*e*. The entire end surface 203*e* is covered with the first electrode layer E1. The first electrode layer E1 included in the electrode portion 205*e* is in contact with the entire end surface 203*e*. The second electrode layer E2 included in the electrode portion 205*e* is disposed on the first electrode layer E1. A part of the first electrode layer E1 is covered with the second electrode layer E2. In the electrode portion 205*e*, the second electrode layer E2 is in contact with the part of the first electrode layer E1. The second electrode layer E2 included in the electrode portion 205*e* is formed to cover a part of the end surface 203*e* (partial region near the principal surface 203*a* in the end surface 203*e*). The second electrode layer E2 included in the electrode portion 205*e* is formed to indirectly cover the part of the end surface 203*e* with the first electrode layer E1 therebetween. The second electrode layer E2 included in the electrode portion 205*e* is formed to directly cover the part of the first electrode layer E1 formed on the end surface 203*e*. In the electrode portion 205*e*, the first electrode layer E1 is formed on the end surface 203*e* to be connected to the one ends of the respective internal electrodes 207 and 209.

The electrode portion 205*e* includes a region 205$e_1$ and a region 205$e_2$. The region 205$e_2$ is located closer to the principal surface 203*a* than the region 205$e_1$. In the present embodiment, the electrode portion 205*e* includes only two regions 205$e_1$ and 205$e_2$. The region 205$e_1$ includes the first electrode layer E1, the third electrode layer E3, and the fourth electrode layer E4. The region 205$e_1$ does not include the second electrode layer E2. The region 205$e_1$ has a three-layer structure. The region 205$e_2$ includes the first electrode layer E1, the second electrode layer E2, the third electrode layer E3, and the fourth electrode layer E4. The region 205$e_2$ has a four-layer structure. The region 205$e_1$ is the region where the first electrode layer E1 is exposed from the second electrode layer E2. The region 205$e_2$ is the region where the first electrode layer E1 is covered with the second electrode layer E2.

The first electrode layer E1 is formed by applying a conductive paste onto the surface of the element body 203 and sintering it. The first electrode layer E1 is formed to cover the end surface 203*e* and the ridge portions 203*g*, 203*h*, and 203*i*. The first electrode layer E1 is a sintered metal layer formed by sintering a metal component (metal powder) contained in the conductive paste. The first electrode layer E1 is the sintered metal layer formed on the element body 203. The first electrode layer E1 is not intentionally formed on the pair of principal surfaces 203*a* and 203*b* and the pair of side surfaces 203*c*. The first electrode layer E1 may be unintentionally formed on the principal surfaces 203*a* and 203*b* and the side surfaces 203*c* due to a production error, for example.

In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent.

The second electrode layer E2 is formed by curing a conductive resin paste applied onto the first electrode layer E1, the principal surface 203*a*, and the pair of side surfaces 203*c*. The second electrode layer E2 is formed on the first electrode layer E1 and the element body 203. In the present embodiment, the second electrode layer E2 is formed to cover a partial region of the first electrode layer E1. The partial region of the first electrode layer E1 is a region, in the first electrode layer E1, corresponding to the electrode portion 205*a*, the region 205$c_2$, and the region 205$e_2$. The second electrode layer E2 is formed to directly cover a part of the ridge portion 203*j* (partial region near the end surface 203*e* in the ridge portion 203*j*). The second electrode layer E2 is in contact with the part of the ridge portion 203*j*. The first electrode layer E1 serves as an underlying metal layer for forming the second electrode layer E2. The second electrode layer E2 is a conductive resin layer formed on the first electrode layer E1.

The conductive resin paste contains, for example, a resin (e.g., a thermosetting resin), a conductive material (e.g., metal powder), and an organic solvent. As the metal powder, for example, Ag powder or Cu powder is used. As the thermosetting resin, for example, a phenolic resin, an acrylic resin, a silicone resin, an epoxy resin, or a polyimide resin is used.

The third electrode layer E3 is formed on the second electrode layer E2 and on the first electrode layer E1 (portion of the first electrode layer E1 exposed from the second electrode layer E2) by plating method. In the present embodiment, the third electrode layer E3 is a Ni plating layer formed on the first electrode layer E1 and on the second electrode layer E2 by Ni plating. The third electrode layer E3 may be an Sn plating layer, a Cu plating layer, or an Au plating layer. The third electrode layer E3 contains Ni, Sn, Cu, or Au.

The fourth electrode layer E4 is formed on the third electrode layer E3 by plating method. In the present embodiment, the fourth electrode layer E4 is an Sn plating layer formed on the third electrode layer E3 by Sn plating. The fourth electrode layer E4 may be a Cu plating layer or an Au plating layer. The fourth electrode layer E4 contains Sn, Cu, or Au. The third electrode layer E3 and fourth electrode layer E4 constitute a plating layer formed on the second electrode layer E2. In the present embodiment, the plating layer formed on the second electrode layer E2 has a two-layer structure.

The first electrode layer E1 included in each of the electrode portions 205*a*, 205*b*, 205*c*, and 205*e* is integrally formed. The second electrode layer E2 included in each of the electrode portions 205*a*, 205*c*, and 205*e* is integrally formed. The third electrode layer E3 included in each of the electrode portions 205*a*, 205*b*, 205*c*, and 205*e* is integrally formed. The fourth electrode layer E4 included in each of the electrode portions 205*a*, 205*b*, 205*c*, and 205*e* is integrally formed.

The first electrode layer E1 (first electrode layer E1 included in the electrode portion 205*e*) is formed on the end surface 3*e* to be connected to the respective internal electrodes 207 and 209. The first electrode layer E1 is formed to cover the entire end surface 203*e*, the entire ridge portion 203*g*, the entire ridge portion 203*h*, and the entire ridge portion 203*i*. The second electrode layer E2 (second electrode layer E2 included in the electrode portions 205*a*, 205*c*, and 205*e*) is formed to continuously cover a part of the principal surface 203*a*, a part of the end surface 203*e*, and a part of each of the pair of side surfaces 203*c*. The second electrode layer E2 (second electrode layer E2 included in the electrode portions 205*a*, 205*c*, and 205*e*) is formed to cover the entire ridge portion 203*g*, a part of the ridge portion 203*i*, and a part of the ridge portion 203*j*. The second electrode layer E2 includes portions each corresponding to the part of the principal surface 203*a*, the part of the end surface 203*e*, the part of each of the pair of side surfaces 203*c*, the entire ridge portion 203*g*, the part of the ridge portion 203*i*, and the part of the ridge portion 203*j*. The first electrode layer E1 (first electrode layer E1 included in the electrode portion 205*e*) is directly connected to the respective internal electrodes 207 and 209.

The first electrode layer E1 (first electrode layer E1 included in the electrode portions 205*a*, 205*b*, 205*c*, and 205*e*) includes a region covered with the second electrode layer E2 (second electrode layer E2 included in the electrode portions 205*a*, 205*c*, and 205*e*), and a region not covered with the second electrode layer E2 (second electrode layer E2 included in the electrode portions 205*a*, 205*c*, and 205*e*). The third electrode layer E3 and the fourth electrode layer E4 are formed to cover the region of the first electrode layer E1 not covered with the second electrode layer E2 and the second electrode layer E2.

As illustrated in FIG. 62, when viewed from the first direction D201, an entirety of the first electrode layer E1 (first electrode layer E1 included in the electrode portion 205*a*) is covered with the second electrode layer E2. When viewed from the first direction D201, the first electrode layer E1 (first electrode layer E1 included in the electrode portion 205*a*) is not exposed from the second electrode layer E2.

As illustrated in FIG. 63, when viewed in the second direction D202, an end region near the principal surface 203*a* of the first electrode layer E1 (first electrode layer E1 included in the region 205$c_2$) is covered with the second electrode layer E2. When viewed from the second direction D202, an end edge E2*e* of the second electrode layer E2 crosses an end edge E1*e* of the first electrode layer E1. When viewed from the second direction D202, an end region near the principal surface 203*b* of the first electrode layer E1 (first electrode layer E1 included in the region 205$c_1$) is exposed from the second electrode layer E2. When viewed from the second direction D202, an area of a region located on the side surface 203*c* and ridge portion 203*i* in the second electrode layer E2 is larger than an area of a region located on the ridge portion 203*i* in the first electrode layer E1. A region located on the side surface 203*c* in the second electrode layer E2 opposes the internal electrode 207 or 209 different in polarity from the second electrode layer E2, in the second direction D202.

As illustrated in FIG. 64, when viewed from the third direction D203, an end region near the principal surface 203*a* of the first electrode layer E1 (first electrode layer E1 included in the region 205$e_2$) is covered with the second electrode layer E2. When viewed from the third direction D203, an end edge E2*e* of the second electrode layer E2 is located on the first electrode layer E1. When viewed from the third direction D203, the end region near the principal surface 203*b* of the first electrode layer E1 (first electrode layer E1 included in the region 205$e_1$) is exposed from the second electrode layer E2. When viewed from the second direction D203, an area of a region located on the end surface 203*e* and ridge portion 203*g* in the second electrode layer E2 is smaller than an area of a region located on the end surface 203*e* and ridge portion 203*g* in the first electrode layer E1. When viewed from the second direction D203, a height H2 of the second electrode layer E2 is not more than half of a height H1 of the element body 203.

As illustrated in FIG. 64, one end of each internal electrode 207 includes a region 207*a* overlapping with the second electrode layer E2 and a region 207*b* not overlapping with the second electrode layer E2, when viewed from the third direction D203. One end of each internal electrode 209 includes a region 209*a* overlapping the second electrode layer E2 and a region 209*b* not overlapping the second electrode layer E2, when viewed from the third direction D203. The regions 207*a* and 209*a* are located closer to the principal surface 203*a* in the first direction D201 than the regions 207*b* and 209*b*. The first electrode layer E1 included in the region 205$e_2$ is connected to the corresponding regions 207*a* and 209*a*. The first electrode layer E1 included in the region 205$e_1$ is connected to the corresponding regions 207*b* and 209*b*. When viewed from the third direction D203, the end edge E2*e* of the second electrode layer E2 crosses the one end of each internal electrode 207 and 209. Lengths $L_{ia}$ of the regions 207*a* and 209*a* in the first direction D201 are smaller than lengths $L_{ib}$ of the regions 207*b* and 209*b* in the first direction D201. In the present embodiment, the first electrode layer E1 is directly connected to the one ends of all the corresponding internal electrodes 207 and 209.

In the present embodiment, the second electrode layer E2 is formed to continuously cover only the part of the principal surface 203*a*, only the part of the end surface 203*e*, and only the part of each of the pair of side surfaces 203*c*. The second electrode layer E2 is formed to cover the entire ridge portion 203*g*, only the part of the ridge portion 203*i*, and only the part of the ridge portion 203*j*. The part of a portion, of the first electrode layer E1, covering the ridge portion 203*i* is exposed from the second electrode layer E2. For example, the first electrode layer E1 included in the region 205$c_1$ is exposed from the second electrode layer E2. The first electrode layer E1 is formed on the end surface 203*e* to be connected to the corresponding regions 207*a* and 209*a*. In present embodiment, the first electrode layer E1 is also formed on the end surface 203*e* to be connected to the corresponding regions 207*b* and 209*b*. In present embodiment, the first electrode layer E1 is directly connected to the one ends of all the corresponding internal electrodes 207 and 209.

As illustrated in FIG. 58, a width of the region 205$c_2$ in the third direction D203 decreases with an increase in distance from the principal surface 203*a* (electrode portion 205*a*). A width of the region 205$c_2$ in the first direction D201 decreases with an increase in distance from the end surface 203*e* (electrode portion 205*e*). In the present embodiment, an end edge of the region 205$c_2$ has an approximately arc shape when viewed from the second direction D202. The region 205$c_2$ has an approximately fan shape when viewed from the second direction D202. In the present embodiment, as illustrated in FIG. 63, the width of the second electrode layer E2 viewed from the second direction D202 decreases with an increase in distance from the principal surface 203*a*. When viewed from the second direction D202, a length of the second electrode layer E2 in the first direction D201 decreases with an increase in distance from the principal surface 203*e* in the third direction D203. When viewed from the second direction D202, a length, of the portion located on the side surface 203*c* of the second electrode layer E2, in the first direction D201 decreases with an increase in distance from the end portion of the element body 203, in the third direction D203. As illustrated in FIG. 63, the end edge E2*e* of the second electrode layer E2 has an approximately arc shape.

In a case in which the multilayer capacitor C201 is solder-mounted on an electronic device, external force applied onto the multilayer capacitor C201 from the electronic device may act as stress on the element body 203 from a solder fillet formed at the solder-mounting, through the external electrode 205. In this case, a crack may occur in the element body 203. The External force tends to act on a region defined by a part of the principal surface 203*a*, a part of the end surface 203*e*, and a part of each of the pair of side surfaces 203*c*, in the element body 203. In the multilayer capacitor C201, the second electrode layer E2 (second electrode layer E2 included in the electrode portions 205*a*, 203*c*, and 205*e*) is formed to continuously cover only the part of the principal surface 203*a*, only the part of the end surface 203*e*, and only the part of each of the pair of side surfaces 203*c*. Therefore, the external force applied onto the multilayer capacitor C201 from the electronic device tends not to act on the element body 203. Consequently, in the multilayer capacitor C201, occurrence of a crack in the element body 203 is suppressed.

A region between the element body 203 and the second electrode layer E2 may act as a path through which moisture infiltrates. In a case in which moisture infiltrates from the region between the element body 203 and the second electrode layer E2, durability of the multilayer capacitor C201 decreases. The multilayer capacitor C201 includes few paths through which moisture infiltrates, as compared with a multilayer capacitor in which the second electrode layer E2*r* is formed to continuously cover the entire end surface 203*e*, a part of each of the pair of principal surface 203*a* and 203*b*, and a part of each of the pair of side surfaces 203*c*. Therefore, in the multilayer capacitor C201, moisture resistance reliability is improved.

The multilayer capacitor C201 includes the plurality of internal electrodes 207 and 209 exposed to the respective end surfaces 203. The external electrodes 205 include the first electrode layer E1 (first electrode layer E1 included in the electrode portion 205*e*) formed on the end surface 203*e* to be connected to the respective internal electrodes 207 and 209. In this case, the external electrodes 205 (first electrode layer E1) and the internal electrodes 207 and 209 that correspond to each other are favorably in contact with each other. Therefore, the external electrodes 205 and the internal electrodes 207 and 209 that correspond to each other are reliably electrically connected to each other.

In the multilayer capacitor C201, the first electrode layer E1 (first electrode layer E1 included in the electrode portion 205*e*) includes the region covered with the second electrode layer E2 (second electrode layer E2 included in the electrode portion 205*e*) and the region not covered with the second electrode layer E2 (second electrode layer E2 included in the electrode portion 205*e*). Electric resistance of the second electrode layer E2 is larger than electric resistance of the first electrode layer E1. The region, in the first electrode layer E1, not covered with the second electrode layer E2 is electrically connected to the electronic device without passing through the second electrode layer E2. Therefore, in the multilayer capacitor C201, an increase in ESR is suppressed, even in a case in which the external electrode 205 includes the second electrode layer E2.

In the multilayer capacitor C201, the first electrode layer E1 is also formed on the ridge portion 203*i* and the ridge portion 203*g*. Bonding strength between the second electrode layer E2 and the element body 203 is smaller than bonding strength between the second electrode layer E2 and the first electrode layer E1. In multilayer capacitor C201, the first electrode layer E1 is formed on the ridge portion 203*i* and the ridge portion 203*g*. Therefore, even in a case in which the second electrode layer E2 peels off from the element body 203, the peel-off of the second electrode layer E2 tends not to develop to a position corresponding to the end surface 203*e* beyond a position corresponding to the ridge portion 203*i* and ridge portion 203*g*.

In the multilayer capacitor C201, the second electrode layer E2 (second electrode layer E2 included in the electrode portions 205*a* and 205*c*) is formed to cover a part of the portion of the first electrode layer E1 formed on the ridge portion 203*i* (first electrode layer E1 included in the region $\mathbf{205}c_2$) and an entirety of the portion of the first electrode layer E1 formed on the ridge portion 203*g*. In this configuration, the peel-off of the second electrode layer E2 further tends not to develop to the position corresponding to the end surface 203*e*.

The Stress acting on the element body due to the external force applied onto the multilayer capacitor C201 from the electronic device tends to concentrate on the end edge of the first electrode layer E1. A crack may occur in the element body 203 with the end edge of the first electrode layer E1 serving as an origination. In the multilayer capacitor C201, the second electrode layer E2 is formed to cover the part of the portion of the first electrode layer E1 formed on the ridge portion 203*i* (first electrode layer E1 included in the region $\mathbf{205}c_2$) and the entirety of the portion of the first electrode layer E1 formed on the ridge portion 203*g*. Therefore, the stress tends not to concentrate on the end edge of the first electrode layer E1. Consequently, in the multilayer capacitor C201, the occurrence of the crack in the element body 203 is reliably suppressed.

In the multilayer capacitor C201, when viewed from the third direction D202, the area of the region located on the side surface 203*c* and ridge portion 203*i* in the second electrode layer E2 is larger than the area of the region located on the ridge portion 203*i* in the first electrode layer E1. When viewed from the third direction D203, the area of the region located on the end surface 203*e* and ridge portion 203*g* in the second electrode layer E2 is smaller than the area of the region located on the end surface 203*e* and ridge portion 203*g* in the first electrode layer E1. In this case, the increase in ESR is further suppressed.

In the multilayer capacitor C201, the part of the portion of the first electrode layer E1 formed on the ridge portion 203*i* is exposed from the second electrode layer E2. For example, the first electrode layer E1 included in the region $\mathbf{205}_{c1}$ is exposed from the second electrode layer E2. In the present embodiment, the area of the region located on the side surface 203*c* and ridge portion 203*i* in the second electrode layer E2 is larger than an area of the part of the portion of the first electrode layer E1 formed on the ridge portion 203*i*. In this case, the increase in ESR is further suppressed.

In the multilayer capacitor C201, the area of the region located on the end surface 203*e* and ridge portion 203*g* in the second electrode layer E2 is smaller than an area of the region exposed from the second electrode layer E2 in the region located on the end surface 203*e* and ridge portion 203*g* in the first electrode layer E1. In this case, the increase in ESR is further suppressed.

In the multilayer capacitor C201, the external electrode 205 includes the third electrode layer E3 and fourth electrode layer E4. The third electrode layer E3 and fourth electrode layer E4 are formed to cover the second electrode layer E2 and on the region of the first electrode layer E1 exposed from the second electrode layer E2. The external electrode 205 includes the third electrode layer E3 and fourth electrode layer E4, and thus the multilayer capacitor C201 can be solder-mounting on the electronic device. The region of the first electrode layer E1 exposed from the second electrode layer E2 is electrically connected to the electronic device via the third electrode layer E3 and fourth electrode layer E4. Therefore, in the multilayer capacitor C201, the increase in ESR is further suppressed.

In the multilayer capacitor C201, when viewed from the third direction D203, the height H2 of the second electrode layer E2 is a half of the height H1 of the element body 203, or less. The multilayer capacitor C201 includes few paths through which moisture infiltrates, as compared with a configuration in which the height H2 of the second electrode layer E2 is higher than a half of the height H1 of the element body 203 when viewed from the third direction D203. Therefore, in the multilayer capacitor C201, the moisture resistance reliability is further improved. In the multilayer capacitor C201, the increase in ESR is suppressed, as compared with in the configuration in which the height H2 of the second electrode layer E2 is higher than a half of the height H1 of the element body 203 when viewed from the third direction D203.

In the multilayer capacitor C201, the principal surface 203*b* of the element body 203 is exposed from the second electrode layer E2. In the multilayer capacitor C201, the increase in ESR is suppressed.

In the multilayer capacitor C201, the second electrode layer E2 is in contact with a part of the ridge portion 203*j*. Therefore, a crack tends not to occur in the part of the ridge portion 203*j*. The second electrode layer E2 reliably covers the first electrode layer E1, and thus the second electrode layer E2 relieves stress acting on the first electrode layer E1.

In the present embodiment, the multilayer capacitor C201 also has the following operations and effects.

In the multilayer capacitor C201, when viewed from the first direction D201, the first electrode layer E1 (first electrode layer E1 included in the electrode portion 205*a*) is entirely covered with the second electrode layer E2. Therefore, the stress tends not to concentrate on the end edge of the first electrode layer E1 included in the electrode portion 205*a*. When viewed from the second direction D202, the end region near the principal surface 203*a* of the first electrode layer E1 (first electrode layer E1 included in the region 205$c_2$) is covered with the second electrode layer E2. Therefore, the stress tends not to concentrate on the end edge of the first electrode layer E1 included in the region 205$c_2$. Consequently, in the multilayer capacitor C201, occurrence of a crack in the element body 203 is suppressed.

In the multilayer capacitor C201, when viewed from the second direction D202, the end edge E2*e* of the second electrode layer E2 crosses the end edge E1*e* of the first electrode layer E1. The entirety of the first electrode layer E1 is not covered with the second electrode layer E2. The first electrode layer E1 includes the region exposed from the second electrode layer E2. Therefore, in the multilayer capacitor C201, an increase in an amount of conductive resin paste used for forming the second electrode layer E2 is suppressed.

The electric resistance of the second electrode layer E2 is larger than the electric resistance of the first electrode layer E1. In the region 205$e_1$ included in the electrode portion 205*e*, the first electrode layer E1 is exposed from the second electrode layer E2. The region 205$e_1$ does not include the second electrode layer E2. At the region 205$e_1$, the first electrode layer E1 is electrically connected to the electronic device without passing through the second electrode layer E2. Therefore, in the multilayer capacitor C201, an increase in ESR is suppressed.

The region 205$c_2$ included in the electrode portion 205*c* includes the second electrode layer E2. Therefore, even in a case in which the external electrode 205 includes the electrode portion 205*c*, the stress tends not to concentrate on the end edge of the external electrode 205. The end edge of the external electrode 205 tends not to serve as an origination of a crack. Consequently, in the multilayer capacitor C201, the occurrence of the crack in the element body 203 is reliably suppressed.

The region 205$e_2$ included in the electrode portion 205*e* includes the second electrode layer E2. Therefore, even in a case in which the external electrode 205 includes the electrode portion 205*e*, the stress tends not to concentrate on the end edge of the external electrode 205. Consequently, in the multilayer capacitor C201, the occurrence of the crack in the element body 203 is reliably suppressed.

In the multilayer capacitor C201, the width of the region 205$c_2$ in the third direction D203 decreases with the increase in distance from the principal surface 203*a*. The width of the second electrode layer E2 viewed from the second direction D202 decreases with the increase in distance from the principal surface 203*a*. Therefore, the occurrence of the crack in the element body 203 is suppressed, and the increase in the amount of conductive resin paste used for forming the second electrode layer E2 is further suppressed.

In the present embodiment, the multilayer capacitor C201 also has the following operations and effects.

In a case in which the multilayer capacitor C201 is solder-mounted on the electronic device, the external force also tends to act on the element body 203 through the region near the principal surface 203*a* in the end surface 203*e*. In the multilayer capacitor C201, the second electrode layer E2 (second electrode layer E2 included in the electrode portion 205*e*) is formed to cover the portion near the principal surface 203*a* in the end surface 203*e*. Therefore, the external force applied onto the multilayer capacitor C201 from the electronic device tends not to act on the element body 203. Consequently, the occurrence of the crack in the element body 203 is suppressed.

In the multilayer capacitor C201, the second electrode layer E2 (second electrode layer E2 included in the electrode portion 205*e*) is formed to cover the portion near the principal surface 203*a* in the end surface 203*e*. Therefore, the end surface 203*e* includes the region not covered with the second electrode layer E2, when viewed from the third direction D203. The multilayer capacitor C201 includes few paths through which moisture infiltrates, as compared with a multilayer capacitor in which the second electrode layer E2*r* is formed to cover the entire end surface 203*e*. Consequently, in the multilayer capacitor C201, the moisture resistance is improved.

In the multilayer capacitor C201, the principal surface 203*a* is arranged to constitute the mounting surface, and the plurality of internal electrodes 207 and 209. Therefore, in the multilayer capacitor C201, a current path formed for each of the internal electrodes 207 and 209 is short, and ESL is low.

In the multilayer capacitor C201, when viewed from the third direction D203, the one end of each of the internal electrodes 207 and 209 includes the regions 207*a* and 209*a* and the regions 207*b* and 209*b*. Also in this case, there are few paths through which moisture infiltrates. Therefore, in the multilayer capacitor C201, the moisture resistance reliability is improved.

In the multilayer capacitor C201, each length $L_{ia}$ of the regions 207*a* and 209*a* in the first direction D201 is smaller than each length $L_{ib}$ of the regions 207*b* and 209*b* in the first direction D201. In this case, there are fewer paths through which moisture infiltrates. Therefore, in the multilayer capacitor C201, the moisture resistance reliability is further improved.

In the multilayer capacitor C201, the external electrodes 205 include the first electrode layer E1 formed on the end surface 203*e* to be connected to the respective internal electrodes 207 and 209. In this case, the external electrodes 205 (first electrode layer E1) and the internal electrodes 207 and 209 that correspond to each other are favorably in contact with each other. Therefore, the external electrodes 205 and the internal electrodes 207 and 209 that correspond to each other are reliably electrically connected to each other. The electric resistance of the second electrode layer E2 is larger than the electric resistance of the first electrode layer E1. In a case in which the external electrodes 205 include the first electrode layer E1 connected to the respective internal electrodes 207 and 209, the first electrode layer E1 is electrically connected to the electronic device without passing through the second electrode layer E2. Therefore, in the multilayer capacitor C201, even in a case in which the external electrode 205 includes the second electrode layer E2, the increase in ESR is suppressed.

In the multilayer capacitor C201, the regions 207*b* of all the internal electrodes 207 and the regions 209*b* of all the internal electrodes 209 is connected with the respective first electrode layer E1. Therefore, in the multilayer capacitor C201, the increase in ESR is further suppressed.

In the multilayer capacitor C201, the external electrode 205 includes the third electrode layer E3 and fourth electrode layer E4. The third electrode layer E3 and fourth electrode layer E4 are formed to cover the second electrode layer E2 and the first electrode layer E1 (region of the first electrode layer E1 exposed from the second electrode layer E2). The external electrode 205 includes the third electrode layer E3 and fourth electrode layer E4. Therefore, the multilayer capacitor C201 can be solder-mounting on the electronic device. The first electrode layer E1 is electrically connected to the electronic device via the third electrode layer E3 and fourth electrode layer E4. Therefore, in the multilayer capacitor C201, the increase in ESR is further suppressed.

In the multilayer capacitor C201, when viewed from the second direction D203, the end edge E2*e* of the second electrode layer E2 crosses the one end of each of the internal electrodes 207 and 209. Also in this case, there are few paths through which moisture infiltrates. Therefore, in the multilayer capacitor C201, the moisture resistance reliability is reliably improved.

In the multilayer capacitor C201, the second electrode layer E2 is formed to cover the portion near the end surface 203*e* in the principal surface 203*a*. The external force applied onto the multilayer capacitor C201 from the electronic device also tends to act on the element body 203 through the region near the end surface 203*e* in the principal surface 203*a*. Therefore, in the multilayer capacitor C201, the occurrence of the crack in the element body 203 is reliably suppressed.

In the multilayer capacitor C201, the second electrode layer E2 is formed to cover the portion near the end surface 203*e* in the side surface 203*c*. The external force applied onto the multilayer capacitor C201 from the electronic device also tends to act on the element body 203 through the region near the end surface 203*e* in the side surface 203*c*. Therefore, in the multilayer capacitor C201, the occurrence of the crack in the element body 203 is reliably suppressed.

In the multilayer capacitor C201, the second electrode layer E2 located on the side surface 203*c* opposes the internal electrode 207 or 209 having a polarity different from that of the second electrode layer E2, in the second direction D202. Therefore, capacitance component is formed between the second electrode layer E2 located on the side surface 203*c* and the internal electrode 207 or 209 opposing the second electrode layer E2. Consequently, in multilayer capacitor C201, electrostatic capacitance increases.

In the multilayer capacitor C201, the second electrode layer E2 is not formed on the principal surface 203*b*. In a case in which the multilayer capacitor C201 is mounted on an electronic device in such a manner that the principal surface 203*a* is arranged to constitute the mounting surface, the principal surface 203*b* needs to be picked up by a suction nozzle of a mounter. In the multilayer capacitor C201, a shape of the external electrode 205 on the principal surface 203*a* is different from a shape of the external electrode 205 on the principal surface 203*b*. Therefore, the principal surface 203*a* and the principal surface 203*b* are easily distinguished from each other. Consequently, the multilayer capacitor C201 is reliably mounted on the electronic device.

In the multilayer capacitor C201, the distance Gc is larger than the distances Ga and Gb. Therefore, in the multilayer capacitor C201, even in a case in which a crack occurs from the side surface 203*c* of the element body 203, the crack tends not to reach to the internal electrodes 207 and 209.

Figure 65:
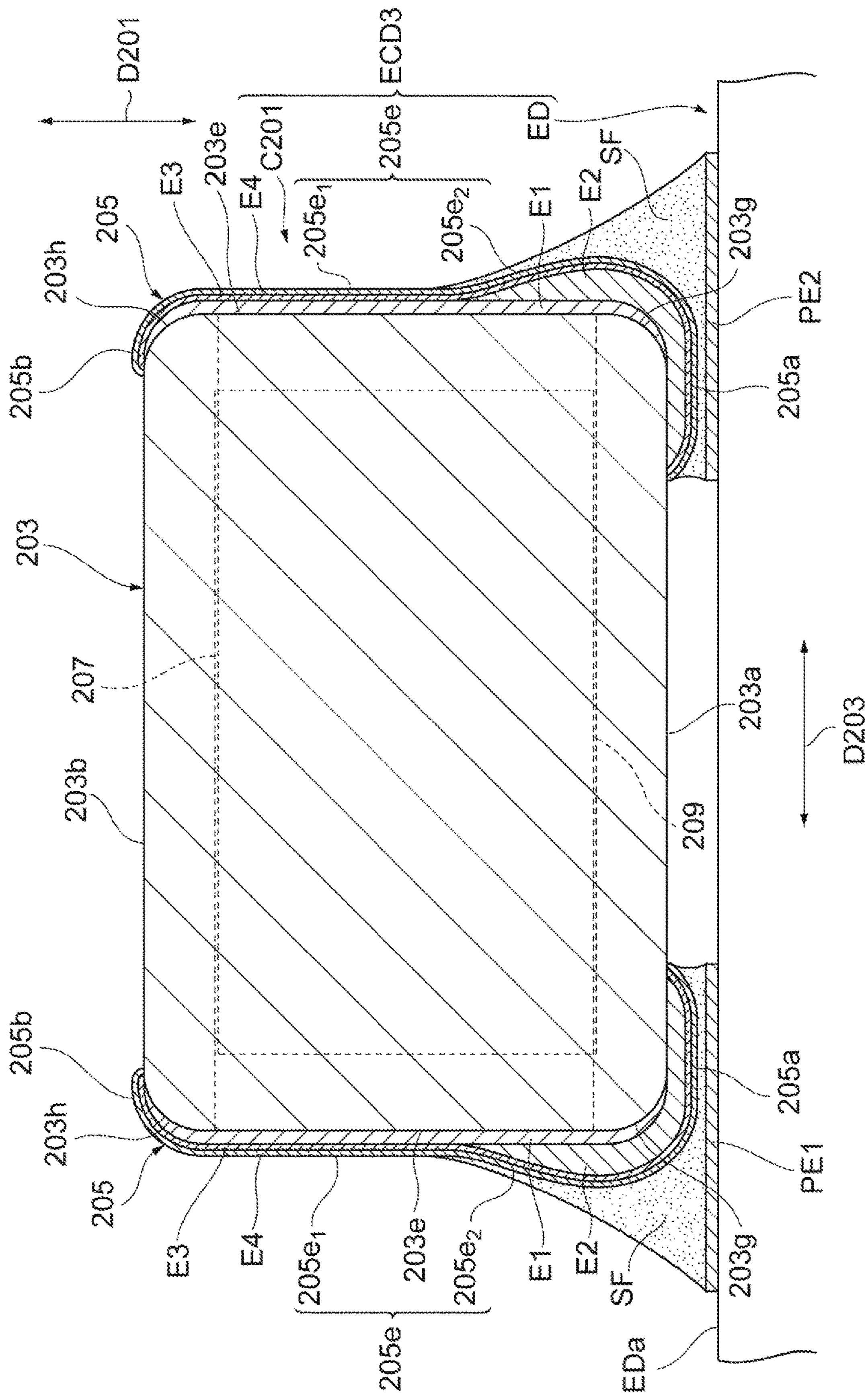
FIG. 65 is a view illustrating a mounted structure of the multilayer capacitor according to the ninth embodiment.

Next, a mounted structure of the multilayer capacitor C201 will be described with reference to FIG. 65. FIG. 65 is a view illustrating a mounted structure of the multilayer capacitor according to the ninth embodiment.

As illustrated in FIG. 65, an electronic component device ECD3 includes the multilayer capacitor C201 and an electronic device ED. The electronic device ED includes, for example, a circuit board or an electronic component. The multilayer capacitor C201 is solder-mounted on the electronic device ED. The electronic device ED includes a principal surface EDa and tow pad electrodes PE1 and PE2. Each of the pad electrodes PE1 and PE2 is disposed on the principal surface EDa. The two pad electrodes PE1 and PE2 are separated from each other. The multilayer capacitor C201 is disposed on the electronic device ED in such a manner that the principal surface 203*a* that is the mounting surface and the principal surface EDa oppose each other.

In a case in which the multilayer capacitor C201 is solder-mounted, molten solder wets to the external electrodes 205 (fourth electrode layers E4). Solder fillets SF are formed on the external electrodes 205 by solidification of the wet solder. The external electrodes 205 and the pad electrodes PE101, PE102, and PE103 that correspond to each other are coupled via the solder fillets SF.

The solder fillet SF is formed on the region 205$e_1$ and region 205*e*, of the electrode portion 205*e*. In addition to the region 205$e_2$, the region 205$e_1$ that does not include the second electrode layer E2 is also coupled to the corresponding pad electrode PE1 or PE2 via the solder fillet SF. When viewed from the third direction D203, the solder fillet SF overlaps with the region 205$e_1$ included in the electrode portion 205*e* (first electrode layer E1 included in the region 205$e_1$). Although illustration is omitted, the solder fillet SF is also formed on the region 205$c_1$ and region 205$c_2$ of the electrode portion 205*c*. A height of the solder fillet SF in the first direction D201 is larger than a height of the second electrode layer E2. The solder fillet SF extends closer to the principal surface 203*b* beyond the end edge E2*e* of the second electrode layer E2 in the first direction D201.

In the electronic component device ECD3, occurrence of a crack in the element body 103 is suppressed and moisture resistance reliability is improved as described above. In the electronic component device ECD3, when viewed from the third direction D203, the solder fillet SF overlaps with the region 205*e*$_1$ included in the electrode portion 205*e*, and thus an increase in ESR is suppressed, even in a case in which the external electrode 205 includes the second electrode layer E2. In the electronic component device ECD3, ESL is low as described above.

Figure 66:
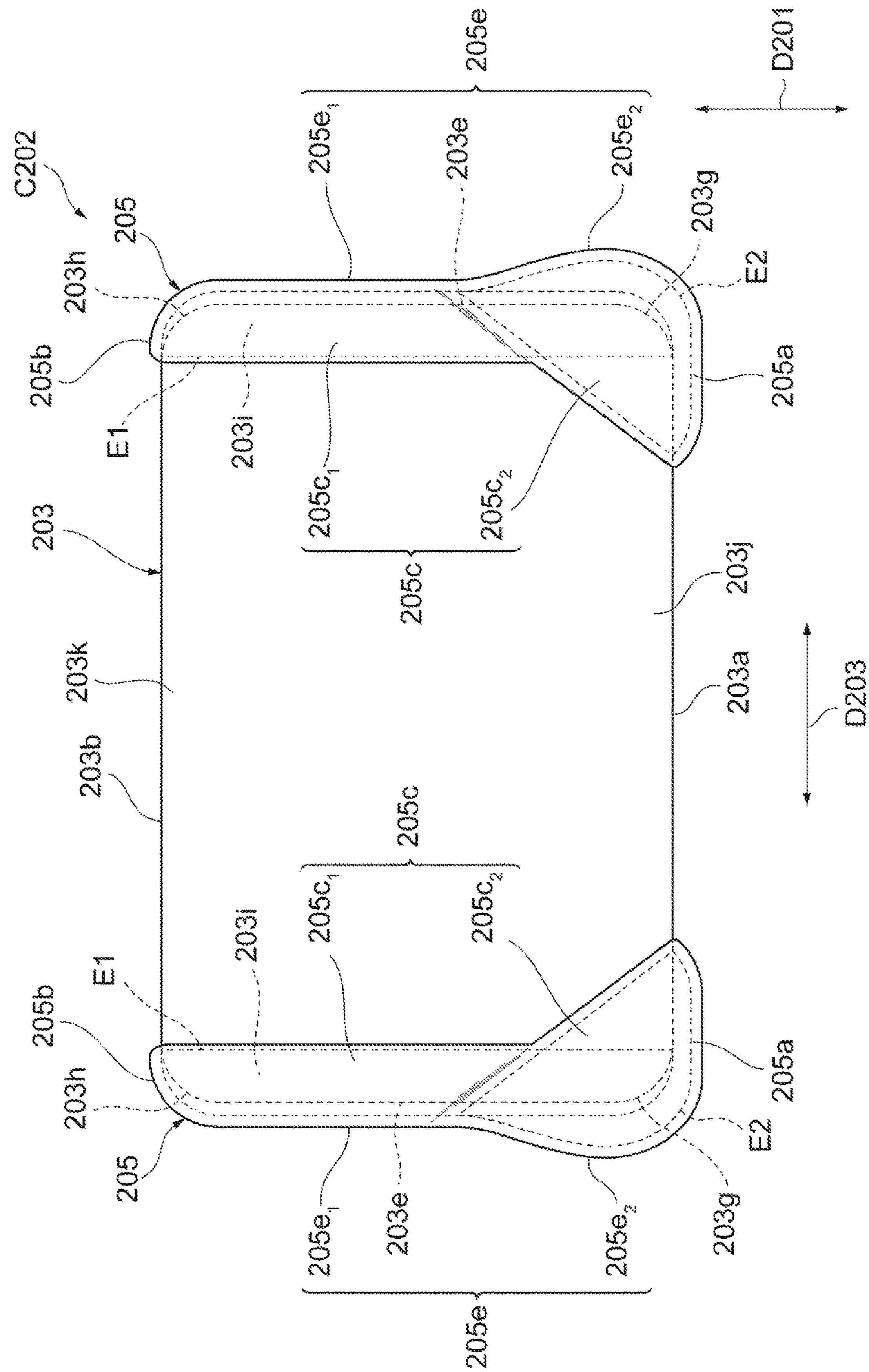
FIG. 66 is a side view of a multilayer capacitor according to a modification of the ninth embodiment.
Figure 67:
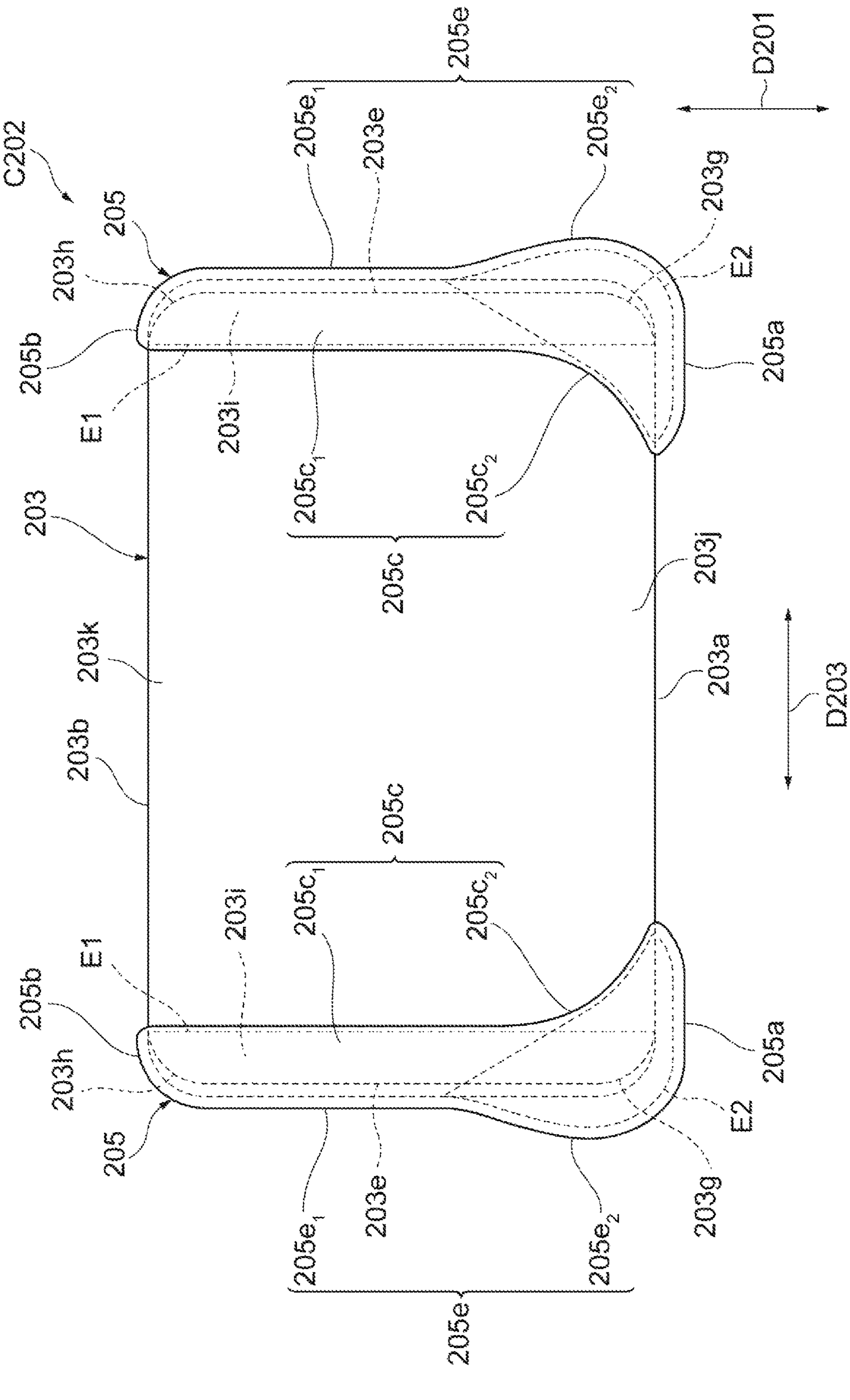
FIG. 67 is a side view of a multilayer capacitor according to a modification of the ninth embodiment.
Figure 68:
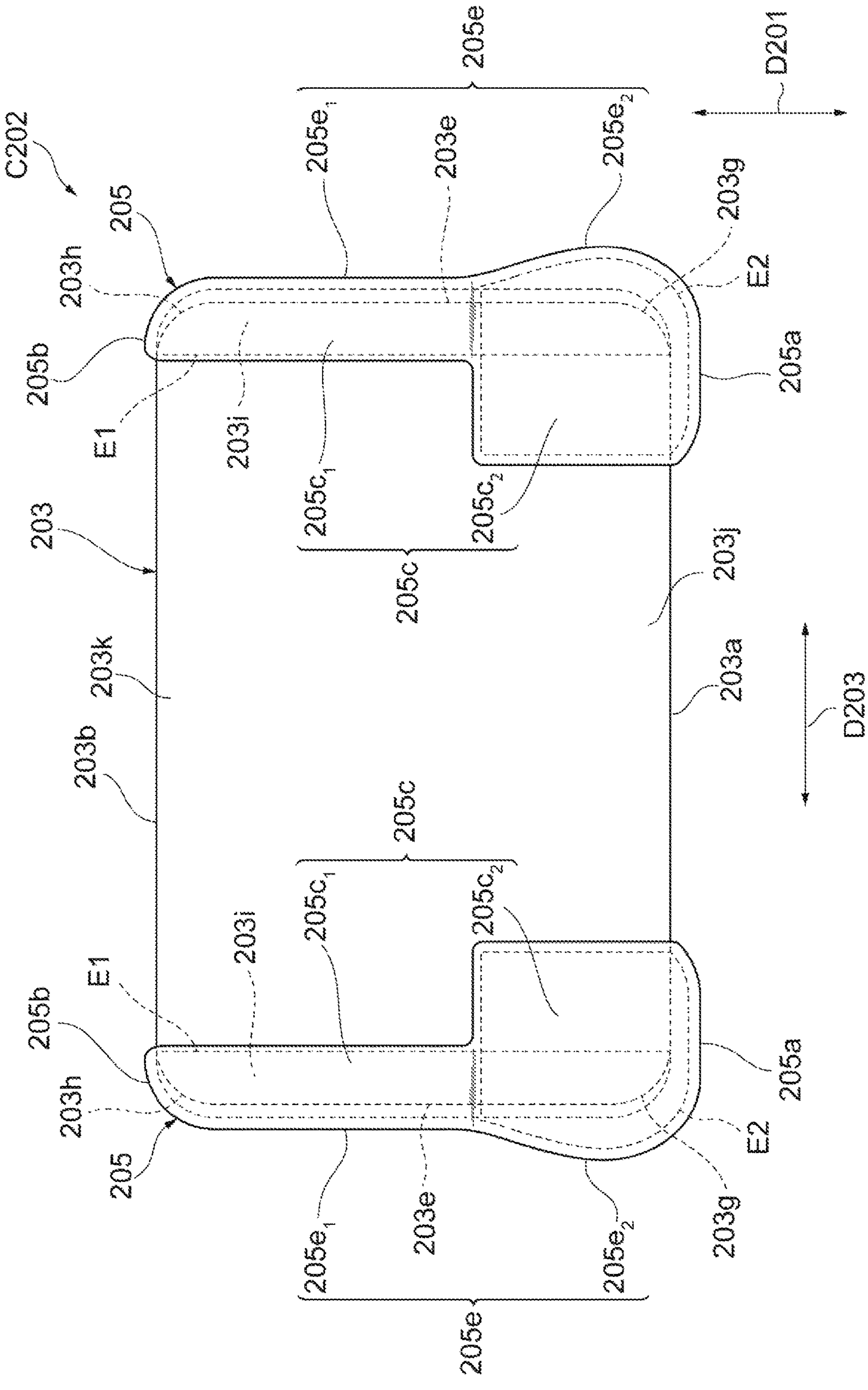
FIG. 68 is a side view of a multilayer capacitor according to a modification of the ninth embodiment.

Next, configurations of multilayer capacitors C202 according to modifications of the ninth embodiment will be described with reference to FIGS. 66 to 68. FIGS. 66 to 68 are side views of multilayer capacitors according to the present modifications.

As with the multilayer capacitor C201, the multilayer capacitor C202 includes the element body 3, the pair of external electrodes 5, the plurality of internal electrodes 7 (not illustrated), and the plurality of internal electrodes 9 (not illustrated). In the multilayer capacitor C202, a shape of the region 205*c*$_2$ (second electrode layer E2 included in the region 205*c*$_2$) is different from that of the multilayer capacitor C201.

As is the case in the multilayer capacitor C201, in the multilayer capacitors C202 illustrated in FIGS. 66 and 67, the width of the region 205*c*, in the third direction D203 decreases with the increase in distance from the electrode portion 205*a*. The width of the second electrode layer E2 viewed from the second direction D202 decreases with the increase in distance from the electrode portion 205*a*. When viewed from the second direction D202, the length of the second electrode layer E2 in the first direction D201 decreases with the increase in distance from the principal surface 203*e* in the third direction D203. When viewed from the second direction D202, the length, of the portion located on the side surface 203*c* of the second electrode layer E2, in the first direction D201 decreases with the increase in distance from the end portion of the element body 203, in the third direction D203.

In the multilayer capacitor C202 illustrated in FIG. 66, the end edge of the region 205*c*$_2$ (end edge E2*e* of the second electrode layer E2) is approximately linear when viewed from the second direction D202. When viewed from the second direction D202, the region 205*c*$_2$ (second electrode layer E2 included in the region 205*c*$_2$) has an approximately triangle shape. In the multilayer capacitor C202 illustrated in FIG. 67, the end edge of the region 205*c*$_2$ (end edge E2*e* of the second electrode layer E2) has an approximately arc shape when viewed from the second direction D202.

In the multilayer capacitor C202 illustrated in FIG. 68, a width of the region 205*c*$_2$ (second electrode layer E2) in the third direction D203 is approximately equal in the first direction D201. When viewed from the second direction D202, the end edge of the region 205*c*$_2$ (end edge E2*e* of the second electrode layer E2) has a side edge extending in the third direction D203 and a side edge extending in the third direction D201. In the present modification, when viewed from the second direction D202, the region 205*c*$_2$ (second electrode layer E2 included in the region 205*c*$_2$) has an approximately rectangular shape.

Tenth Embodiment

Figure 69:
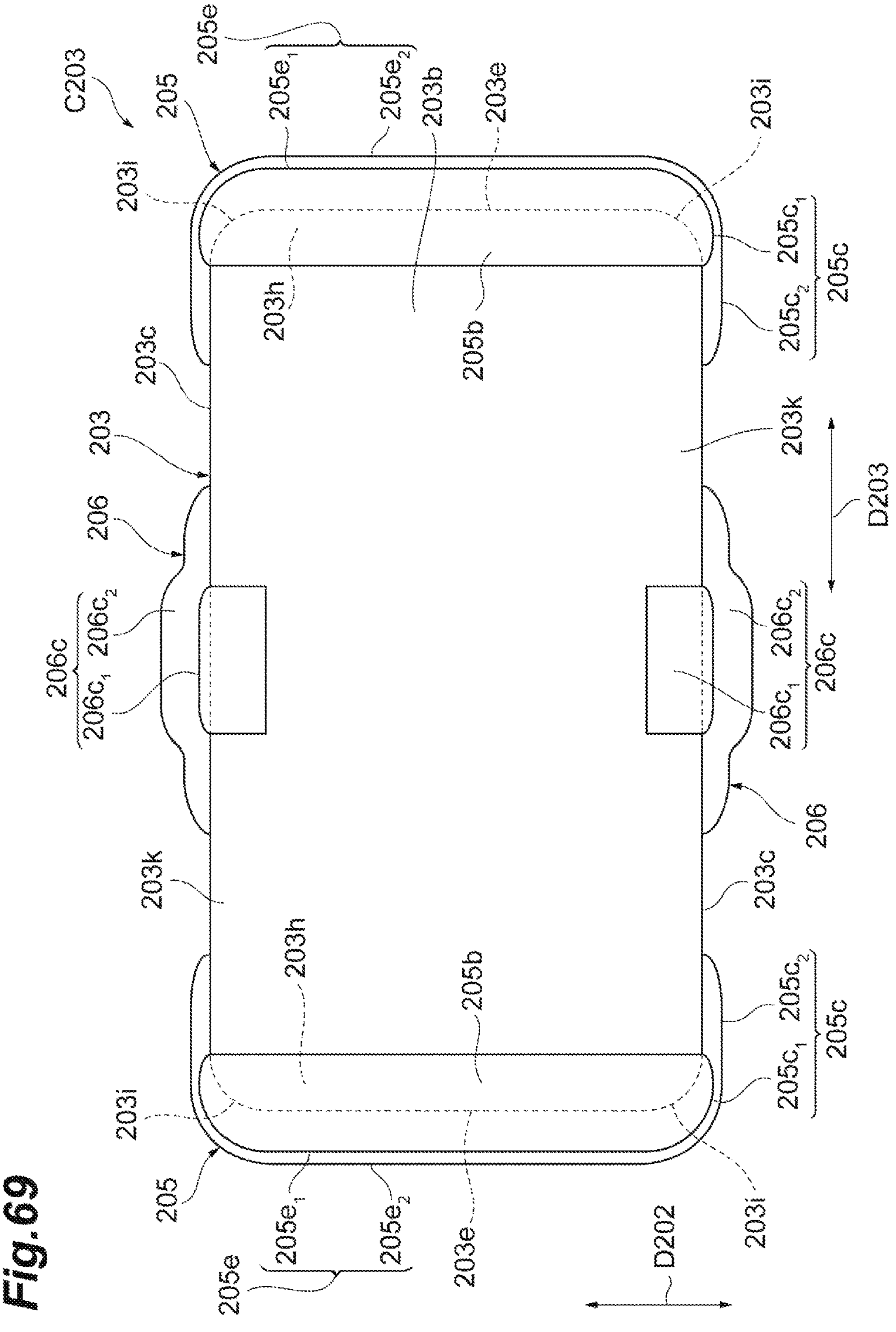
FIG. 69 is a plan view of a multilayer feedthrough capacitor according to a tenth embodiment.
Figure 70:
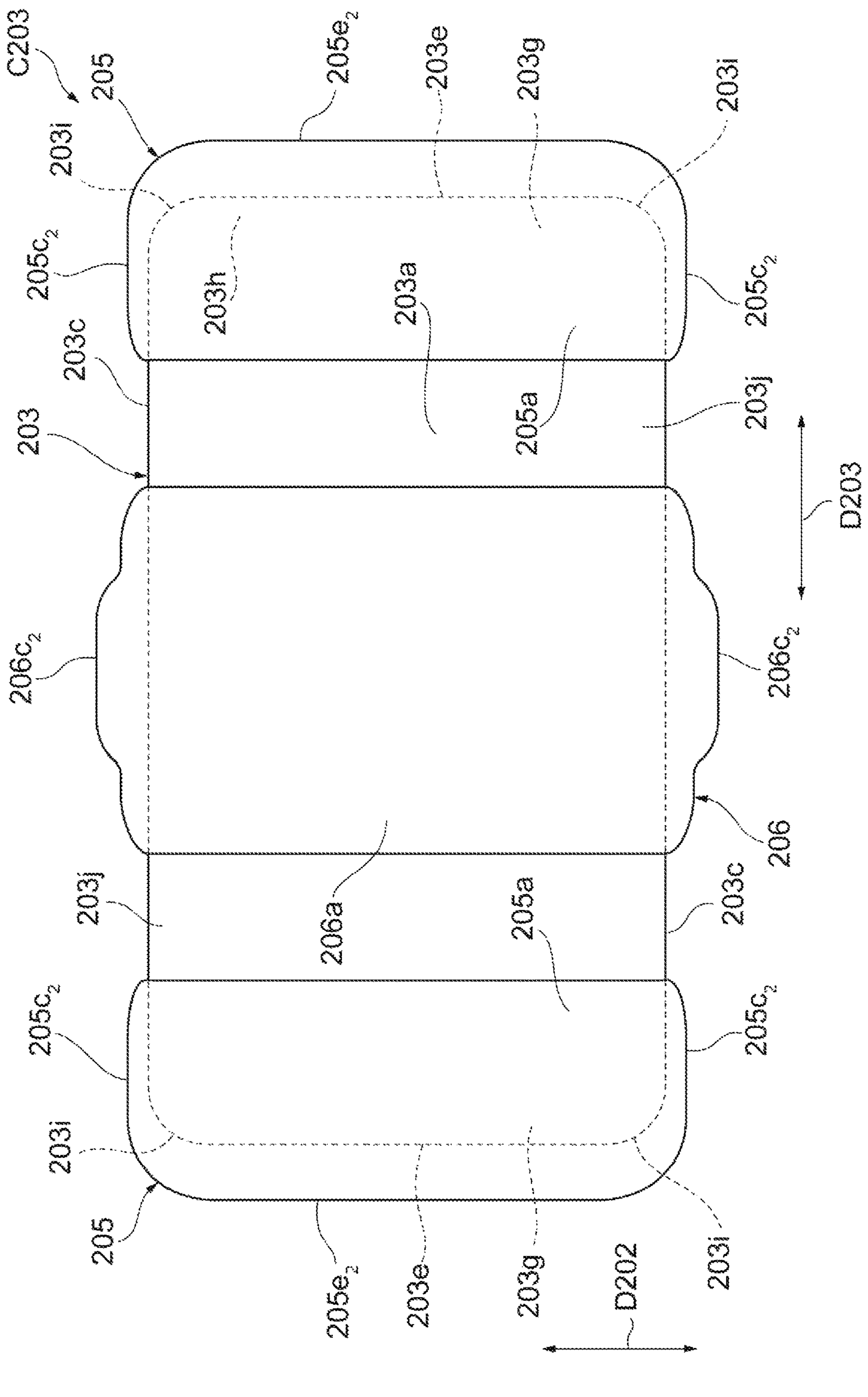
FIG. 70 is a plan view of the multilayer feedthrough capacitor according to the tenth embodiment.
Figure 71:
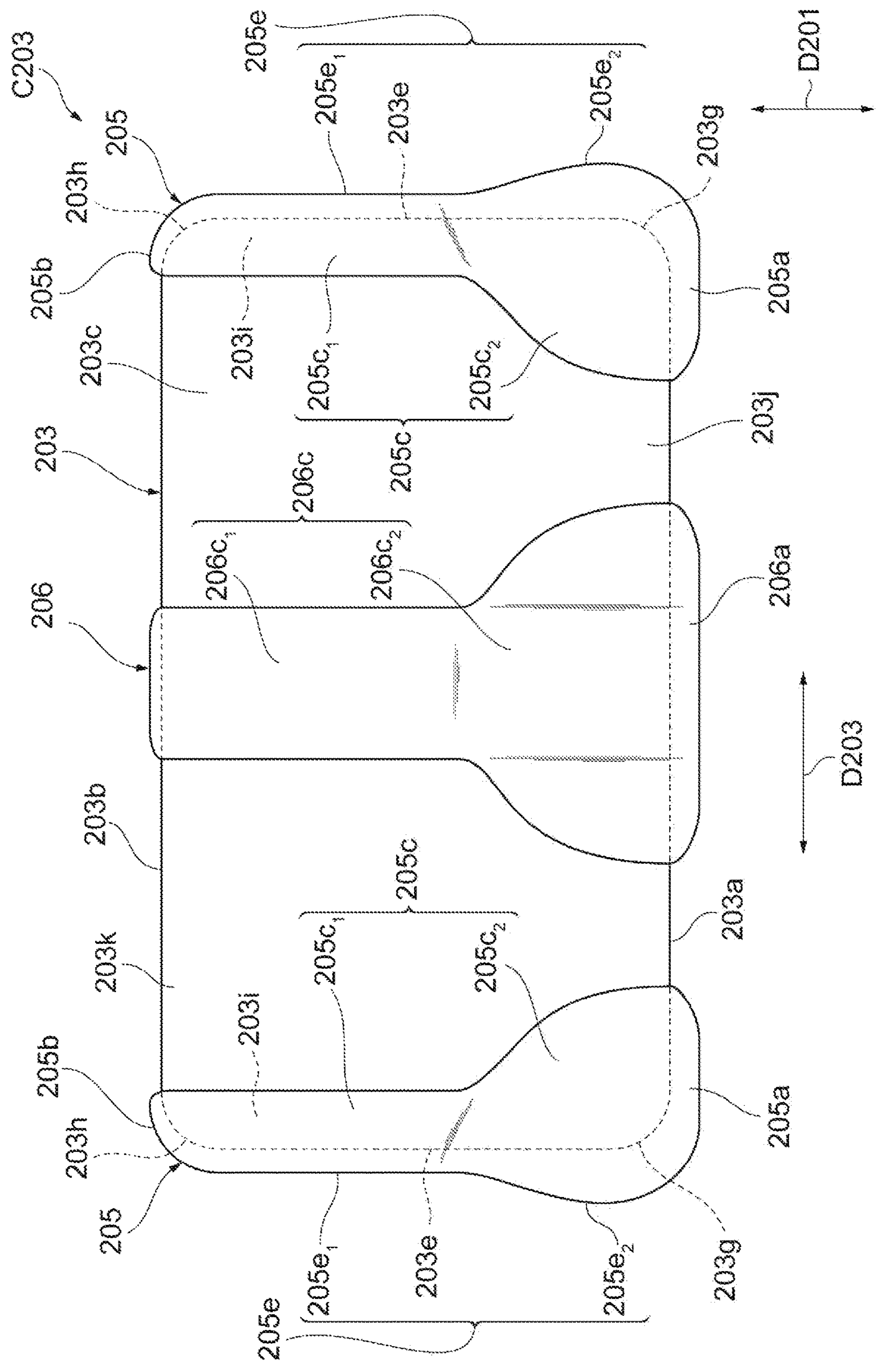
FIG. 71 is a side view of the multilayer feedthrough capacitor according to the tenth embodiment.
Figure 72:
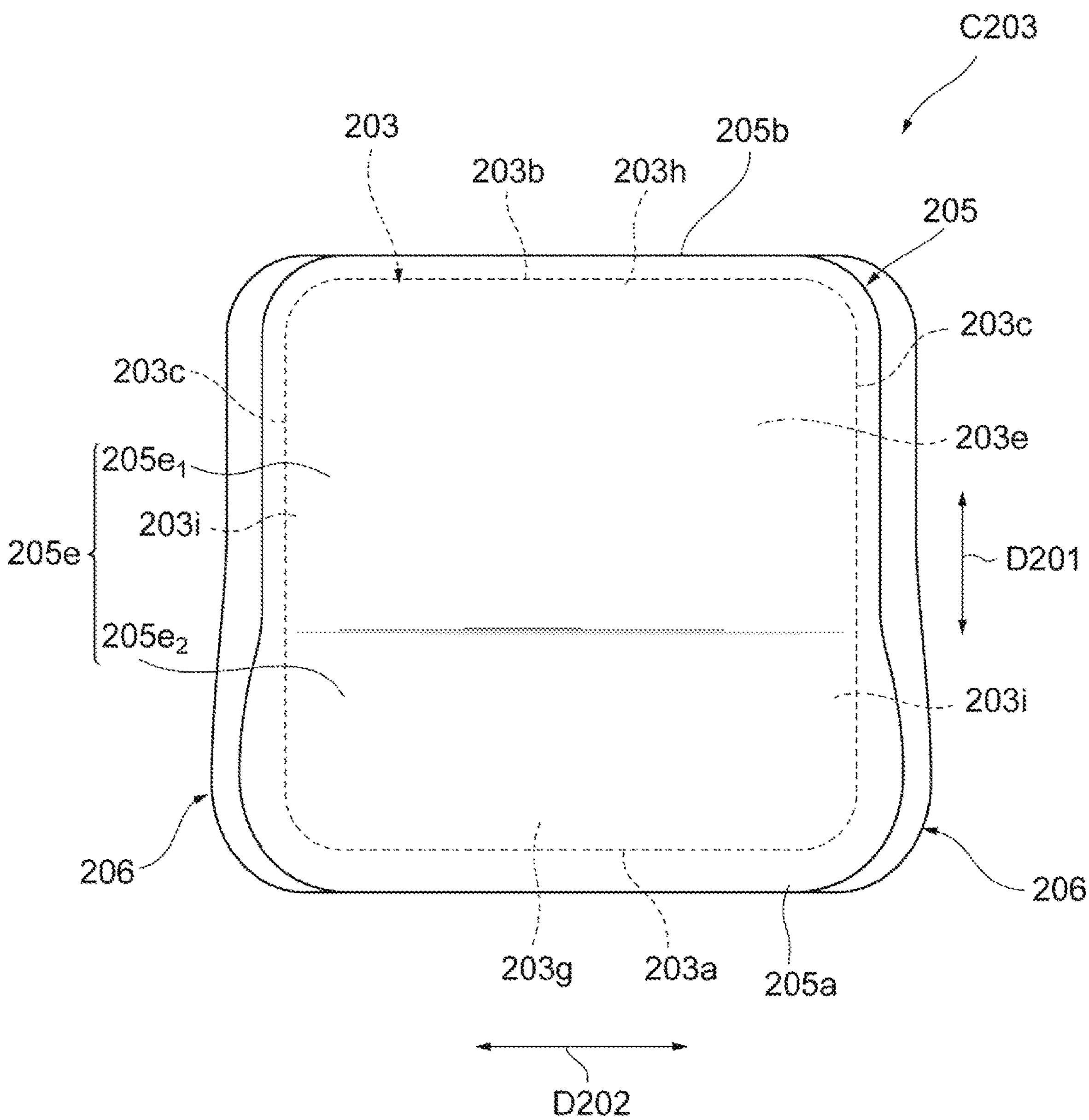
FIG. 72 is an end view of the multilayer feedthrough capacitor according to the tenth embodiment.
Figure 73:
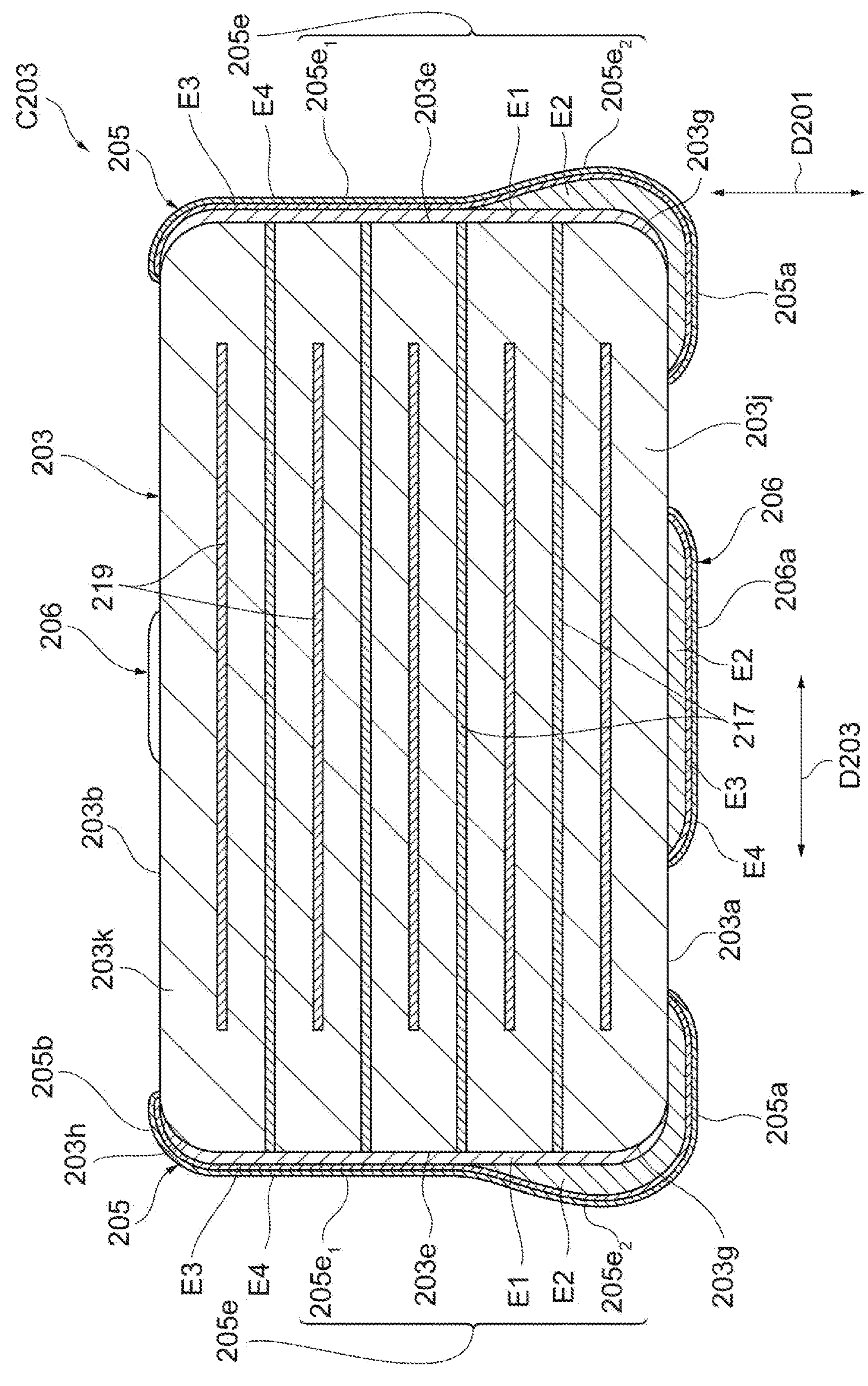
FIG. 73 is a view illustrating a cross-sectional configuration of the multilayer feedthrough capacitor according to the tenth embodiment.
Figure 74:
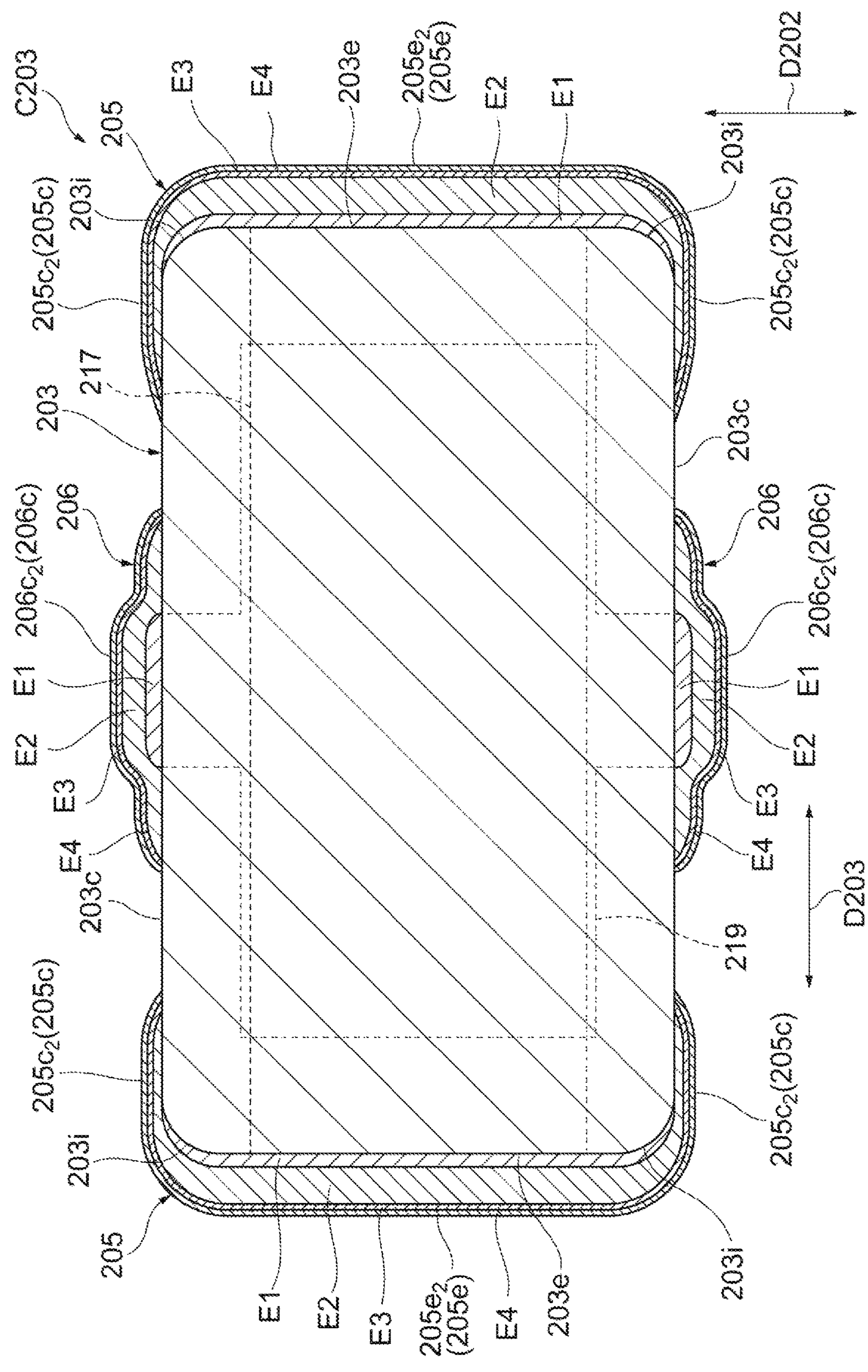
FIG. 74 is a view illustrating a cross-sectional configuration of the multilayer feedthrough capacitor according to the tenth embodiment.
Figure 75:
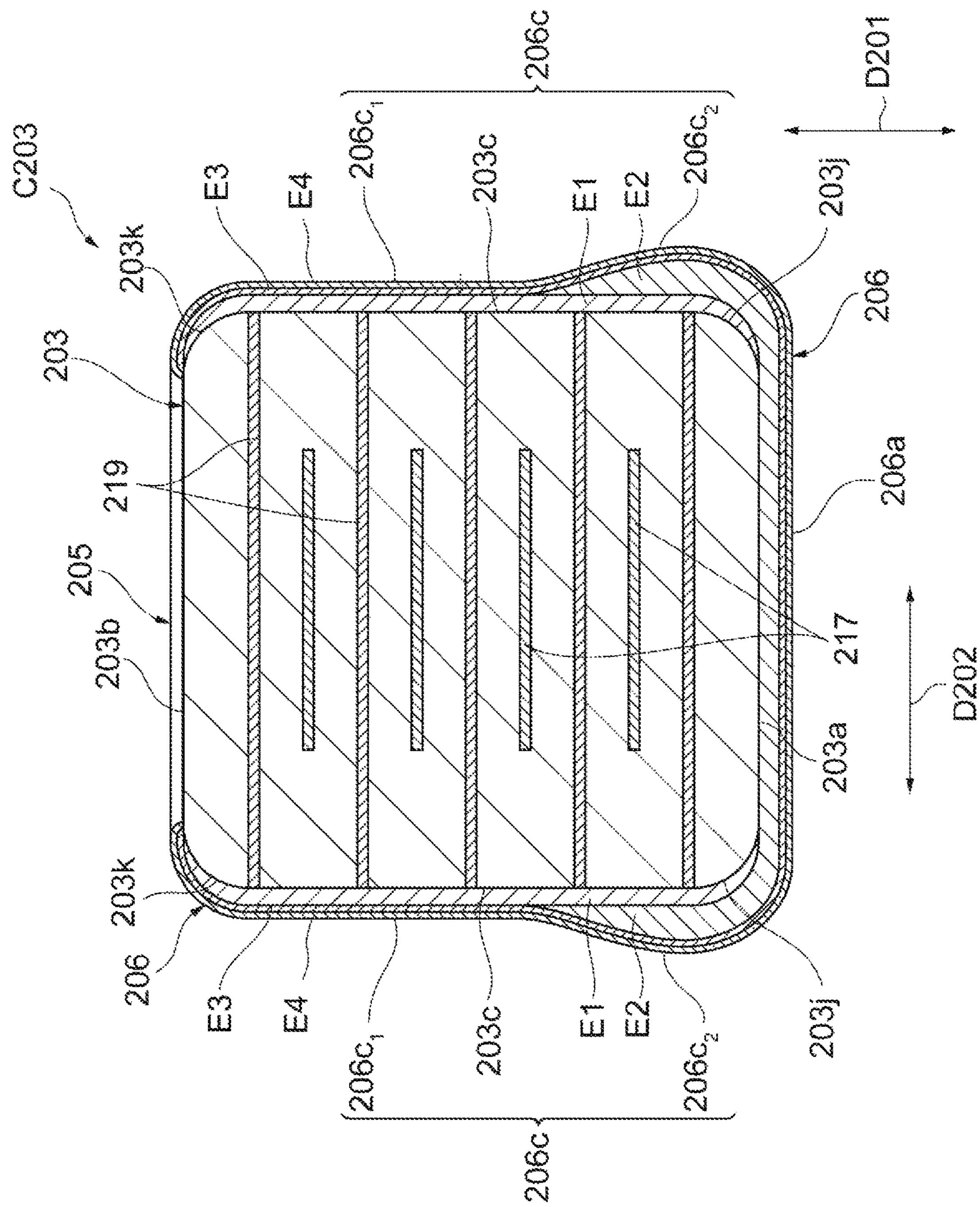
FIG. 75 is a view illustrating a cross-sectional configuration of the multilayer feedthrough capacitor according to the tenth embodiment.
Figure 76:
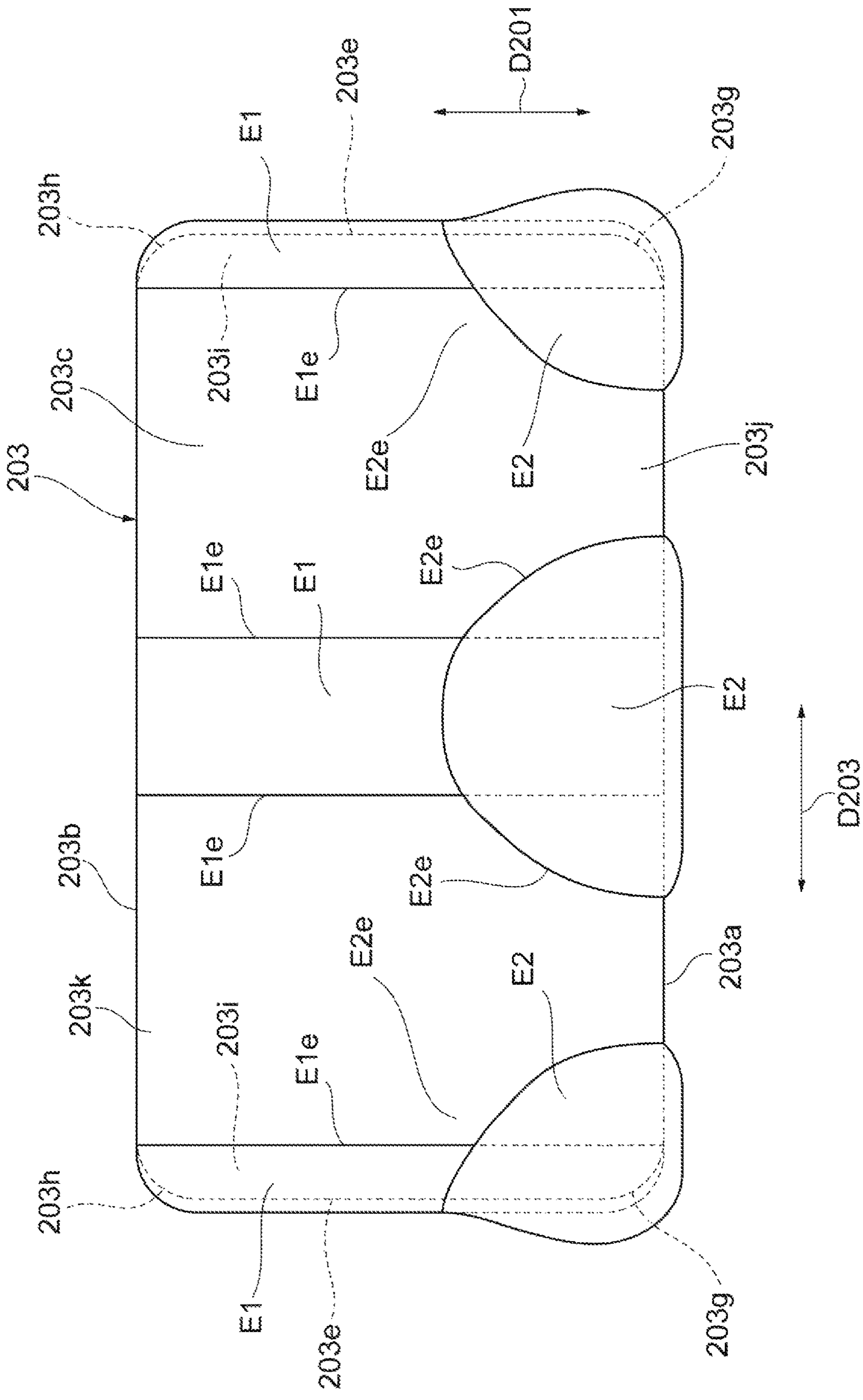
FIG. 76 is a side view illustrating an element body, a first electrode layer, and a second electrode layer.

A configuration of a multilayer feedthrough capacitor C203 according to a tenth embodiment will be described with reference to FIGS. 69 to 76. FIGS. 69 and 70 are plan views of a multilayer feedthrough capacitor according to the tenth embodiment. FIG. 71 is a side view of the multilayer feedthrough capacitor according to the tenth embodiment. FIG. 72 is an end view of the multilayer feedthrough capacitor according to the tenth embodiment. FIGS. 73, 74, and 75 are views illustrating a cross-sectional configuration of the multilayer feedthrough capacitor according to the tenth embodiment. FIG. 76 is a side view illustrating an element body, a first electrode layer, and a second electrode layer. In the tenth embodiment, an electronic component is, for example, the multilayer feedthrough capacitor C203.

As illustrated in FIGS. 69 to 72, the multilayer feedthrough capacitor C203 includes the element body 203, the pair of external electrodes 205, and an external electrodes 206. The pair of external electrodes 205 and the external electrode 206 are disposed on the outer surface of the element body 203. The pair of external electrodes 205 and the external electrode 206 are separated from each other. The pair of external electrodes 205 functions as, for example, signal terminal electrodes. The external electrode 206 functions as, for example, a ground terminal electrode. In the present embodiment, the element body 203 is configured by laminating a plurality of dielectric layers in the first direction D201.

As illustrated in FIGS. 73, 74, and 75, the multilayer feedthrough capacitor C203 includes a plurality of internal electrodes 217 and a plurality of internal electrodes 219. Each of the internal electrodes 217 and 219 is an internal conductor disposed in the element body 203. As with the internal electrodes 207 and 209, the internal electrodes 217 and 219 are made of a conductive material that is usually used as an internal electrode of a multilayer electronic component. Also in the tenth embodiment, the internal electrodes 207 and 209 are made of Ni.

The internal electrodes 217 and the internal electrodes 219 are disposed in different positions (layers) in the first direction D201. The internal electrodes 217 and the internal electrodes 219 are alternately disposed in the element body 203 to oppose each other in the first direction D201 with an interval therebetween. Polarities of the internal electrodes 217 and the internal electrodes 219 are different from each other. In a case in which the lamination direction of the plurality of dielectric layers is the second direction D202, the internal electrodes 217 and the internal electrodes 219 are disposed in different positions (layers) in the second direction D202. Both ends of the internal electrode 217 are exposed to the pair of end surfaces 203*e*. Both ends of the internal electrode 219 are exposed to the pair of side surfaces 203*c*.

As with the external electrodes 205 of the multilayer capacitor C201, the external electrodes 205 are disposed at both end portions of the element body 203 in the third direction D203. Each of the external electrodes 205 is disposed on a corresponding end surface 203*e* side of the element body 203. The external electrode 205 includes the electrode portions 205*a*, 205*b*, 205*c*, and 205*e*. The electrode portion 205*a* is disposed on the principal surface 203*a* and on the ridge portion 203*g*. The electrode portion 205*b* is disposed on the ridge portion 203*h*. The electrode portion 205*c* is disposed on each ridge portion 203*i*. The electrode portion 205*e* is disposed on the corresponding end surface 203*e*. The external electrode 205 also includes electrode portions disposed on the ridge portions 203*j*. The electrode portion 205*c* is also disposed on the side surface 203*c*. The electrode portion 205*e* covers all the ends exposed at the end surface 203*e* of the internal electrodes 217. The internal electrode 217 is directly connected to the electrode portion 205*e*. The internal electrode 217 is electrically connected to the pair of external electrodes 205.

The first electrode layer E1 included in the external electrode 205 is formed on the end surface 203*e* to be connected to the internal electrode 217. The first electrode layer E1 included in the external electrode 205 is formed to cover the entire end surface 203*e*, the entire ridge portion 203*g*, the entire ridge portion 203*h*, and the entire ridge portion 203*i*. The second electrode layer E2 included in the external electrode 205 is formed to continuously cover a part of the principal surface 203*a*, a part of the end surface 203*e*, and a part of each of the pair of side surfaces 203*c*. The second electrode layer E2 included in the external electrode 205 is formed to cover the entire ridge portion 203*g*, a part of the ridge portion 203*i*, and a part of the ridge portion 203*j*. The second electrode layer E2 included in the external electrode 205 includes portions each corresponding to the part of the principal surface 203*a*, the part of the end surface 203*e*, the part of each of the pair of side surfaces 203*c*, the entire ridge portion 203*g*, the part of the ridge portion 203*i*, and the part of the ridge portion 203*j*. The first electrode layer E1 included in the external electrode 205 is directly connected to the internal electrodes 217.

The first electrode layer E1 included in the external electrode 205 includes a region covered with the second electrode layer E2 and a region not covered with the second electrode layer E2. The third electrode layer E3 and fourth electrode layer E4 included in the external electrode 205 are formed to cover the region of the first electrode layer E1 not covered with the second electrode layer E2 and the second electrode layer E2. The second electrode layer E2 included in the external electrode 205 includes a portion located on the side surface 203*c*.

As illustrated in FIG. 76, in the multilayer feedthrough capacitor C203, a width of the region 205$c_2$ in the third direction D203 decreases with an increase in distance from the principal surface 203*a* (electrode portion 205*a*), as is the case in the multilayer capacitor C201. A width of the region 205$c_2$ in the first direction D201 decreases with an increase in distance from the end surface 203*e* (electrode portion 205*e*). In the present embodiment, an end edge of the region 205$c_2$ has an approximately arc shape when viewed from the second direction D202. The region 205$c_2$ has an approximately fan shape when viewed from the second direction D202. Also in the present embodiment, as illustrated in FIG. 6, the width of the second electrode layer E2 viewed from the second direction D202 decreases with an increase in distance from the principal surface 203*a*. When viewed from the second direction D202, a length of the second electrode layer E2 in the first direction D201 decreases with an increase in distance from the principal surface 203*e* in the third direction D203. When viewed from the second direction D202, a length, of the portion located on the side surface 203*c* of the second electrode layer E2, in the first direction D201 decreases with an increase in distance from the end portion of the element body 203, in the third direction D203. The end edge E2*e* of the second electrode layer E2 has an approximately arc shape.

The external electrode 206 is disposed on a central portion of the element body 203 in the third direction D203. The external electrode 206 is located between the pair of external electrodes 205. The external electrode 206 includes an electrode portion 206*a* and a pair of electrode portions 206*c*. The electrode portion 206*a* is disposed on the principal surface 203*a*. Each of the electrode portions 206*c* is disposed on the side surface 203*c* and on the ridge portions 203*j* and 203*k*. The external electrode 206 is formed on the three surfaces, that is, the principal surface 203*a* and the pair of side surfaces 203*c*, as well as on the ridge portions 203*j* and 203*k*. The electrode portions 206*a* and 206*c* adjacent each other are coupled and are electrically connected to each other. The electrode portion 206*c* covers all the ends exposed at the side surface 203*c* of the internal electrodes 219. The internal electrode 219 is directly connected to each electrode portion 206*c*. The internal electrode 219 is electrically connected to the one external electrode 206.

As illustrated in FIGS. 73, 74, and 75, the external electrode 206 also includes the first electrode layer E1, the second electrode layer E2, the third electrode layer E3, and the fourth electrode layer E4. The fourth electrode layer E4 is the outermost layer of the external electrode 206. The electrode portion 206*a* includes the second electrode layer E2, the third electrode layer E3, and the fourth electrode layer E4. Each of the electrode portions 206*c* includes the first electrode layer E1, the second electrode layer E2, the third electrode layer E3, and the fourth electrode layer E4.

The second electrode layer E2 included in the electrode portion 206*a* is disposed on the principal surface 203*a*. The electrode portion 206*a* does not include the first electrode layer E1. The second electrode layer E2 included in the electrode portion 206*a* is formed to cover a part of the principal surface 203*a*. The second electrode layer E2 included in the electrode portion 206*a* is in contact with the principal surface 203*a*. The third electrode layer E3 and fourth electrode layer E4 included in the electrode portion 206*a* is formed to cover the second electrode layer E2. The electrode portion 206*a* has a three-layer structure.

The first electrode layer E1 included in the electrode portion 206*c* is disposed on the side surface 203*c* and on each ridge portions 203*j* and 203*k*. The first electrode layer E1 included in the electrode portion 206*c* is formed to cover a part of the side surface 203*c*, a part of the ridge portion 203*j*, and a part of the ridge portion 203*k*. The second electrode layer E2 included in the electrode portion 206*c* is disposed on the first electrode layer E1, on the side surface 203*c*, and on the ridge portion 203*j*. The second electrode layer E2 included in the electrode portion 206*c* is formed to cover a part of the first electrode layer E1, a part of the side surface 203*c*, and a part of the ridge portion 203*j*. The part of the first electrode layer E1 is covered with the second electrode layer E2. In the electrode portion 206*c*, the part of the first electrode layer E1 is in contact with a part of the second electrode layer E2. The second electrode layer E2 included in the electrode portion 206*c* is in contact with the part of the side surface 203*c* and the part of the ridge portion 203*j*. The second electrode layer E2 included in the electrode portion 206*c* includes a portion located on the side surface 203*c*.

In the electrode portion 206*c*, regions covered with the first electrode layer E1 in the side surface 203*c* and ridge portion 203*j* is covered with the second electrode layer E2 with the first electrode layer E1 therebetween. The second electrode layer E2 included in the electrode portion 206*c* is formed to indirectly cover the part of the side surface 203*c* and the part of the ridge portion 203*j*. The second electrode layer E2 included in the electrode portion 206*c* is also formed to directly cover a part of the side surface 203*c* and a part of the ridge portion 203*j*. The second electrode layer E2 included in the electrode portion 206*c* is formed to directly cover an entire portion of the first electrode layer E1 formed on the ridge portion 203*g*.

The electrode portion 203*c* includes a region 203$c_1$ and a region 206$c_2$. The region 206$c_2$ is located closer to the principal surface 203*a* than the region 206*$c_1$*. In the present embodiment, the electrode portion 206*c* includes only two regions 206*$c_1$* and 206*$c_2$*. The region 206*$c_1$* includes the first electrode layer E1, the third electrode layer E3, and the fourth electrode layer E4. The region 206*$c_1$* does not include the second electrode layer E2. The region 206*$c_1$* has a three-layer structure. The region 206*$c_2$* includes the first electrode layer E1, the second electrode layer E2, the third electrode layer E3, and the fourth electrode layer E4. The region 206*$c_2$* has a four-layer structure. The region 206*$c_1$* is the region where the first electrode layer E1 is exposed from the second electrode layer E2. The region 206*$c_2$* is the region where the first electrode layer E1 is covered with the second electrode layer E2.

The third electrode layer E3 included in the external electrode 206 is formed on the second electrode layer E2 and on the first electrode layer E1 (portion of the first electrode layer E1 exposed from the second electrode layer E2) by plating method. The fourth electrode layer E4 is formed on the third electrode layer E3 by plating method. As with the first electrode layer E1 included in the external electrode 205, the first electrode layer E1 included in the external electrode 206 is not intentionally formed on the pair of principal surfaces 203*a* and 203*b*. In the external electrode 206, the first electrode layer E1 may be unintentionally formed on the principal surfaces 203*a* and 203*b* due to a production error, for example.

The second electrode layer E2 included in each of the electrode portions 206*a* and 206*c* is integrally formed. The third electrode layer E3 included in each of the electrode portions 206*a* and 206*c* is integrally formed. The fourth electrode layer E4 included in each of the electrode portions 206*a* and 206*c* is integrally formed.

Next, a configuration of the external electrode 206 will be described.

As illustrated in FIG. 76, when viewed from the second direction D202, an end region near the principal surface 203*a* of the first electrode layer E1 (first electrode layer E1 included in the region 206*$c_2$*) is covered with the second electrode layer E2. When viewed from the second direction D202, an end edge E2*e* of the second electrode layer E2 crosses an end edge E1*e* of the first electrode layer E1. When viewed from the second direction D202, an end region near the principal surface 203*b* of the first electrode layer E1 (first electrode layer E1 included in the region 206*$c_1$*) is exposed from the second electrode layer E2.

As illustrated in FIG. 71, a width of the region 206*$c_2$* in the third direction D203 decreases with an increase in distance from the principal surface 203*a* (electrode portion 206*a*). In the present embodiment, an end edge of the region 206*$c_2$* has an approximately arc shape when viewed from the second direction D202. The region 206*$c_2$* has an approximately semicircular shape when viewed from the second direction D202. In the present embodiment, as illustrated in FIG. 76, the width of the second electrode layer E2 viewed from the second direction D202 decreases with an increase in distance from the principal surface 203*a*. When viewed from the second direction D202, the end edge E2*e* of the second electrode layer E2 included in region 206*$c_2$* has an approximately arc shape.

The multilayer feedthrough capacitor C203 is also solder-mounted on the electronic device. In the multilayer feedthrough capacitor C203, the principal surface 203*a* is arranged to constitute a mounting surface opposing the electronic device. The principal surface 203*b* may be arranged to constitute a mounting surface opposing the electronic device. In the multilayer feedthrough capacitor C203, the external electrode 206 may not include the electrode portion 206*a*.

As with the multilayer capacitor C201, the multilayer feedthrough capacitor C203 has the following operations and effects.

Occurrence of a crack in the element body 203 is suppressed and moisture resistance reliability is improved. Each of the external electrodes 205 and each of the internal electrodes 217 are reliably electrically connected to each other. Each of the external electrodes 206 and each of the internal electrodes 219 are reliably electrically connected to each other. Peel-off of the second electrode layer E2 tends not to develop to a position corresponding to the end surface 203*e*. An increase in ESR is suppressed.

The multilayer feedthrough capacitor C203 also has the following operations and effects.

Regarding the external electrode 206 as well as regarding the external electrode 205, when viewed from the second direction D202, the end region near the principal surface 203*a* of the first electrode layer E1 (first electrode layer E1 included in the region 206*$c_2$*) is covered with the second electrode layer E2. Therefore, the stress tends not to concentrate on the end edge of the first electrode layer E1 included in the region 206*$c_2$*. Consequently, in the multilayer capacitor C203, occurrence of a crack in the element body 203 is suppressed.

In the multilayer capacitor C203, regarding the external electrode 206 as well as regarding the external electrode 205, when viewed from the second direction D202, the end edge E2*e* of the second electrode layer E2 crosses the end edge Ele of the first electrode layer E1. The entirety of the first electrode layer E1 is not covered with the second electrode layer E2. The first electrode layer E1 includes the region exposed from the second electrode layer E2. Therefore, in the multilayer capacitor C203, an increase in an amount of conductive resin paste used for forming the second electrode layer E2 is suppressed.

In the region 206*$c_1$* included in the electrode portion 206*c*, the first electrode layer E1 is exposed from the second electrode layer E2. The region 206*$c_1$* does not include the second electrode layer E2. At the region 206*$c_1$*, the first electrode layer E1 is electrically connected to the electronic device without passing through the second electrode layer E2. Therefore, in the multilayer capacitor C203, an increase in ESR is suppressed.

The region 206*$c_2$* included in the electrode portion 206*c* includes the second electrode layer E2. Therefore, even in a case in which the external electrode 206 includes the electrode portion 206*c*, the stress tends not to concentrate on the end edge of the external electrode 206. The end edge of the external electrode 206 tends not to serve as an origination of a crack. Consequently, in the multilayer capacitor C203, the occurrence of the crack in the element body 203 is reliably suppressed.

In the multilayer capacitor C203, the width of the region 206*$c_2$* in the third direction D203 decreases with the increase in distance from the principal surface 203*a*. The width of the second electrode layer E2 viewed from the second direction D202 decreases with the increase in distance from the principal surface 203*a*. Therefore, the occurrence of the crack in the element body 203 is suppressed, and the increase in the amount of conductive resin paste used for forming the second electrode layer E2 is further suppressed.

In the present invention, the end edge of the region 205*$c_2$* (end edge E2*e* of the second electrode layer E2) may be approximately linear, and may have a side edge extending in the third direction D203 and a side edge extending in the first direction D201. The end edge of the region 206$c_2$ (end edge E2$e$ of the second electrode layer E2) may be approximately linear, and may have a side edge extending in the third direction D203 and a side edge extending in the first direction D201.

The ninth and tenth embodiments may be configured as follows.

The first electrode layer E1 may be formed on the principal surface 203$a$ to extend over the ridge portion 203$g$ entirely or partially from the end surface 203$e$. The first electrode layer E1 may be formed on the principal surface 203$b$ to extend beyond the ridge portion 203$h$ entirely or partially from the end surface 203$e$. The first electrode layer E1 may be formed on the side surface 203$c$ to extend beyond the ridge portion 203$i$ entirely or partially from the end surface 203$e$.

Figure 77:
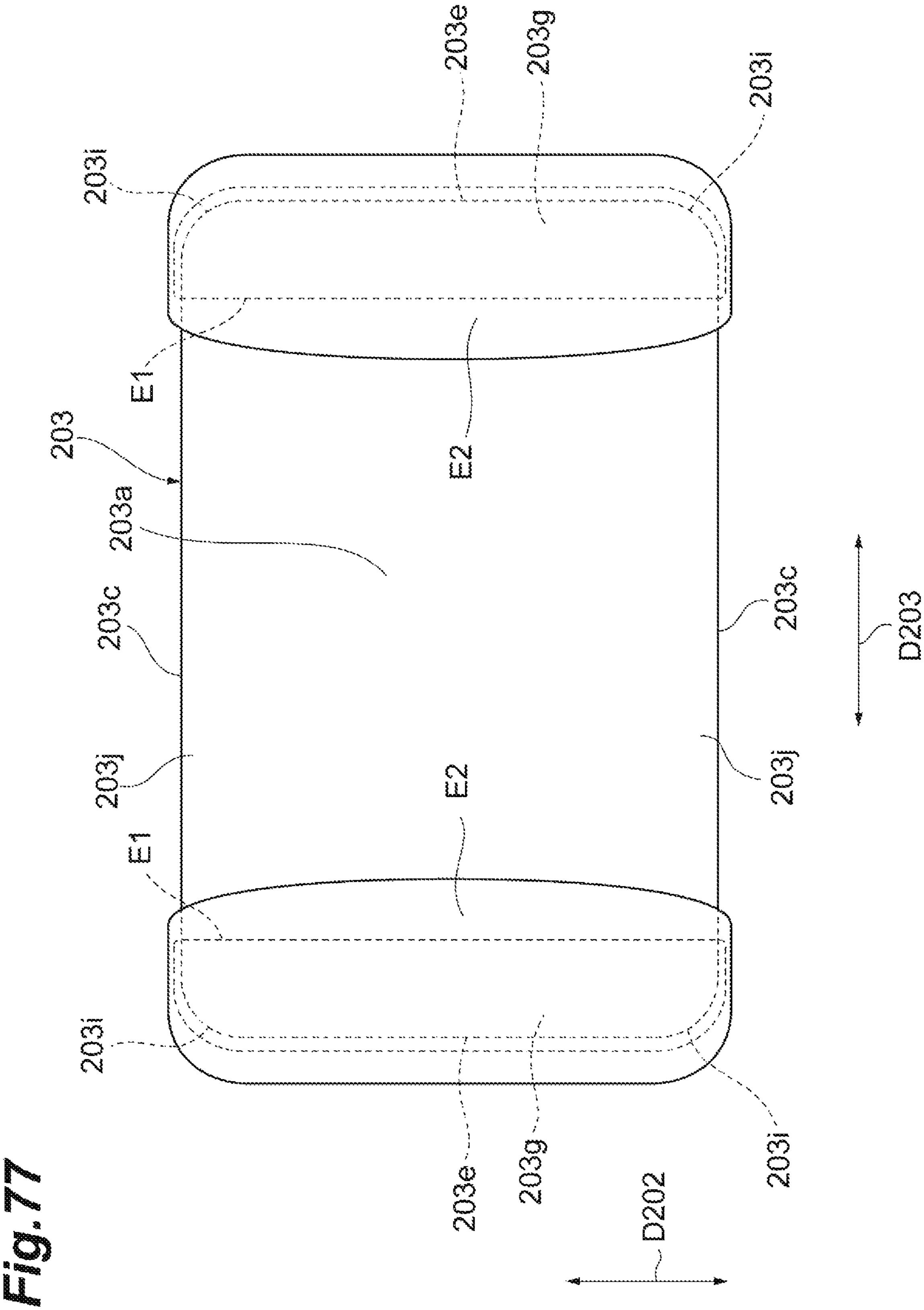
FIG. 77 is a plan view illustrating an element body, a first electrode layer, and a second electrode layer.
Figure 78:
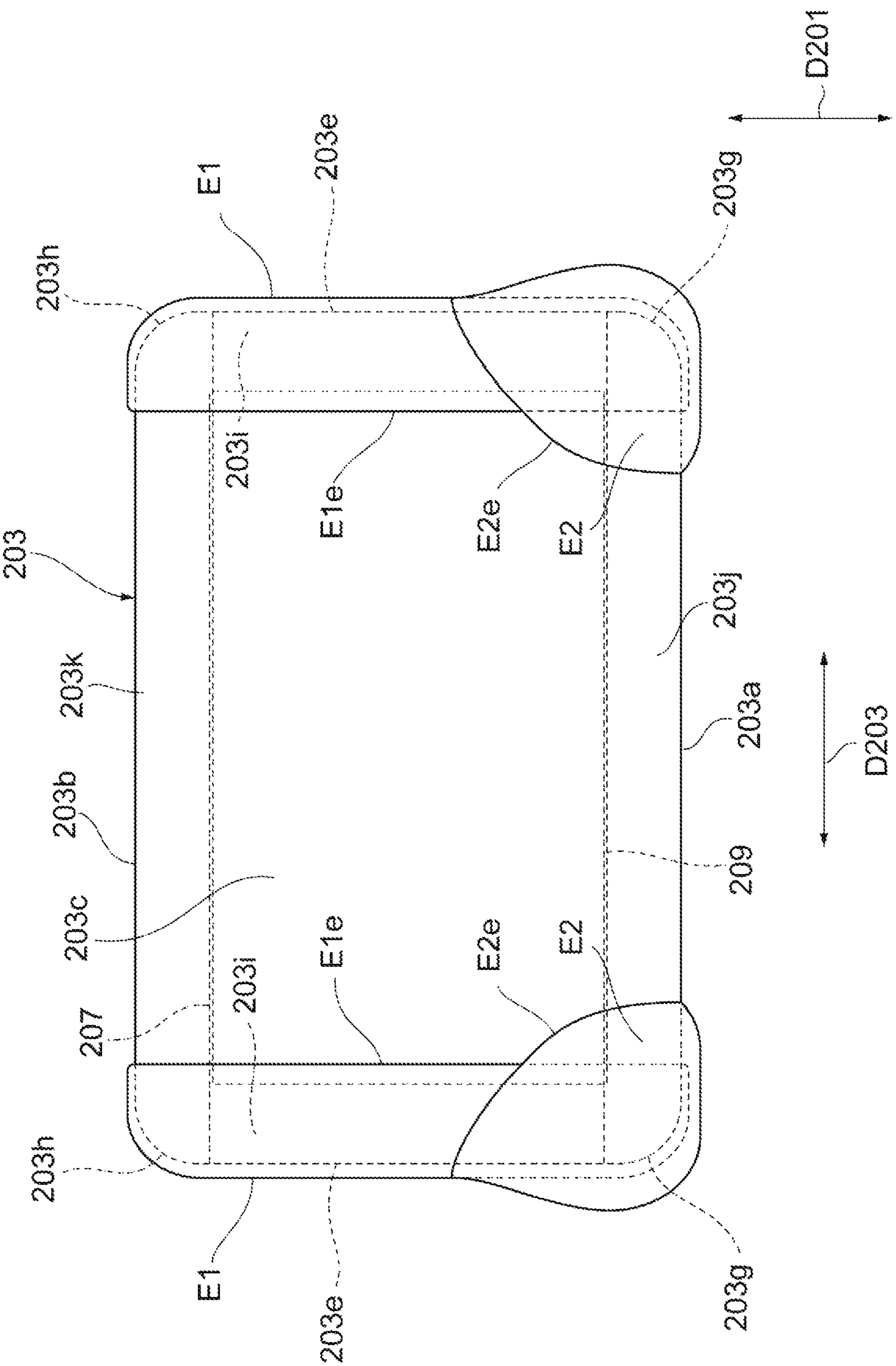
FIG. 78 is a side view illustrating the element body, the first electrode layer, and the second electrode layer.

As illustrated in FIGS. 77 and 78, the first electrode layer E1 may be formed, for example, on each of the principal surfaces 203$a$ and 203$b$ and each of the side surfaces 203$c$. In FIGS. 77 and 78, the first electrode layer E1 is formed on the principal surface 203$a$ to extend over the entire ridge portion 203$g$ from the end surface 203$e$. The first electrode layer E1 is formed on the principal surface 203$b$ to extend beyond the entire ridge portion 203$h$ from the end surface 203$e$. The first electrode layer E1 is formed on the side surface 203$c$ to extend beyond the entire ridge portion 203$i$ from the end surface 203$e$. In the modification illustrated in FIGS. 77 and 78, as illustrated in FIG. 77, an entirety of the portion of the first electrode layer E1 formed on the principal surface 203$a$ is covered with the second electrode layer E2. As illustrated in FIG. 78, a part of the portion of the first electrode layer E1 formed on the side surface 203$c$ (first electrode layer E1 included in the region 205$c_2$) is covered with the second electrode layer E2. The first electrode layer E1 formed on each of the principal surfaces 203$a$ and 203$b$ and each of the side surfaces 203$c$ is covered with the third electrode layer E3 and fourth electrode layer E4.

The plating layer (third and fourth electrode layers E3 and E4) indirectly covers the portion of the first electrode layer E1 formed on the principal surface 203$a$ and the first electrode layer E1 included in the region 205$c_2$ with the second electrode layer E2 therebetween. The plating layer (third and fourth electrode layers E3 and E4) directly covers the portion of the first electrode layer E1 formed on the principal surface 203$b$ and a part of the portion of the first electrode layer E1 formed on the side surface 203$c$ (first electrode layer E1 included in the region 205$c_1$). The electrode portion disposed on the principal surface 203$a$ has a four-layer structure. The electrode portion disposed on the principal surface 203$b$ has a three-layer structure. The electrode portion disposed on the region near the principal surface 203$b$ in the side surface 203$c$ has a three-layer structure. The electrode portion disposed on the region near the principal surface 203$a$ in the side surface 203$c$ has a four-layer structure. The electrode portion disposed on the region near the principal surface 203$b$ in the end surface 203$e$ has a three-layer structure. The electrode portion disposed on the region near the principal surface 203$a$ in the end surface 203$e$ has a four-layer structure.

The number of the internal electrodes 207 and 209 included in the multilayer capacitor C201 or C202 is not limited to the number of the internal electrodes 207 and 209 illustrated in FIGS. 59 and 61. The number of the internal electrodes 217 and 219 included in the multilayer feed-through capacitor C203 is not limited to the number of the internal electrodes 217 and 219 illustrated in FIGS. 73 and 75. In the multilayer capacitor C201 or C202, the number of the internal electrodes connected to one external electrode 205 (first electrode layer E1) may be one. In the multilayer feedthrough capacitor C203, the number of the internal electrode connected to one pair of external electrodes 205 (first electrode layer E1) may be one. The number of the internal electrodes connected to one pair of external electrodes 206 (first electrode layer E1) may be one.

Figure 79:
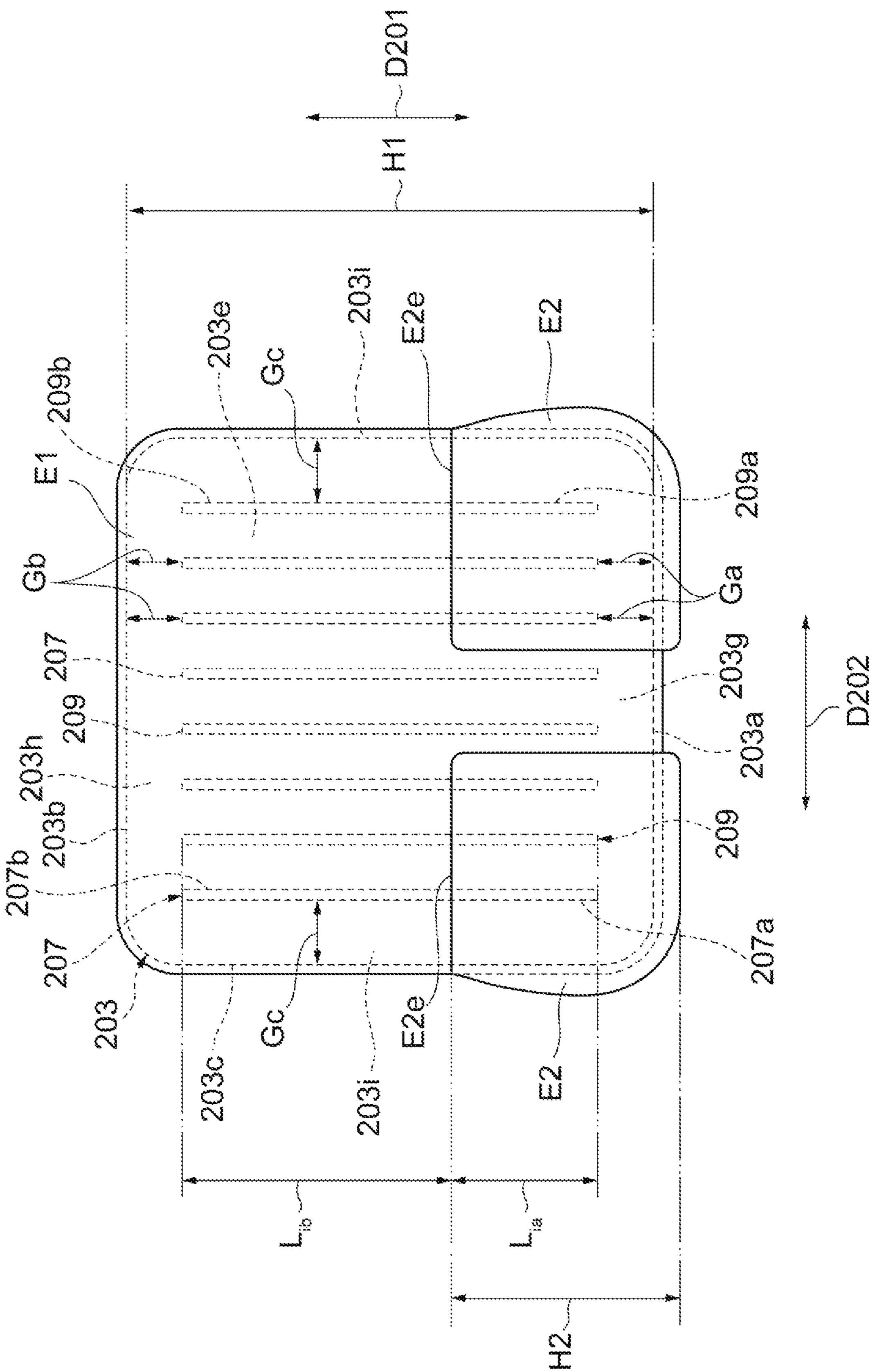
FIG. 79 is an end view illustrating an element body, a first electrode layer, and a second electrode layer.
Figure 80:
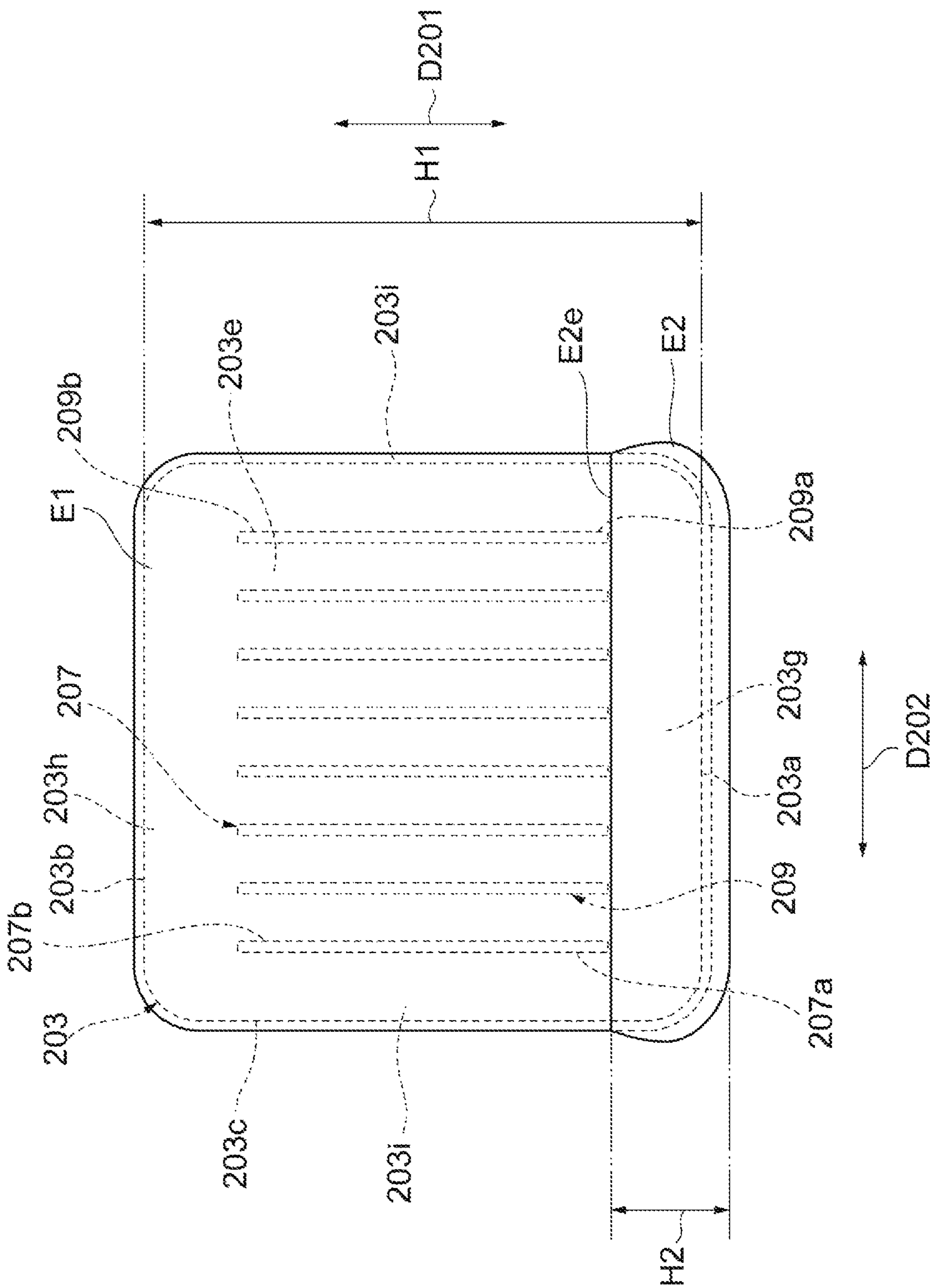
FIG. 80 is an end view illustrating an element body, a first electrode layer, and a second electrode layer.

Next, configurations of multilayer capacitors according to modifications of the ninth embodiment will be described with reference to FIGS. 79 and 80. FIGS. 79 and 80 are an end view illustrating an element body, a first electrode layer, and a second electrode layer. In the modifications illustrated in FIGS. 79 and 80, a shape of the second electrode layer E2 included in the region 205$e_2$ is different from that of the multilayer capacitor C201.

In the multilayer capacitor illustrated in FIG. 79, the second electrode layer E2 included in the region 205$e_2$ consists of a plurality of portions E2$_1$ and E2$_2$. In the present modification, the second electrode layer E2 included in the region 205$e_2$ consists of two portions E2$_1$ and E2$_2$. Each of the portions E2$_1$ and E2$_2$ are separated from each other. The first electrode layer E1 is exposed between the portion E2$_1$ and the portion E2$_2$. The plurality of internal electrodes 207 and 209 includes an internal electrode including one end not overlapping with the second electrode layer E2 (portions E2$_1$ and E2$_2$) when viewed from the third direction D203. The number of the internal electrode including the one end not overlapping with the second electrode layer E2 (portions E2$_1$ and E2$_2$) may be one or more. The second electrode layer E2 included in the region 205$e_2$ may consist of three or more portions.

In the multilayer capacitor illustrated in FIG. 80, when viewed from the third direction D203, the second electrode layer E2 included in the region 205$e_2$ does not overlap with the one ends of all the internal electrodes 207 and 209. All the internal electrodes 207 and 209 are internal electrodes including one end not overlapping with the second electrode layer E2 (portions E2$_1$ and E2$_2$) when viewed from the third direction D203.

For example, the ninth and tenth embodiments disclose the following notes.

(Note 1)

An electronic component includes an element body of a rectangular parallelepiped shape including a first principal surface arranged to constitute a mounting surface, a second principal surface opposing the first principal surface in a first direction, a pair of side surfaces opposing each other in a second direction, and a pair of end surfaces opposing each other in a third direction, and external electrodes disposed at both end portions of the element body in the third direction.

The external electrode includes a conductive resin layer located on the side surface.

When viewed from the second direction, a length of the conductive resin layer in the first direction decreases with an increase in distance from the corresponding end portion in the third direction.

(Note 2)

The electronic component according to note 1, wherein when viewed from the second direction, an end edge of the conductive resin layer has an approximately arc shape.

(Note 3)

The electronic component according to note 1, wherein when viewed from the second direction, an end edge of the conductive resin layer is approximately linear.

(Note 4)

The electronic component according to any one of notes 1 to 3, wherein the conductive resin layer is located on the first principal surface and on the end surface.

(Note 5)

The electronic component according to note 4, wherein the conductive resin layer is formed to cover a part of the first principal surface, a part of the end surface, a part of the side surface, a part of a ridge portion located between the first principal surface and the side surface, and an entire ridge portion located between the first principal surface and the end surface.

(Note 6)

The electronic component according to any one of notes 1 to 5 includes an internal conductor exposed to the corresponding end surface.

The external electrode further includes a sintered metal layer formed on the end surface to be connected to the internal conductor.

(Note 7)

The electronic component according to note 6, wherein the sintered metal layer includes a first region covered with the conductive resin layer and a second region exposed from the conductive resin layer.

(Note 8)

The electronic component according to note 7, wherein the external electrode further includes a plating layer formed to cover the conductive resin layer and the second region included in the sintered metal layer.

Although the preferred embodiments and modifications of the present invention have been described above, the present invention is not necessarily limited to the above-described embodiments and modifications, and various modifications can be made without departing from the gist thereof.

In the embodiments and the modifications described above, the multilayer capacitors C1, C2, C4, C5, C103, and C201, and the multilayer feedthrough capacitors C3, C6, C7, C101, and C203 are exemplified as electronic components, but applicable electronic components are not limited to multilayer capacitors and multilayer feedthrough capacitors. Applicable electronic components are, for example, multilayer electronic components such as multilayer inductors, multilayer varistors, multilayer piezoelectric actuators, multilayer thermistors, multilayer composite components, or the like, or electronic components other than multilayer electronic components.

INDUSTRIAL APPLICABILITY

The present invention can be used for a multilayer capacitor or a multilayer feedthrough capacitor.

REFERENCE SIGNS LIST

3 element body
3*a*, 3*b* principal surface
3*c*, 3*e* side surface
5, 13, 15, 21, 31 external electrode
5*a*, 5*b*, 5*c*, 5*e*, 13*a*, 13*b*, 13*c*, 13*e*, 15*a*, 15*b*, 15*c*, 21*a*, 21*b*, 21*c*, 31*a*, 31*b*,
31*c*, 31*e* electrode portion
$5c_1$, $5c_2$, $5e_1$, $5e_2$, $13c_1$, $13c_2$, $13e_1$, $13e_2$, $15c_1$, $15c_2$, $21c_1$, $21c_2$, $31c_1$, $31c_2$, $31e_1$, $31e_2$ region included in the electrode portion
C1, C2, C4, C5 multilayer capacitor
C3, C6, C7 multilayer feedthrough capacitor
E1 first electrode layer
E2 second electrode layer
E3 third electrode layer
E4 fourth electrode layer
ECD1 electronic component device
ED electronic device
PE1, PE2 pad electrode
SF solder fillet.

The invention claimed is:

1. An electronic component comprising:

an element body of a rectangular parallelepiped shape including a first principal surface arranged to constitute a mounting surface, a second principal surface opposing the first principal surface in a first direction, a pair of side surfaces opposing each other in a second direction, and a pair of end surfaces opposing each other in a third direction;

a plurality of internal electrodes in the element body, the plurality of internal electrodes (i) opposing each other in the second direction and (ii) comprising a first set of internal electrodes and a second set of internal electrodes; and a pair of external electrodes at the pair of end surfaces; wherein:

each of the first set of internal electrodes (a) has a first end (i) exposed to a first end surface of the pair of end surfaces and (ii) coupled to a first external electrode of the pair of external electrodes and (b) is not coupled to a second external electrode of the pair of external electrodes;

each of the second set of internal electrodes (a) has a first end (i) exposed to the second end surface of the pair of end surfaces and (ii) coupled to the second external electrode of the pair of external electrodes and (b) is not coupled to the first external electrode of the pair of external electrodes;

the first external electrode of the pair of external electrodes (i) covers an entirety of the first end surface of the pair of end surfaces and (ii) includes a conductive resin layer covering a portion of the first end surface of the pair of end surfaces;

the second external electrode of the pair of external electrodes (i) covers an entirety of the second end surface of the pair of end surfaces and includes (ii) a conductive resin layer covering a portion of the second end surface of the pair of end surfaces;

the first end of the each of the first set of internal electrodes includes a first region that overlaps the conductive resin layer of the first external electrode of the pair of external electrodes and a second region that does not overlap the conductive resin layer of the first external electrode of the pair of external electrodes, when viewed in the third direction; and the first end of the each of the second set of internal electrodes includes a first region that overlaps the conductive resin layer of the second external electrode of the pair of external electrodes and a second region that does not overlap the conductive resin layer of the second external electrode of the pair of external electrodes, when viewed in the third direction.

2. The electronic component according to claim 1, wherein a length of each of (i) the first region of the first end of the each of the first set of internal electrodes and (ii) the first region of the first end of the each of the second set of internal electrodes in the first direction is smaller than a length of each of (ii) the second region of the first end of the each of the first set of internal electrodes and (ii) the second region of the first end of the each of the second set of internal electrodes, in the first direction.

3. The electronic component according to claim 1, wherein:

the first external electrode of the pair of external electrodes includes a sintered metal layer on the first end surface of the pair of end surfaces connected to the second region of the first end of the each of the first set of internal electrodes; and the second external electrode of the pair of external electrodes includes a sintered metal layer on the second end surface of the pair of end surfaces connected to the second region of the first end of the each of the second set of internal electrodes.

4. The electronic component according to claim 3, wherein the first ends of all of the first set of internal electrodes are connected to the sintered metal layer of the first external electrode of the pair of external electrodes and the first ends of all of the second set of internal electrodes are connected to the sintered metal layer of the second external electrode of the pair of external electrodes.

5. The electronic component according to claim 3, wherein the each of the pair of external electrodes includes a plating layer covering the conductive resin layer and the sintered metal layer.

6. The electronic component according to claim 1, wherein (i) an end edge of the conductive resin layer of the first external electrode of the pair of external electrodes and the first end of the each of the first set of internal electrodes cross and (ii) an end edge of the conductive resin layer of the second external electrode of the pair of external electrodes and the first end of the each of the second set of internal electrodes cross, when viewed from the third direction.

7. The electronic component according to claim 1, wherein each of the conductive resin layer of the first external electrode of the pair of external electrodes and the second external electrode of the pair of external electrodes covers a portion of the first principal surface near one of the pair of end surfaces.

8. The electronic component according to claim 1, wherein the each of the conductive resin layer of the first external electrode of the pair of external electrodes and the second external electrode of the pair of external electrodes covers a portion of a side surface of the pair of side surfaces.

9. The electronic component according to claim 8, wherein a portion of the each of the conductive resin layer of the first external electrode of the pair of external electrodes and the second external electrode of the pair of external electrodes on the portion of the side surface of the pair of side surfaces opposes an internal electrode of the plurality of internal electrodes having a polarity different from that of the portion, in the second direction.

10. The electronic component according to claim 1, wherein the each of the conductive resin layer of the first external electrode of the pair of external electrodes and the second external electrode of the pair of external electrodes is not on the second principal surface.

11. The electronic component according to claim 1, wherein a distance between each of the pair of side surfaces and an internal electrode of the plurality of internal electrodes nearest to the each of the pair of side surfaces in the second direction is larger than a distance between the first principal surface and the internal electrode of the plurality of internal electrodes in the first direction, and larger than a distance between the second principal surface and the internal electrode of the plurality of internal electrodes in the first direction.

12. An electronic component comprising:

an element body of a rectangular parallelepiped shape including a first principal surface arranged to constitute a mounting surface, a second principal surface opposing the first principal surface, a side surface adjacent to the first and second principal surfaces, and an end surface adjacent to the first and second principal surfaces and the side surface; and on the side surface, wherein the side surface includes a first region close to the first principal surface and the end surface and a second region close to the second principal surface and the end surface, an external electrode including an electrode portion includes a conductive resin layer on the first region, and the second region is exposed from the conductive resin layer.

13. The electronic component according to claim 12, wherein the end surface includes a third region close to the first principal surface and a fourth region close to the second principal surface, the external electrode includes another electrode portion on the end surface and coupled to the electrode portion, the other electrode portion includes a conductive resin layer on the third region, and the fourth portion is exposed from the conductive resin layer included in the other electrode portion.

14. The electronic component according to claim 13, wherein the conductive resin layers included in the electrode portion and the other electrode portion are coupled on a ridge portion between the side surface and the end surface.

15. An electronic component comprising:

an element body of a rectangular parallelepiped shape including a first principal surface arranged to constitute a mounting surface, a second principal surface opposing the first principal surface, a side surface adjacent to the first and second principal surfaces, and an end surface adjacent to the first and second principal surfaces and the side surface; and an external electrode including an electrode portion on the side surface, wherein the electrode portion includes a first portion including a conductive resin layer and a second portion including no conductive resin layer, and the first portion is closer to the first principal surface than the second portion.

16. The electronic component according to claim 15, wherein the external electrode includes another electrode portion on the end surface and coupled to the electrode portion, the other electrode portion includes a third portion including a conductive resin layer and a fourth portion including no conductive resin layer, and the third portion is closer to the first principal surface than the fourth portion.

17. The electronic component according to claim 16, wherein the conductive resin layers included in the electrode portion and the other electrode portion are coupled on a ridge portion between the side surface and the end surface.

18. An electronic component comprising:

an element body of a rectangular parallelepiped shape including a principal surface arranged to constitute a mounting surface and a first side surface adjacent to the principal surface; and an external electrode including an electrode portion on the first side surface, wherein the electrode portion includes a first portion including a conductive resin layer, and a second portion including no conductive resin layer, and the first portion is closer to the principal surface than the second portion.

19. The electronic component according to claim 18, wherein the element body includes a second side surface adjacent to the principal surface and the first side surface, the external electrode includes another electrode portion on the second side surface and coupled to the electrode portion, and the other electrode portion includes a third portion including a conductive resin layer.

20. The electronic component according to claim 19, wherein the conductive resin layers included in the first and the third portions are coupled on a ridge portion between the first and second side surfaces.

21. The electronic component according to claim 18, wherein:

the electrode portion includes a sinter metal layer, and the sinter metal layer is covered with conductive resin layer in the first portion, and is exposed from the conductive resin layer in the second portion.

22. The electronic component according to claim 18, wherein the external electrode includes another electrode portion on the principal surface and coupled to the electrode portion, and the other electrode portion includes a conductive resin layer.

23. The electronic component according to claim 22, wherein the conductive resin layers included in the first portion and the other electrode portion are coupled on a ridge portion between the first side surface and the principal surface.

* * * * *